US012170489B2

(12) United States Patent
Kim et al.

(10) Patent No.: US 12,170,489 B2
(45) Date of Patent: Dec. 17, 2024

(54) DEVICE FOR COMPENSATING FOR CURRENT OR VOLTAGE

(71) Applicants: EM CORETECH INC., Ulsan (KR); UNIST( ULSAN NATIONAL INSTITUTE OF SCIENCE AND TECHNOLOGY), Ulsan (KR)

(72) Inventors: Jin Gook Kim, Ulsan (KR); Sang Yeong Jeong, Ulsan (KR)

(73) Assignees: EM CORETECH INC., Ulsan (KR); UNIST( ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 18/396,750

(22) Filed: Dec. 27, 2023

(65) Prior Publication Data

US 2024/0186910 A1 Jun. 6, 2024

Related U.S. Application Data

(63) Continuation of application No. 17/450,361, filed on Oct. 8, 2021, now Pat. No. 11,901,832, which is a (Continued)

(30) Foreign Application Priority Data

Apr. 17, 2019 (KR) ........................ 10-2019-0045138
Apr. 23, 2019 (KR) ........................ 10-2019-0047518
(Continued)

(51) Int. Cl.

| | |
|---|---|
| ***H02M 1/12*** | (2006.01) |
| ***H02M 1/32*** | (2007.01) |
| ***H02M 5/293*** | (2006.01) |

(52) U.S. Cl.
CPC ............. *H02M 5/293* (2013.01); *H02M 1/32* (2013.01)

(58) Field of Classification Search
CPC .......... H02M 5/293; H02M 1/32; H02M 1/12; H02M 1/44
See application file for complete search history.

(56) References Cited

U.S. PATENT DOCUMENTS 11,901,832 B2 * 2/2024 Jeong .................... H02M 1/123
2014/0312966 A1 10/2014 Hoene et al.
(Continued)

FOREIGN PATENT DOCUMENTS

CN 106058886 10/2016
CN 106208094 12/2016
(Continued)

OTHER PUBLICATIONS

K. Mainali and R. Oruganti, "Design of a current-sense voltage-feedback common mode EMI filter for an off-line power converter," 2008 IEEE Power Electronics Specialists Conference, Rhodes, Greece, 2008, pp. 1632-1638, doi: 10.1109/PESC.2008.4592174.
(Continued)

*Primary Examiner* — Adolf D Berhane
(74) *Attorney, Agent, or Firm* — PnK IP LLC

(57) ABSTRACT

This application relates to an active compensating device. In one aspect, the active compensating device includes two or more high current paths through which a second current supplied by a second device is transmitted to a first device, and a sensing unit sensing the first current on the high current paths and generating an output signal corresponding to the first current. The device may also include an amplifying unit amplifying the output signal of the sensing unit to generate an amplified current and a compensating unit generating a compensation current based on the amplified
(Continued)

current and allowing the compensation current to flow to each of the two or more high current paths. The device may further include a first anti-disturbance unit connected in parallel to output terminals of the sensing unit, and a second anti-disturbance unit connected in parallel to input terminals of the compensating unit.

9 Claims, 98 Drawing Sheets

Related U.S. Application Data continuation-in-part of application No. PCT/KR2020/005180, filed on Apr. 17, 2020.

(30) Foreign Application Priority Data

| | | |
|---|---|---|
| May 3, 2019 | (KR) | 10-2019-0052371 |
| May 7, 2019 | (KR) | 10-2019-0053238 |
| May 16, 2019 | (KR) | 10-2019-0057607 |
| Sep. 17, 2019 | (KR) | 10-2019-0114374 |
| Sep. 17, 2019 | (KR) | 10-2019-0114375 |
| Mar. 2, 2020 | (KR) | 10-2020-0026120 |
| Mar. 17, 2020 | (KR) | 10-2020-0032851 |
| Dec. 23, 2020 | (KR) | 10-2020-0182641 |
| Dec. 23, 2020 | (KR) | 10-2020-0182642 |
| Dec. 24, 2020 | (KR) | 10-2020-0183864 |
| Feb. 24, 2021 | (KR) | 10-2021-0024761 |

(56) References Cited

U.S. PATENT DOCUMENTS

| | | | | |
|---|---|---|---|---|
| 2016/0013638 | A1 | 1/2016 | Glas et al. | |
| 2017/0047881 | A1 | 2/2017 | Shimura et al. | |
| 2022/0208443 | A1 * | 6/2022 | Kim | G01R 31/2827 |

FOREIGN PATENT DOCUMENTS

| | | |
|---|---|---|
| CN | 208239552 | 12/2018 |
| JP | 10-013159 | 1/1998 |
| JP | 2000-201044 | 7/2000 |
| JP | 2002-010650 | 1/2002 |
| JP | 2003-174777 | 6/2003 |
| JP | 2005-124339 | 5/2005 |
| JP | 2005-532027 | 10/2005 |
| JP | 2006-006038 | 1/2006 |
| JP | 2007-274026 | 10/2007 |
| JP | 2010-57268 | 3/2010 |
| JP | 2018-191443 | 11/2018 |
| KR | 10-2003-0002685 | 1/2003 |
| KR | 10-2012-0053606 | 5/2012 |
| KR | 10-2012-0098283 | 9/2012 |
| KR | 10-2016-0117703 | 10/2016 |
| KR | 10-2018-0106913 | 10/2018 |
| KR | 10-1945463 | 2/2019 |
| KR | 10-2019-0096689 | 8/2019 |
| KR | 10-2071480 | 3/2020 |
| KR | 10-2131263 | 7/2020 |
| KR | 10-2020-0122264 | 10/2020 |
| WO | 2013008925 | 1/2013 |
| WO | 2018109801 | 6/2018 |
| WO | 2018162488 | 9/2018 |
| WO | 2018236570 | 12/2018 |

OTHER PUBLICATIONS

Office Action dated Nov. 8, 2022 issued in the Japanese Patent Application No. 2021-561606.
Office Action dated Apr. 19, 2022 issued in the Korean Patent Application No. 10-2020-0079643.
Office Action dated May 20, 2022 issued in the Korean Patent Application No. 10-2020-0182641.
Notice of Allowance dated May 12, 2023, issued in the Korean Patent Application No. 10-2020-0182642.
Office Action dated May 20, 2022, issued in the Korean Patent Application No. 10-2020-0182642.
Notice of Allowance dated Jun. 28, 2023, issued in the Korean Patent Application No. 10-2020-0183864.
Office Action dated May 20, 2022, issued in the Korean Patent Application No. 10-2020-0183864.
Notice of Allowance dated Jun. 22, 2023, issued in the Korean Patent Application No. 10-2021-0008701.
Office Action dated Aug. 1, 2022, issued in the Korean Patent Application No. 10-2021-0008701.
Final Office Action dated Feb. 21, 2023, issued in the Korean Patent Application No. 10-2021-0008702.
Office Action dated Jul. 20, 2022, issued in the Korean Patent Application No. 10-2021-0024761.
Office Action dated May 2, 2023, issued in the Korean Patent Application No. 10-2021-0078328.
Office Action dated Jun. 7, 2022, issued in the Korean Patent Application No. 10-2022-0033567.
Notice of Allowance dated Apr. 28, 2023, issued in the Korean Patent Application No. 10-2022-0127502.
Office Action dated Feb. 6, 2023, issued in the Korean Patent Application No. 10-2022-0127502.
Office Action dated Mar. 8, 2023, issued in the Korean Patent Application No. 10-2023-0024796.
International Search Report and Written Opinion mailed Jul. 27, 2020 in International Application No. PCT/KR2020/005180.
Arados et al., "Differential Overvoltage Protection Circuits for Current Sense Amplifiers", Analog Devices, Inc., Technical Article 2016, pp. 1-3.
Smudger, "Designing with op-amps and single supplies"<Stompville Article, Jun. 24, 2013, pp. 1-9. Retrieved from http://stompville.co.uk/?p=740.
Notice of Allowance dated Sep. 27, 2023, issued in the United States U.S. Appl. No. 17/450,361.
M. L. Heldwein, H. Ertl, J. Biela and J. W. Kolar, "Implementation of a Transformerless Common-Mode Active Filter for Offline Converter Systems," in IEEE Transactions on Industrial Electronics, vol. 57, No. 5, pp. 1772-1786, May 2010, doi: 10.1109/TIE.2009.2032204.

* cited by examiner

DEVICE FOR COMPENSATING FOR CURRENT OR VOLTAGE

CROSS REFERENCE TO RELATED APPLICATIONS

This application is a Continuation Application of U. S. application Ser. No. 17/450,361, filed on Dec. 27, 2023, which is a Continuation-In-Part Application of International Patent Application No. PCT/KR2020/005180, filed on Apr. 17, 2020, which claims priority from and the benefit of Korean patent applications Nos. 10-2019-0045138 filed on Apr. 17, 2019, 10-2019-0047518 filed on Apr. 23, 2019, 10-2019-0052371 filed on May 3, 2019, 10-2019-0053238 filed on May 7, 2019, No. 10-2019-0057607 filed on May 16, 2019, 10-2019-0114375 filed on Sep. 17, 2019, 10-2019-0114374 filed on Sep. 17, 2019, 10-2020-0003875 filed on Apr. 23, 2019, 10-2020-0026120 filed on Mar. 2, 2020, 10-2020-0032851 filed on Mar. 17, 2020, 10-2020-0182641 filed on Dec. 23, 2020, 10-2020-0182642 filed on Dec. 23, 2020, 10-2020-0183864 filed on Dec. 24, 2020, and 10-2021-0024761 filed on Feb. 24, 2021, each of which is hereby incorporated by reference for all purposes as if fully set forth herein.

BACKGROUND

Field

Embodiments of the present disclosure relate to an active current (and/or voltage) compensating device, and more particularly, to an active compensating device for actively compensating for a current and/or a voltage that is input as a common-mode current and/or voltage to two or more high current paths connecting two devices.

Discussion of the Background

Generally, electrical devices such as household appliances, industrial electrical appliances and electric vehicles emit noise during operation. For example, noise may be emitted through a power line due to a switching operation of a power conversion device in an electronic device. If such noise is neglected, not only it is harmful to the human body, but also it causes malfunctions in surrounding parts and other electronic devices. As such, the electromagnetic interference that an electronic device exerts on other devices is called electromagnetic interference (EMI), and, from among them, noise transmitted through wires and substrate wires is called conducted emission (CE) noise.

SUMMARY

One aspect is a compensating device for reducing common-mode (CM) noise.

Another aspect is a compensating device having a sensing unit with a reduced size and improved productivity.

Another aspect is a compensating device for outputting a compensation current to a side from which electromagnetic interference (EMI)noise is emitted regardless of the magnitude of a load on the side from which the EMI noise is emitted.

However, the above and following aspects are merely examples and do not limit the scope of the inventive concept.

Another aspect is an active compensating device configured to actively compensate for a first current that is input as a common-mode current to each of at least two or more high current paths connected to a first device, the active compensating device including at least two or more high current paths through which a second current supplied by a second device is transmitted to a first device, a sensing unit configured to sense the first current on the high current paths and generate an output signal corresponding to the first current, an amplifying unit configured to amplify the output signal of the sensing unit to generate an amplified current, and a compensating unit configured to generate a compensation current on the basis of the amplified current and allow the compensation current to flow to each of the at least two or more high current paths, and a first anti-disturbance unit connected in parallel to output terminals of the sensing unit from which the output signal is generated, and a second anti-disturbance unit connected in parallel to input terminals of the compensating unit, wherein each of the first anti-disturbance unit and the second anti-disturbance unit include a transient voltage suppression (TVS) diode element, and a junction capacitance of the TVS diode element is several hundred pF or less.

According to an embodiment, each of the first anti-disturbance unit and the second anti-disturbance unit may have a first impedance when a voltage less than a predetermined threshold voltage is applied to the output terminals of the sensing unit and the input terminals of the compensating unit, and a second impedance lower than the first impedance when a voltage greater than or equal to the predetermined threshold voltage is applied to the output terminals of the sensing unit and the input terminals of the compensating unit.

According to an embodiment, the sensing unit may include a sensing transformer including a primary side disposed on the high current paths, and a secondary side configured to output the output signal to the amplifying unit.

According to an embodiment, the first anti-disturbance unit may limit a voltage, which is greater than or equal to a threshold voltage and induced toward the secondary side by the primary side on the basis of a voltage applied to the at least two or more high current paths, to a voltage less than or equal to the threshold voltage, and transmit the limited voltage to the amplifying unit.

According to an embodiment, the compensating unit may include a primary side disposed on a path connecting the output terminals of the amplifying unit and a reference potential of the amplifying unit, and a secondary side disposed on a path connecting a compensating capacitor unit, which is included in the compensating unit and connected to the high current paths, and a reference potential of the active compensating device, and the second anti-disturbance unit may limit a voltage, which is greater than or equal to a threshold voltage and induced toward the primary side by the secondary side on the basis of a voltage applied to the at least two or more high current paths, to a voltage less than or equal to the threshold voltage, and transmit the limited voltage to the amplifying unit.

Other aspects, features, and advantages other than those described above will become apparent from the following forms, claims, and drawings for carrying out the present disclosure.

The present disclosure is designed to overcome the above problems, and the objective thereof is to provide an active current compensation device capable of detecting a malfunction. In particular, the objective of the present disclosure is to provide an active current compensation device in which an active circuit unit and a malfunction detection circuit are integrated together in one integrated circuit (IC) chip.

However, these problems are exemplary, and the scope of the present disclosure is not limited thereto.

An active circuit unit should be powered to operate in an active EMI filter. For example, an output of a switching mode power supply (SMPS) may be used as a power source for the active circuit unit. A specific voltage (e.g., 12 V) may be required in the active circuit unit, but the required voltage may not exist in an existing system. That is, the direct current (DC) voltage input to the active circuit unit varies depending on a system.

In summary, depending on the system, the SMPS may not output the specific voltage for driving the active circuit unit, and in this case, an operation of the active circuit unit becomes unstable.

The present disclosure has been made in view of the above problems, and it is an object of the present disclosure to provide an active current compensation device including a power conversion unit embedded therein.

However, these problems are exemplary, and the scope of the present disclosure is not limited thereto.

Meanwhile, in order to actually apply an active EMI filter to electronic products, it is necessary to mass-produce semiconductor devices that meet various demands. When discrete elements (or components) are used to produce an active EMI filter for actual use, in order to improve an active EMI filter function, the number of elements for an active circuit is increased and various components are required. Accordingly, the size and cost of the active EMI filter may be increased to achieve a higher function.

Thus, there is a need for an active EMI filter, which uses a customized IC that may be used in various power systems.

The present disclosure is designed to overcome the above problems, and the objective thereof is to provide an active current compensation device including an integrated circuit unit and a non-integrated circuit unit. The integrated circuit unit may be one chip including essential components of the active current compensation device, and the non-integrated circuit unit may be a configuration to implement an active EMI filter of various designs.

The active EMI filter may include, for example, bipolar junction transistors (BJTs). However, when a current flows through the BJT and heat is generated, there is an effect of increasing a current gain of the BJT (or an effect of reducing an internal resistance of the BJT). Then, positive feedback, in which heat is further generated due to the increased current, occurs. Due to the positive feedback, the heat may continue to increase, resulting in a problem that the BJT is damaged or loses its original properties. This phenomenon is referred to as a thermal runaway phenomenon.

The thermal runaway problem should be solved when configuring an amplification unit of the active EMI filter using BJTs.

The present disclosure has been made in view of the above problems, and it is an object of the present disclosure to provide an active current compensation device including a one-chip IC.

However, these problems are exemplary, and the scope of the present disclosure is not limited thereto.

Additional aspects will be set forth in part in the description which follows and, in part, will be apparent from the description, or may be learned by practice of the presented embodiments of the disclosure.

According to an embodiment of the present disclosure, an active current compensation device which actively compensates for a noise occurring in a common mode in each of two or more high-current paths, includes a sensing unit configured to generate an output signal corresponding to a common-mode noise current on the high-current paths, an amplification unit configured to amplify the output signal to generate an amplified current, a compensation unit configured to generate a compensation current on the basis of the amplified current and allow the compensation current to flow to each of the two or more high-current paths, and a malfunction detection unit configured to detect a malfunction of the amplification unit, wherein the malfunction detection unit and at least a portion of the amplification unit may be embedded in one integrated circuit (IC) chip.

According to an embodiment, signals at two nodes included in the amplification unit may be differentially input to the malfunction detection unit.

According to an embodiment, the amplification unit may include a first transistor and a second transistor, and one node of the first transistor and one node of the second transistor may be respectively connected to input terminals of the malfunction detection unit.

According to an embodiment, the malfunction detection unit may detect a differential direct current (DC) voltage at two nodes included in the amplification unit, and detect whether the differential DC voltage is in a predetermined range.

According to an embodiment, the IC chip may include a terminal to be connected to a power supply, which is configured to supply power to the amplification unit and the malfunction detection unit, a terminal to be connected to a reference potential of the amplification unit and the malfunction detection unit, and an output terminal of the malfunction detection unit.

According to an embodiment, the IC chip may include a terminal to be connected to a switch for selectively supplying power to the malfunction detection unit.

Other aspects, features and advantages other than those described above will become apparent from the following drawings, claims, and detailed description of the disclosure.

According to an embodiment of the present disclosure, an active current compensation device which actively compensates for a noise occurring in a common mode in each of two or more high-current paths, includes a sensing unit configured to generate an output signal corresponding to a common-mode noise current on the high-current paths, a power management unit configured to receive a first voltage from a power supply for supplying power and convert the first voltage into a second voltage of a specified magnitude, an amplification unit driven by the second voltage and configured to amplify the output signal to generate an amplified current, and a compensation unit configured to generate a compensation current on the basis of the amplified current and allow the compensation current to flow to each of the two or more high-current paths, wherein active elements included in the amplification unit and active elements included in the power management unit may be embedded in one integrated circuit (IC) chip.

According to an embodiment, the power management unit may include a power conversion unit configured to generate a switching signal for outputting the second voltage of a constant magnitude from the first voltage of any magnitude, a feedback unit configured to transmit a voltage signal output from the power conversion unit back to the power conversion unit so that the power management unit outputs the second voltage of a constant magnitude, and a filter unit configured to pass only a direct current (DC) component of the voltage signal.

According to an embodiment, the power conversion unit may be embedded in the one-chip IC, and the filter unit and at least a portion of the feedback unit may be commercial discrete elements disposed outside the one-chip IC.

According to an embodiment, the power conversion unit may include a regulator configured to generate a DC low voltage for driving an internal circuit of the power conversion unit.

According to an embodiment, the power conversion unit may include a pulse width modulation circuit configured to generate the switching signal using the DC low voltage provided from the regulator, and a first switch and a second switch that are selectively turned on according to the switching signal.

According to an embodiment, a high current supplied by a second device may be transmitted to a first device through the two or more high-current paths, and the power supply may be a power supply device of the first device or the second device.

According to an embodiment of the present disclosure, an active current compensation device which actively compensates for a noise occurring in a common mode in each of two or more high-current paths, includes two or more high-current paths through which power supplied by a second device is transmitted to a first device, a sensing unit configured to generate an output signal corresponding to a common-mode noise current on the high-current paths, an amplification unit configured to amplify the output signal to generate an amplified current, and a compensation unit configured to generate a compensation current on the basis of the amplified current and allow the compensation current to flow to each of the two or more high-current paths, wherein the amplification unit may include a non-integrated circuit unit and a one-chip integrated circuit unit, the non-integrated circuit unit may be designed according to a power system of at least one of the first device and the second device, and the one-chip integrated circuit unit may be independent of power rating specifications of the first device and the second device.

According to an embodiment, the non-integrated circuit unit may be designed according to power rating of the first device.

According to an embodiment, the one-chip integrated circuit unit may include a first transistor, a second transistor, and one or more resistors.

According to an embodiment, the non-integrated circuit unit may include a first impedance (Z1) connecting an emitter node side of each of the first transistor and the second transistor to an input terminal of the compensation unit, and a second impedance (Z2) connecting a base node side of each of the first transistor and the second transistor to an input terminal of the compensation unit.

According to an embodiment, the sensing unit may include a sensing transformer, the compensation unit may include a compensation transformer, a value of the first impedance or the second impedance may be determined on the basis of a turns ratio of each of the sensing transformer and the compensation transformer and a target current gain of the amplification unit, and a configuration of the one-chip integrated circuit unit may be independent of the turns ratio and the target current gain.

According to an embodiment, the one-chip integrated circuit unit may be used for the first device of various power systems depending on a design of the first impedance and the second impedance.

According to an embodiment of the present disclosure, an active current compensation device which actively compensates for a noise occurring in a common mode in each of two or more high-current paths, includes a sensing unit configured to generate an output signal corresponding to a common-mode noise current on the high-current paths, an amplification unit configured to amplify the output signal to generate an amplified current, and a compensation unit configured to generate a compensation current on the basis of the amplified current and allow the compensation current to flow to each of the two or more high-current paths, wherein the amplification unit may include a non-integrated circuit unit and a one-chip integrated circuit, active elements whose element characteristics change according to a change in temperature may be embedded in the one-chip integrated circuit, and the one-chip integrated circuit may be designed so that the amplification unit maintains a performance in a certain range even when a temperature changes.

According to an embodiment, an npn bipolar junction transistor (BJT) and a pnp BJT may be embedded in the one-chip integrated circuit, and a diode may be connected between a base node of the npn BJT and a base node of the pnp BJT.

According to an embodiment, a resistor may be connected between an emitter node of the npn BJT and an emitter node of the pnp BJT.

According to an embodiment, the diode may serve to reduce an emitter current flowing through the resistor.

According to an embodiment, the diode and the resistor may adjust a direct current (DC) bias current of each of the npn BJT and the pnp BJT.

According to an embodiment, an emitter current flowing through the resistor may be maintained in a predetermined range in response to a change in temperature.

Other aspects, features and advantages other than those described above will become apparent from the following drawings, claims, and detailed description of the disclosure.

According to various embodiments of the present disclosure, it is possible to provide an active current/voltage compensating device that does not significantly increase in price, area, volume, and weight even in a high-power system.

An active compensating device according to various embodiments of the present disclosure can have a reduced price, area, volume, and weight as compared to a passive compensating device including a common-mode (CM) choke.

Also, a current compensating device according to an embodiment of the present disclosure can provide a compensating device capable of independently operating without parasitic on a CM choke.

Also, an active compensating device according to various embodiments of the present disclosure can have an active circuit end electrically isolated from a power line, thereby stably protecting elements included in the active circuit end.

Also, an active compensating device according to an embodiment of the present disclosure may provide a current compensating device capable of performing a current compensating function regardless of a load of a surrounding situation on a side from which electromagnetic interference (EMI)noise is emitted.

Of course, the scope of the present disclosure is not limited by these effects.

DETAILED DESCRIPTION

Figure 1:
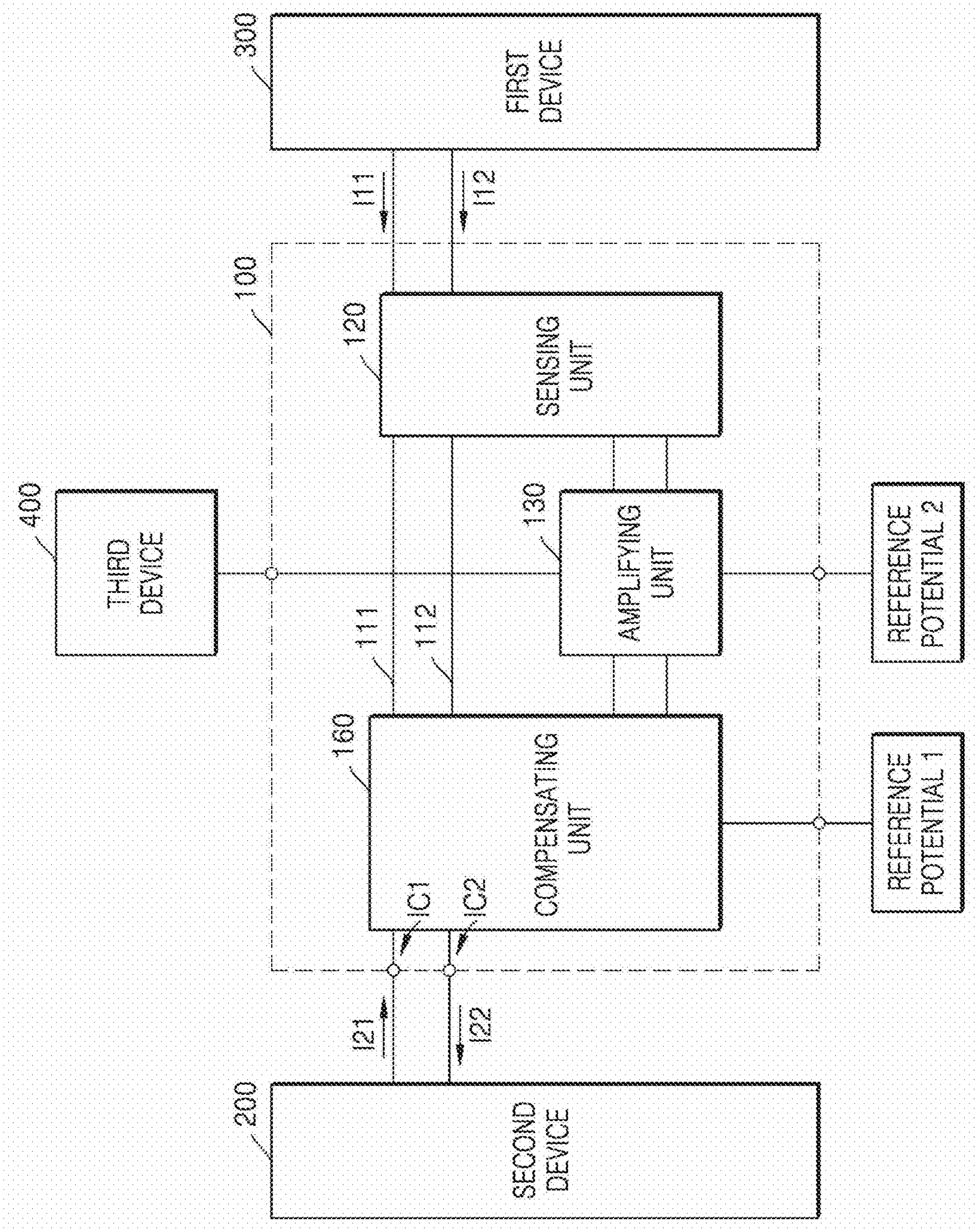
FIG. 1 is a schematic view of the configuration of a system including an active compensating device according to an embodiment of the present disclosure.

In order to operate electronic devices without causing malfunctions in surrounding components and other devices, the amount of EMI noise emission from all electronic products is strictly regulated. Therefore, most electronic products necessarily include a noise reduction device (e.g., an EMI filter) for reducing an EMI noise current in order to satisfy the regulation on the amount of noise emission. For example, in domestic appliances such as air conditioners, electric vehicles, aircrafts, and energy storage systems (ESSs), EMI filters are essentially included. A conventional EMI filter uses a common-mode (CM) choke, which is a passive filter, to reduce CM noise from among CE noises.

Meanwhile, as high-power products are becoming available, a demand for a current/voltage compensator for a high-power system is increasing. However, in a high power/high current system, the noise reduction performance of a CM choke is rapidly degraded due to magnetic saturation. Therefore, in order to prevent magnetic saturation and maintain noise reduction performance in high-power/high-current systems, it is conventionally necessary to increase the size or the number of CM chokes. However, increasing the size or the number of CM chokes greatly increases the size and the price of a current compensating device for high-power products.

In order to overcome the limitations of a passive electromagnetic interference (EMI) filter, interest in an active EMI filter has emerged. The active EMI filter may remove EMI noise by detecting the EMI noise and generating a signal that cancels the noise. The active EMI filter includes an active circuit unit capable of generating an amplified signal from the detected noise signal.

However, it is difficult to identify a malfunction of the active circuit unit, with the naked eye. In addition, since the active EMI filter just performs a noise reduction function, the power system may still operate normally even when the active circuit unit is malfunctioning, and thus it is difficult to determine the malfunction of the active circuit unit from the phenomenon.

The present disclosure may include various embodiments and modifications, and embodiments thereof will be illustrated in the drawings and will be described herein in detail. The effects and features of the present disclosure and the accompanying methods thereof will become apparent from the following description of the embodiments, taken in conjunction with the accompanying drawings. However, the present disclosure is not limited to the embodiments described below, and may be embodied in various modes.

Reference will now be made in detail to embodiments, examples of which are illustrated in the accompanying drawings. In the drawings, the same elements are denoted by the same reference numerals or reference numerals of the same series, and a repeated explanation thereof will not be given.

It will be understood that although the terms "first," "second," etc. may be used herein to describe various elements, these elements should not be limited by these terms. These elements are only used to distinguish one element from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation. When a certain embodiment may be implemented differently, a specific process order may be performed differently from the described order. In the following embodiments, when a region, a component, a part, a unit, a module, etc. is/are connected, the region, the component, the part, the unit, the module, etc. may not only be directly connected, but also be indirectly connected through another region, another component, another part, another unit, another module, etc.

In other words, since sizes and shapes of components in the drawings are arbitrarily illustrated for convenience of explanation, the following embodiments are not limited thereto.

In this document, an active compensating device or a compensating device may include a current compensating device and/or a voltage compensating device. Also, the term 'current compensating device' may be interchangeable with the term 'voltage compensating device'.

Also, at least portions of compensating devices according to different embodiments may be applied to various compensating devices according to various embodiments described below.

Meanwhile, the embodiments described in the detailed description of the present specification may each belong to one of four categories of embodiments for convenience. The four categories of embodiments are as follows:

[1] Device for compensating for current or voltage

[2] Active current compensation device capable of detecting malfunction;

[3] Active current compensation device including power conversion unit embedded therein;

[4] Active current compensation device including integrated circuit unit and non integrated circuit unit; and

[5] Active current compensation device including one-chip integrated circuit (IC).

Four categories [1] to [5] of embodiments are classified only for convenience of description, and it goes without saying that each of the embodiments described herein may belong to a plurality of categories overlappingly.

In addition, the drawings appended to the present specification may each belong to one of the categories of embodiments. In more detail, FIGS. 1 to 64 may belong to category [1], FIGS. 65 to 73 may belong to category [2], FIGS. 74 to 80 may belong to category [3], FIGS. 81 to 86 may belong to category [4], and FIGS. 87 to 92 may belong to category [5]. In the present specification, the same reference number may be assigned to the same or corresponding component in the drawings in the same category. However, in the drawings in different categories, even though the same reference number is assigned, the reference number may refer to different components. For example, a malfunction detection unit 180 of FIG. 65 belonging to category [2] and a power management unit 180 of FIG. 74 belonging to category [3] may indicate different components although the same reference numeral is assigned thereto.

[1] Device for Compensating for Current or Voltage

FIG. 1 is a schematic view of the configuration of a system including an active compensating device 100 according to an embodiment of the present disclosure. The active compensating device 100 may actively compensate for first currents $I_{11}$ and $I_{12}$ (e.g., electromagnetic interference (EMI) noise currents) input from a first device 300 as a common-mode (CM) current through two or more high current paths 111 and 112.

Referring to FIG. 1, the active compensating device 100 may include a sensing unit 120, an amplifying unit 130, and a compensating unit 160.

In this specification, the first device 300 may include various types of devices using power supplied by a second device 200. For example, the first device 300 may be a load driven by using power supplied by the second device 200. Also, the first device 300 may be a load (e.g., an electric vehicle) that stores energy by using power supplied by the second device 200 and is driven by using stored energy. However, the present disclosure is not limited thereto.

In this specification, the second device 200 may be a device of various types for supplying power to the first device 300 in the form of a current and/or a voltage. For example, the second device 200 may be a device for generating and supplying power or a device for supplying power produced by another device (e.g., an electric vehicle charging device). Of course, the second device 200 may be a device for supplying stored energy. However, the present disclosure is not limited thereto. A power conversion device may be located on the side of the first device 300. For example, the first currents $I_{11}$ and $I_{12}$ may be input to the compensating device 100 through a switching operation of the power conversion device. In other words, the side of the first device 300 may correspond to a noise source, whereas the side of the second device 200 may correspond to a noise receiver.

Two or more high current paths 111 and 112 may be paths for transmitting power supplied by the second device 200 (that is, second currents $I_{21}$ and $I_{22}$) to the first device 300 and may be, for example, power lines. For example, the two or more high current paths 111 and 112 may each include a live line and a neutral line. At least portions of the high current paths 111 and 112 may pass through the compensating device 100. The second currents $I_{21}$ and $I_{22}$ may be alternating currents having frequencies of a second frequency band. The second frequency band may be, for example, a band from about 50 Hz to about 60 Hz.

Also, the two or more high current paths 111 and 112 may be paths through which noises generated in the first device 300 (that is, the first currents $I_{11}$ and $I_{12}$) are transmitted to the second device 200. The first currents $I_{11}$ and $I_{12}$ may be input as a common-mode current to the two or more high current paths 111 and 112, respectively. The first currents $I_{11}$ and $I_{12}$ may be currents that are unintentionally generated in the first device 300 due to various causes. For example, the first currents $I_{11}$ and $I_{12}$ may be noise currents generated due to virtual capacitance between the first device 300 and the surrounding environment. Alternatively, the first currents $I_{11}$ and $I_{12}$ may be noise currents generated through a switching operation of the power conversion device of the first device 300. The first currents $I_{11}$ and $I_{12}$ may be currents having frequencies of a first frequency band. The first frequency band may be a higher frequency band than the above-described second frequency band. The first frequency band may be, for example, a band from about 150 KHz to about 30 MHz.

Figure 8:
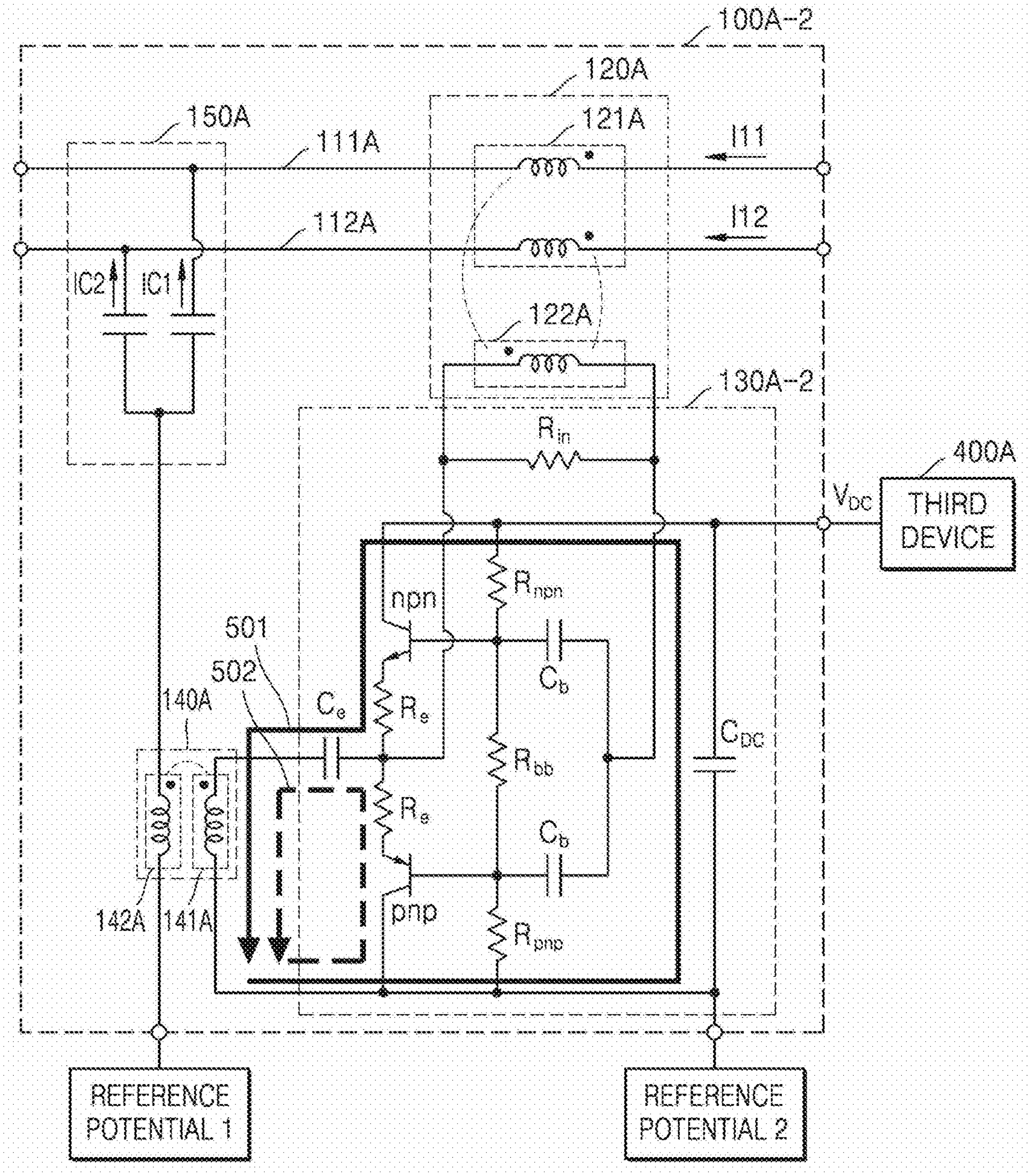
FIG. 8 is a schematic view of an active compensating device according to an embodiment of the present disclosure.

Meanwhile, the two or more high current paths 111 and 112 may include two paths as shown in FIG. 1, or may include three paths or four paths as shown in FIGS. 8 and 9. The number of the high current paths 111 and 112 may vary depending on the type and/or form of power used by the first device 300 and/or the second device 200.

The sensing unit 120 may sense the first currents $I_{11}$ and $I_{12}$ on the two or more high current paths 111 and 112 and generate an output signal corresponding to the first currents $I_{11}$ and $I_{12}$. In other words, the sensing unit 120 may refer to a means for sensing the first currents $I_{11}$ and $I_{12}$ on the high current paths 111 and 112. At least portions of the high current paths 111 and 112 may pass through the sensing unit 120 to sense the first currents $I_{11}$ and $I_{12}$, but an inner portion of the sensing unit 120 at which an output signal is generated through sensing may be isolated from the high current paths 111 and 112. For example, the sensing unit 120 may be implemented as a sensing transformer. The sensing transformer may sense the first currents $I_{11}$ and $I_{12}$ on the high current paths 111 and 112 while being isolated from the high current paths 111 and 112.

According to an embodiment, the sensing unit 120 may be differentially connected to input terminals of the amplifying unit 130.

The amplifying unit 130 may be electrically connected to the sensing unit 120, amplify an output signal output by the sensing unit 120, and generate an amplified output signal. In the present disclosure, the term 'amplification' by the amplifying unit 130 may refer to adjustment of the size and/or the phase of an amplification target. The amplifying unit 130 may be implemented by various means and may include an active element. In an embodiment, the amplifying unit 130 may include an OP-AMP. For example, the amplifier 130 may include a plurality of passive elements, such as resistors and capacitors, in addition to the OP-AMP. In another embodiment, the amplifying unit 130 may include a bipolar junction transistor (BJT). For example, the amplifying unit 130 may include a plurality of passive elements, such as resistors and capacitors, in addition to the BJT. However, the present disclosure is not limited thereto, and the means for 'amplification' described in the present disclosure may be used as the amplifying unit 130 of the present disclosure without limitation. A reference potential (reference potential 2) of the amplifying unit 130 and a reference potential (reference potential 1) of the compensating device 100 may be potentials that may be distinguished from each other.

The amplifying unit 130 may receive power from a third device 400 that is distinguished from the first device 300 and/or the second device 200 and generate an amplified current by amplifying an output signal output by the sensing unit 120. Here, the third device 400 may be a device that receives power from a power source irrelevant to the first device 300 and the second device 200 and generates input power for the amplifying unit 130. Optionally, the third device 400 may be a device that receives power from any one of the first device 300 and the second device 200 and generates input power for the amplifying unit 130.

The compensating unit 160 may generate a compensation current based on an output signal amplified by the amplifying unit 130. An output side of the compensating unit 160 may be connected to the high current paths 111 and 112 to input compensation currents $IC_1$ and $IC_2$ to the high current paths 111 and 112, but may be isolated from the amplifying unit 130. For example, the compensating unit 160 may include a compensating transformer for the isolation. For example, an output signal of the amplifying unit 130 may flow through a primary side of the compensating transformer, and a compensation current based on the output signal may be generated at a secondary side of the compensating transformer.

The compensating unit 160 may inject the compensation currents $IC_1$ and $IC_2$ into the high current paths 111 and 112 or withdraw the compensation currents $IC_1$ and $IC_2$ from the high current paths 111 and 112 through the two or more high current paths 111 and 112, respectively, in order to offset the first currents $I_{11}$ and $I_{12}$. According to an embodiment, the compensation currents $IC_1$ and $IC_2$ may have the same magnitudes and opposite phases as compared to the first currents $I_{11}$ and $I_{12}$. However, the present disclosure is not limited thereto.

Figure 2:
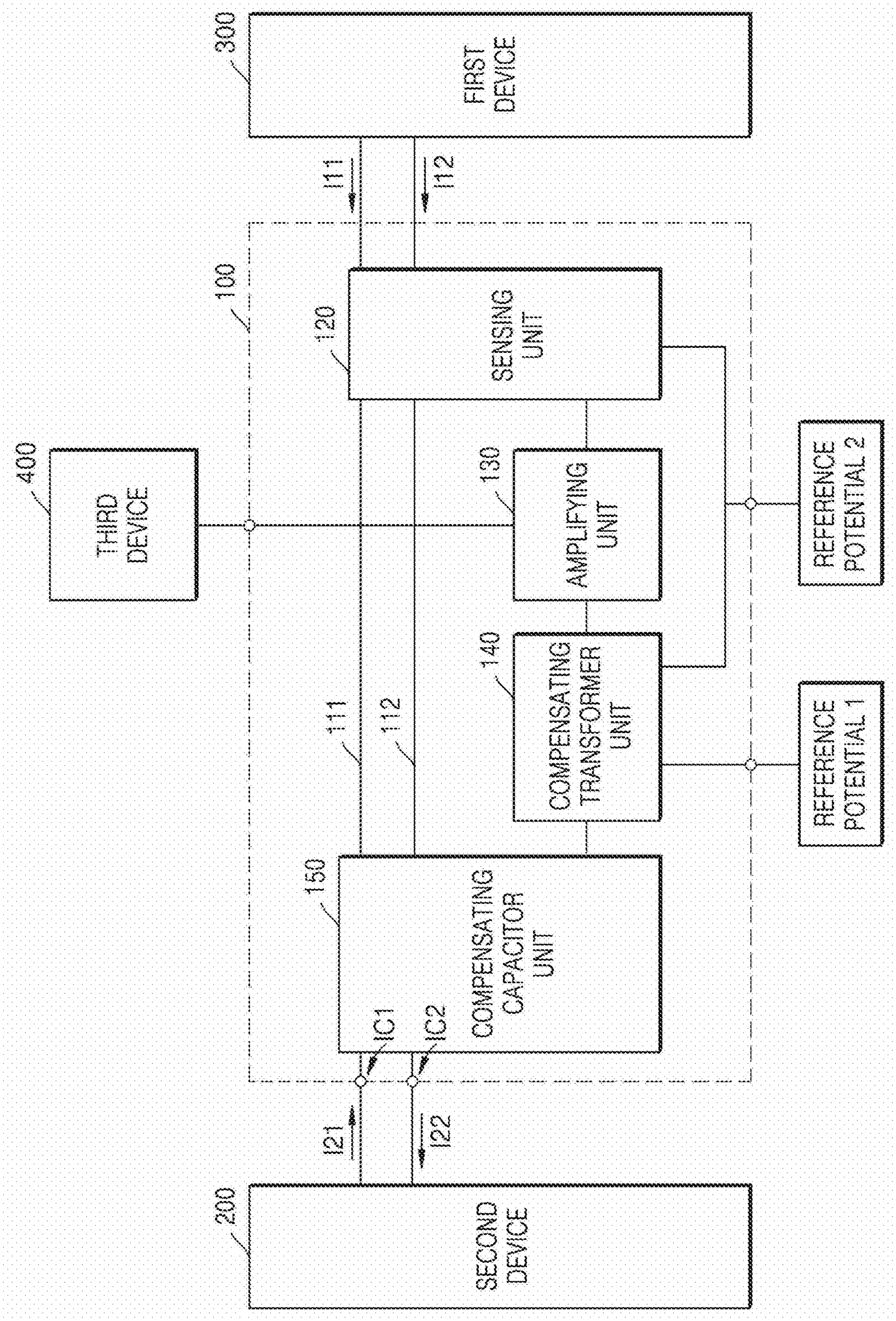
FIG. 2 is a diagram illustrating an example of the embodiment shown in FIG. 1.

FIG. 2 is a diagram illustrating an example of the embodiment shown in FIG. 1.

Referring to FIG. 2, the compensating unit 160 may include a compensating transformer unit 140 and a compensating capacitor unit 150.

The compensating transformer unit 140 may be electrically connected to the amplifying unit 130 and may generate a compensation current based on an output signal amplified by the above-described amplifying unit 130.

The compensating transformer unit 140 may be electrically connected to a path connecting an output terminal of the amplifying unit 130 and the reference potential (the reference potential 2) of the amplifying unit 130 and generate a compensation current. The compensating transformer unit 140 may be electrically connected to a path connecting the compensating capacitor unit 150 and the reference potential (the reference potential 1) of the current compensating device 100. A reference potential (reference potential 2) of the amplifying unit 130 and a reference potential (reference potential 1) of the current compensating device 100 may be potentials that may be distinguished from each other.

The compensating capacitor unit 150 may provide paths through which the compensation currents $IC_1$ and $IC_2$ generated by the compensating transformer unit 140 flow to two or more high current paths, respectively.

According to an embodiment, the compensating capacitor unit 150 may be implemented as a compensating capacitor unit 150 that provides paths through which a current generated by the compensating transformer unit 140 flows to two or more high current paths 111 and 112, respectively. In this case, the compensating capacitor unit 150 may include at least two or more compensating capacitors connecting the reference potential (the reference potential 1) of the current compensating device 100 to the two or more high current paths 111 and 112, respectively.

The current compensating device 100 configured as described above may sense and actively compensate for a current under a specific condition on the two or more high current paths 111 and 112 and may be applied to high current, high voltage, and/or high-power systems, despite the miniaturization of the device 100.

Meanwhile, according to an embodiment, the sensing unit 120 may include a through opening into which at least two or more high current paths are inserted. The sensing unit 120 may generate an output signal corresponding to the sensed first current by sensing a first current on the two or more high current paths.

In an embodiment, the sensing unit 120 may be implemented as a sensing transformer including a core that includes a through opening and generates an output signal based on density of a magnetic flux generated by a first current on at least two or more high current paths. In this case, the core may have an openable clamp structure and may be implemented, such that each of the at least two or more high current paths are inserted thereinto when opened.

In an embodiment, the term 'clamp structure' may refer to a structure in which an outer portion of the core is configured to be openable. For example, the outer portion of the core having the clamp structure may be configured, such that the high current paths 111 and 112 are inserted into the through opening when opened. Thereafter, the opened outer portion of the core may be closed to prevent the high current paths 111 and 112 inserted thereinto from being detached.

However, the description of the sensing unit 120 as given above is merely an example, and the present disclosure is not limited thereto. Therefore, a current sensing means coupled with a path (or a conducting wire), through which a current to be sensed flows, in a form in which the path (or the conducting wire) is 'inserted' may be used without limitation as the sensing unit 120 of the present disclosure.

Figure 3:
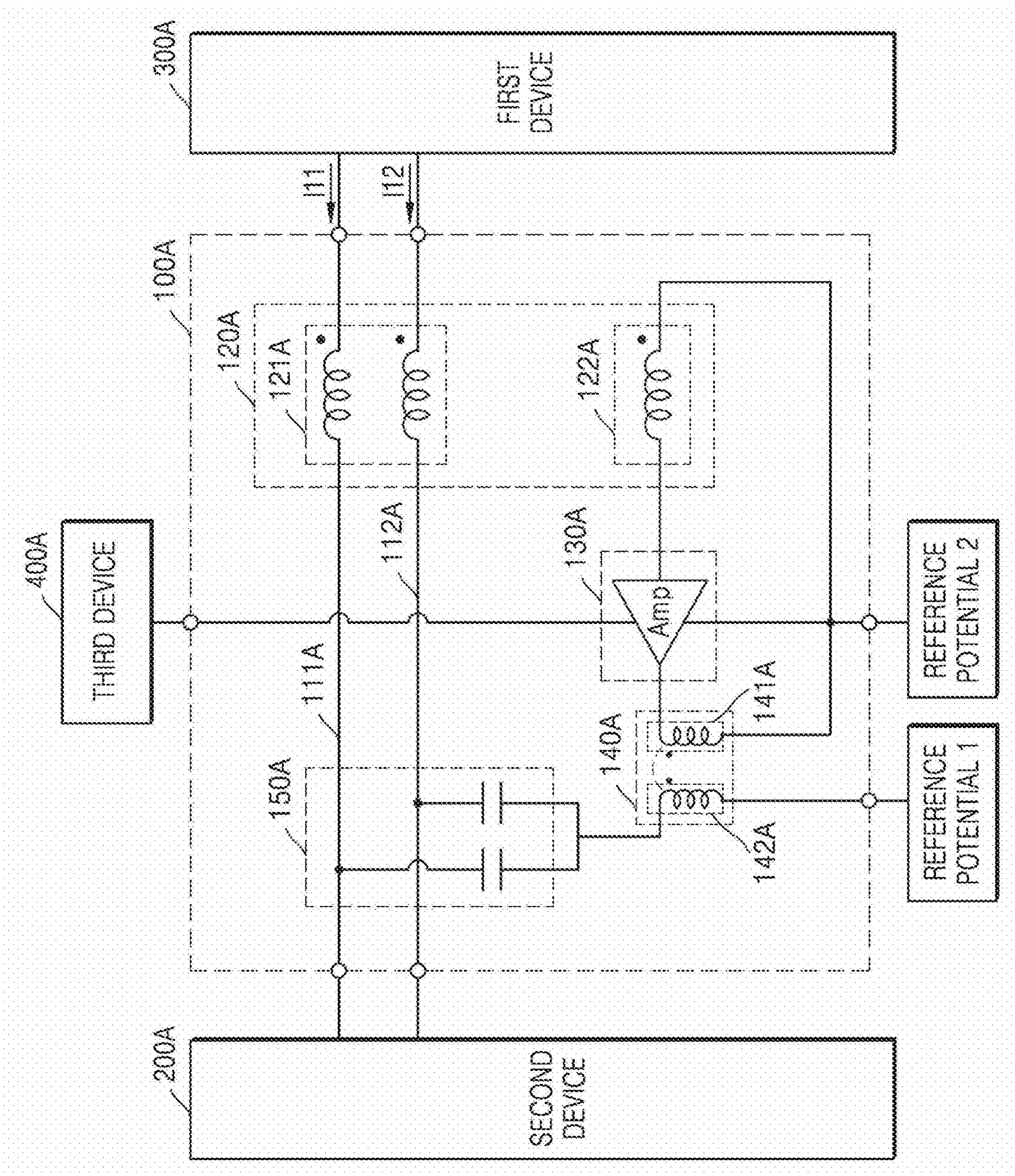
FIG. 3 shows a more specific example of the embodiment shown in FIG. 2 and is a schematic view of a current compensating device according to an embodiment of the present disclosure.

FIG. 3 shows a more specific example of the embodiment shown in FIG. 2 and is a schematic view of a compensating device 100A according to an embodiment of the present disclosure. The compensating device 100A may actively compensate for the first currents $I_{11}$ and $I_{12}$ (e.g., noise currents) input as a common-mode current to two high current paths 111A and 112A, respectively, connected to a first device 300A.

Referring to FIG. 2, the compensating device 100A may include a sensing transformer 120A, an amplifying unit 130A, and a compensating unit 160A.

In an embodiment, the above-described sensing unit 120 may include the sensing transformer 120A. In this case, the sensing transformer 120A may be a means for sensing the first currents $I_{11}$ and $I_{12}$ on the high current paths 111A and 112A while being isolated from the high current paths 111A and 112A. The sensing transformer 120A may sense the first currents $I_{11}$ and $I_{12}$, which are noise currents input from the side of the first device 300A to the high current paths 111A and 112A (e.g., power lines).

The sensing transformer 120A may include a primary side 121A disposed on the high current paths 111A and 112A and a secondary side 122A differentially connected to input terminals of the amplifying unit 130A. The sensing transformer 120A may generate an induced current on the secondary side 122A (e.g., a secondary winding) based on magnetic flux densities induced due to the first currents $I_{11}$ and $I_{12}$ on the primary side 121A (e.g., a primary winding) disposed on the high current paths 111A and 112A. The primary side 121A of the sensing transformer 120A may be, for example, a winding in which each of a first high current path 111A and a second high current path 112A is wound around one core. However, the present disclosure is not limited thereto, and, in the primary side 121A of the sensing transformer 120A, the first high current path 111A and the second high current path 112A may pass through the core.

In detail, it may be configured such that a magnetic flux density induced due to a first current $I_{11}$ on the first high current path 111A (e.g., a live line) and a magnetic flux density induced due to a first current $I_{12}$ on the second high current path 112A (e.g., a neutral line) overlap (or reinforce) each other. At this time, the second currents $I_{21}$ and $I_{22}$ also flow on the high current paths 111A and 112A, wherein it may be configured such that a magnetic flux density induced due to a second current $I_{21}$ on the first high current path 111A and a magnetic flux density induced due to a second current $I_{21}$ on the second high current path 112A offset each other.

Also, for example, the sensing transformer 120A may be configured, such that the magnitude of a magnetic flux density induced due to the first currents $I_{11}$ and $I_{12}$ in a first frequency band (e.g., a band having a range from about 150 KHz to about 30 MHz) is greater than the magnitude of a magnetic flux density induced due to the second currents $I_{21}$ and $I_{22}$ in a second frequency band (e.g., a band having a range from about 50 Hz to about 60 Hz).

As described above, the sensing transformer 120A may be configured, such that magnetic flux densities induced due to the second currents $I_{21}$ and $I_{22}$ offset each other. Therefore, only the first currents $I_{11}$ and $I_{12}$ may be sensed. In other words, a current induced at the secondary side 122A of the sensing transformer 120A may be a current generated by converting the first currents $I_{11}$ and $I_{12}$ at a certain ratio.

For example, in the sensing transformer 120A, when a turns ratio between the primary side 121A and the secondary side 122A is $1:N_{sen}$, at this time, a current induced at the secondary side 122A may be $1/N_{sen}$ times the first currents $I_{11}$ and $I_{12}$. The secondary side 122A of the sensing transformer 120A may be connected to an input terminal of the amplifying unit 130A. For example, the secondary side 122A of the sensing transformer 120A may be differentially connected to the input terminals of the amplifying unit 130A and supply an induced current to the amplifying unit 130A. Alternatively, depending on the configuration of the amplifying unit 130A, the secondary side 122A of the sensing transformer 120A may be disposed on a path connecting the input terminal of the amplifying unit 130A and the reference potential (the reference potential 2) of the amplifying unit 130A. In other words, one end of the secondary side 122A may be connected to the input terminal of the amplifying unit 130A, and the other end of the secondary side 122A may be connected to the reference potential (the reference potential 2) of the amplifying unit 130A.

The amplifying unit 130A may correspond to the above-described amplifying unit 130. The amplifying unit 130A may amplify a current sensed by the sensing transformer 120A and induced to the secondary side 122A. For example, the amplifying unit 130A may amplify the magnitude of the induced current at a certain ratio and/or adjust the phase of the induced current.

The compensating unit 160A may correspond to the above-described compensating unit 160. The compensating unit 160A may include a compensating transformer 140A and a compensating capacitor unit 150A. An amplified current amplified by the above-described amplifying unit 130A flows to a primary side 141A of the compensating transformer 140A.

The compensating transformer 140A may be a means for isolating the amplifying unit 130A including active elements from the high current paths 111A and 112A. In other words, the compensating transformer 140A may be a means for generating a compensation current to be injected to the high current paths 111A and 112A (at a secondary side 142A) based on the amplified current while being isolated from the high current paths 111A and 112A.

The compensating transformer 140A may include the primary side 141A that is differentially connected to output terminals of the amplifying unit 130A and the secondary side 142A that is connected to the high current paths 111A and 112A. The compensating transformer 140A may induce a compensation current to the secondary side 142A (e.g., a secondary winding) based on a magnetic flux density induced due to an amplified current flowing through the primary side 141A (e.g., the primary winding).

At this time, the secondary side 142A may be disposed on a path connecting the compensating capacitor unit 150A described later and the reference potential (the reference potential 1) of the current compensating device 100A. In other words, one end of the secondary side 142A may be connected to the high current paths 111A and 112A through the compensating capacitor unit 150A, and the other end of the secondary side 142A may be connected to the reference potential (the reference potential 1) of the compensating device 100A. Meanwhile, the primary side 141A of the compensating transformer 140A, the amplifying unit 130A, and the secondary side 122A of the sensing transformer 120A may be connected to a reference potential (the reference potential 2) that is distinguished from a reference potential to which the remaining components of the compensating device 100A are connected. The reference potential (reference potential 1) of the current compensating device 100A and the reference potential (reference potential 2) of the amplifying unit 130A may be distinguished from each other.

As described above, according to the present disclosure, components for generating a compensation current may use a reference potential different from that used by the remaining components and a separate power source. Therefore, the components for generating a compensation current may be operated in an isolated state, and thus the reliability of the compensating device 100A may be improved.

In the compensating transformer 140A, when a turns ratio between the primary side 141A and the secondary side 142A is $1:N_{inj}$, a current induced to the secondary side 142A may be $1/N_{inj}$ times a current flowing in the primary side 141A (that is, an amplified current).

A current transformed through the compensating transformer 140A may be injected as the compensation currents $IC_1$ and $IC_2$ into the high current paths 111A and 112A (e.g., power lines) through the compensating capacitor unit 150A. As described above, the compensating capacitor unit 150A may provide paths through which a current generated by the compensating transformer 140A flows to the two high current paths 111A and 112A.

Therefore, according to an embodiment, the compensation currents $IC_1$ and $IC_2$ may have the same magnitude and opposite phase as compared to the first currents $I_{11}$ and $I_{12}$ in order to offset the first currents $I_{11}$ and $I_{12}$. Therefore, the amplifying unit 130A may be designed, such that the magnitude of a current gain of the amplifying unit 130A is $N_{sen}N_{inj}$.

The compensating capacitor unit 150A may include two Y-capacitors (Y-caps) each having one end connected to the secondary side 142A of the compensating transformer 140A and the other end connected to the high current paths 111A and 112A. One end of each of the two Y-caps may share a node connected to the secondary side 142A of the compensating transformer 140A, and the other end of each of the two Y-caps may have nodes connected to the first high current path 111A and the second high current path 112A, respectively.

The compensating capacitor unit 150A may apply the compensation currents $IC_1$ and $IC_2$ induced by the compensating transformer 140A to power lines. For example, as the compensation currents $IC_1$ and $IC_2$ compensate for (or offset) the first currents $I_{11}$ and $I_{12}$, the current compensating device 100A may reduce noise.

The compensating device 100A may implement an isolated structure by using the compensating transformer 140A and the sensing transformer 120A.

Figure 4A:
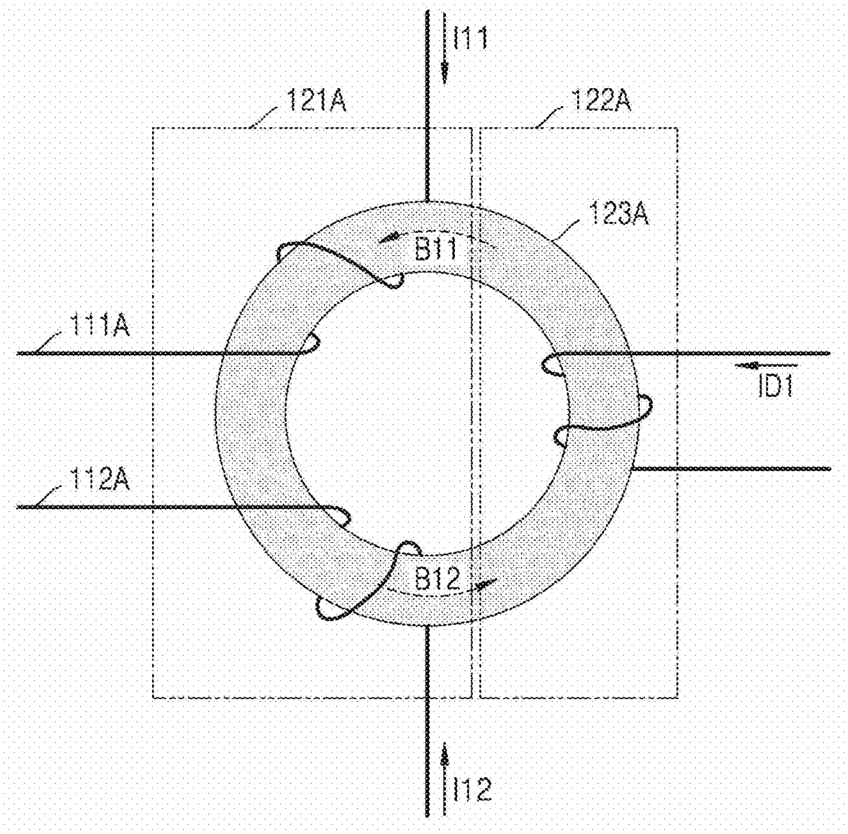
FIGS. 4A and 4B are diagrams for describing the operation of the sensing transformer, which is an example of the sensing unit, according to an embodiment of the present disclosure.
Figure 4B:
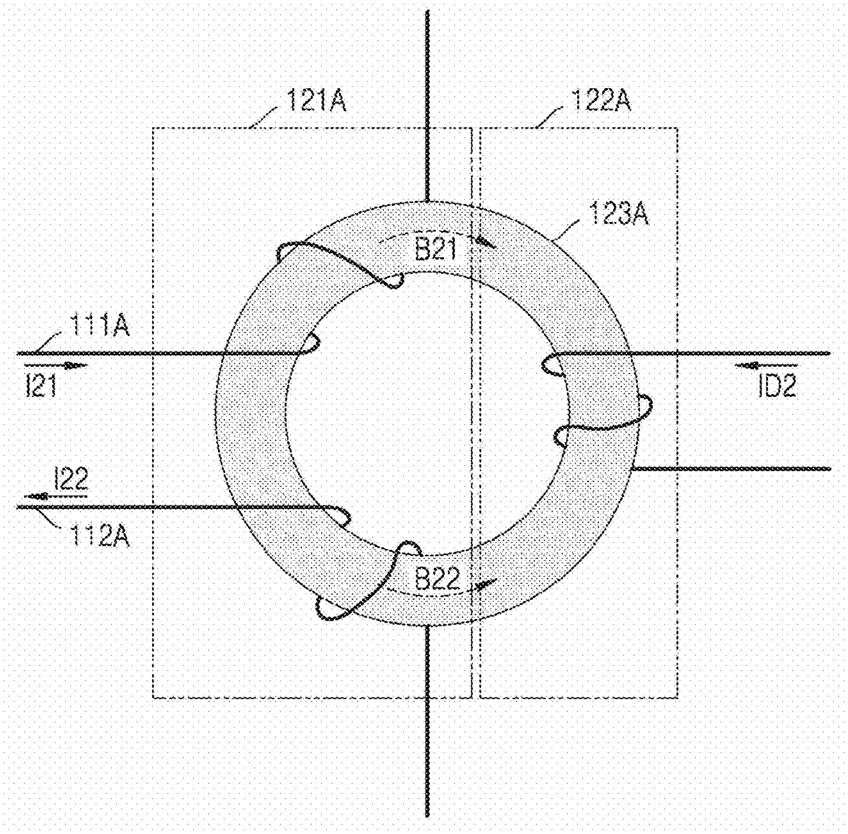

FIGS. 4A and 4B are diagrams for describing the operation of the sensing transformer 120A, which is an example of the sensing unit 120, according to an embodiment of the present disclosure.

In particular, FIG. 4A is a diagram for describing the principle that the sensing transformer 120A generates a first induced current ID1.

For convenience of explanation, it is assumed that the primary side 121A and the secondary side 122A of the sensing transformer 120A are configured as shown in FIG. 4A. In other words, it will be assumed that the high current paths 111A and 112A and the windings of the secondary side 122A are wound around a core 123A of the sensing transformer 120A in consideration of a direction in which a magnetic flux and/or a magnetic flux density is generated.

As the first current $I_{11}$ is input to the high current path 111A, a magnetic flux density B11 may be induced to the core 123A. Similarly, as the first current $I_{12}$ is input to the high current path 112A, a magnetic flux density B12 may be induced to the core 123A.

The first induced current ID1 may be induced to the secondary side 122A winding due to the induced magnetic flux densities B11 and B12.

In this regard, the sensing transformer 120A may be configured, such that the first magnetic flux densities B11 and B12 induced due to the first currents $I_{11}$ and $I_{12}$ may overlap (or reinforce) each other, and thus the first induced current ID1 corresponding to the first currents $I_{11}$ and $I_{12}$ may be generated at the secondary side 122A isolated from the two or more high current paths 111A and 112A.

Meanwhile, the sensing transformer 120A may be configured, such that a second magnetic flux density induced due to the second currents $I_{21}$ and $I_{22}$ respectively flowing in the two or more high current paths 111A and 112A satisfies a predetermined magnetic flux density condition.

FIG. 4B is a diagram for describing second magnetic flux densities B21 and B22 induced to the sensing transformer 120A by the second currents $I_{21}$ and $I_{22}$.

Like in FIG. 4A, it is assumed that the primary side 121A and the secondary side 122A of the sensing transformer 120A are configured as shown in FIG. 4B. In other words, it will be assumed that the two or more high current paths 111A and 112A and the winding of the secondary side 122A are wound around a core 123A of the sensing transformer 120A in consideration of a direction in which a magnetic flux and/or a magnetic flux density is generated.

As the second current $I_{21}$ is input to the high current path 111A, a magnetic flux density B21 may be induced to the core 123A. Similarly, as the second current $I_{22}$ is input (or output) to the high current path 112A, a magnetic flux density B22 may be induced to the core 123A.

The sensing transformer 120A may be configured, such that the second magnetic flux densities B21 and B22 induced due to the second currents $I_{21}$ and $I_{22}$ (flowing through the two or more high current paths 111A and 112A, respectively) satisfy a predetermined magnetic flux density condition. Here, the predetermined magnetic flux density condition may be a condition that the magnetic flux densities are offset each other as shown in FIG. 4B.

In other words, the sensing transformer 120A may be configured, such that a second induced current ID2 induced due to the second currents $I_{21}$ and $I_{22}$ respectively flowing in the two or more high current paths 111A and 112A satisfies a second predetermined induced current condition. In this case, the second predetermined induced current condition may be a condition in which the magnitude of the second induced current ID2 is smaller than a predetermined threshold magnitude.

As described above, the sensing transformer 120A may be configured, such that the second magnetic flux densities B21 and B22 induced due to the second currents $I_{21}$ and $I_{22}$ offset each other. Therefore, only the first currents $I_{11}$ and $I_{12}$ may be sensed.

The sensing transformer 120A may be configured, such that the magnitude of each of the first magnetic flux densities B11 and B12 induced due to the first currents $I_{11}$ and $I_{12}$ in a first frequency band (e.g., a band having a range from about 150 KHz to about 30 MHz) is greater than the magnitude of each of the second magnetic flux densities B21 and B22 induced by the second currents $I_{21}$ and $I_{22}$ in a second frequency band (e.g., a band having a range from about 50 Hz to about 60 Hz).

In the present disclosure, when a component A is 'configured' to do B, it may mean that the design parameters of component A are set to be appropriate to do B. For example, when the sensing transformer 120A is configured to have a magnetic flux having a large magnitude induced due to a current in a specific frequency band, it may mean that parameters like the size of the sensing transformer 120A, the diameter of a core, the number of windings, the size of an inductance, and the size of a mutual inductance are appropriately set, such that the magnitude of the magnetic flux induced due to the current in the specific frequency band is strong.

The secondary side 122A of the sensing transformer 120A may be differentially connected to the input terminals of the amplifying unit 130A as shown in FIG. 2 in order to supply a first induced current to the amplifying unit 130A. Alternatively, depending on the configuration of the amplifying unit 130A, the secondary side 122A of the sensing transformer 120A may be disposed on a path connecting the input terminal of the amplifying unit 130A and the reference potential (the reference potential 2) of the amplifying unit 130A.

Meanwhile, the sensing unit 120 implemented as the sensing transformer 120A as described above is merely an example, and the present disclosure is not limited thereto. Therefore, a means capable of sensing only the first currents $I_{11}$ and $I_{12}$ input as a common-mode current on the high current paths 111A and 112A may be used as the sensing unit 120 without limitation.

However, it is merely an example, and the present disclosure is not limited thereto. In other words, the numbers of times that the high current paths 111A and 112A and the winding of the secondary side 122A are wound around the core 123A may be appropriately determined according to demands of a system in which the current compensating device 100A is used.

According to an embodiment of the present disclosure, the sensing transformer 120A may include a core that includes a through opening and generates an output signal based on density of a magnetic flux generated by a first current on at least two or more high current paths. At this time, the core may have an openable clamp structure, wherein, when opened, the at least two high current paths 111A and 112A may be inserted thereinto.

Figure 5A:
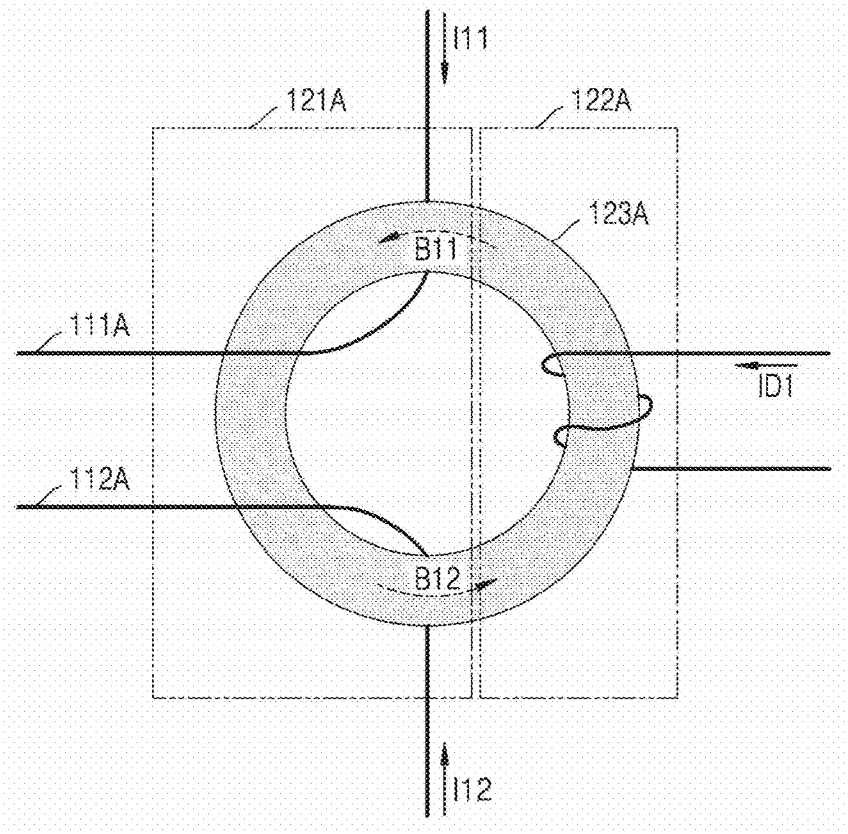
FIGS. 5A and 5B are diagrams for describing the sensing transformer including the core having an openable clamp structure according to an embodiment of the present disclosure.
Figure 5B:
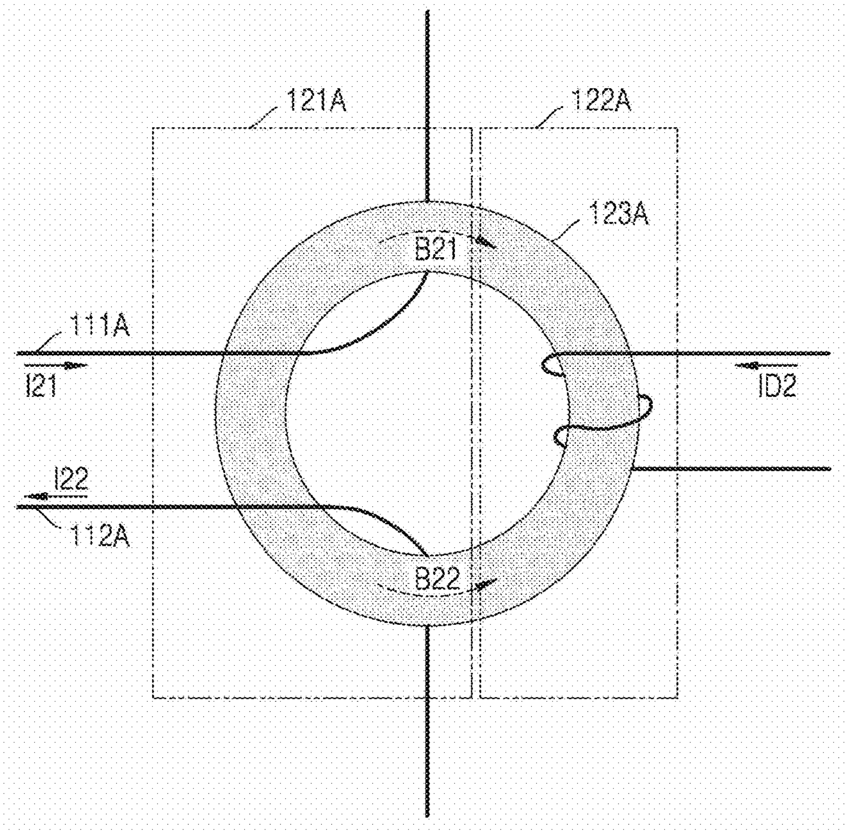

FIGS. 5A and 5B are diagrams for describing the sensing transformer 120A including the core 123A having an openable clamp structure according to an embodiment of the present disclosure.

Referring to FIG. 5A, the sensing unit 120 may be implemented as the sensing transformer 120A including the core 123A having a clamp structure. The high current paths 111A and 112A may be inserted into an opening of the sensing transformer 120A as shown in the drawings.

Hereinafter, it will be assumed that the high current paths 111A and 112A and the windings of the secondary side 122A are inserted into (or wound around) a core 123A of the sensing transformer 120A in consideration of a direction in which a magnetic flux and/or a magnetic flux density is generated.

As the first current $I_{11}$ is input to the first high current path 111A, a magnetic flux density B11 may be induced to the core 123A. Similarly, as the first current $I_{12}$ is input to the second high current path 112A, a magnetic flux density B12 may be induced to the core 123A. The first induced current ID1 may be induced to the secondary side 122A winding by induced magnetic flux densities B11 and B12.

In this regard, the sensing transformer 120A may be configured, such that the first magnetic flux densities B11 and B12 induced due to the first currents $I_{11}$ and $I_{12}$ may overlap (or reinforce) each other, and thus the first induced current ID1 corresponding to the first currents $I_{11}$ and $I_{12}$ may be generated at the secondary side 122A isolated from the two or more high current paths 111A and 112A.

Meanwhile, the sensing transformer 120A may be configured, such that a second magnetic flux density induced due to the second currents $I_{21}$ and $I_{22}$ respectively flowing in the two or more high current paths 111A and 112A satisfies a predetermined magnetic flux density condition.

FIG. 5B is a diagram for describing the second magnetic flux densities B21 and B22 induced due to the second currents $I_{21}$ and $I_{22}$ to the sensing transformer 120A when the high current paths 111A and 112A are wound around the primary side 121A of the sensing transformer 120A once.

Referring to FIG. 5B, the sensing unit 120 may be implemented as the sensing transformer 120A including the core 123A having a clamp structure. Like in FIG. 5A, the high current paths 111A and 112A may be inserted into an opening of the sensing transformer 120A as shown in the drawings.

Like in FIG. 4B, the sensing transformer 120A may be configured, such that a second induced current ID2 induced due to the second currents $I_{21}$ and $I_{22}$ respectively flowing in the two or more high current paths 111A and 112A satisfies a second predetermined induced current condition. In this case, the second predetermined induced current condition may be a condition in which the magnitude of the second induced current ID2 is smaller than a predetermined threshold magnitude.

As described above, the sensing transformer 120A may be configured, such that the second magnetic flux densities B21 and B22 induced due to the second currents $I_{21}$ and $I_{22}$ offset each other. Therefore, only the first currents $I_{11}$ and $I_{12}$ may be sensed.

However, it is merely an example, and the present disclosure is not limited thereto.

In the sensing transformer 120A according to an embodiment of the present disclosure, both the high current paths 111A and 112A and the winding of the secondary side 122A may be inserted into the core 123A. In this case, the sensing transformer 120A may be configured, such that the high current paths 111A and 112A and the winding of the secondary side 122A only pass through the opening of the core 123A.

According to the embodiment of the present disclosure shown in FIGS. 5A and 5B, the core 123A may have a clamp structure in which a portion thereof may be opened, such that the high current paths 111A and 112A may pass through or be inserted into a central opening.

The clamp type core 123A of the present disclosure may be configured, such that the high current paths 111A and 112A may pass through a central through opening when opened, and, after the high current paths 111A and 112A are inserted, an opened portion of the core 123A may be closed. However, it is merely an example, and the core 123A may be implemented in various shapes through which the high current paths 111A and 112A may be inserted into a through opening. For example, the core 123A may be implemented in a rectangular shape other than the circular shape as shown in FIGS. 5A and 5B.

As described above, according to an embodiment of the present disclosure, the high current paths 111A and 112A are simply inserted into (or simply pass through) the core 123A, and thus size of the circuit may be remarkably reduced as compared to the sensing unit 120 in which the high current paths 111A and 112A are wound several times around the core 123A.

In particular, in a high-power/high-current system, since a material that is not easy to process, such as thick copper wires, is used for the high current paths 111A and 112A, the high current paths 111A and 112A are simply inserted into the core 123A, and thus productivity and assembly ability of products using the high-power/high-current system may be improved.

Figure 6:
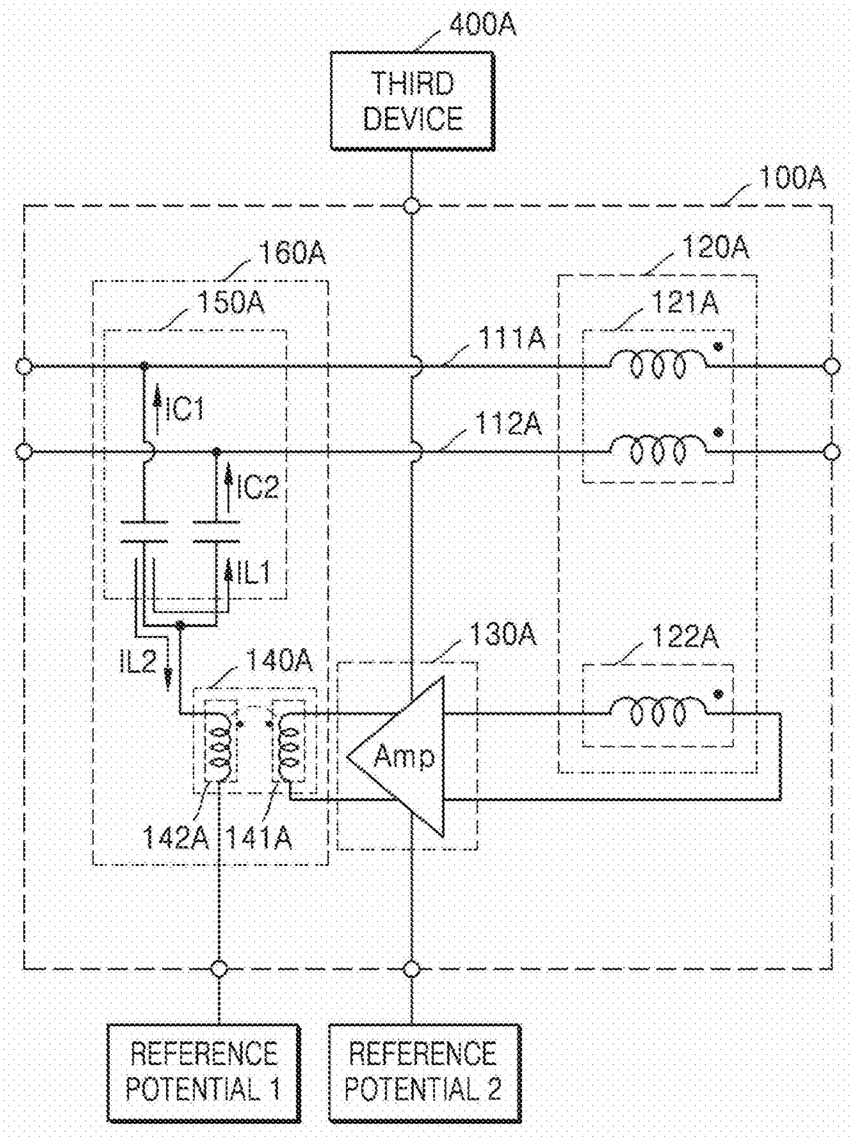
FIG. 6 is a diagram for describing currents flowing through the compensating capacitor unit.

FIG. 6 is a diagram for describing currents $IL_1$ and $IL_2$ flowing through the compensating capacitor unit 150A.

Referring to FIG. 6, the compensating capacitor unit 150A may be configured, such that a current $IL_1$ flowing between two high current paths 111A and 112A through a compensating capacitor satisfies a first predetermined current condition. In this case, the first predetermined current condition may be a condition in which the magnitude of the current $IL_1$ is smaller than a first predetermined threshold magnitude.

Also, the compensating capacitor unit 150A may be configured, such that a current $IL_2$ flowing between each of the two high current paths 111A and 112A and the reference potential (the reference potential 1) of the current compensating device 100A through a compensating capacitor satisfies a second predetermined condition. In this case, the second predetermined current condition may be a condition in which the magnitude of the current $IL_2$ is smaller than a second predetermined threshold magnitude.

The compensation currents $IC_1$ and $IC_2$ flowing respectively to the two high current paths 111A and 112A along the compensating capacitor unit 150A may offset first currents I11 and I22 on the high current paths 111A and 112A, thereby preventing the first currents I11 and I22 from being transmitted to a second device 200A. According to an embodiment, the first currents I11 and I22 and a compensation current may have the same magnitude and opposite phases.

Therefore, the current compensating device 100A according to an embodiment of the present disclosure may actively compensate for the first currents $I_{11}$ and $I_{12}$ input as a common-mode current to the two high current paths 111A and 112A, respectively, connected to the first device 300A, thereby preventing malfunction or damage of the second device 200A.

Figure 7:
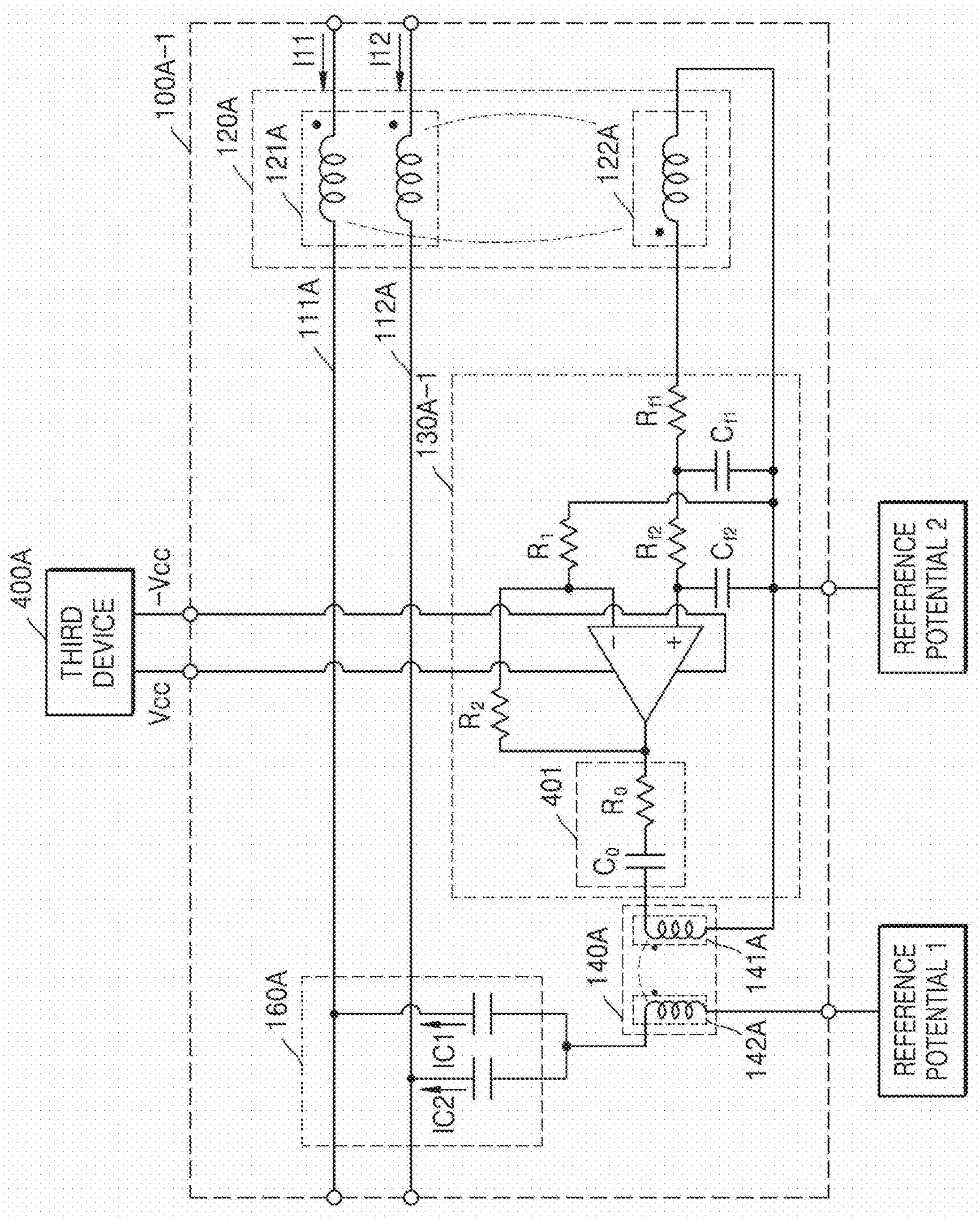
FIG. 7 is a schematic view of an active compensating device according to an embodiment of the present disclosure.

FIG. 7 is a schematic view of an active compensating device 100A-1 according to an embodiment of the present disclosure. The compensating device 100A-1 shown in FIG. 7 may be an example of the compensating device 100A. An amplifying unit 130A-1 included in the compensating device 100A-1 is an example of the amplifying unit 130A of the compensating device 100A.

In the compensating device 100A-1, the amplifying unit 130A of the compensating device 100A is implemented as the amplifying unit 130A-1 having a non-inverting amplifier structure including an OP-amp. In the amplifying unit 130A-1, powers $V_{cc}$ and $-V_{cc}$ may be supplied from a third device 400A to the OP-amp based on the reference potential 2. R1, R2, Rf1, Cf1, Rf2, and Cf2 included in the amplifying unit 130A-1 are elements for adjusting the gain of a non-inverting amplifier according to frequencies. In detail, in order to satisfy the limiting specification of conductive emission (CE) within a first frequency band (e.g., from about 150 KHz to about 30 MHz), values of R1, R2, Rf1, Cf1, Rf2, and Cf2 may be determined. For example, the values of R1, R2, Rf1, Cf1, Rf2, and Cf2 may be determined, such that the first currents $I_{11}$ and $I_{12}$ and the compensation currents $IC_1$ and $IC_2$ have the same magnitude and the opposite phase.

For example, when a turns ratio between the primary side 121A and the secondary side 122A is 1:$N_{sen}$ in the sensing transformer 120A and a turns ratio between the primary side 141A and the secondary side 142A is 1:$N_{inj}$ in the compensating transformer 140A, the values of R1, R2, Rf1, Cf1, Rf2, and Cf2 may be designed, such that the current gain of the amplifying unit 130A-1 is $N_{sen}N_{inj}$.

The amplifying unit 130A-1 may include a high pass filter 401. Elements R0 and C0 included in the high-pass filter 401 may block the operation of the amplifying unit 130A-1 at a low frequency of the first frequency band or a lower frequency, which is a target of noise reduction.

According to an embodiment, a decoupling capacitor unit 170A (refer to FIG. 15) may be disposed on the output side of the compensating device 100A-1 (that is, the side of the second device 200A).

FIG. 8 is a schematic view of an active compensating device 100A-2 according to an embodiment of the present disclosure. The compensating device 100A-2 shown in FIG. 8 is an example of the compensating device 100A. An amplifying unit 130A-2 included in the compensating device 100A-2 is an example of the amplifying unit 130A of the current compensating device 100A.

In the compensating device 100A-2, the amplifying unit 130A of the compensating device 100A is implemented as an amplifying unit 130A-2 having a push-pull amplifier structure including an npn BJT and a pnp BJT.

At an input terminal of the amplifying unit 130A-2, a resistor $R_{in}$ may be connected in parallel to the secondary side 122A. The resistor $R_{in}$ may adjust the input impedance of the amplifying unit 130A-2. $C_b$ and $C_e$ may selectively combine only AC signals.

The third device 400A supplies a DC low voltage VDC based on the reference potential 2 to drive the amplifying unit 130A-2. CDC is a DC decoupling capacitor and may be connected in parallel to the third device 400A. CDC may selectively combine only AC signals between both collectors of each of the npn BJT and the pnp BJT.

In the amplifier 130A-2, an $R_{npn}$, $R_{pnp}$, $R_{bb}$, and $R_e$ may adjust the operating point of a BJT. $R_{npn}$, $R_{pnp}$, $R_{bb}$, and $R_e$ may be designed according to the operating point of the BJT. $R_{npn}$ may connect a collector terminal of the npn BJT, which is a terminal of the third device 400A, and a base terminal of the npn BJT. $R_{bb}$ may connect the base terminal of the npn BJT and a base terminal of the pnp BJT. $R_{pnp}$ may connect a collector terminal of the pnp BJT, which is a terminal of the reference potential 2, and the base terminal of the pnp BJT.

Meanwhile, when a turns ratio between the primary side 121A and the secondary side 122A is 1:$N_{sen}$ in the sensing transformer 120A and a turns ratio between the primary side 141A and the secondary side 142A is 1:$N_{inj}$ in the compensating transformer 140A, the current gain of the amplifying unit 130A-2 may be designed to be $N_{sen}N_{inj}$.

Meanwhile, a current flowing between a collector and an emitter varies according to a voltage applied between a base and the emitter of the BJT. In the case of a positive swing in which an input voltage of the amplifier 130A-2 is greater than 0 due to noise, the npn BJT may operate. In this case, an operating current may flow through a first path 501. In the case of a negative swing in which the input voltage of the amplifier 130A-2 is less than 0 due to noise, the pnp BJT may operate. In this case, the operating current may flow through a second path 502.

On the other hand, when the transconductance (a ratio between an output current of a BJT element to an input voltage of the BJT element) of a BJT element is $g_{m,BJT}$, the total transconductance $g_{m,BJT}$ of the amplifying unit 130A-2 may be expressed as shown in Equation 1.

$$g_{amp} = \frac{I_{out}}{V_{sen}} = \frac{g_{m,BJT}}{1 + g_{m,BJT}R_e} \quad \text{[Equation 1]}$$

In Equation 1, $I_{out}$ denotes an output current of the amplifying unit 130A-2, which is a current flowing in the primary side 141A of the compensating transformer 140A. $V_{sen}$ denotes an input voltage of the amplifying unit 130A-2, which is a potential difference between both differential input terminals of the amplifying unit 130A-2, that is, a voltage induced to the secondary side 122A of the sensing transformer 120A. As described above, $g_{m,BJT}$ denotes the transconductance (a ratio between an output current to an input voltage) of a BJT without a feedback loop.

Therefore, a current gain $A_{i,amp}$ of the amplifying unit 130A-2 may be expressed as shown in Equation 2.

$$A_{i,amp} = \frac{I_{out}}{V_{sen}} \approx g_{m,amp}R_{in} = \frac{g_{m,BJT}}{1 + g_{m,BJT}R_e}R_{in} \quad \text{[Equation 2]}$$

In Equation 2, $I_{sen}$ denotes an input current of the amplifier 130A-2, which is a current induced to the secondary side 122A by the sensing transformer 120A. $I_{out}$ denotes an output current of the amplifying unit 130A-2, which is a current flowing in the primary side 141A of the compensating transformer 140A.

Therefore, the current gain of the amplifying unit 130A-2 may be approximated as shown in Equation 3.

$$A_{i,amp} \approx \frac{R_{in}}{R_e} \quad \text{[Equation 3]}$$

On the other hand, as described above, by designing such that the current gain & amp of the amplifying unit 130A-2 to be $N_{sen}N_{inj}$, the compensation currents $IC_1$ and $IC_2$ and the first currents $I_{11}$ and $I_{12}$ may have the same magnitude, and thus the first currents $I_{11}$ and $I_{12}$ may be offset by the compensation currents $IC_1$ and $IC_2$.

In order to offset the first currents $I_{11}$ and $I_{12}$ with the compensation currents $IC_1$ and $IC_2$, it may be designed, such that the current gain of $$A_{i,amp}\left(\approx \frac{R_{in}}{R_e}\right)$$

of the amplifier 130A-2 is $N_{sen}N_{inj}$.

According to an embodiment, the decoupling capacitor unit 170A (refer to FIG. 15) may be selectively disposed on the output side of the compensating device 100A-2 (that is, the side of the second device 200A).

Figure 9A:
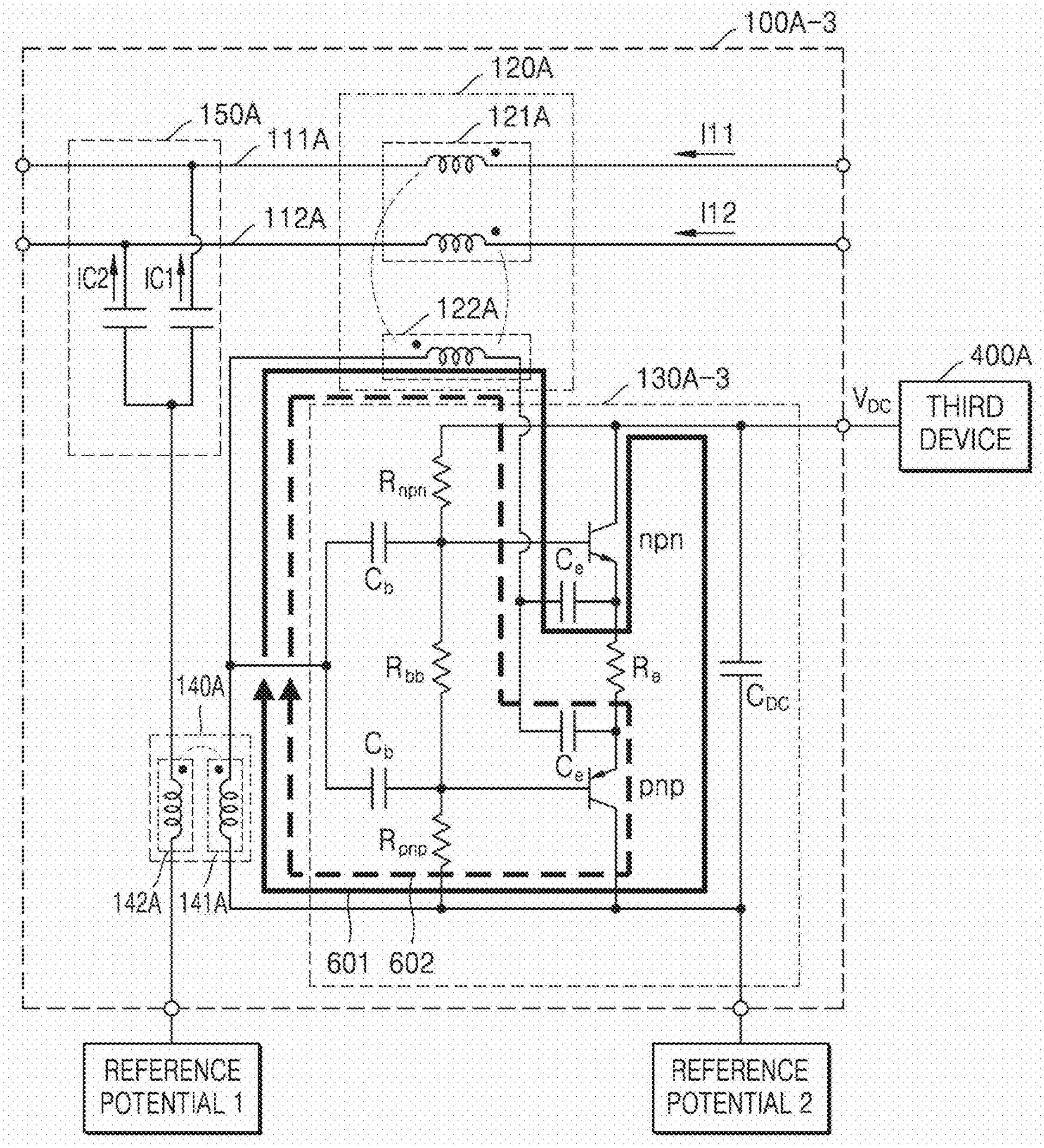
FIG. 9A is a schematic view of a compensating device according to an embodiment of the present disclosure.

FIG. 9A is a schematic view of a compensating device 100A-3 according to an embodiment of the present disclosure. The compensating device 100A-3 may be an example of the current compensating device 100A, and an amplifying unit 130A-3 may be an example of the amplifying unit 130A.

In the compensating device 100A-3, the amplifying unit 130A of the compensating device 100A is implemented as an amplifying unit 130A-3 having a push-pull amplifier structure including an npn BJT and a pnp BJT.

$C_b$ and $C_e$ of the amplifying unit 130A-3 may selectively combine only AC signals.

The third device 400A supplies a DC low voltage VDC based on the reference potential 2 to drive the amplifying unit 130A-3. CDC is a DC decoupling capacitor with respect to the Vic and may be connected in parallel to the third device 400A. CDC may selectively combine only AC signals between both collectors, that is, the npn BJT and the pnp BJT.

In the amplifier 130A-3, $R_{npn}$, $R_{pnp}$, $R_{bb}$, and $R_e$ may adjust the operating point of a BJT. $R_{npn}$ may connect a collector terminal of the npn BJT, which is a terminal of the third device 400A, and a base terminal of the npn BJT. $R_{bb}$ may connect the base terminal of the npn BJT and a base terminal of the pnp BJT. $R_{pnp}$ may connect a collector terminal of the pnp BJT, which is a terminal of the reference potential 2, and the base terminal of the pnp BJT.

Meanwhile, in an embodiment, the secondary side 122A of the sensing transformer 120A may be connected to base terminals and emitter terminals of the two BJTs, and the primary side 141A of the compensating transformer 140A may be connected to collector terminals and the base terminals of the two BJTs. The amplifying unit 130A-3 may have a regression structure for injecting an output current back to the base of a BJT. Due to the regression structure, the amplifying unit 130A-3 may stably obtain a constant current gain for the operation of the compensating device 100A-3.

In the case of a positive swing in which an input voltage of the amplifier 130A-3 is greater than 0 due to noise, the npn BJT may operate. In this case, an operating current may flow through a first path 601. In the case of a negative swing in which the input voltage of the amplifier 130A-3 is less than 0 due to noise, the pnp BJT may operate. In this case, the operating current may flow through a second path 602.

Figure 9B:
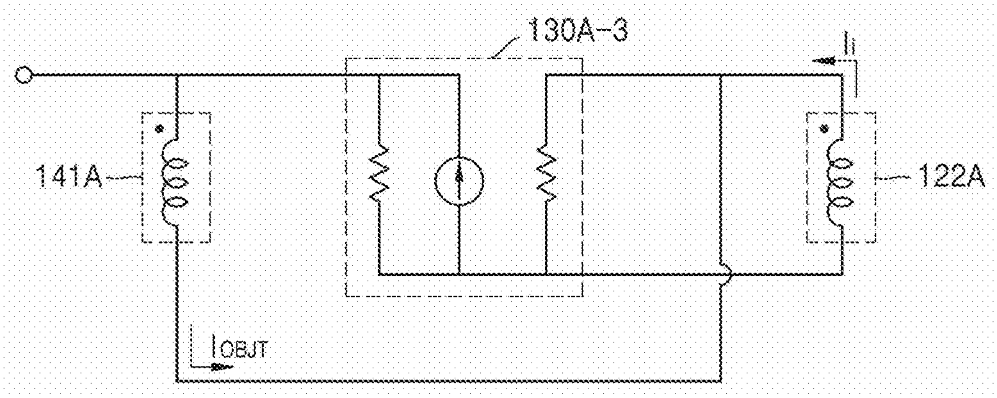
FIG. 9B is a simplified view of an amplifier of FIG. 9A.

FIG. 9B is a simplified view of an amplifier of FIG. 9A.

Referring to FIG. 9B, an induced current $I_i$ (or $I_{sen}$) generated at the secondary side 122A of the sensing transformer 120A may be a first induced current input to the amplifying unit 130A-3 or an output signal including the first induced current. Also, $I_{OBJT}$ (or $I_{out,BJT}$) passing through the primary side 141A of the compensating transformer 140A may be an amplified current or an amplified signal output from the amplifying unit 130A-3.

On the other hand, a current gain of a BJT element β may be expressed as shown in Equation 4.

$$\beta = \frac{I_{out,BJT}}{I_{sen} + I_{out,BJT}} \quad \text{[Equation 4]}$$

In Equation 4, β denotes a current gain of a BJT element, $I_{sen}$ denotes which is a current flowing in the secondary side 122A of the sensing transformer 120A, $I_{out,BJT}$ denotes $I_{OBJT}$, which is a current flowing in the primary side 141A of the compensating transformer 140A. $I_{sen}$ may expressed as a function of $I_{out,BJT}$, as shown in Equation 5.

$$I_{sen} = \frac{I_{out,BJT}}{\beta} - I_{out,BJT} = \frac{1-\beta}{\beta} I_{out,BJT} \quad \text{[Equation 5]}$$

Therefore, a current gain $A_{i,amp}$ of the amplifying unit 130A-3 may be expressed as shown in Equation 6.

$$A_{i,amp} = \frac{I_{out,BJT}}{I_{sen}} = -\frac{-\beta}{1+(-\beta)} \approx -1 \quad \text{[Equation 6]}$$

Since a current gain 9 of a BJT has a value significantly greater than 1 (e.g., 100 or greater), $A_{i,amp}$ may be approximated to −1. Therefore, for example, by designing the compensating device 100A-3 to satisfy $N_{sen}N_{inj}=1$, the first currents $I_{11}$ and $I_{12}$ may be offset by the compensation currents $IC_1$ and $IC_2$.

Unlike the amplifying unit 130A-2 of the compensating device 100A-2, the amplifying unit 130A-3 of the compensating device 100A-3 has no $R_{in}$ at an input terminal and may have a feedback structure for feeding a compensating output current $I_{out,BJT}$ back to the input terminal. Therefore, the amplifying unit 130A-3 may obtain a current gain more stably than the amplifying unit 130A-2, instead of having limitations for a current gain.

According to embodiments, the decoupling capacitor unit 170A (refer to FIG. 15) may be disposed on the output side of the compensating device 100A-3 (that is, the side of the second device 200A).

Figure 10A:
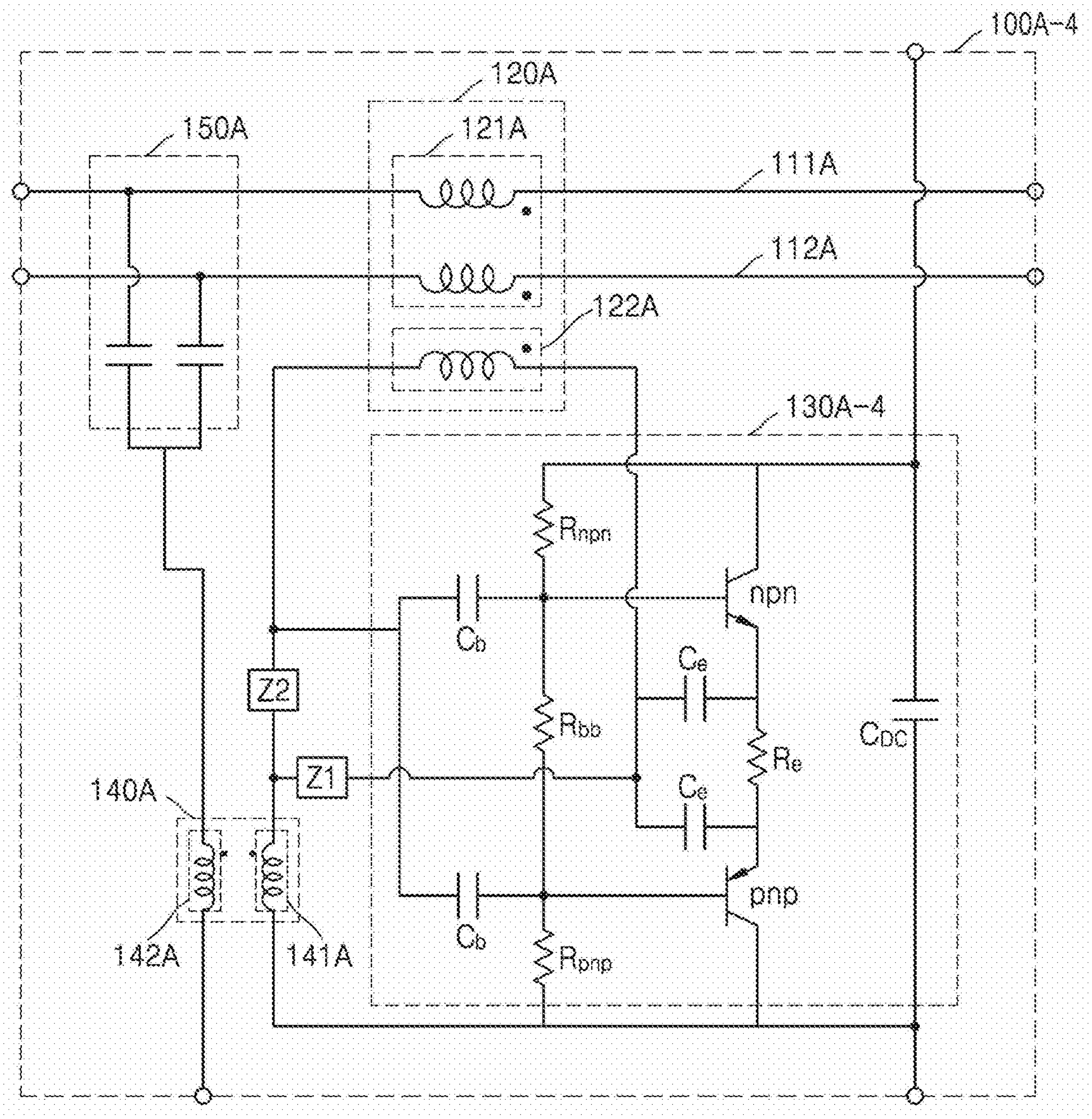
FIGS. 10A and 10B are diagrams for describing an amplifying unit of a compensating device according to an embodiment of the present disclosure.
Figure 10B:
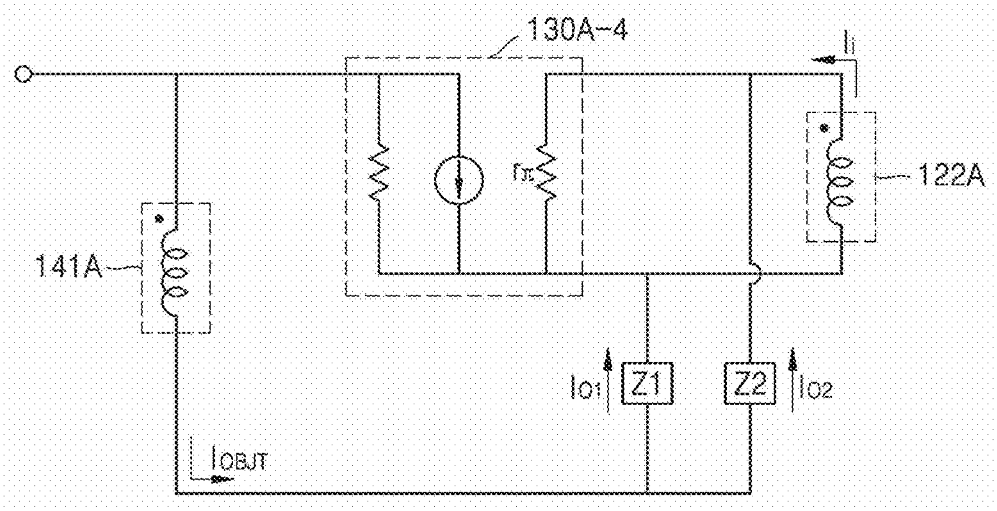

FIGS. 10A and 10B are diagrams for describing an amplifying unit 130A-4 of a compensating device 100A-4 according to an embodiment of the present disclosure.

Referring to FIG. 10A, the amplifying unit 130A-4 according to an embodiment of the present disclosure may include at least one impedances Z1 and Z2 for adjusting an amplification ratio of an amplifying element.

For example, the amplifying unit 130A-4 may include an npn type BJT, a pnp type BJT, capacitors $C_e$ at emitter terminals of the BJTs, capacitors $C_b$ at base terminals of the BJTs, resistors $R_{npn}$ and $R_{pnp}$ at collector terminals of the BJTs, a resistor Re at the emitter terminals of two BJTs, and a resistor Reb at the based ends of the two BJTs. A first terminal of a capacitor Ce of the emitter terminal of each of the two BJTs may be connected to the secondary side 122A of the sensing transformer 120A, and a second terminal of the capacitor Ce may be connected to an emitter terminal of each of the two BJTs. The resistors $R_{pnp}$ and $R_{pnp}$ of the collector terminals of the BJTs, the resistor Re at the emitter terminals of the two BJTs, and the resistor Reb at the base terminals of the two BJT may be components for designing DC operating points of the BJTs.

As compared with the amplifying unit 130A-3, an amplifier of FIG. 10A may include at least one impedances Z1 and Z2 for adjusting an amplification ratio of an amplifying element. A first impedance Z1 and a second impedance Z2 may each be implemented by using one or more of a resistor (R) element, a capacitor (C) element, or an inductor (L) element in combination.

For example, the first impedance Z1 and the second impedance Z2 may each be implemented as an RC series or an RLC series, respectively, and may be designed to more precisely compensate for a phase and a magnitude of a current according to frequency.

A first terminal of the first impedance Z1 may be connected to the primary side 141A of the compensating transformer 140A, and a second terminal of the first impedance Z1 may be connected to the emitter terminals of the two BJTs. Also, a first terminal of the second impedance may be connected to the primary side 141A of the compensating transformer 140A, and a second terminal of the second impedance may be connected to the capacitors Ce of the base terminals of the BJTs.

An amplification degree $A_{i,amp}$ of the amplifying unit 130A-4 according to another embodiment of the present disclosure may be adjusted according to the value of at least one of impedances Z1 and Z2 described above. For example, when the first impedance Z1 is R1 and the second impedance Z2 is (n−1)R1, the amplification degree $A_{i,amp}$ may be designed to be −n(n>1). In this case, the design value of n may be tuned in consideration of the characteristic errors of elements.

FIG. 10B is a simplified view of an amplifier of FIG. 10A.

Referring to FIG. 10B, a first induced current $I_i$ generated at the secondary side 122A of the sensing transformer 120A may be an input current input to the amplifying unit 130A-4. Also, an amplification current $I_{OBJT}$ passing through the primary side 141A of the compensating transformer 140A may be an output current output from the amplifying unit 130A.

The amplification degree $A_{i,amp}$ of the amplifying unit 130A may be expressed as shown in Equation 7.

$$A_{i,amp} = \frac{I_{OBJT}}{I_i} = \frac{1}{-1 - \frac{1}{\beta} + \frac{z_2 + \frac{r_z}{\beta}}{z_1 - z_2}} \approx -n \quad \text{[Equation 7]}$$

$$(\beta >> 1, Z2 >> r\pi/\beta, Z1 = R1, Z2 = (n-1)Z-1)$$

As shown in Equation 7, an amplifier of the present disclosure may be designed with a current amplification degree $(A_{i,amp})$=−n(n>1). According to the above example, the amplification degree $A_{i,amp}$ may be designed to $N_{sen}*N_{inj}$, and, by setting the impedances Z1 and Z2 in consideration of errors, a current amplification degree may be precisely tuned.

In particular, when a current compensating device includes the sensing transformer 120A having the clamp structure described with reference to FIGS. 5A to 5B, the sensing gain of a first current is not large, and thus a decrease in gain due to the sensing transformer 120A may be compensated for by appropriately adjusting at least one of the impedances Z1 and Z2.

Figure 11:
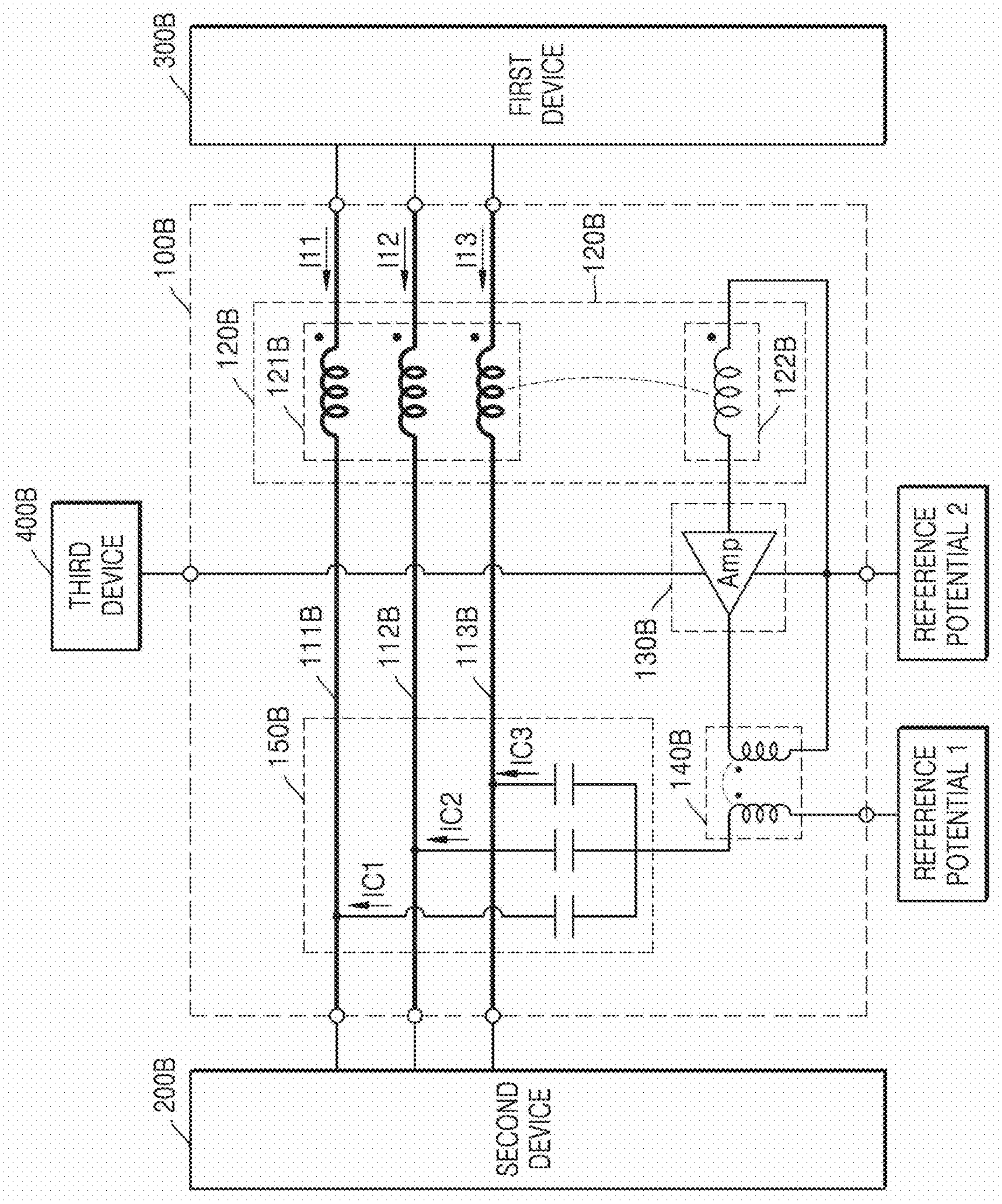
FIG. 11 is a diagram schematically showing a configuration of a compensating device according to another embodiment of the present disclosure.

FIG. 11 is a diagram schematically showing a configuration of a compensating device 100B according to another embodiment of the present disclosure. Hereinafter, descriptions identical to those given above with reference to drawings will be omitted.

The compensating device 100B according to another embodiment of the present disclosure may actively compensate for first currents $I_{11}$, $I_{12}$, and $I_{13}$ input as a common-mode current to high current paths 111B, 112B, and 113B, respectively, connected to a first device 300B.

To this end, the compensating device 100B according to another embodiment of the present disclosure may include three high current paths 111B, 112B, and 113B, a sensing transformer 120B, an amplifying unit 130B, a compensating transformer 140B, and a compensating capacitor unit 150B.

As compared with the compensating devices according to the above-described embodiments, the compensating device 100B includes the three high current paths 111B, 112B, and 113B, and thus the sensing transformer 120B and the compensating capacitor unit 150B are different from those of the compensating devices according to the above-described embodiments. Therefore, the compensating device 100B will be described below with the focus on the above-described differences.

The compensating device 100B according to another embodiment of the present disclosure may include a first high current path 111B, a second high current path 112B, and a third high current path 113B that are distinguished from one another. According to an embodiment, the first high current path 111B may be an R-phase power line, the second high current path 112B may be an S-phase power line, and the third high current path 113B may be a T-phase power line. The first currents $I_{11}$, $I_{12}$, and $I_{13}$ may be respectively input to the first high current path 111B, the second high current path 112B, and the third high current path 113B as a common-mode current.

According to an embodiment, a primary side 121B of the sensing transformer 120B may be disposed on the first high current path 111B, the second high current path 112B, and the third high current path 113B and generate an induced current at a secondary side 122B. Magnetic flux densities generated at the sensing transformer 120B by the first currents $I_{11}$, $I_{12}$, and $I_{13}$ on the three high current paths 111B, 112B, and 113B may reinforce with one another.

On the other hand, when the compensating device 100B includes the three high current paths 111B, 112B, and 113B, the effect of reducing the size of a sensing unit and the size of the compensating device 100B may be maximized by using a clamp-type sensing unit as shown in FIGS. 5A and 5B.

Meanwhile, the compensating capacitor unit 150B may provide paths through which compensation currents $IC_1$, $IC_2$, and $IC_3$ generated by the compensating transformer flow to the first high current path 111B, the second high current path 112B, and the third high current path 113B, respectively.

The active current compensating device 100B according to the present embodiment may be used to compensate for (or offset) the first currents $I_{11}$, $I_{12}$, and $I_{13}$ generated as a common-mode current on three high current paths of a three-phase three-line power system.

Figure 12:
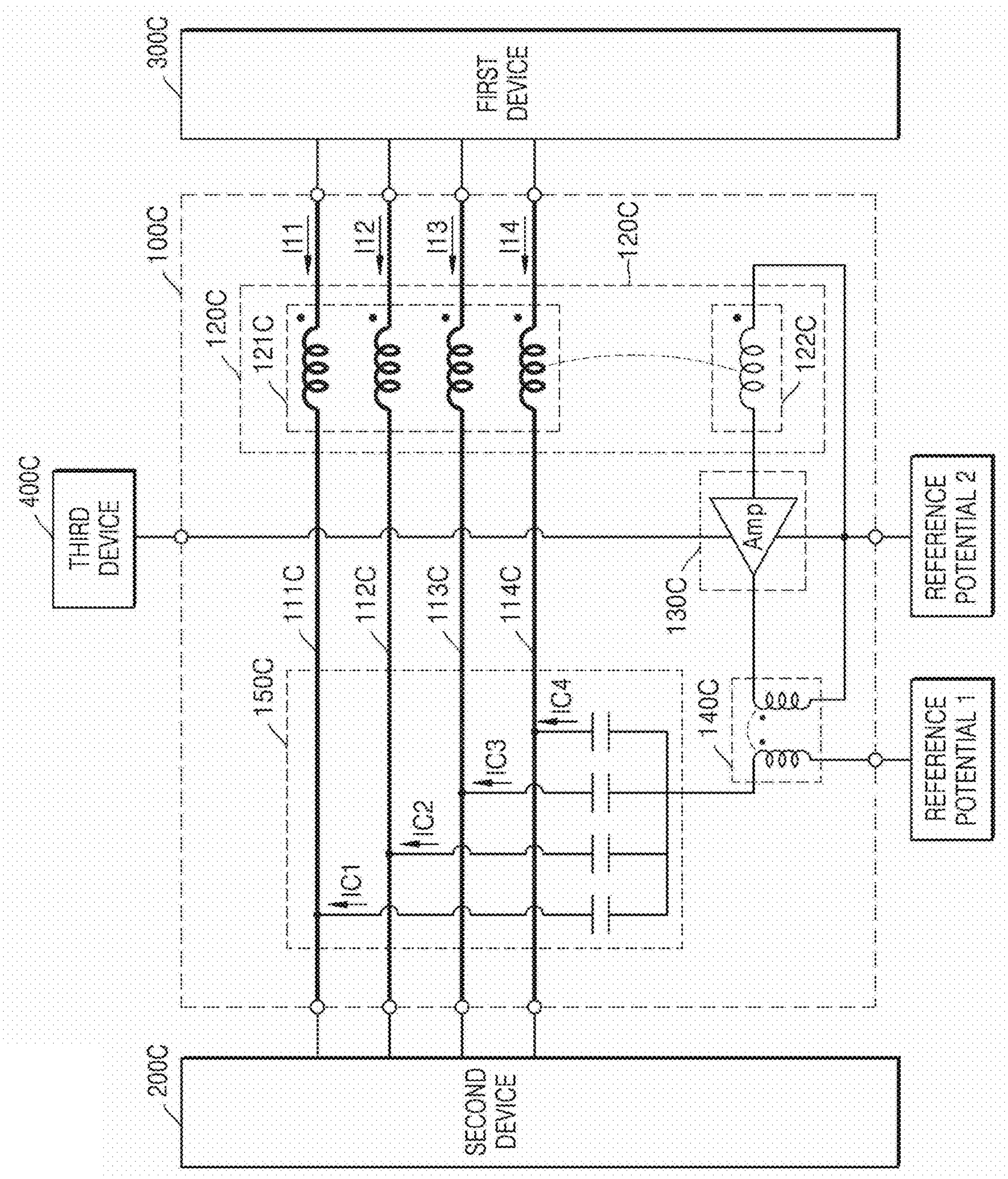
FIG. 12 is a diagram schematically showing a configuration of a compensating device according to another embodiment of the present disclosure.

FIG. 12 is a diagram schematically showing a configuration of a compensating device 100C according to another embodiment of the present disclosure. Hereinafter, descriptions identical to those given above with reference to drawings will be omitted.

The compensating device 100C may actively compensate for first currents $I_{11}$, $I_{12}$, $I_{13}$, and $I_{14}$ input as a common-mode current to high current paths 111C, 112C, 113C, and 114C, respectively, connected to a first device 300C.

To this end, the compensating device 100C according to an embodiment of the present disclosure may include four high current paths 111C, 112C, 113C, and 114C, a sensing transformer 120C, an amplifying unit 130C, a compensating transformer 140C, and a compensating capacitor unit 150C.

As compared with the compensating devices according to the above-described embodiments, the compensating device 100C includes the four high current paths 111C, 112C, 113C, and 114C, and thus the sensing transformer 120C and the compensating capacitor unit 150C are different from those of the compensating devices according to the above-described embodiments. Therefore, the compensating device 100C will be described below with the focus on the above-described differences.

The compensating device 100C according to another embodiment of the present disclosure may include a first high current path 111C, a second high current path 112C, a third high current path 113C, and a fourth high current path 114C that are distinguished from one another. According to an embodiment, the first high current path 111C may be an R-phase power line, the second high current path 112C may be an S-phase power line, the third high current path 113C may be a T-phase power line, and the fourth high current path 114C may be an N-phase power line. The first currents $I_{11}$, $I_{12}$, $I_{13}$, and $I_{14}$ may be input as a common-mode current to the first high current path 111C, the second high current path 112C, the third high current path 113C, and the fourth high current path 114C, respectively.

According to an embodiment, a primary side 121C of the sensing transformer 120C may be disposed on each of the first high current path 111C, the second high current path 112C, the third high current path 113C, and the fourth high current path 114C and generate an induced current at a secondary side 122C. Magnetic flux densities generated at the sensing transformer 120C by the first currents $I_{11}$, $I_{12}$, $I_{13}$, and $I_{14}$ on the four high current paths 111C, 112C, 113C, and 114C may reinforce with one another.

On the other hand, when the compensating device 100C includes the four high current paths 111C, 112C, 113C, and 114C, the effect of reducing the size of a sensing unit and the size of the compensating device 100C may be maximized by using a clamp-type sensing unit as shown in FIGS. 5A and 5B.

Meanwhile, in the compensating capacitor unit 150C may provide paths through which compensation currents $IC_1$, $IC_2$, $IC_3$, and $IC_4$ generated by the compensating transformer flow to the first high current path 111C, the second high current path 112C, the third high current path 113C, and the fourth high current path 114C, respectively.

The compensating device 100C according to the present embodiment may be used to compensate for (or offset) the first currents $I_{11}$, $I_{12}$, $I_{13}$, and $I_{14}$ generated as a common-mode current on four high current paths of a three-phase four-line power system.

Figure 13:
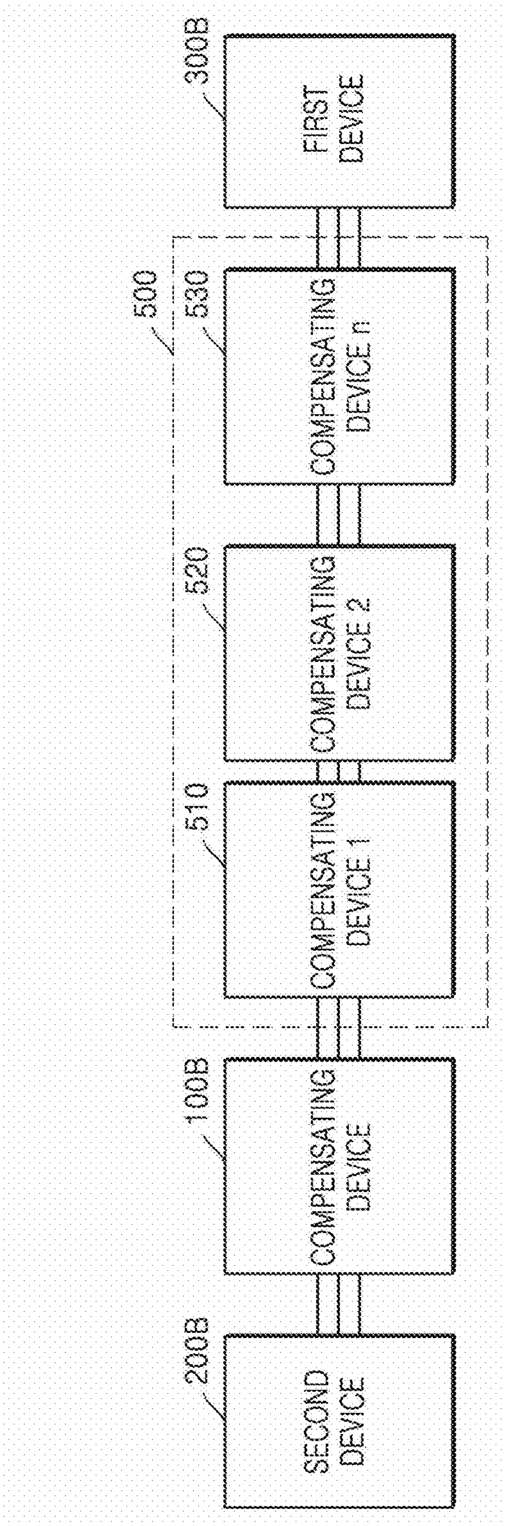
FIG. 13 is a diagram schematically showing the configuration of a system in which the compensating device according to the embodiment shown in FIG. 11 is used, according to an embodiment of the present disclosure.

FIG. 13 is a diagram schematically showing the configuration of a system in which the compensating device 100B according to the embodiment shown in FIG. 11 is used, according to an embodiment of the present disclosure.

The compensating device 100B according to the embodiment may be used with one or more other compensating devices 500 on a high current path connecting a second device 200B and the first device 300B.

For example, the compensating device 100B according to the embodiment may be used together with a compensating device 1 510 for compensating for a first current input as a common-mode current. Here, the compensating device 1 510 may be implemented with active devices similar to the compensating device 100B or may be implemented only with passive devices.

Also, the compensating device 100B according to the embodiment may be used together with a compensating device 2 520 for compensating for a third current input in a differential mode. Here, the compensating device 2 520 may also be implemented with active devices or may be implemented only with passive devices.

Also, the compensating device 100B according to the embodiment may be used together with a compensating device n 530 for compensating for a voltage. Here, the compensating device n 530 may also be implemented with active devices or may be implemented only with passive devices.

On the other hand, the type, quantity, and arrangement order of the compensating device 500 described in FIG. 13 are merely examples, and the present disclosure is not limited thereto. Therefore, various quantities and types of compensating devices may be further included in a system according to the design of the system. Also, optionally, the embodiment shown in FIG. 13 may be equally applied to all other embodiments of the present specification.

Figure 14:
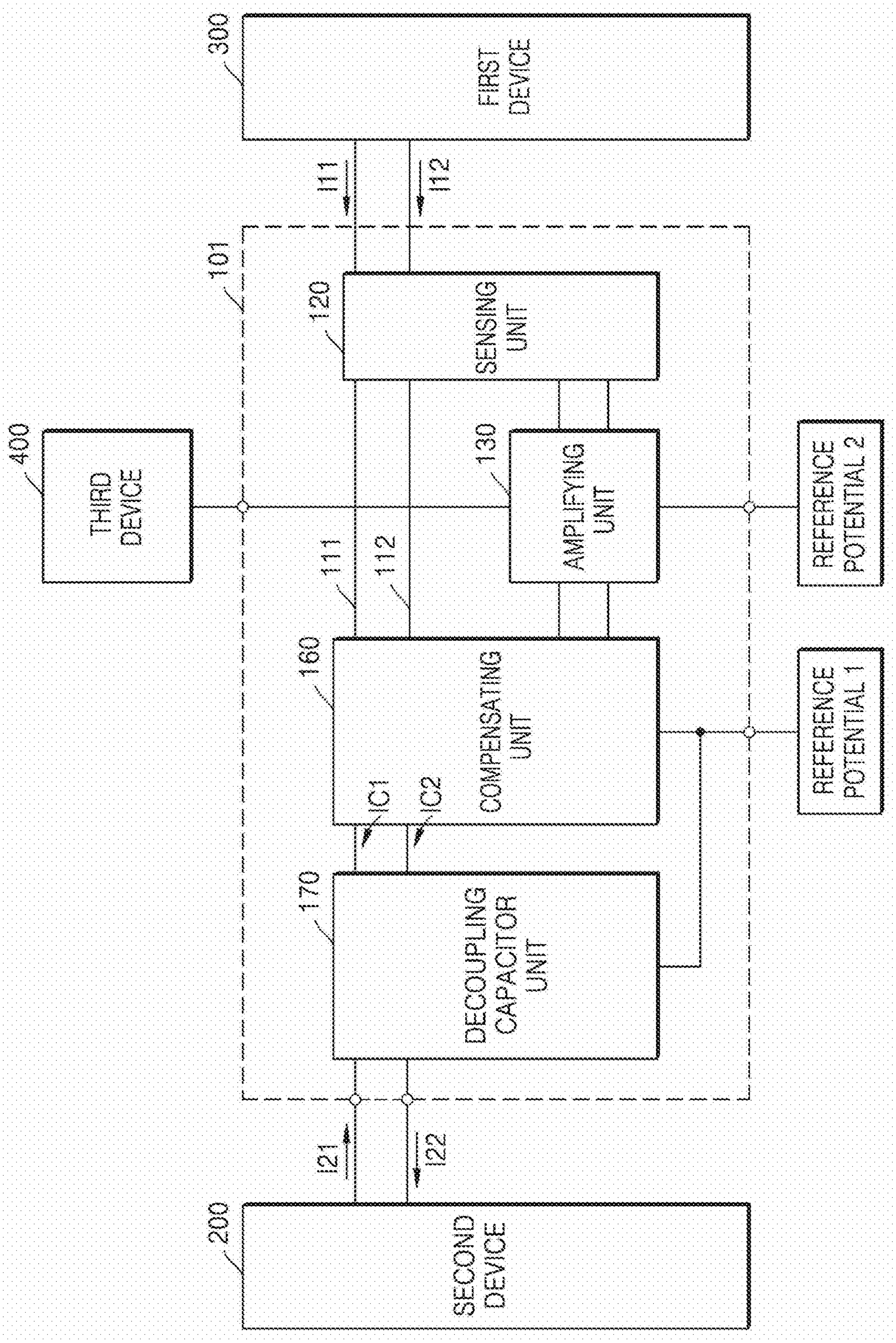
FIG. 14 is a schematic view of the configuration of a system including an active compensating device according to an embodiment of the present disclosure.

FIG. 14 is a schematic view of the configuration of a system including an active compensating device 101 according to an embodiment of the present disclosure. Referring to FIG. 14, the compensating device 101 may further include a decoupling capacitor unit 170 as compared with the compensating device shown in FIG. 1. Detailed descriptions of components identical to those of the above-described embodiments will be omitted.

The decoupling capacitor unit 170 may be a means for allowing an output impedance from the above-described compensating unit 160 toward the second device 200 to satisfy a predetermined condition. In other words, the decoupling capacitor unit 170 may be a means for allowing a compensation current to be output toward the second device 200 along the at least two or more high current paths 111 and 112 and prevent the compensation current from returning back to the compensating device 101.

For example, the compensating device 101 may increase the effect of compensating for a first current input as a common-mode current when a condition that the output impedance of the compensating unit 160 is smaller than or equal to the impedance of the compensating unit 160 is satisfied. According to the example embodiment, a condition that the amount of at least a part of a compensation current flowing toward the second device 200 is greater than the amount of at least a part of the compensation current flows into the compensating device 101 along the two or more high current paths 111 and 112 may be satisfied.

The impedance of the side of the second device 200 may be arbitrarily changed according to surrounding conditions of a power system and a filter. For example, a household appliance may have various impedance values according to its components (e.g., an electric motor, an electric heater, a light emitting device, etc.).

The decoupling capacitor unit 170 prevents the performance of the compensating device 101 for outputting a compensation current from being significantly changed according to a change in an impedance value of the second device 200, thereby allowing the compensating device 101 to be applied to various systems.

Figure 23:
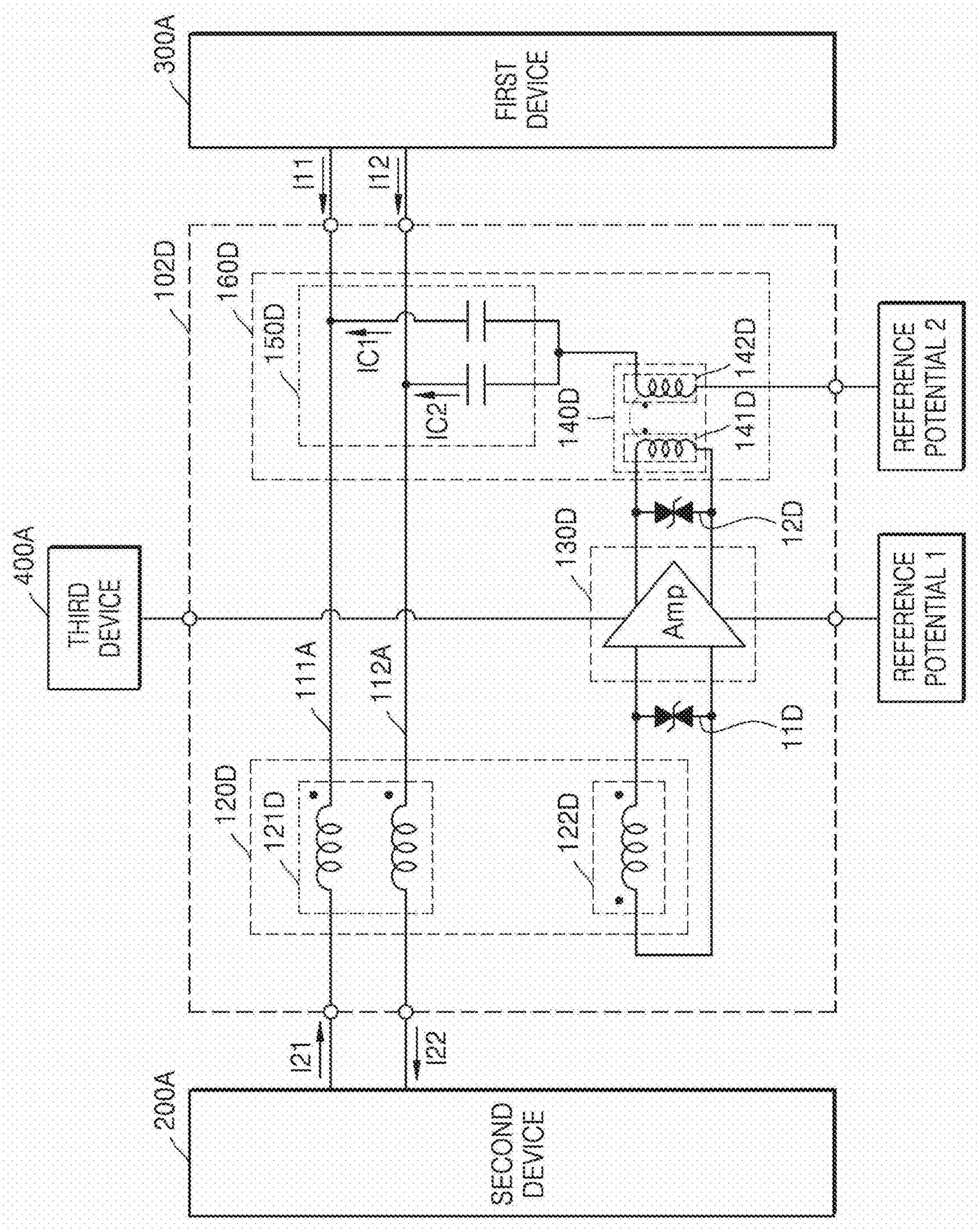
FIG. 23 is a diagram schematically showing a configuration of a compensating device according to another embodiment of the present disclosure.
Figure 47:
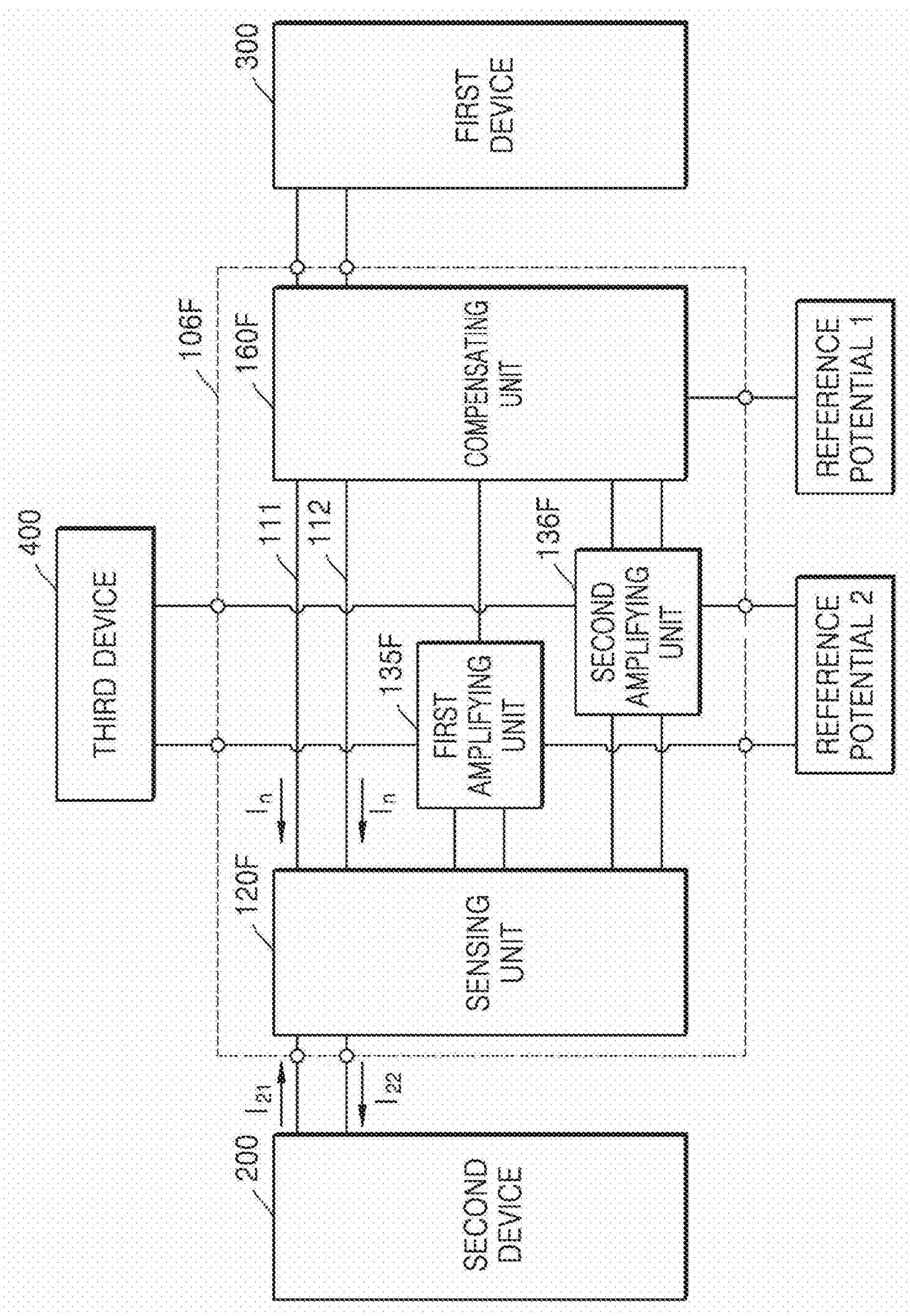
FIG. 47 is a schematic view of the configuration of a system including an active compensating device according to an embodiment of the present disclosure.

Compensating devices 100 and 101 according to an example embodiment may be feedforward type compensation filters that compensate for noise input from the first device 300 at a front end, which is a power source side. However, the present disclosure is not limited thereto, and as shown in FIGS. 23 and 47, the present disclosure may also include a compensating device of a type for compensating for noise sensed at the front end, which is a power source side, at a rear end.

Figure 15:
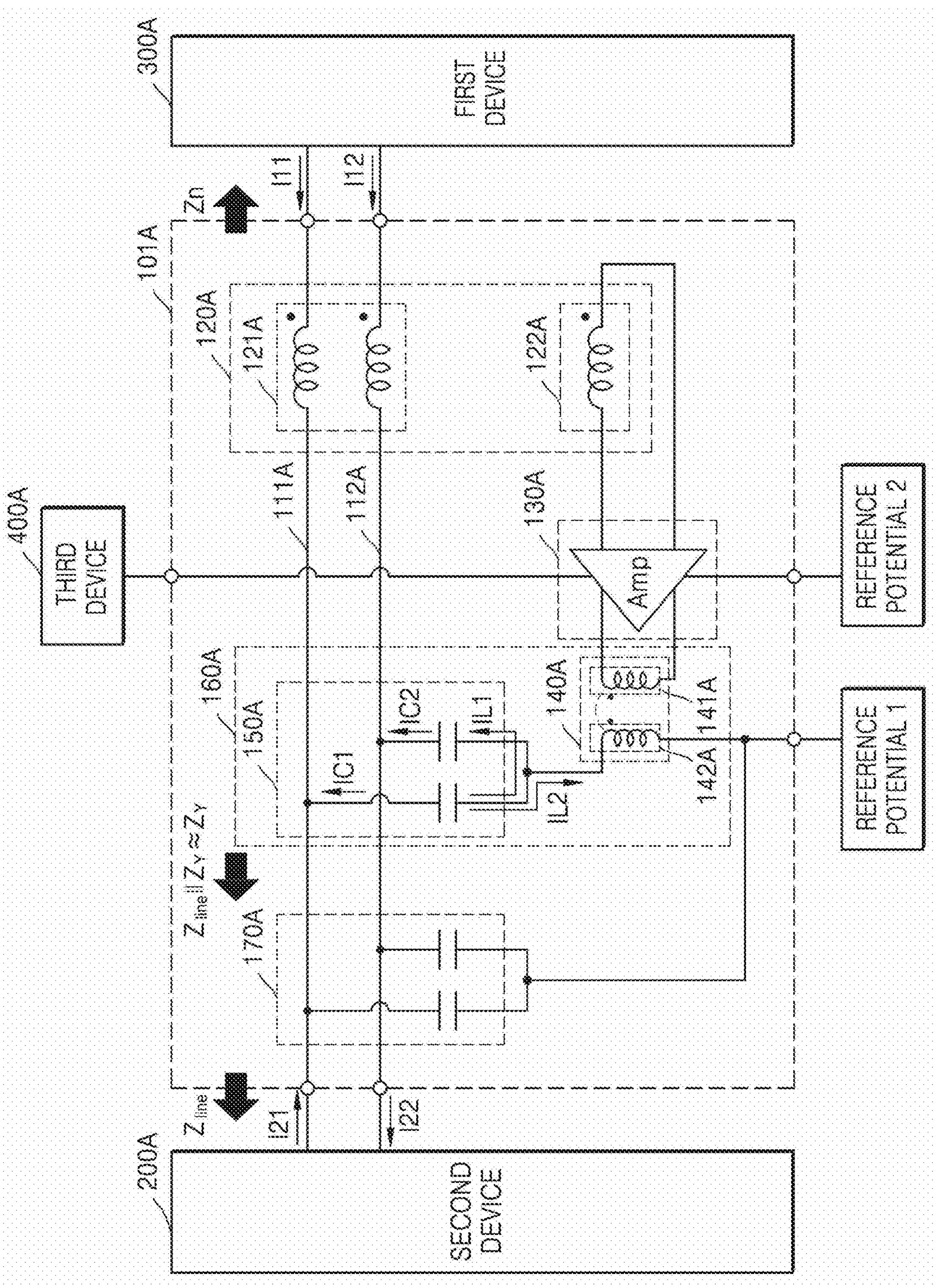
FIG. 15 is a schematic view of a specific example of the compensating device according to the embodiment shown in FIG. 14.

FIG. 15 is a schematic view of a specific example of the compensating device 101 according to the embodiment shown in FIG. 14. Referring to FIG. 15, a compensating device 101A may further include the decoupling capacitor unit 170A as compared with the compensating device 100A shown in FIG. 3.

The decoupling capacitor unit 170A may be a means for allowing an output impedance from the compensating unit 160A toward the second device 200A to satisfy a predetermined condition.

An impedance $Z_n$ of the first device 300A and/or an impedance $Z_{line}$ of the second device 200A may be arbitrarily changed according to surrounding conditions of a power system and a filter. The decoupling capacitor unit 170A prevents the performance of the compensating device 101A for outputting a compensation current from being significantly changed according to a change in an impedance value of the second device 200A.

The decoupling capacitor unit 170A may include at least two capacitors arranged on paths branching from each of at least two high current paths 111A and 112A connecting the second device 200A and the compensating capacitor unit 150A.

Referring to FIG. 15, one end of each of the two capacitors included in the decoupling capacitor unit 170A may be connected to the reference potential (the reference potential 1) of the compensating device 101A, and the other end of each of the two capacitors may be connected to the first high current path 111A and the second high current path 112A, respectively. According to an embodiment, the decoupling capacitor unit 170A may be connected to the power source side of the compensating device 101A (i.e., the side of the second device 200A). However, the present disclosure is not limited thereto.

An impedance $Z_Y$ of the decoupling capacitor unit 170A may be designed to have a sufficiently small value in the first frequency band that is a target of noise reduction. For example, the impedance $Z_Y$ of the decoupling capacitor unit 170A may satisfy Equation 8.

$$Z_{line} \| Z_Y \approx Z_Y \quad \text{[Equation 8]}$$

Referring to Equation 8, an impedance $Z_{line} \| Z_Y$ viewed from the compensating device 101A toward the second device 200A may have a value of the designed $Z_Y$ regardless of any $Z_{line}$ value due to the decoupling capacitor unit 170A. For example, the impedance $Z_Y$ of the decoupling capacitor unit 170A may be designed to have a value smaller than a specified value within a specified frequency band (e.g., the first frequency band). Since the impedance $Z_Y$ of the decoupling capacitor unit 170A has a sufficiently small value in the first frequency band that is the target of noise reduction, the current compensating device 101A may operate normally regardless of the impedance $Z_{line}$ of the second device 200A.

In combination with the decoupling capacitor unit 170A, the compensating device 101A may be used as an independent module in any system.

Meanwhile, the sensing unit 120 according to an embodiment of the present disclosure may include the common sensing transformer 120A or the clamp structure described above with reference to FIGS. 5A to 5B.

According to an embodiment, since the sensing unit 120 is for the purpose of sensing the first currents $I_{11}$ and $I_{12}$ (i.e., noise), it is not necessary to have a large impedance. The sensing transformer 120A or the clamp structure may have an impedance from one thousandth to one hundredth of the impedance of a passive filter (e.g., a CM choke). Therefore, the size of the sensing transformer 120A may be significantly smaller than the size of the CM choke.

Meanwhile, it goes without saying that amplifying units 130 and 130A of the compensating devices 101 and 101A may include amplifying units 130A-1, 130A-2, 130A-3, and 130A-4 according to the various embodiments described above. The same applies below.

Figure 16:
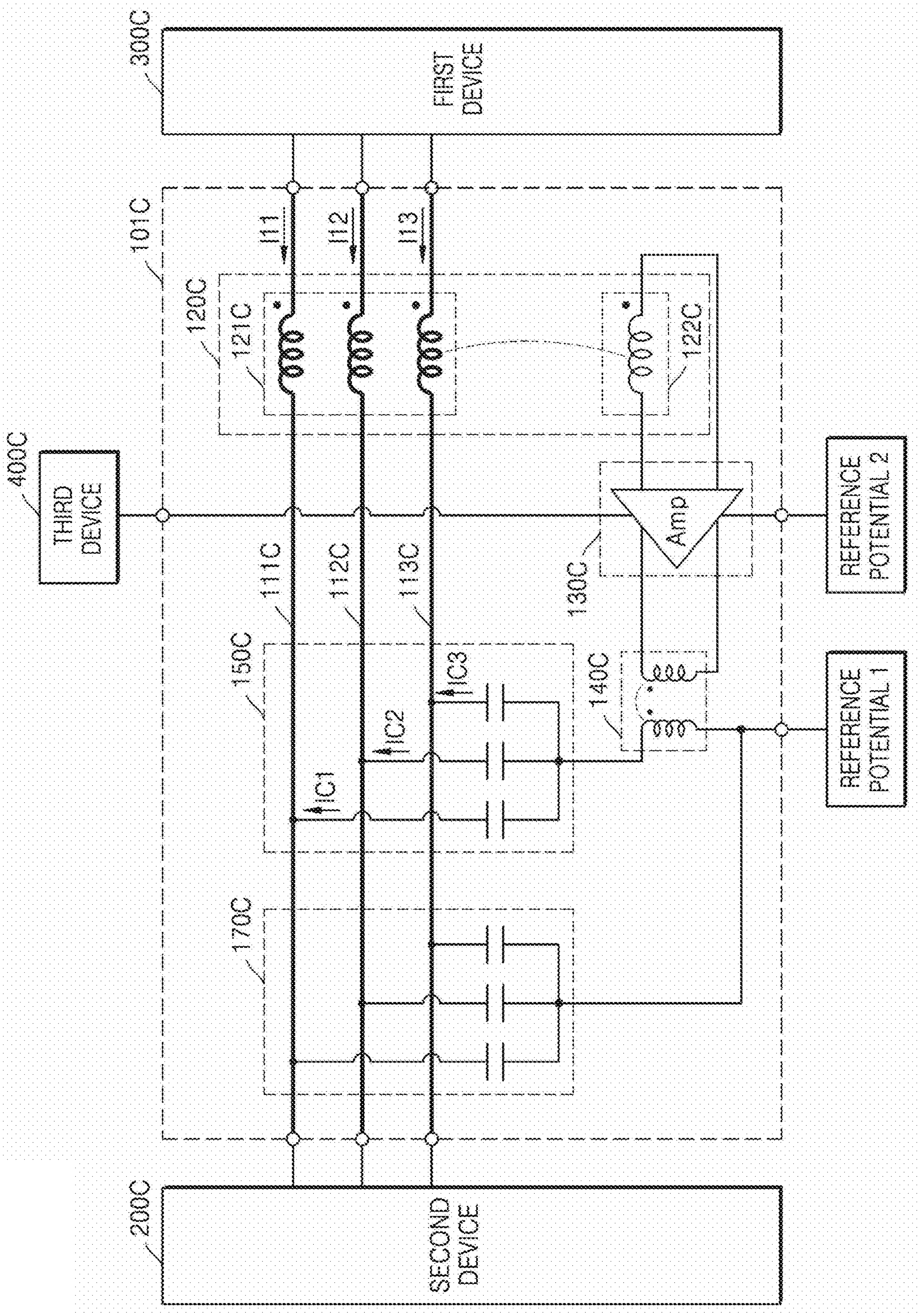
FIG. 16 is a diagram schematically showing a configuration of a compensating device according to another embodiment of the present disclosure.

FIG. 16 is a diagram schematically showing a configuration of a compensating device 101C according to another embodiment of the present disclosure. Hereinafter, descriptions identical to those given above with reference to drawings will be omitted.

The compensating device 101C shown in FIG. 16 may further include a decoupling capacitor unit 170C at an output side (i.e., the side of the second device 200C) of the compensating device 100B shown in FIG. 11.

The decoupling capacitor unit 170C may include three capacitors. One end of each of the three capacitors may be connected to the first high current path 111C, the second high current path 112C, and the third high current path 113C, respectively. Opposite ends of the three capacitors may be connected to the reference potential (reference potential 1) of the current compensating device 100C.

An impedance $Z_Y$ of the decoupling capacitor unit 170C may be designed to have a value smaller than a specified value in the first frequency band that is a target of noise reduction. In combination with the decoupling capacitor unit 170C, the compensating device 101C may be used as an independent module in any system (e.g., a three-phase three-line system).

Although not shown, even in a three-phase four-line system as shown in FIG. 12, a decoupling capacitor including four capacitors may be combined with a compensating device. For example, in a three-phase four-line system, a decoupling capacitor including four capacitors may be disposed between a compensating capacitor unit and a second device. However, the present disclosure is not limited thereto.

Figure 17:
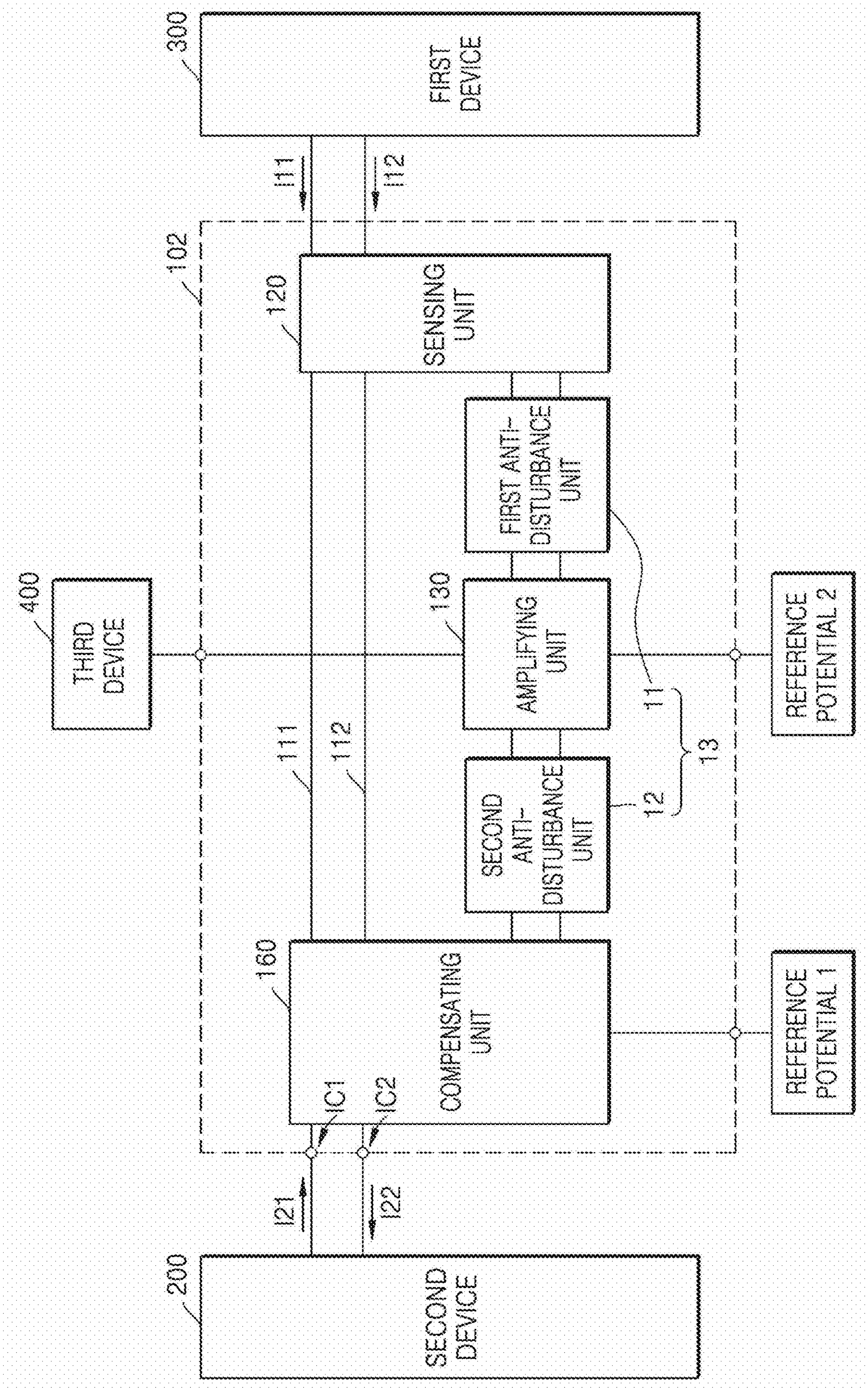
FIG. 17 is a schematic view of the configuration of a system including a compensating device according to an embodiment of the present disclosure.

FIG. 17 is a schematic view of the configuration of a system including a compensating device 102 according to an embodiment of the present disclosure. The compensating device 102 may be the compensating device 100 shown in FIG. 1 to which only an anti-disturbance unit 13 is added. All of the compensating devices according to the above-described embodiments may be applied to the compensating device 102. Therefore, descriptions below will focus on differences due to the anti-disturbance unit 13.

Referring to FIG. 17, the compensating device 102 may include the anti-disturbance unit 13 in addition to the sensing unit 120, the amplifying unit 130, and the compensating unit 160 as described above.

The anti-disturbance unit 13 may protect the amplifying unit 130 from disturbance. For example, active elements included in the amplifying unit 130 may be protected by the anti-disturbance unit 13.

The compensating device 102 may be mounted on an electric device, and in general, a situation in which the electric device operates may not be stable. In other words, a disturbance signal, such as an overvoltage or an overcurrent, may enter the compensating device 102 from the outside through the high current paths 111 and 112. For example, a pulse voltage of several kV may be generated in at least one of the high current paths 111 and 112 due to lightning or lightning surge. An overvoltage and/or an overcurrent as described above may be transmitted to the amplifying unit 130 through the sensing unit 120 or the compensating unit 160. The amplifying unit 130 may include various types of active elements, thus being vulnerable to external disturbances. Therefore, malfunctions or failures may occur due to an overvoltage and/or an overcurrent.

In various embodiments of the present disclosure, the compensating device 102 may have a structure in which the amplifying unit 130 is isolated from the high current paths 111 and 112, thereby primarily protecting the amplifying unit 130 from the above-described disturbance.

For more reliable protection against disturbances, the compensating device 102 may include the anti-disturbance unit 13. In an embodiment, when a voltage equal to or higher than a predetermined threshold voltage is applied to at least one of an input terminal of the amplifying unit 130 to which the sensing unit 120 and the amplifying unit 130 are connected and an output terminal of the amplifying unit 130 to which the sensing unit 120 and the compensating unit 160 are connected, the anti-disturbance unit 13 may limit an applied voltage to a voltage lower than or equal to the threshold voltage. For example, the anti-disturbance unit 13 may include a first anti-disturbance unit 11 for blocking an overvoltage transmitted to the amplifying unit 130 through the sensing unit 120 and a second anti-disturbance unit 12 for blocking an overvoltage transmitted to the amplifying unit 130 through the compensating unit 160.

According to an embodiment, the first anti-disturbance unit 11 may be differentially connected to input terminals of the amplifying unit 130. The first anti-disturbance unit 11 may be connected in parallel to an output terminal of the sensing unit 120. The second anti-disturbance unit 12 may be connected in parallel to an input terminal of the compensator 160.

The first anti-disturbance unit 11 and the second anti-disturbance unit 12 may be isolated from the high current paths 111 and 112.

According to an embodiment, the first anti-disturbance unit 11 may have a first impedance when a voltage below the predetermined threshold voltage is applied to the input terminal of the amplifying unit 130 and may have a second impedance lower than the first impedance when a voltage equal to or higher than the predetermined threshold voltage is applied to the input terminal of the amplifying unit 130. The first impedance may be a very large value, e.g., a value close to infinity. Similarly, the second anti-disturbance unit 12 may have a first impedance when a voltage below the predetermined threshold voltage is applied to the output terminal of the amplifying unit 130 and may have a second impedance lower than the first impedance when a voltage equal to or higher than the predetermined threshold voltage is applied to the output terminal of the amplifying unit 130.

According to an embodiment, the anti-disturbance unit 13 does not apply a current through the anti-disturbance unit 13 when a voltage applied to the anti-disturbance unit 13 is below a specified voltage. However, when the voltage applied to the voltage exceeds the specified voltage due to an external overvoltage, the anti-disturbance unit 13 may apply a current in parallel to prevent an overvoltage from being transmitted to the amplifying unit 130, thereby protecting the amplifying unit 130.

Figure 18:
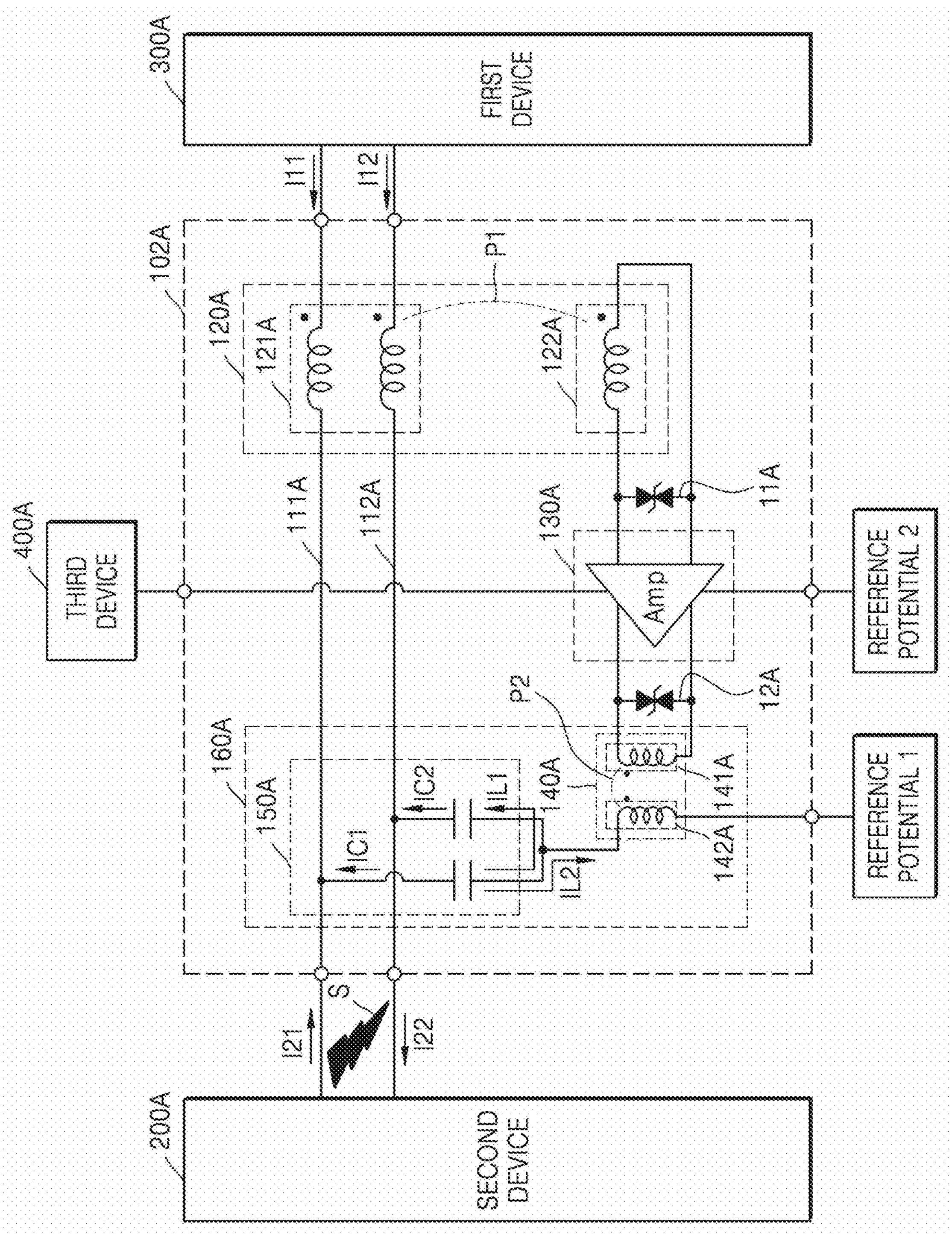
FIG. 18 is a schematic view of a compensating device according to an embodiment of the present disclosure.

FIG. 18 is a schematic view of a compensating device 102A according to an embodiment of the present disclosure. The current compensating device 102A may be a compensating device 100A illustrated in FIG. 2 to which only a first anti-disturbance unit 11A and a second anti-disturbance unit 12A are added as an example of the anti-disturbance unit 13. All of the compensating devices or amplifying units according to the above-described embodiments may be applied to the compensating device 102A. Differences due to the first anti-disturbance unit 11A and the second anti-disturbance unit 12A will be mainly described.

Referring to FIG. 18, the compensating device 102A may include the first anti-disturbance unit 11A and the second anti-disturbance unit 12A in addition to the sensing transformer 120A, the amplifying unit 130A, and the compensating unit 160A (e.g., the compensating transformer 140A and the compensating capacitor unit 150A).

The first anti-disturbance unit 11A and the second anti-disturbance unit 12A may be examples of the first anti-disturbance unit 11 and the second anti-disturbance unit 12 described above.

The first anti-disturbance unit 11A and the second anti-disturbance unit 12A may each include a transient voltage suppression (TVS) diode element. However, the present disclosure is not limited thereto.

For example, an external overvoltage S such as a lightning surge may occur in at least one of the high current paths 111A and 112A. For example, when the external overvoltage S occurs in the second high current path 112A as shown in FIG. 18, the external overvoltage S may be transmitted to the amplifying unit 130A in the form of magnetic energy through a first transmission path P1 or a second transmission path P2. The first transmission path P1 represents a path through the sensing transformer 120A, and the second transmission path P2 represents a path through the compensating transformer 140A. Since active elements of the amplifying unit 130A are vulnerable to external disturbances, a protection device is necessary.

The first anti-disturbance unit 11A may be connected in parallel to the secondary side 122A of the sensing transformer 120A in order to protect the amplifying unit 130A from an overvoltage transmitted through the first transmission path P1. The second anti-disturbance unit 12A may be connected in parallel to the primary side 141A of the compensating transformer 140A in order to protect the amplifying unit 130A from an overvoltage transmitted through the second transmission path P2.

The first anti-disturbance unit 11A and the second anti-disturbance unit 12A may each include, for example, a TVS diode element. In this case, in order to minimize the performance deterioration of the amplifying unit 130A due to TVS diode elements, TVS diode elements having a sufficiently low (e.g., less than a specified value) diode junction capacitance may be used. For example, the junction capacitance of a TVS diode may be several hundred pF or less. Even when TVS diodes of the first anti-disturbance unit 11A and the second anti-disturbance unit 12A have a low junction capacitance, their durability may be guaranteed due to their isolating structure.

The first anti-disturbance unit 11A and the second anti-disturbance unit 12A (e.g., TVS diodes) may have a breakdown voltage. For example, when a voltage applied to the first anti-disturbance unit 11A is below the breakdown voltage, a current may not flow through the first anti-disturbance unit 11A. However, when a voltage equal to or higher than the breakdown voltage is applied to both ends of the first anti-disturbance unit 11A due to the external overvoltage S, the impedance of the first anti-disturbance unit 11A is lowered, and thus a current may flow through the first anti-disturbance unit 11A. The second anti-disturbance unit 12A may operate in the same regard as the first anti-disturbance unit 11A.

When a voltage equal to or higher than a predetermined threshold voltage (e.g., the breakdown voltage) is applied to at least one of an input terminal and an output terminal of the amplifying unit 130A, the first anti-disturbance unit 11A and the second anti-disturbance unit 12A may consume at least some of power by the voltage equal to or higher than the predetermined threshold voltage. At least another some of the remaining power by the voltage equal to or higher than the predetermined threshold voltage may be consumed by the remaining elements (e.g., elements included in the amplifying unit 130A).

According to an embodiment, due to an isolating structure and by being combined with the first anti-disturbance unit 11A and the second anti-disturbance unit 12A, the compensating device 102A may be used as an independent module in any system.

Figure 19:
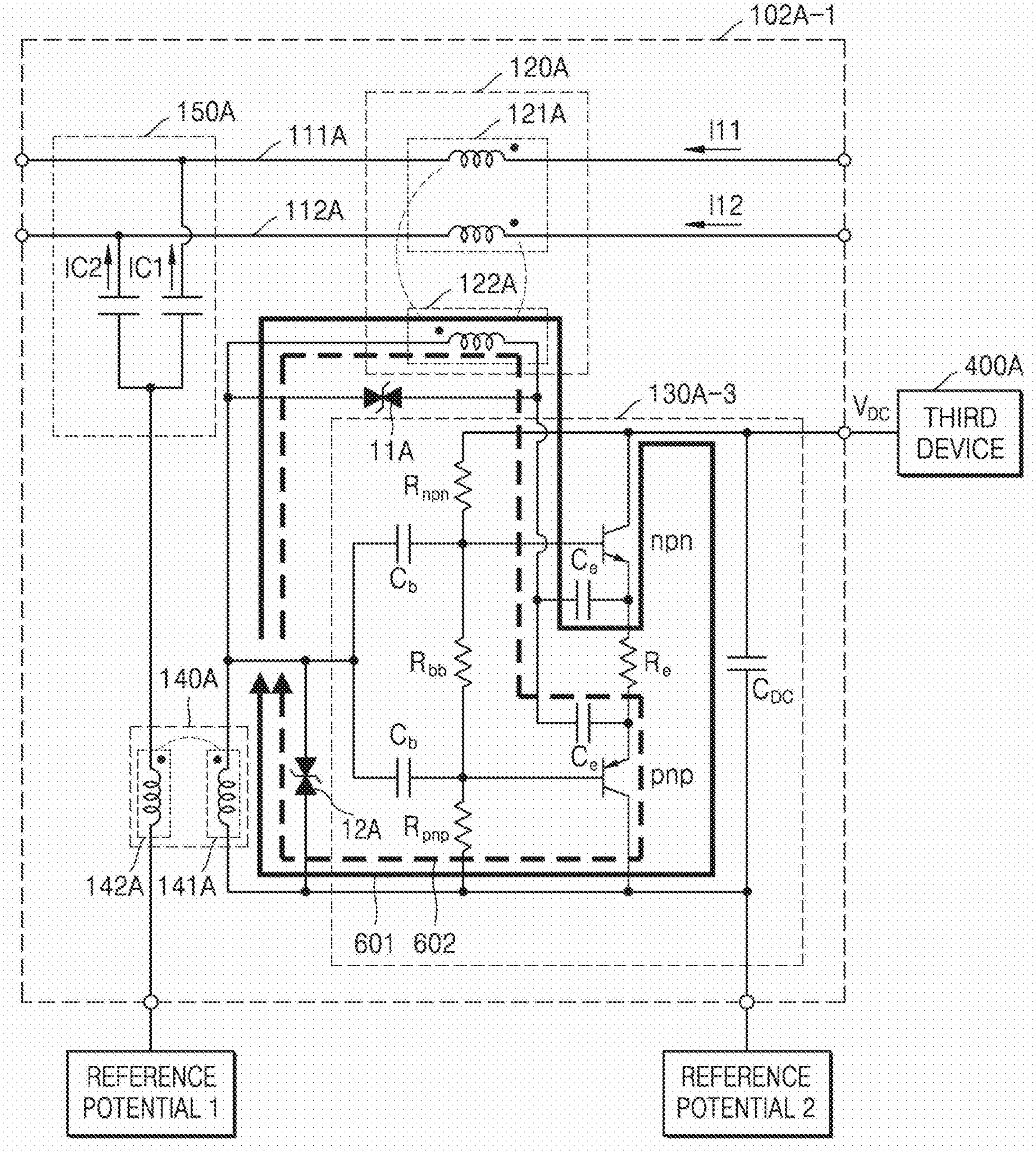
FIG. 19 is a schematic view of a compensating device according to an embodiment of the present disclosure.

FIG. 19 is a schematic view of a compensating device 102A-1 according to an embodiment of the present disclosure. The compensating device 102A-1 is an example of the compensating device 102A shown in FIG. 18, and the amplifying unit 130A-3 is an example of the amplifying unit 130A of the compensating device 102A.

Meanwhile, the current compensating device 102A-1 may be the amplifying unit 130A-3 described above with reference to the compensating device 100A-3 shown in FIG. 9A, to which only the first anti-disturbance unit 11A and the second anti-disturbance unit 12A are added. Therefore, descriptions identical to those of the compensating device 100A-3 of FIG. 9A will be omitted, and descriptions below will focus on differences due to the first anti-disturbance unit 11A and the second anti-disturbance unit 12A.

The amplifying unit 130A-3 may include a first amplifying element amplifying a positive signal and a second amplifying element amplifying a negative signal. For example, the amplifying unit 130A-3 may be implemented as a push-pull amplifier using an amplifying element including an npn BJT and a pnp BJT.

The amplifying unit 130A-3 of the compensating device 102A-1 may have a feedback structure that returns a compensating output current back to an input terminal. The amplifying unit 130A-3 may obtain a current gain stably, instead of having limitations for a current gain.

The compensating device 102A-1 may include the first anti-disturbance unit 11A connected in parallel to the secondary side 122A of the sensing transformer 120A in order to protect the amplifying unit 130A-3 from an overvoltage transmitted through the sensing transformer 120A. Also, in order to protect the amplifying unit 130A-3 from an overvoltage transmitted through the compensating transformer 140A, the second anti-disturbance unit 12A is connected in parallel to the primary side 141A of the compensating transformer 140A.

the first anti-disturbance unit 11A and the second anti-disturbance unit 12A may be implemented as TVS diode elements having a junction capacitance of, for example, a specified value or less (e.g., several hundred pF or less).

The first anti-disturbance unit 11A and the second anti-disturbance unit 12A (e.g., TVS diodes) may have a breakdown voltage, and the breakdown voltage may be designed according to an operating voltage of the amplifying unit 130A-3.

Figure 20:
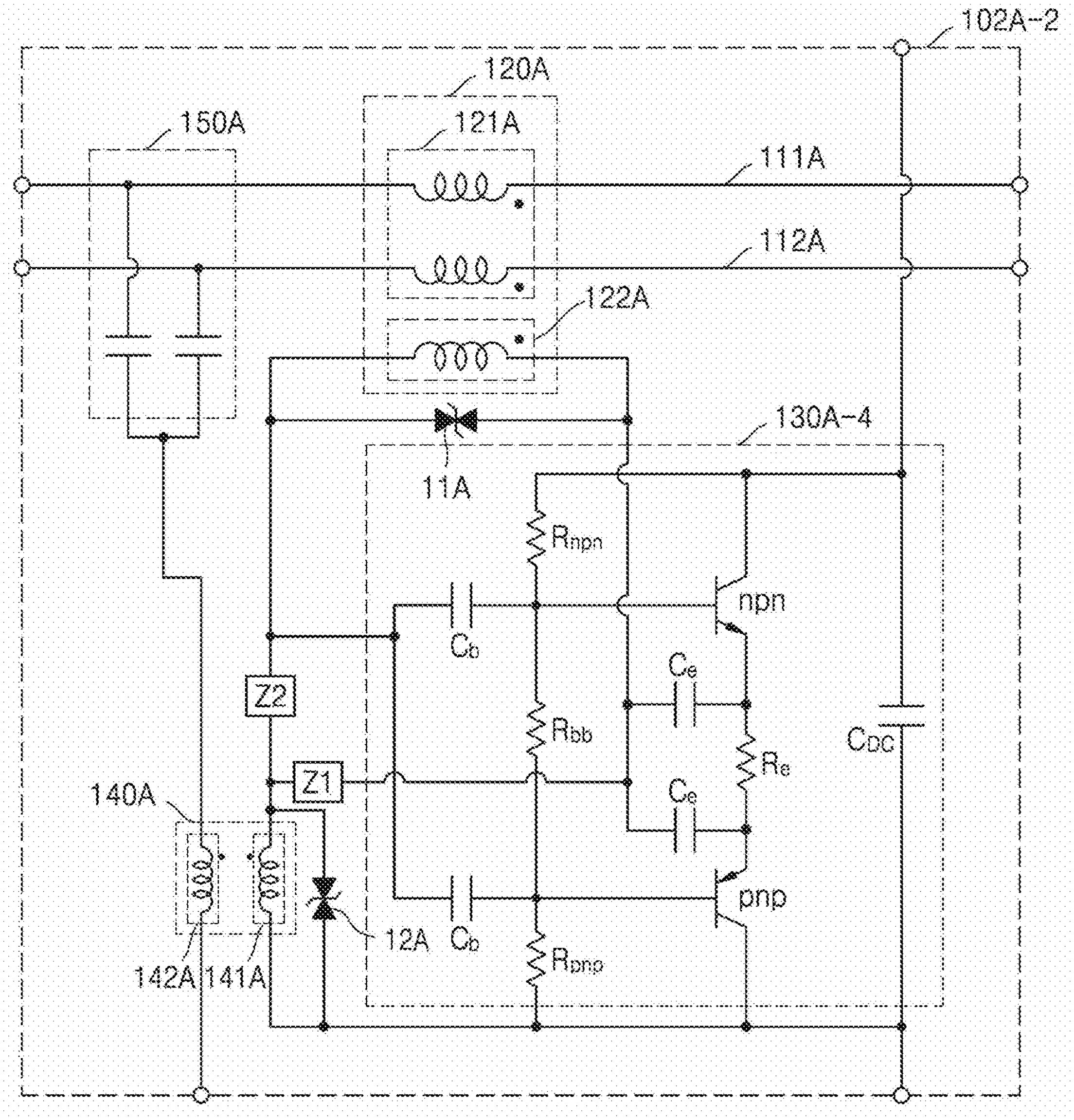
FIG. 20 is a schematic view of a compensating device according to an embodiment of the present disclosure.

FIG. 20 is a schematic view of a compensating device 102A-2 according to an embodiment of the present disclosure. The compensating device 102A-2 is an example of the compensating device 102A shown in FIG. 18, and the amplifying unit 130A-4 is an example of the amplifying unit 130A of the compensating device 102A.

Meanwhile, the current compensating device 102A-2 may be the amplifying unit 130A-4 described above with reference to the compensating device 100A-4 shown in FIG. 10A, to which only the first anti-disturbance unit 11A and the second anti-disturbance unit 12A are added. Therefore, descriptions identical to those of the compensating device 100A-4 of FIG. 10A will be omitted, and descriptions below will focus on differences due to the first anti-disturbance unit 11A and the second anti-disturbance unit 12A.

The amplifying unit 130A-4 according to an embodiment of the present disclosure may further include at least one impedance Z1 or Z2 for adjusting an amplification ratio of the first amplifying element and the second amplifying element in addition to the first amplifying element and the second amplifying element.

Like the compensating device 102A-1, the compensating device 102A-2 may also include a first anti-disturbance unit 131A connected in parallel to the secondary side 122A of the sensing transformer 120A in order to protect the amplifying unit 130A-4. Also, in order to protect the amplifying unit 130A-2 from an overvoltage transmitted through the compensating transformer 140A, a second anti-disturbance unit 132A is connected in parallel to the primary side 141A of the compensating transformer 140A.

Figure 21:
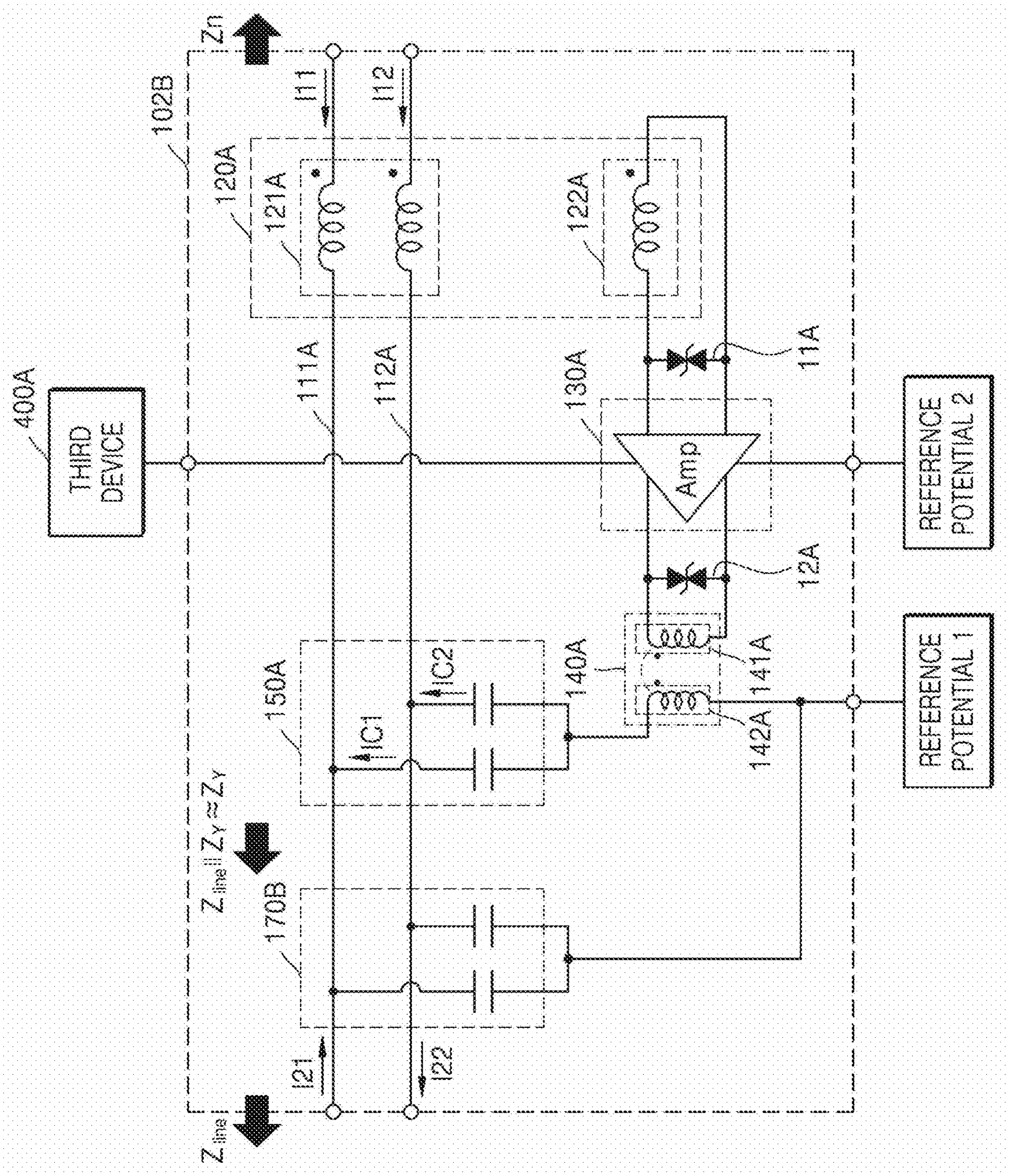
FIG. 21 is a diagram schematically showing a configuration of a compensating device according to an embodiment.

FIG. 21 is a diagram schematically showing a configuration of a compensating device 102B according to an embodiment of the present disclosure.

The compensating device 102B may be an embodiment in which a decoupling capacitor unit 170B is further included in the compensating device 102A shown in FIG. 18.

Alternatively, the compensating device 102B may be an embodiment in which the first anti-disturbance unit 11A and the second anti-disturbance unit 12A are further included in the compensating device 101A shown in FIG. 15.

Alternatively, the compensating device 102B may be an embodiment in which the decoupling capacitor unit 170B and the first anti-disturbance unit 11A and the second anti-disturbance unit 12A are further included in the compensating device 100A shown in FIG. 6. Therefore, descriptions identical to those already given above will be omitted.

In order for the active compensating device 102B to maintain stable performance, the impedance of an output side of the compensating device 102B (i.e., the side of the second device 200A) needs to be sufficiently smaller than the impedance $Z_n$ of the side of the first device 300A (that is, a noise source side).

The decoupling capacitor unit 170B prevents the performance of the compensating device 102B for outputting a compensation current from being significantly changed according to a change in an impedance value of the second device 200A, thereby allowing the compensating device 101 to perform the role as a compensating device in various systems.

According to an embodiment, by being combined with the first anti-disturbance unit 11A and the second anti-disturbance unit 12A and the decoupling capacitor unit 170B, the compensating device 102B may be used as an independent module in any system.

Figure 22:
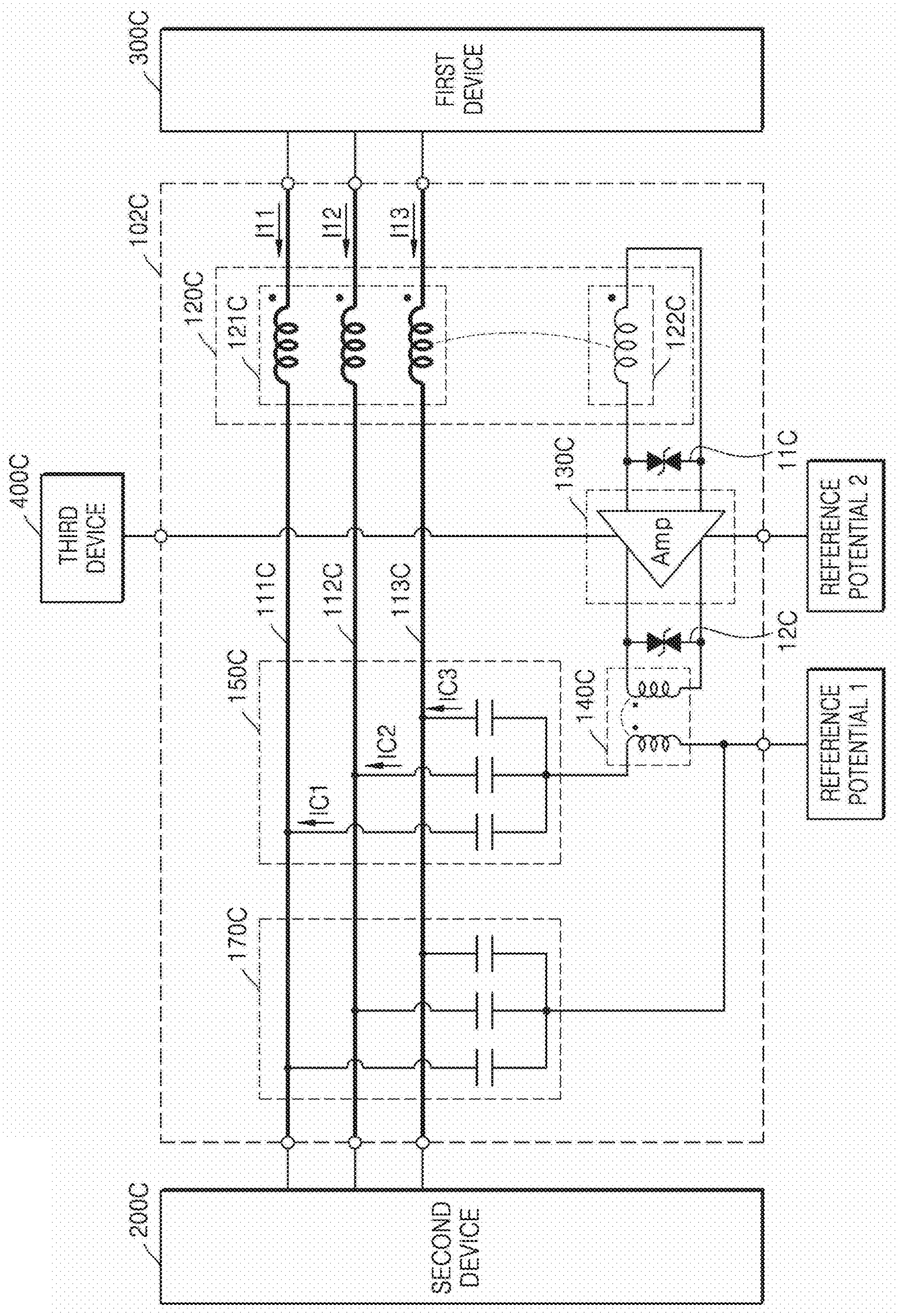
FIG. 22 is a diagram schematically showing a configuration of a compensating device according to another embodiment of the present disclosure.

FIG. 22 is a diagram schematically showing a configuration of a compensating device 102C according to another embodiment of the present disclosure.

The compensating device 102C may be an embodiment in which a first anti-disturbance unit 11C and a second anti-disturbance unit 12C are further included in the compensating device 101C shown in FIG. 16.

Alternatively, the compensating device 102C may be an embodiment in which the decoupling capacitor unit 170C and the first anti-disturbance unit 11C and the second anti-disturbance unit 12C are further included in the compensating device 100B shown in FIG. 11. Therefore, descriptions identical to those already given above will be omitted.

Referring to FIG. 22, the compensating device 102C may compensate for (or offset) the first currents $I_{11}$, $I_{12}$, and $I_{13}$ generated as a common-mode current on high current paths of a three-phase three-line power system.

The compensating device 102C may include three high current paths 111C, 112C, and 113C, the sensing transformer 120C, the amplifying unit 130C, the compensating transformer 140C, the compensating capacitor unit 150C, a first anti-disturbance unit 11C, a second anti-disturbance unit 12C, and the decoupling capacitor unit 170C.

According to an embodiment, the first high current path 111C may be an R-phase power line, the second high current path 112C may be an S-phase power line, and the third high current path 113C may be a T-phase power line.

A primary side 121C of the sensing transformer 120C may be disposed on the first high current path 111C, the second high current path 112C, and the third high current path 113C and generate an induced current at the secondary side 122C.

The compensating capacitor unit 150C may provide paths through which the compensation currents $IC_1$, $IC_2$, and $IC_3$ generated by the compensating transformer flow to the first high current path 111C, the second high current path 112C, and the third high current path 113C, respectively.

The decoupling capacitor unit 170C including three Y-caps may be disposed in the compensating device 102C. One end of each of the three Y-caps may be connected to the first high current path 111C, the second high current path 112C, and the third high current path 113C, respectively. Opposite ends of the three Y-caps may be connected to the reference potential (reference potential 1) of the compensating device 102C.

The first anti-disturbance unit 11C may be in parallel to the secondary side 122C of the sensing transformer 120A. The second anti-disturbance unit 12C may be connected in parallel to a primary side 141C of the compensating transformer 140C.

Meanwhile, although not shown, the compensating device 102C including the decoupling capacitor unit 170C and the first anti-disturbance unit 11C and the second anti-disturbance unit 12C may also be modified to be suitable for a three-phase four-line power system (refer to FIG. 12). The description of a compensating device for the three-phase four-line power system may correspond to the descriptions given above with reference to FIG. 12.

FIG. 23 is a diagram schematically showing a configuration of a compensating device 102D according to another embodiment of the present disclosure. At least some of the compensating device according to the above-described various embodiments may be applied to the compensating device 102D. Also, descriptions identical to those given above with reference to FIGS. 17 to 22 will be omitted.

Referring to FIG. 23, the compensating device 102D may refer to a feedback type CSCC compensating device 102D that detects a common-mode noise current outgoing from the side of the second device 200A (e.g., the power source side) and compensates for the common-mode noise current with a current at the side of the first device 300A (e.g., the noise source side). In other words, in the compensating device 102D, a sensing transformer 120D may be disposed on the side of the second device 200A, and the compensating capacitor unit 150D may be disposed on the side of the first device 300A.

Figure 24:
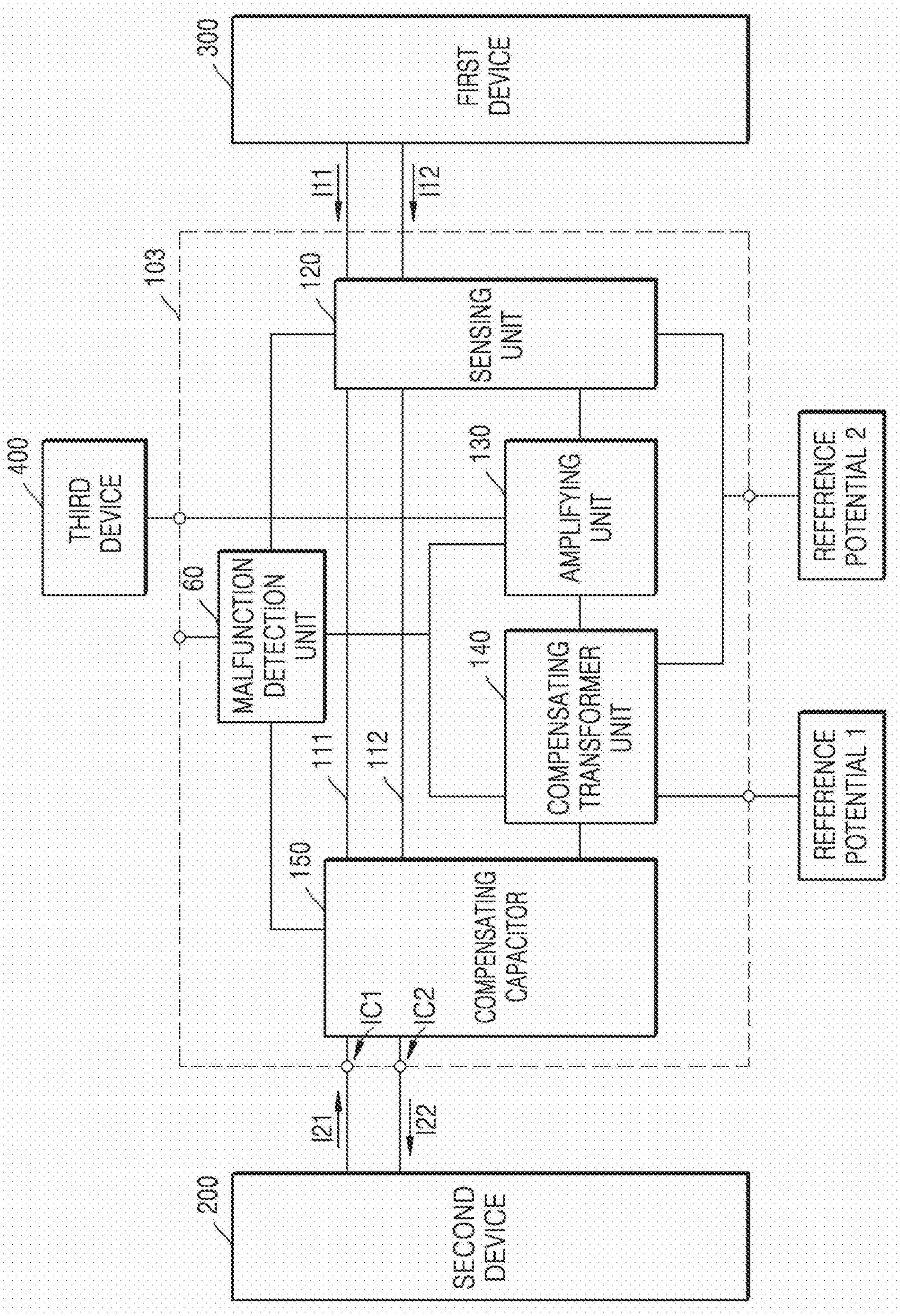
FIG. 24 is a schematic view of the configuration of a system including a compensating device according to an embodiment of the present disclosure.

FIG. 24 is a schematic view of the configuration of a system including a compensating device 103 according to an embodiment of the present disclosure.

The compensating device 103 according to an embodiment of the present disclosure may be an embodiment in which only a malfunction detection unit 60 and a connection circuit connecting the malfunction detection unit 60 to other components are added to the compensating device 100 shown in FIG. 2. Therefore, descriptions identical to those of the compensating devices according to the above-described embodiments will be omitted, and descriptions below will focus on a difference therefrom, that is, the malfunction detection unit 60.

According to an embodiment, the two or more high current paths 111 and 112 may be electrically connected to the malfunction detection unit 60. In this case, the malfunction detection unit 60 may check the state of the two or more high current paths 111 and 112 and generate a signal corresponding thereto. For example, the malfunction detection unit 60 may check voltages of the two or more high current paths 111 and 112 and/or a line voltage between the two or more high current paths 111 and 112 and, based on the same, may generate a signal indicating whether the high current paths 111 and 112 are normal.

According to an embodiment, the sensing unit 120 may be electrically connected to the malfunction detection unit 60. The malfunction detection unit 60 may check an operation state of the sensing unit 120 and generate a signal corresponding thereto. For example, in an example in which the sensing unit 120 is implemented as a sensing transformer, the malfunction detection unit 60 may check whether a primary side and a secondary side of the sensing transformer are isolated, and, based on a result thereof, generate a signal indicating whether the sensing unit 120 is normal.

According to an embodiment, the amplifying unit 130 may be electrically connected to the malfunction detection unit 60. The malfunction detection unit 60 may check an operation state of the amplifying unit 130 and generate a signal corresponding thereto. A method by which the malfunction detection unit 60 checks whether the amplifying unit 130 is normal will be described later.

The compensating transformer unit 140 may be electrically connected to the amplifying unit 130 and may generate a compensation current based on an output signal amplified by the above-described amplifying unit 130.

According to an embodiment, the compensating transformer unit 140 may be electrically connected to the malfunction detection unit 60 to be described later. The malfunction detection unit 60 may check an operation state of the compensating transformer unit 140 and generate a signal corresponding thereto. For example, in an example in which the compensating transformer unit 140 is implemented as a compensating transformer, the malfunction detection unit 60 may check whether a primary side and a secondary side of the compensating transformer are isolated, and, based on a result thereof, generate a signal indicating whether the compensating transformer unit 140 is normal.

The compensating capacitor unit 150 may provide paths through which compensation currents generated by the compensating transformer unit 140 flow to two or more high current paths, respectively.

According to an embodiment, the compensating capacitor unit 150 may be electrically connected to the malfunction detection unit 60. The malfunction detection unit 60 may check an operation state of the compensating capacitor unit 150 and generate a signal corresponding thereto. For example, the malfunction detection unit 60 may check the magnitudes of currents respectively flowing through the two or more high current paths 111 and 112 through the compensating capacitor unit 150, and, based on the same, generate a signal indicating whether the compensating capacitor unit 150 is normal.

The malfunction detection unit 60 may check an operation state of at least one of the two or more high current paths 111 and 112, the sensing unit 120, the amplifying unit 130, the compensating transformer unit 140, and the compensating capacitor unit 150 (hereinafter referred to as a check target) and generate a signal corresponding to a checked operation state.

In an embodiment, the malfunction detection unit 60 may include a malfunction detection signal output unit for outputting a signal corresponding to an operation state of a check target and a malfunction detection signal indicating unit for indicating a signal corresponding to an operation state.

In an embodiment, the malfunction detection signal output unit may output a signal corresponding to an operation state of a check target in the form of a voltage based on whether the voltage of at least one node in the check target is within a predetermined reference voltage range. A signal (i.e., a voltage) output by the malfunction detection signal output unit may be output to an external device or may be output to the malfunction detection signal indicating unit. In this case, the external device may refer to various devices including the first device 300 and the second device 200 described above.

In an embodiment, the malfunction detection signal indicating unit may include a light-emitting element that is turned on based on a signal generated by the above-described malfunction detection signal output unit. In this case, the light-emitting element may include, for example, a light-emitting diode.

In another embodiment, the malfunction detection signal indicating unit may include a light-emitting element group including at least two or more light-emitting elements. In this case, the malfunction detection signal indicating unit may control on/off of at least one light-emitting element of the light-emitting element group based on a signal generated by the malfunction detection signal output unit. For example, the malfunction detection signal indicating unit may increase the number of light-emitting elements that are turned on in proportion to the magnitude of a voltage generated by the malfunction detection signal output unit.

As described above, the malfunction detection unit 60 may check an operation state of a check target based on the voltage of at least one node inside the check target, and may also check the operation state of the check target based on at least one path current in the check target. Of course, the malfunction detection unit 60 may check an operation state of a check target based on a temperature of the check target, the amount of change in the temperature, and the magnitude of a magnetic field and/or an electric field. However, it is merely an example, and the present disclosure is not limited thereto.

In the example including the amplifying unit 130 consisting of the first amplifying element and the second amplifying element that are arranged to be complementary to each other, the malfunction detection unit 60 may check the operation state of the amplifying unit 130 and generate a signal corresponding thereto. In this case, the malfunction detection unit 60 may generate a signal corresponding to the operation state of the amplifying unit 130 based on the voltage of a central node disposed on a path electrically connecting the first amplifying element and the second amplifying element.

When the voltage of the central node has a value in a predetermined relationship with the operating voltage of the amplifying unit 130 (e.g., a value corresponding to the half of the operating voltage), the malfunction detection unit 60 may output or indicate a signal indicating that the operation state of the amplifying unit 130 is normal.

Figure 26A:
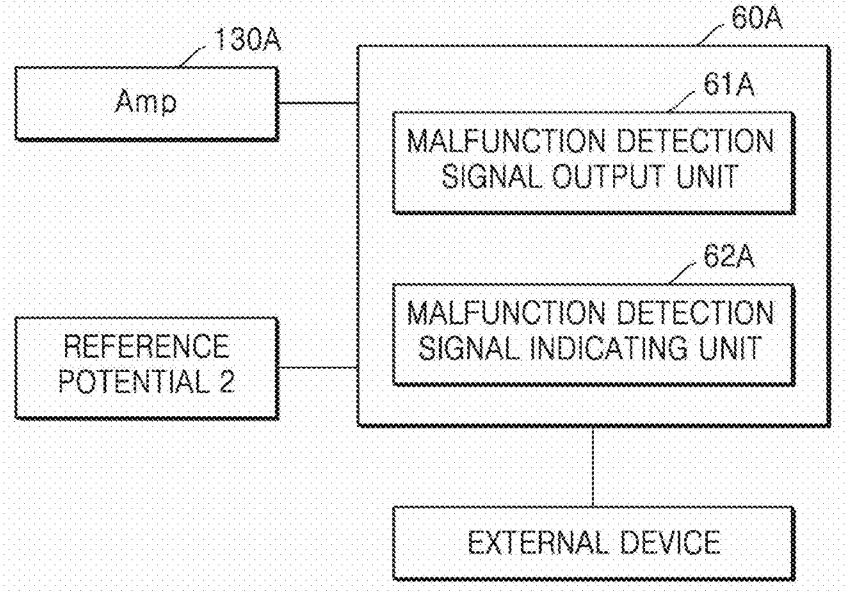
FIGS. 26A to 26C are diagrams for describing the malfunction detection unit according to an embodiment.
Figure 26B:
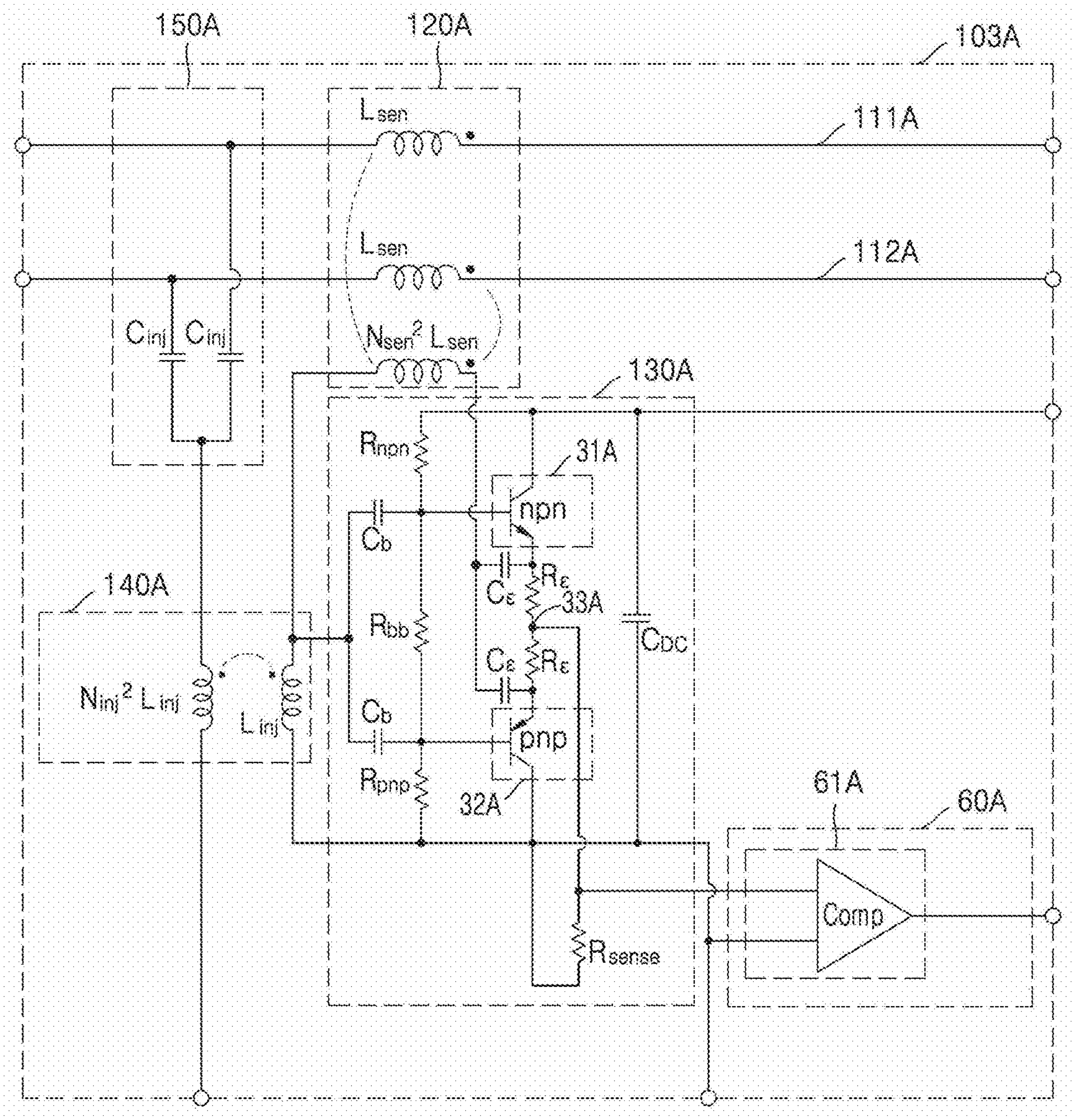
Figure 26C:
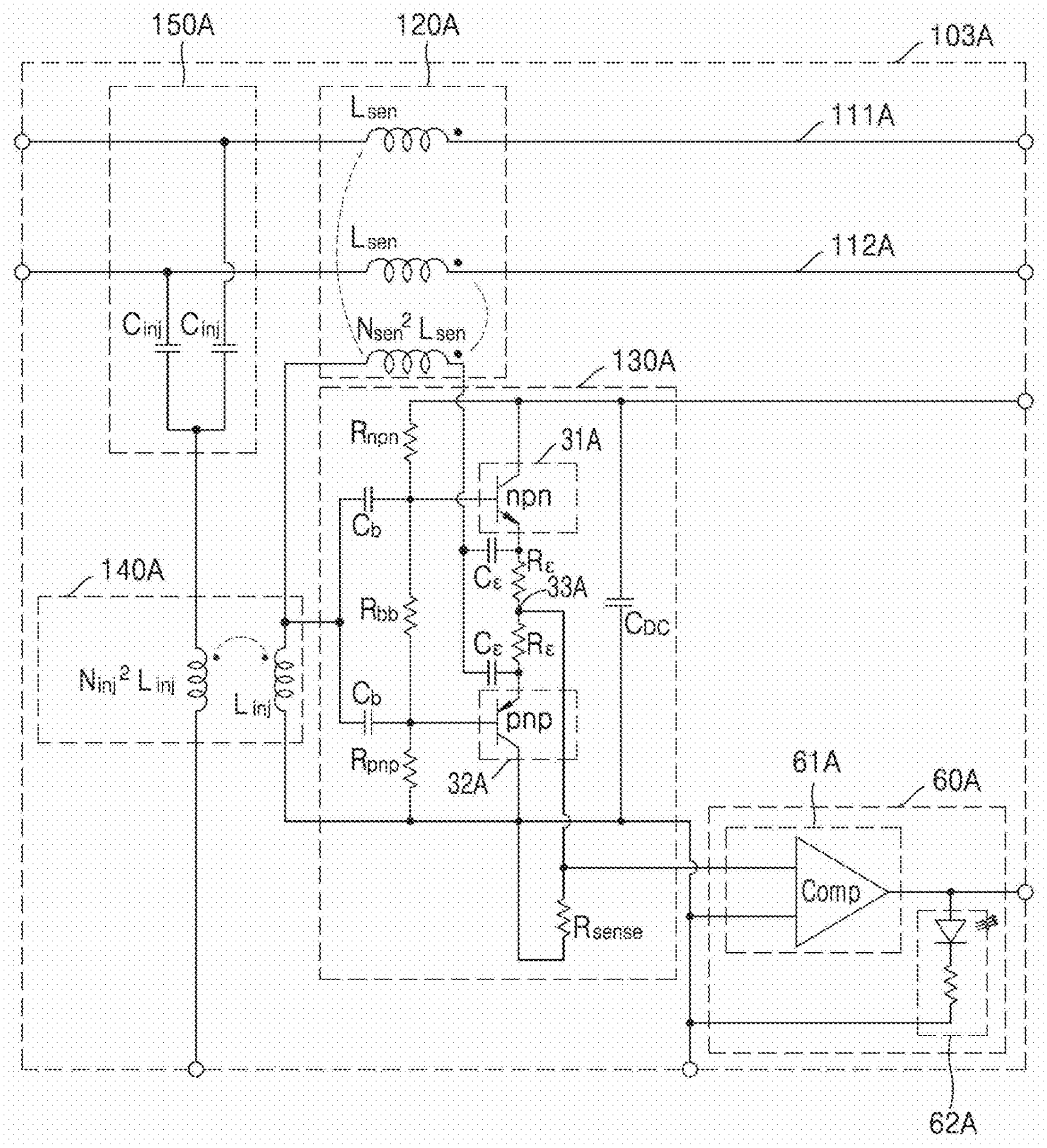

Meanwhile, in the descriptions above, amplifying elements are 'arranged to complement each other' may mean that, as shown in FIGS. 26B and 26C, any one amplifying element is disposed to amplify a positive signal and the other amplifying element is disposed to amplify a negative signal.

The compensating device 103 configured as described above may sense and actively compensate for a current under a specific condition on the two or more high current paths 111 and 112 and may be applied to high current, high voltage, and/or high-power systems, despite the miniaturization of the active compensating device 103.

Meanwhile, the compensating device 103 configured as described above may be implemented in the form of a module including a substrate encapsulated in one encapsulation structure. Also, terminals connected to the components of the compensating device 103, the first device 300, the second device 200, the third device 400, the reference potential 1, the reference potential 2, and other external devices are in the form of pins and may be arranged to protrude in a direction perpendicular to one surface of a substrate.

For example, a terminal for outputting a signal corresponding to an operation state generated by the malfunction detection unit 60 may be provided in the form of a pin to protrude from the above-described module. Therefore, a user may easily check whether a specific component of the compensating device 103 is abnormal by checking the voltage of a corresponding pin without disassembling the module.

Hereinafter, the compensating device 103 according to various embodiments will be described with reference to FIGS. 25 to 27 together with FIG. 24.

Figure 25:
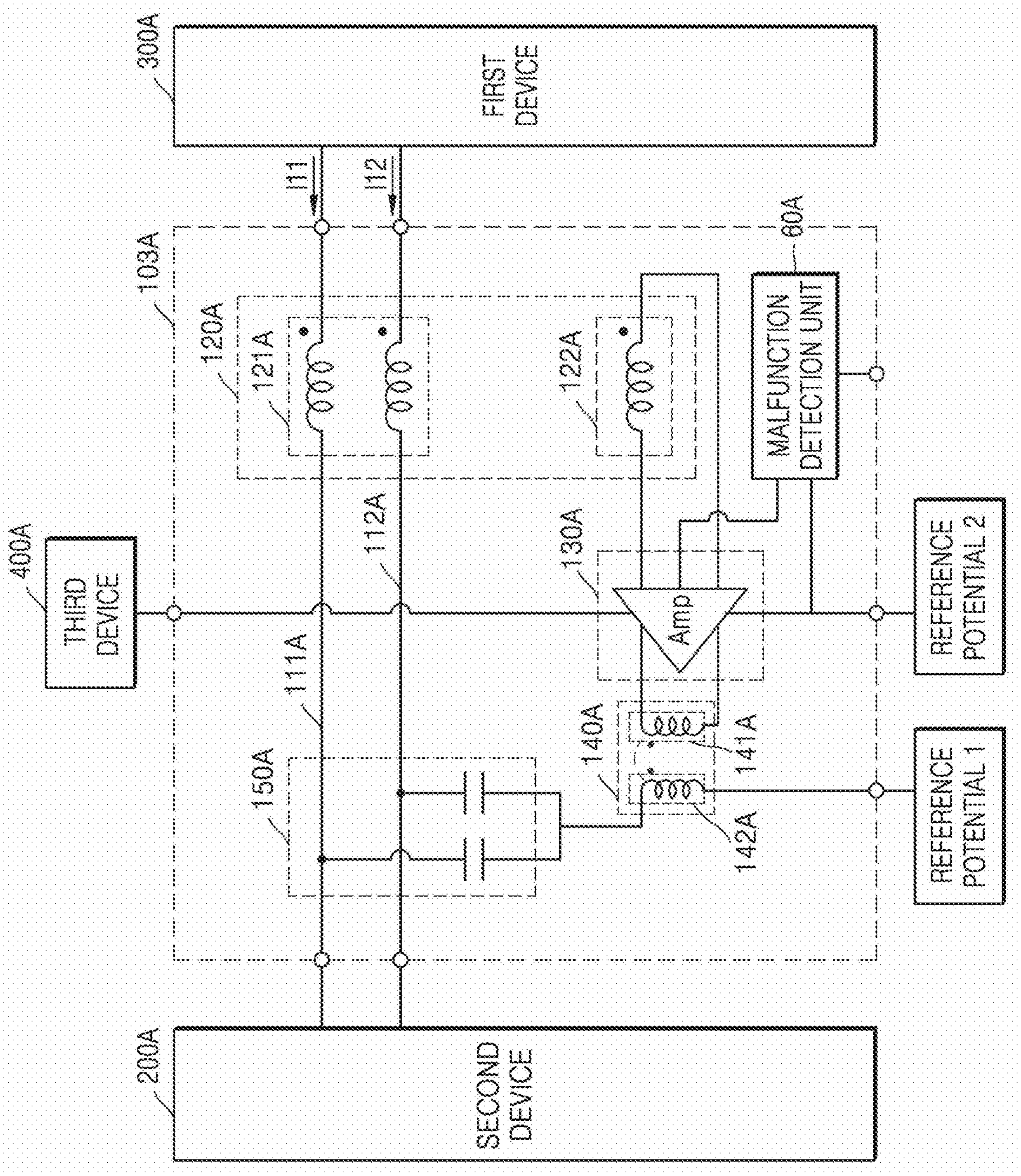
FIG. 25 is a diagram schematically showing the configuration of a compensating device used in a two-line system, according to an embodiment of the present disclosure.

FIG. 25 is a diagram schematically showing the configuration of a compensating device 103A used in a two-line system, according to an embodiment of the present disclosure.

The compensating device 103A may be an example of the compensating device 103 of FIG. 24, and may be the compensating device 100A of FIG. 3 to which only a malfunction detection unit 60A is added. Therefore, descriptions of the compensating device 103A may correspond to the descriptions given above with reference to FIGS. 24 and 3.

FIGS. 26A to 26C are diagrams for describing the malfunction detection unit 60A according to an example embodiment. Hereinafter, descriptions will be given with reference to FIGS. 26A to 26C together.

In an embodiment, the malfunction detection unit 60A may check an operation state of the amplifying unit 130A and generate a signal corresponding to a checked operation state. To this end, the malfunction detection unit 60A may include a malfunction detection signal output unit 61A and a malfunction detection signal indicating unit 62A, as shown in FIG. 26C. The malfunction detection signal output unit 61A may output a signal corresponding to an operation state of the check target, and the malfunction detection signal indicating unit 62A may indicate a signal corresponding to the operation state.

In another embodiment, the malfunction detection unit 60A may include only the malfunction detection signal output unit 61A as shown in FIG. 26B.

The malfunction detection signal output unit 61A may output a signal corresponding to an operation state of the amplifying unit 130A in the form of a voltage based on whether the voltage of at least one node in the amplifying unit 130A is within a predetermined reference voltage range.

For example, as shown in FIG. 26B, when the amplifying unit 130A includes a first amplifying element 31A and a second amplifying element 32A that are arranged to complement each other, the malfunction detection signal output unit 61A may generate a signal corresponding to an operation state of the amplifying unit 130A based on the voltage of a central node 33A disposed on a path electrically connecting the first amplifying element 31A and the second amplifying element 32A.

For example, when the voltage of the central node 33A has a value within a certain range (e.g., from 4 [V] to 8 [V]) around a value corresponding to half (e.g., 6 [V]) of the operating voltage (e.g., 12 [V]) of the amplifying unit 130A (i.e., half of the operating voltage of the amplifying unit 130A), the malfunction detection signal output unit 61A may output a signal indicating that the operation state of the amplifying unit 130A is normal. In this case, the operating voltage of the amplifying unit 130A and the range around half of the operating voltage of the amplifying unit 130A may be appropriately determined according to the design of the compensating device 103A.

A signal generated by the malfunction detection signal output unit 61A may be output to an external device and/or the malfunction detection signal indicating unit 62A to be described later.

The malfunction detection signal indicating unit 62A may indicate a signal generated by the malfunction detection signal output unit 61A in a user-recognizable form. The malfunction detection signal indicating unit 62A may be implemented with various indicating means.

For example, as shown in FIG. 26C, the malfunction detection signal indicating unit 62A may include a light-emitting element for indicating the state of the amplifying unit 130A as normal or abnormal. In this case, the light-emitting element may include, for example, a light-emitting diode, and may indicate normality by being turned on and indicate abnormality by being turned off.

In another embodiment, the malfunction detection signal indicating unit 62A may include a light-emitting element group including at least two or more light-emitting elements to more specifically indicate the voltage of the central node 33A of the amplifying unit 130A. The malfunction detection signal indicating unit 62A may control on and off of at least one light-emitting element of the light-emitting element group based on a signal generated by the malfunction detection signal output unit 61A. For example, the malfunction detection signal indicating unit 62A may increase the number of light-emitting elements that are turned on in proportion to the magnitude of the voltage of the central node 33A.

The light-emitting elements as described above are not necessarily located in the compensating device 103A and may be electrically connected to the malfunction detection signal output unit 61A and located at an outside location suitable for a user to recognize. The same may be equally applied to other embodiments of the present specification.

Figure 27:
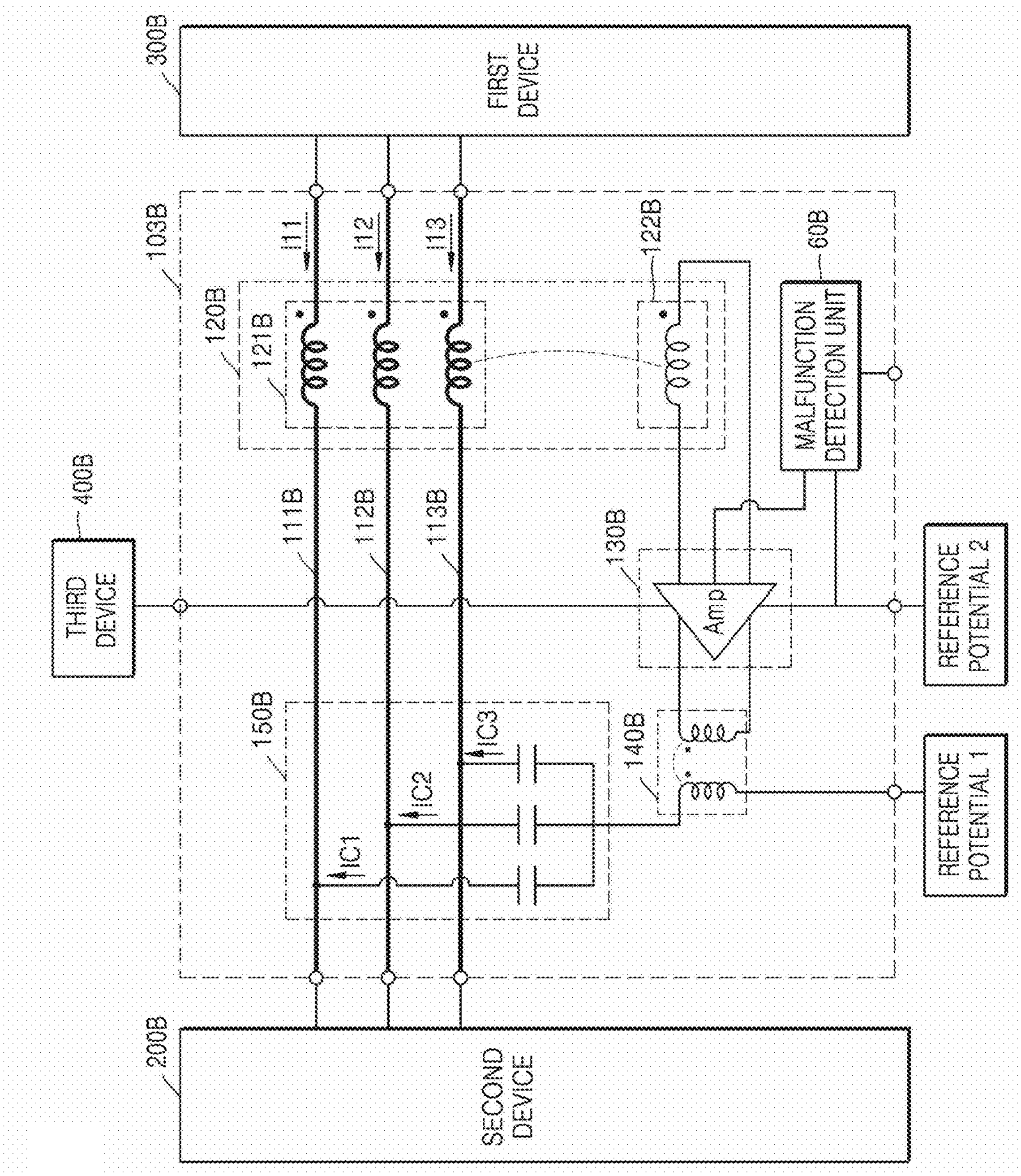
FIG. 27 is a diagram schematically showing the configuration of a compensating device according to another embodiment of the present disclosure.

FIG. 27 is a diagram schematically showing the configuration of a compensating device 103B according to another embodiment of the present disclosure.

The compensating device 103B may be an embodiment in which a malfunction detection unit 60B is further included in the compensating device 100B shown in FIG. 11. Descriptions of the malfunction detection unit 60B may correspond to the descriptions given above with reference to FIGS. 24 to 26. Therefore, descriptions identical to those already given above will be omitted.

The compensating device 103B according to an embodiment may compensate for (or offset) the first currents $I_{11}$, $I_{12}$, and $I_{13}$ generated as a common-mode current on high current paths of a three-phase three-line power system.

The compensating device 103B may include the three high current paths 111B, 112B, and 113B, the sensing transformer 120B, the amplifying unit 130B, the compensating transformer 140B, the compensating capacitor unit 150B, and the malfunction detection unit 60B.

According to an embodiment, the first high current path 111B may be an R-phase power line, the second high current path 112B may be an S-phase power line, and the third high current path 113B may be a T-phase power line.

The primary side 121B of the sensing transformer 120B may be disposed on each of the first high current path 111B, the second high current path 112B, and the third high current path 113B and generate an induced current at the secondary side 122B.

The compensating capacitor unit 150B may provide paths through which the compensation currents $IC_1$, $IC_2$, and $IC_3$ generated by the compensating transformer flow to the first high current path 111B, the second high current path 112B, and the third high current path 113B, respectively.

Meanwhile, although not shown, at least some of the above-described decoupling capacitor unit 170, the first anti-disturbance unit 11A, and the second anti-disturbance unit 12A may be further provided in the compensating device 103B.

Meanwhile, although not shown, the compensating device 103B including the malfunction detection unit 60B may be modified to be suitable for a three-phase four-line power system (refer to FIG. 12). The description of a compensating device for the three-phase four-line power system may correspond to the descriptions given above with reference to FIG. 12.

Figure 28:
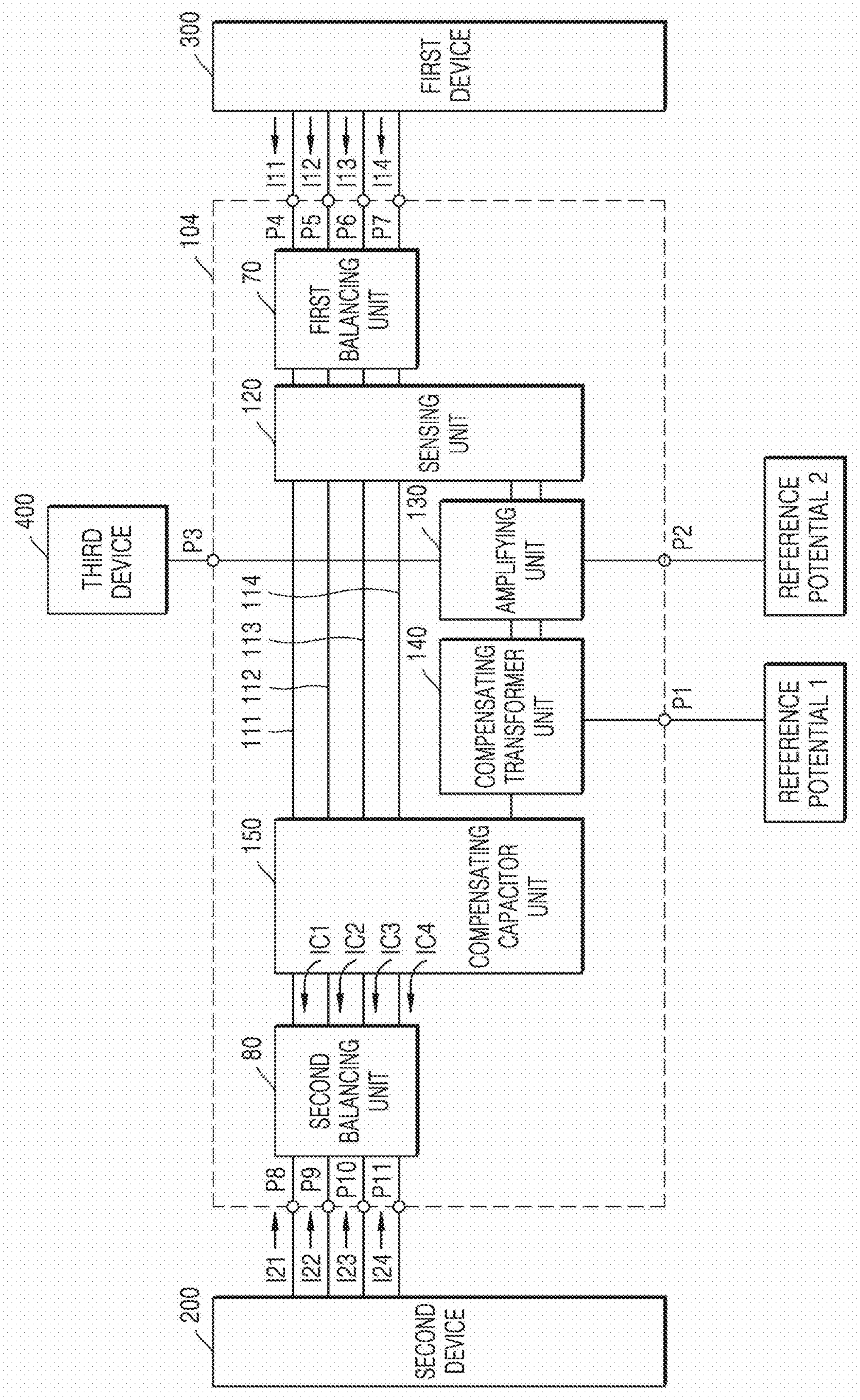
FIG. 28 is a schematic view of the configuration of a system including a compensating device according to an embodiment of the present disclosure.

FIG. 28 is a schematic view of the configuration of a system including a compensating device 104 according to an embodiment of the present disclosure.

The compensating device 104 may be an embodiment in which a first balancing unit 70 and a second balancing unit 80 are added to the three-phase four-line system of the compensating device 100 of FIG. 2.

Also, the compensating device 104 may be, for example, an embodiment in which the first balancing unit 70 and the second balancing unit 80 are added to the three-phase four-line system shown in FIG. 12. Therefore, descriptions identical to those already given above will be omitted. Meanwhile, balancing may represent noise balancing.

On the other hand, the compensating device 104 according to an embodiment of the present disclosure is not applicable only to a three-phase four-line system, but may be modified to be suitable for a three-phase three-line system or a single-phase two-line system.

The compensating device 104 according to an embodiment may include two or more high current paths 111, 112, 113, and 114, the sensing unit 120, the amplifying unit 130, the compensating transformer unit 140, the compensating capacitor unit 150, the first balancing unit 70, and the second balancing unit 80.

Figure 32:
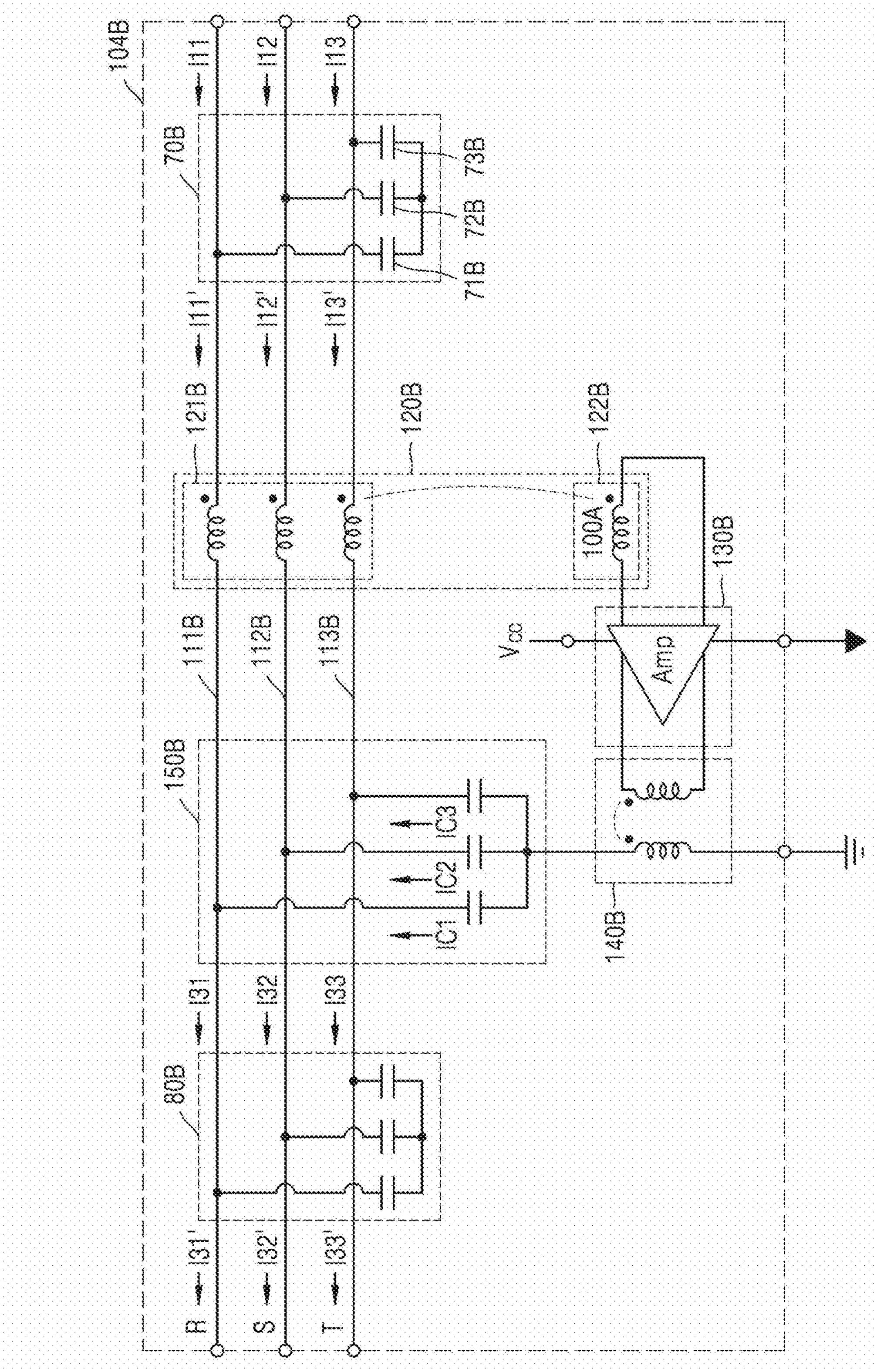
FIG. 32 is a diagram schematically showing the configuration of a compensating device used in a three-phase three-line system according to another embodiment of the present disclosure.
Figure 33:
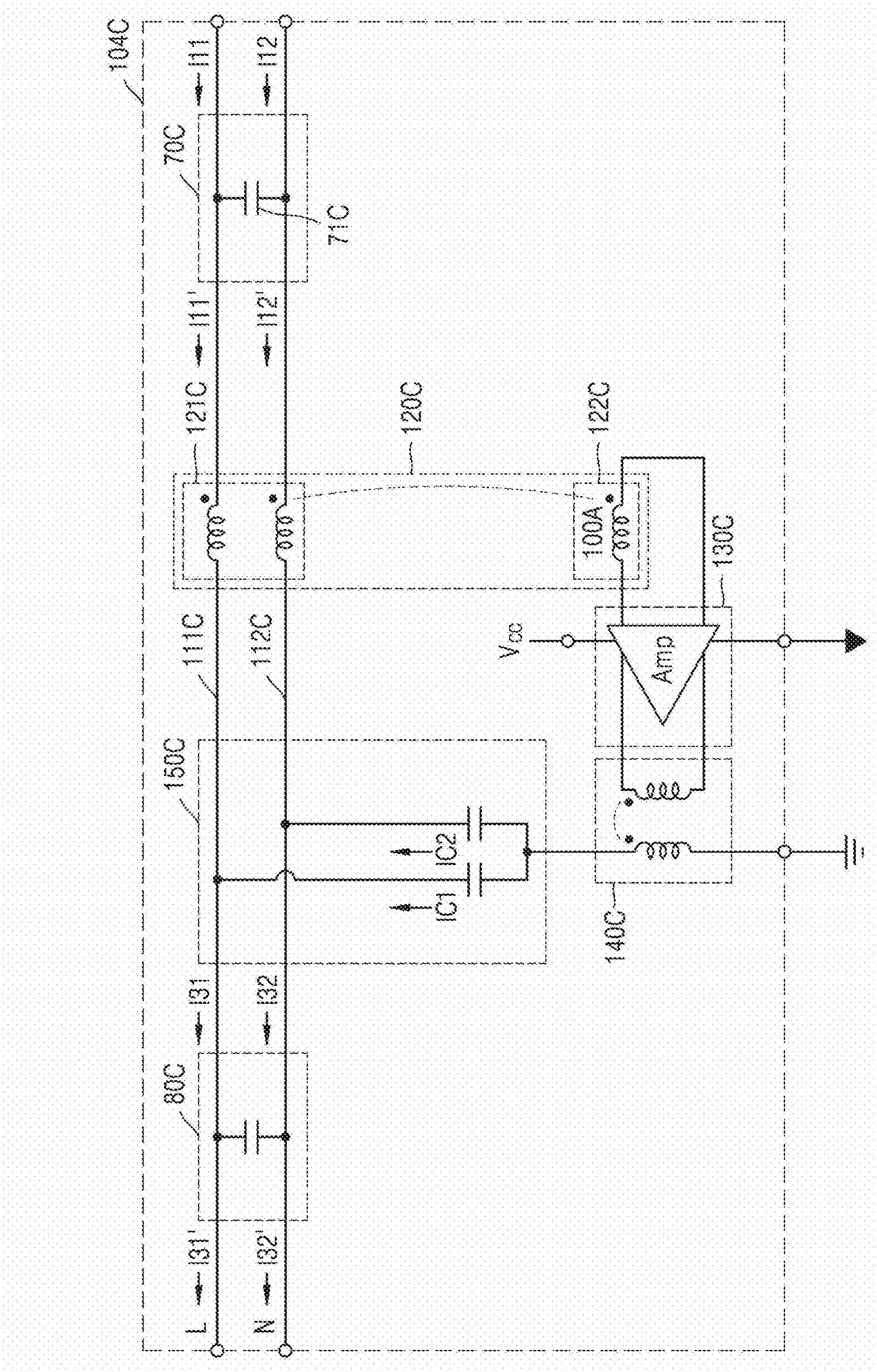
FIG. 33 is a diagram schematically showing the configuration of a compensating device according to another embodiment of the present disclosure.

According to an embodiment, the two or more high current paths 111, 112, 113, and 114 may be an R-line, an S-line, a T-line, and an N-line, respectively, in a three-phase four-line power system. Of course, the two or more high current paths 111, 112, 113, and 114 may respectively be an R-line, an S-line, and a T-line in a three-phase three-line power system as shown in FIG. 32 or may respectively be an L-line and an N-line in a single-phase two-line power system as shown in FIG. 33. As described above, in the present disclosure, the number of the two or more high current paths 111, 112, 113, and 114 may be variously set.

As described above, the two or more high current paths 111, 112, 113, and 114 may respectively be paths for transmitting power supplied by the second device 200, that is, second currents $I_{21}$, $I_{22}$, $I_{23}$, and $I_{24}$ to the first device 300. According to an embodiment, the second currents $I_{21}$, $I_{22}$, $I_{23}$, and $I_{24}$ may be alternating currents having frequencies of a second frequency band. For example, the second frequency band may be a band having a range from about 50 Hz to about 60 Hz.

Also, the two or more high current paths 111, 112, 113, and 114 may be paths through which the first currents $I_{11}$, $I_{12}$, $I_{13}$, and $I_{14}$, which are common-mode noises, flow. The first currents $I_{11}$, $I_{12}$, $I_{13}$, and $I_{14}$ may be generated by various causes (e.g., from the first device 300). The first currents $I_{11}$, $I_{12}$, $I_{13}$, and $I_{14}$ may be currents having frequencies of a first frequency band. In this case, the first frequency band may be a frequency band higher than the above-stated second frequency band, e.g., a band having a range from about 150 KHz to about 30 MHz.

The first balancing unit 70 may adjust balancing of the first currents $I_{11}$, $I_{12}$, $I_{13}$, and $I_{14}$ between the high current paths 111, 112, 113, and 114.

In the present disclosure, 'adjusting balancing' may mean adjusting physical quantities of balancing control targets, such that differences between physical quantities of the balancing control targets are reduced. Therefore, the first balancing unit 70 may reduce differences between the magnitudes of the first currents $I_{11}$, $I_{12}$, $I_{13}$, and $I_{14}$ flowing through the high current paths 111, 112, 113, and 114, respectively. For example, it will be assumed that the magnitude of the first current $I_{11}$ on a first high current path 111 is 1, the magnitude of the first current $I_{12}$ on a second high current path 112 is 3, the magnitude of a first current $I_{13}$ on a third high current path 113 is 1.5, and the magnitude of a first current $I_{14}$ on a fourth high current path 114 is 2.5. According to the assumption, the first balancing unit 70 may adjust the magnitude of the first current $I_{11}$ to 2.01, adjust the magnitude of the first current $I_{12}$ to 2.02, adjust the magnitude of the first current $I_{13}$ to 1.99, and adjust the magnitude of the first current $I_{14}$ to 1.98.

As described above, according to the present disclosure, the first currents $I_{11}$, $I_{12}$, $I_{13}$, and $I_{14}$, which are noise currents, are evenly distributed on the respective high current paths to facilitate noise removal by the remaining components of the compensating device 104.

According to an embodiment, the first balancing unit 70 may be configured to include a high current path connection unit that allows only currents of the first frequency band to flow between the high current paths 111, 112, 113, and 114. In this case, the high current path connection unit may be implemented by, for example, a capacitor having a capacitance for passing only currents of the first frequency band.

The sensing unit 120 may be electrically connected to the high current paths 111, 112, 113, and 114, detect balancing-adjusted first currents on the two or more high current paths 111, 112, 113, and 114, and generate an output signal corresponding to a result of the detection.

The amplifying unit 130 may be electrically connected to the sensing unit 120, amplify an output signal output by the sensing unit 120, and generate an amplified output signal.

The compensating device 104 may generate the compensation currents $IC_1$, $IC_2$, $IC_3$, and $IC_4$, which have, for example, the same magnitude and opposite phase as compared to balancing-adjusted first currents, and compensate for the balancing-adjusted first currents on the high current paths 111, 112, 113, and 114.

The compensating transformer unit 140 may be electrically connected to the amplifying unit 130 and may generate a compensation current based on an output signal amplified by the above-described amplifying unit 130.

The compensating capacitor unit 150 may provide paths through which compensation currents generated by the compensating transformer unit 140 flow to two or more high current paths 111, 112, 113, and 114, respectively.

The second balancing unit 80 may adjust balancing of synthetic currents generated by adding the compensation currents $IC_1$, $IC_2$, $IC_3$, and $IC_4$ provided by the compensating capacitor unit 150 to the balancing-adjusted first currents on the high current paths 111, 112, 113, and 114.

As described above, in the present disclosure, 'adjusting balancing' may mean adjusting physical quantities of balancing control targets, such that differences between physical quantities of the balancing control targets are reduced. Therefore, the second balancing unit 80 may reduce differences between the magnitudes of synthetic currents flowing through the high current paths 111, 112, 113, and 114, respectively. For example, it will be assumed that the magnitude of a synthetic current on the first high current path 111 is 0.01, the magnitude of a synthetic current on the second high current path 112 is 0.02, the magnitude of a synthetic current on the third high current path 113 is −0.01, and the magnitude of a synthetic current on the fourth high current path 114 is −0.02. Under the above assumption, the second balancing unit 80 may adjust the magnitudes of synthetic currents on all of the high current paths 111, 112, 113, and 114 to 0.

As described above, according to the present disclosure, distribution of minute first currents remaining after current compensation by the compensating transformer unit 140 and the compensating capacitor unit 150 is leveled again and reduced, thereby more completely blocking first currents transmitted to the second device 200.

According to an embodiment, the second balancing unit 80 may be configured to include a high current path connection unit that allows only currents of the first frequency band to flow between the high current paths 111, 112, 113, and 114. In this case, the high current path connection unit may be implemented by, for example, a capacitor having a capacitance for passing only currents of the first frequency band.

The compensating device 104 configured as described above may sense and actively compensate for a current under a specific condition on the two or more high current paths 111, 112, 113, and 114 and may be applied to high current, high voltage, and/or high-power systems, despite the miniaturization of the active compensating device 104.

Hereinafter, the compensating device 104 according to various embodiments will be described with reference to FIGS. 29 to 34 together with FIG. 28.

Figure 29:
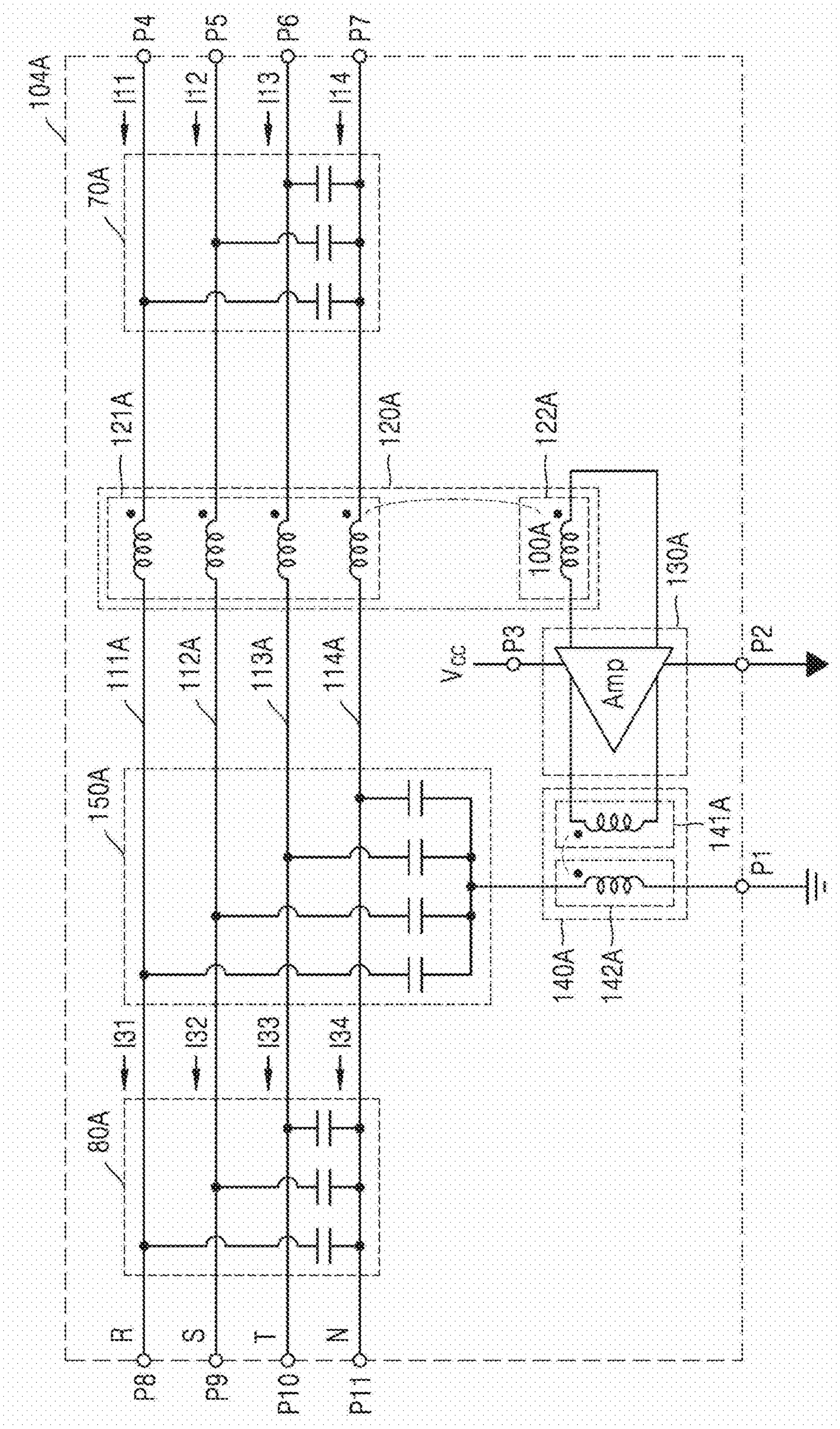
FIG. 29 is a diagram schematically showing the configuration of a compensating device used in a three-phase four-line system, according to an embodiment of the present disclosure.

FIG. 29 is a diagram schematically showing the configuration of a compensating device 104A used in a three-phase four-line system, according to an embodiment of the present disclosure.

The compensating device 104A according to an embodiment of the present disclosure may actively compensate for the first currents $I_{11}$, $I_{12}$, $I_{13}$, and $I_{14}$ input as a common-mode current to four high current paths 111A, 112A, 113A, and 114A, respectively, connected to a first device (the first device is connected to P4 to P7).

To this end, the compensating device 104A according to an embodiment of the present disclosure may include the four high current paths 111A, 112A, 113A, and 114A, the sensing transformer 120A, the amplifying unit 130A, the compensating transformer 140A, the compensating capacitor unit 150A, a first balancing unit 70A, and a second balancing unit 80A.

Also, the compensating device 104A may include terminals P1 to P11 connected to external devices. In this case, a terminal P1 may be a terminal connected to the reference potential 1, a terminal P2 may be a terminal connected to the reference potential 2, a terminal P3 may be a terminal connected to a third device that supplies power for the amplifying unit 130A, the terminals P4 to P7 may be terminals connected to the first device, and terminals P8 to P11 may be terminals connected to the second device.

Figure 30:
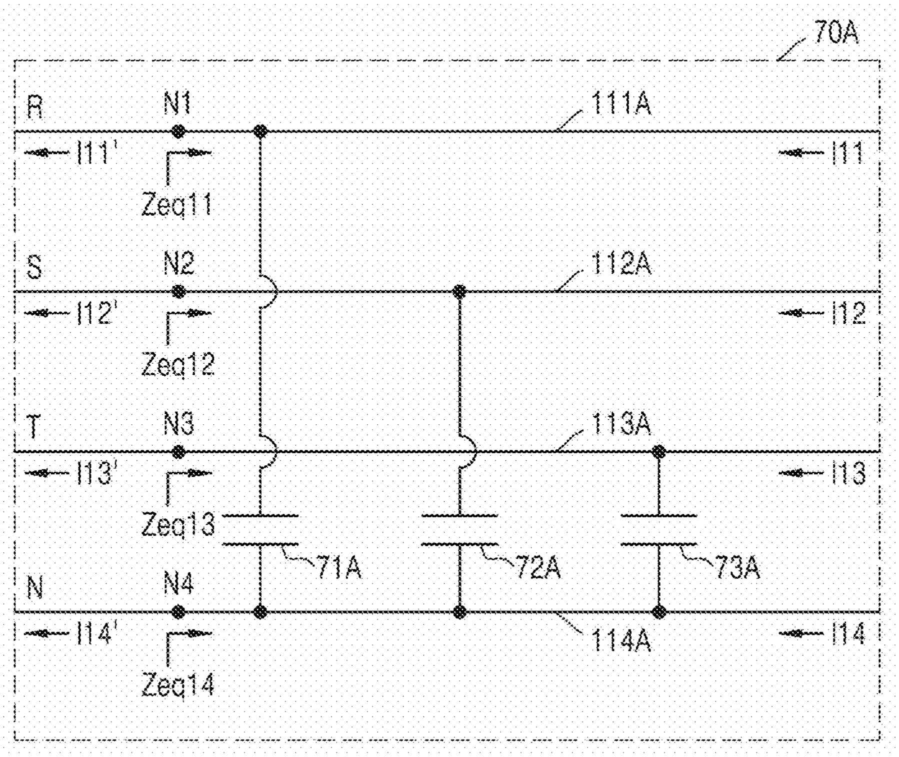
FIG. 30 is a diagram for describing the configuration and the operation of a first balancing unit according to an embodiment.

FIG. 30 is a diagram for describing a configuration and an operation of the first balancing unit 70A according to an embodiment.

The first balancing unit 70A may adjust the balancing of the first currents $I_{11}$, $I_{12}$, $I_{13}$, and $I_{14}$ between the high current paths 111A, 112A, 113A, and 114A and generate balancing-adjusted first currents $I_{11}'$, $I_{12}'$, $I_{13}'$, and $I_{14}'$.

In an embodiment, as shown in FIG. 30, the first balancing unit 70A may be implemented to include capacitors 71A, 72A, and 73A connecting high current paths 111A, 112A, and 113A corresponding to an R-line, an S-line, and a T-line to a high current path 114A corresponding to an N-line.

Capacitances of the capacitors 71A, 72A, and 73A constituting the first balancing unit 70A may be determined such that only currents of the first frequency band, to which the frequencies of first currents belong, may selectively flow. For example, when the first frequency band is from about 150 Khz to about 30 Mhz, the capacitance of each of the capacitors 71A, 72A, and 73A constituting the first balancing unit 70A may be determined to be 30 uF, such that the capacitors 71A, 72A, and 73A may operate like short circuits in the corresponding frequency band. Therefore, balancing of first currents between the high current paths 111A, 112A, 113A, and 114A may be adjusted through the capacitors 71A, 72A, and 73A.

For example, when the magnitude of the first current $I_{11}$ on the first high current path 111A is relatively greater than the magnitude of first currents I12, I13, and I14 on the other high current paths 112A, 113A, and 114A, the first currents may be transmitted to the fourth high current path 114A through a capacitor 71A and may be transmitted to the remaining high current paths 112A and 113A through capacitors 72A and 73A.

On the other hand, in order for the first currents to be distributed (or balanced) with an equal size between the high current paths 111A, 112A, 113A, and 114A, a difference between each of impedances Zeq11, Zeq12, Zeq13, and Zeq14, which are impedances when viewed from the first balancing unit 70A to the respective high current paths 111A, 112A, 113A, and 114A, may be less than or equal to a predetermined threshold impedance difference.

In an embodiment, the first balancing unit 70A may reduce differences between the voltages of the high current paths 111A, 112A, 113A, and 114A in the first frequency band to less than or equal to a predetermined threshold voltage difference. As described above, since the capacitors 71A, 72A, and 73A operate as short circuits in the first frequency band, the differences between the voltages of the high current paths 111A, 112A, 113A, and 114A may be reduced to less than or equal to the predetermined threshold voltage difference by the first balancing unit 70A. In other words, differences between voltages of nodes N1, N2, N3, and N4 on the high current paths 111A, 112A, 113A, and 114A may be reduced to less than or equal to the predetermined threshold voltage difference.

As described above, according to the present disclosure, by generating the balancing-adjusted first currents $I_{11}'$, $I_{12}'$, $I_{13}'$, and $I_{14}'$ and transmitting the same to other components of the compensating device 104A, noise may be efficiently removed.

Referring to FIG. 29 again, the sensing unit 120 may be implemented as the sensing transformer 120A. The sensing transformer 120A may detect the balancing-adjusted first currents $I_{11}'$, $I_{12}'$, $I_{13}'$, and $I_{14}'$ on the high current paths 111A, 112A, 113A, and 114A while being isolated from the high current paths 111A, 112A, 113A, and 114A.

The sensing transformer 120A may generate a first induced current at the secondary side 122A based on a first magnetic flux density induced due to the balancing-adjusted first currents $I_{11}'$, $I_{12}'$, $I_{13}'$, and $I_{14}'$ at the primary side 121A disposed on the high current paths 111A, 112A, 113A, and 114A.

Meanwhile, the numbers of times that the high current paths 111A, 112A, 113A, and 114A (or the primary side 121A) and the winding of the secondary side 122A are wound may be appropriately determined according to demands of a system in which the current compensating device 104A is used. For example, both the windings of high current paths 111A, 112A, 113A, and 114A (or the primary side 121A) and windings of the secondary side 122A may be wound around a transformer core only once. In this case, the sensing transformer 120A may be configured, such that the windings of the high current paths 111A, 112A, 113A, and 114A side (or the primary side 121A) and the windings of the secondary side 122A only pass through a center hole of a core. However, it is merely an example, and the present disclosure is not limited thereto. Also, the sensing unit 120 implemented as the sensing transformer 120A as described above is merely an example, and the present disclosure is not limited thereto.

The sensing transformer 120A may be configured, such that second magnetic flux densities induced due to the second currents $I_{21}$, $I_{22}$, $I_{23}$, and $I_{24}$ may offset one another. Therefore, the sensing transformer 120A may sense the balancing-adjusted first currents $I_{11}'$, $I_{12}'$, $I_{13}'$, and $I_{14}'$ only.

The amplifying unit 130 (e.g., the amplifying unit 130A) may amplify an output signal output by the sensing unit 120 and generate an amplified output signal. The amplifying unit may be implemented by the amplifying units according to various embodiments described above.

The compensating transformer unit 140 (e.g., the compensating transformer 140A) may generate a compensation current based on an output signal amplified by the above-described amplifying unit 130.

As described above, the compensating capacitor unit 150 may be implemented as the compensating capacitor unit 150A that provides paths through which a current generated by the compensating transformer 140A flows to the four high current paths 111A, 112A, 113A, and 114A.

The compensating capacitor unit 150A may be configured, such that currents flowing between the four high current paths 111A, 112A, 113A, and 114A through a compensating capacitor satisfy a first predetermined current condition. In this case, the first predetermined current condition may be a condition in which the magnitude of a current is smaller than a first predetermined threshold magnitude.

Also, the compensating capacitor unit 150A may be configured, such that a current flowing between each of the four high current paths 111A, 112A, 113A, and 114A and the reference potential (the reference potential 1) of the compensating device 104A through a compensating capacitor satisfies a second predetermined condition. In this case, the second predetermined current condition may be a condition in which the magnitude of a current is smaller than a second predetermined threshold magnitude.

Compensation currents flowing respectively to the four high current paths 111A, 112A, 113A, and 114A along the compensating capacitor unit 150A may offset the balancing-adjusted first currents $I_{11}'$, $I_{12}'$, $I_{13}'$, and $I_{14}'$ on the high current paths 111A, 112A, 113A, and 114A, thereby preventing the balancing-adjusted first currents $I_{11}'$, $I_{12}'$, $I_{13}'$, and $I_{14}'$ from being transmitted to the second device 200A.

According to the above-described processes, the compensating device 104A may generate the compensation currents $IC_1$, $IC_2$, $IC_3$, and $IC_4$ having the same magnitude and the opposite phase as compared to the balancing-adjusted first currents $I_{11}'$, $I_{12}'$, $I_{13}'$, and $I_{14}'$ and compensate for the balancing-adjusted first currents $I_{11}'$, $I_{12}'$, $I_{13}'$, and $I_{14}'$ on the high current paths 111A, 112A, 113A, and 114A.

Figure 31:
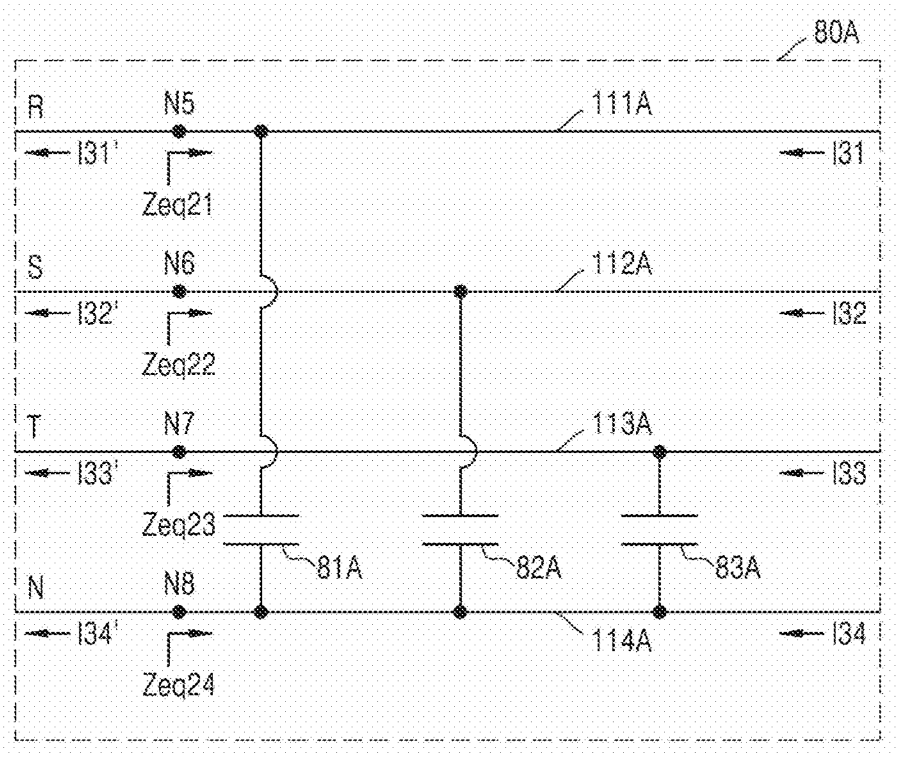
FIG. 31 is a diagram for describing the configuration and the operation of a second balancing unit according to an embodiment.

FIG. 31 is a diagram for describing the configuration and the operation of the second balancing unit 80A according to an embodiment.

The second balancing unit 80 may adjust balancing of synthetic currents I31, I32, I33, and I34 generated by adding the compensation currents $IC_1$, $IC_2$, $IC_3$, and $IC_4$, which are provided by the compensating capacitor unit 150A, to the balancing-adjusted first currents $I_{11}'$, $I_{12}'$, $I_{13}'$, and $I_{14}'$ on the high current paths 111A, 112A, 113A, and 114A to generate balancing-adjusted synthetic currents $I_{31}'$, $I_{32}'$, $I_{33}'$, and $I_{34}'$.

In an embodiment, the second balancing unit 80A may be implemented to include capacitors 81A, 82A, and 83A respectively connecting the high current paths 111A, 112A, and 113A corresponding to an R-line, an S-line, and a T-line to the high current path 114A corresponding to an N-line.

Capacitance of each of the capacitors 81A, 82A, and 83A constituting the second balancing unit 80A may be determined such that only the current of the first frequency band to which the frequency of the synthetic currents belongs flows selectively, and a detailed description thereof will be replaced with the description of the first balancing unit 70A.

In an embodiment, when the magnitude of the synthetic current I31 on the first high current path 111A is relatively greater than the magnitude of each of the synthetic currents I32, I33, and I34 on the other high current paths 112A, 113A, and 114A, the synthetic current I31 may be transmitted to the fourth high current path 114A through the capacitor 81A and may again be transmitted to the remaining high current paths 112A and 113A through the capacitors 82A and 83A.

Meanwhile, in order for the synthetic currents to be distributed (or balanced) with an equal magnitude between the high current paths 111A, 112A, 113A, and 114A, a difference between each of impedances Zeq21, Zeq22, Zeq23, and Zeq24, which are impedances when viewed from the first balancing unit 80A to the respective high current paths 111A, 112A, 113A, and 114A, may be less than or equal to a predetermined threshold impedance difference.

Meanwhile, in order for the synthetic currents to be distributed (or balanced) with an equal magnitude between the high current paths 111A, 112A, 113A, and 114A, a difference between each of impedances Zeq21, Zeq22, Zeq23, and Zeq24, which are impedances threshold voltage difference. In the first frequency band, since the capacitors 81A, 82A, and 83A operate as short circuits, the difference between each of the voltages of the high current paths 111A, 112A, 113A, and 114A may be reduced to less than or equal to the predetermined threshold voltage difference by the second balancing unit 80A.

As described above, according to the present disclosure, distribution of minute first currents remaining after current compensation by the compensating transformer unit 140A is leveled again and reduced, thereby more completely blocking the first currents transmitted to the side of the second device.

Therefore, the current compensating device 104A according to an embodiment of the present disclosure may actively compensate for the first currents $I_{11}$, $I_{12}$, $I_{13}$, and $I_{14}$ input as a common-mode current to the four high current paths 111A, 112A, 113A, and 114A, respectively, connected to the first device, thereby preventing malfunction or damage of the second device.

FIG. 32 is a diagram schematically showing the configuration of a compensating device 104B used in a three-phase three-line system according to another embodiment of the present disclosure. Hereinafter, descriptions of contents overlapping with those described with reference to FIGS. 28 to 31 will be omitted.

In addition, descriptions of a sensing transformer 120B, an amplifying unit 130B, a compensating transformer 140B, and a compensating capacitor unit 150B may correspond to the descriptions of the respective components of the three-phase three-line system given above with reference to FIG. 11, and thus will be omitted.

The compensating device 104B includes three high current paths 111B, 112B, and 113B. Due to this, the compensating device 104B has differences in a first balancing unit 70B and a second balancing unit 80B, and thus will be described with a focus on the first balancing unit 70B and the second balancing unit 80B.

According to an embodiment, a first high current path 111B may be an R-phase power line, a second high current path 112B may be an S-phase power line, and a third high current path 113B may be a T-phase power line. First currents $I_{11}$, $I_{12}$, and $I_{13}$ may be input as a common-mode current to the first high current path 111B, the second high current path 112B, and the third high current path 113B, respectively.

The first balancing unit 70B may adjust balancing of the first currents $I_{11}$, $I_{12}$, and $I_{13}$ between the high current paths 111B, 112B, and 113B and generate balancing-adjusted first currents $I_{11}'$, $I_{12}'$, and $I_{13}'$.

In an embodiment, as shown in FIG. 32, the first balancing unit 70B may be implemented as capacitors each having one end connected to each of the high current paths 111B, 112B, and 113B respectively corresponding to the R-, S-, and T-lines, and the other end connected in common. For example, when the magnitude of the first current $I_{11}$ on the first high current path 111B is relatively greater than the magnitude of each of the first currents I12 and I13 on the other high current paths 112B and 113B, the first current $I_{11}$ may be transmitted to the remaining high current paths 112B and 113B through a capacitor 71B and capacitors 72B, and 73B.

A primary side 121B of the sensing transformer 120B may be disposed in each of the first high current path 111B, the second high current path 112B, and the third high current path 113B, and may sense the balancing-adjusted first currents $I_{11}'$, $I_{12}'$, and $I_{13}'$.

Meanwhile, the compensating capacitor unit 150B may provide paths through which compensation currents $IC_1$, $IC_2$, and $IC_3$ generated by the compensating transformer flow to the first high current path 111B, the second high current path 112B, and the third high current path 113B, respectively.

The second balancing unit 80B may adjust balancing of synthetic currents $I_{31}$, $I_{32}$, and $I_{33}$ generated by adding the compensation currents $IC_1$, $IC_2$, and $IC_3$, which are provided by the compensating capacitor unit 150B, to the balancing-adjusted first currents $I_{11}'$, $I_{12}'$, and $I_{13}'$ on the high current paths 111B, 112B, and 113B to generate balancing-adjusted synthetic currents $I_{31}'$, $I_{32}'$, and $I_{33}'$, and $I_{34}'$. Since a configuration and an operation principle of the second balancing unit 80B are substantially the same as those of the first balancing unit 70B, a detailed description thereof will be omitted.

FIG. 33 is a diagram schematically showing a configuration of a compensating device 104C according to another embodiment of the present disclosure. Hereinafter, descriptions of contents overlapping with those described with reference to FIGS. 28 and 31 will be omitted.

In addition, descriptions of a sensing transformer 120C, an amplifying unit 130C, a compensating transformer 140C, and a compensating capacitor unit 150C may correspond to the descriptions of the respective components (e.g., the sensing transformer 120A, the amplifying unit 130A, the compensating transformer 140A, and the compensating capacitor unit 150A) of the single-phase two-line system given above with reference to FIGS. 3, 5, and the like, and thus will be omitted.

The compensating device 104C includes two high current paths 111C and 112C, and therefore, has differences in a first balancing unit 70C and a second balancing unit 80C, and will be described with a focus on the first balancing unit 70C and the second balancing unit 80C.

According to an embodiment, the first high current path 111C may be an L-power line, and the second high current path 112C may be an N-power line.

The first balancing unit 70C may adjust balancing of first currents $I_{11}$ and $I_{12}$ between the high current paths 111C and 112C and generate balancing-adjusted first currents $I_{11}'$ and $I_{12}'$.

In an embodiment, as shown in FIG. 33, the first balancing unit 70C may be implemented as a capacitor 71C connected between the high current paths 111C and 112C respectively corresponding to the L-line and the N-line, As described above, for example, when the magnitude of the first current $I_{11}$ on a first high current path 111C is relatively greater than the magnitude of the first current $I_{12}$ on the other high current path 112C, the first current $I_{11}$ may be transmitted to the second high current path 112C through the capacitor 71C.

The second balancing unit 80C may adjust balancing of synthetic currents I31 and I32 generated by adding compensation currents $IC_1$ and $IC_2$, which are provided by the compensating capacitor unit 150C, to the balancing-adjusted first currents I11' and I12' on the high current paths 111C and 112C to generate balancing-adjusted synthetic currents I31' and I32'. Since a configuration and an operation principle of the second balancing unit 80C are substantially the same as those of the first balancing unit 70C, a detailed description thereof will be omitted.

The compensating device 104C according to the embodiment may be used to offset (or compensate for) the first currents $I_{11}$ and $I_{12}$ that are input to or generated in a single-phase two-line power system.

Figure 34:
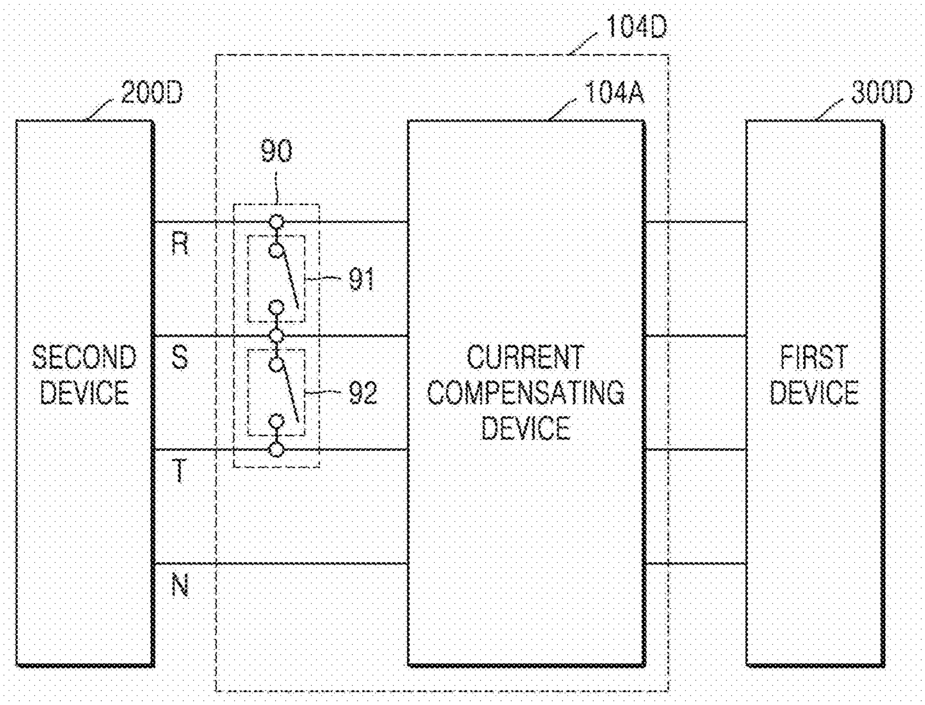
FIG. 34 is a diagram schematically showing the configuration of a compensating device used in a three-phase four-line system according to another embodiment of the present disclosure.

FIG. 34 is a diagram schematically showing the configuration of a compensating device 104D used in a three-phase four-line system according to another embodiment of the present disclosure.

The compensating device 104D according to an embodiment may be configured by further include a phase control unit 90 to the same compensating device as the compensating device 104A described with reference to FIGS. 28 to 31. Therefore, hereinafter, a description will focus on a function of the phase control unit 90.

The phase control unit 90 according to an embodiment may electrically connect at least two or more high current paths between a second device 200D and the compensating device 104D such that the at least two or more electrically connected high current paths are used as one high current path. In this case, the expression that two or more high current paths are electrically connected may mean that the two or more high current paths are electrically short circuited.

For example, the phase control unit 90 may allow a compensating device, which is designed to be suitable for a three-phase four-line system, to be used in a single-phase two-line system using only an R-line (an S-line) and an N-line by operating a switching element 91 between a first high current path and a second high current path.

Of course, the phase control unit 90 may operate both the switching element 91 between the first high current path and the second high current path and a switching element 92 between the second high current path and a third high current path to allow a compensating device, which is designed to be suitable for a three-phase four-line system, to be used in a single-phase two-line system using an R-line (an S-line, or a T-line) and an N-line.

Therefore, the present disclosure may be used in various power systems without changing or replacing the compensating device 104D.

Figure 35:
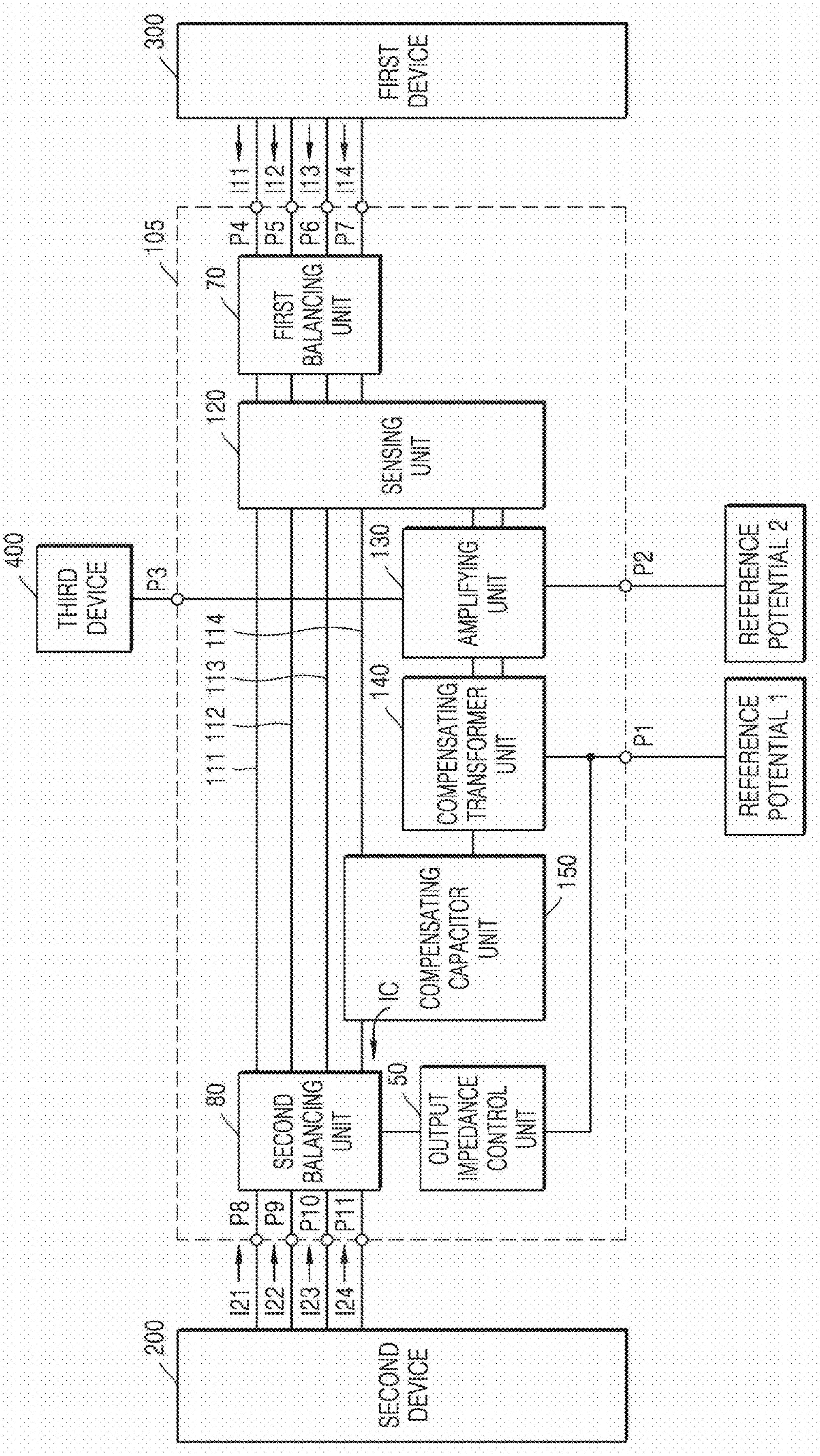
FIG. 35 is a diagram schematically showing the configuration of a system including a compensating device according to an embodiment of the present disclosure.

FIG. 35 is a diagram schematically showing the configuration of a system including a compensating device 105 according to an embodiment of the present disclosure.

When it is described in comparison with the compensating device 104 of FIG. 28, the compensating device 105 of FIG. 35 may have a difference in a compensating capacitor unit 150, and may further include an output impedance control unit 50. Therefore, descriptions of contents overlapping with those of the compensating device 104 of FIG. 28 will be omitted, and descriptions will focus on the compensating capacitor unit 150 and the output impedance control unit 50.

The compensating capacitor unit 150 may provide a path through which a compensation current Ic generated by a compensating transformer unit 140 flows to a reference high current path 114. At this time, the reference high current path 114 means one of high current paths 111, 112, 113, and 114, and as the one is selected, any one of the remaining high current paths 111, 112, and 113 may also correspond to a reference high current path.

According to an embodiment, the compensating capacitor unit 150 may be implemented as a capacitor that provides a path through which the compensation current $I_c$ generated by the compensating transformer unit 140 flows to the reference high current path 114. In this case, the compensating capacitor unit 150 may include a capacitor connecting a reference potential (the reference potential 1) of the compensating device 105 and the reference high current path 114.

A second balancing unit 80 may distribute the compensation current Ic provided to the reference high current path 114 to the two or more high current paths 111, 112, 113, and 114. For example, when the compensation current $I_c$ provided to the high current path 114 has a magnitude of 8, the second balancing unit 80 may distribute the compensation current $I_c$ such that the compensation current having a magnitude of 2 flows in each of the four high current paths 111, 112, 113, and 114.

Meanwhile, the second balancing unit 80 may control balancing of synthetic currents on the high current paths 111, 112, 113, and 114. In this case, the synthetic current may refer to a current generated by adding the distributed compensation current to a first current whose balancing is controlled by a first balancing unit. For example, the second balancing unit 80 may reduce a difference between each of the magnitudes of the synthetic currents flowing through the high current paths 111, 112, 113, and 114.

According to an embodiment, the second balancing unit 80 may be configured to include a high current path connection unit that allows only a current of the first frequency band to flow between the high current paths 111, 112, 113, and 114. In this case, the high current path connection unit may be implemented as, for example, a capacitor having capacitance that allows only the current of the first frequency band to pass therethrough.

The second balancing unit 80 may control an output impedance viewed from the compensating transformer unit 140 to the side of the second device 200 together with the output impedance control unit 50 to be described later.

The output impedance control unit 50 may control the output impedance, which is viewed from the compensating transformer unit 140 to the side of the second device 200, together with the second balancing unit 80. For example, the impedance control unit 50 may reduce the output impedance viewed from the compensating transformer unit 140 to the side of the second device 200 so that the compensation current $I_c$ may be prevented from flowing in a reverse direction (e.g., toward the compensating transformer unit 140). In an embodiment, the output impedance control unit 50 may be implemented as a capacitor having a predetermined capacitance.

Hereinafter, a compensating device 105 according to various embodiments will be described with reference to FIGS. 36 to 39 together with FIG. 35.

Figure 36:
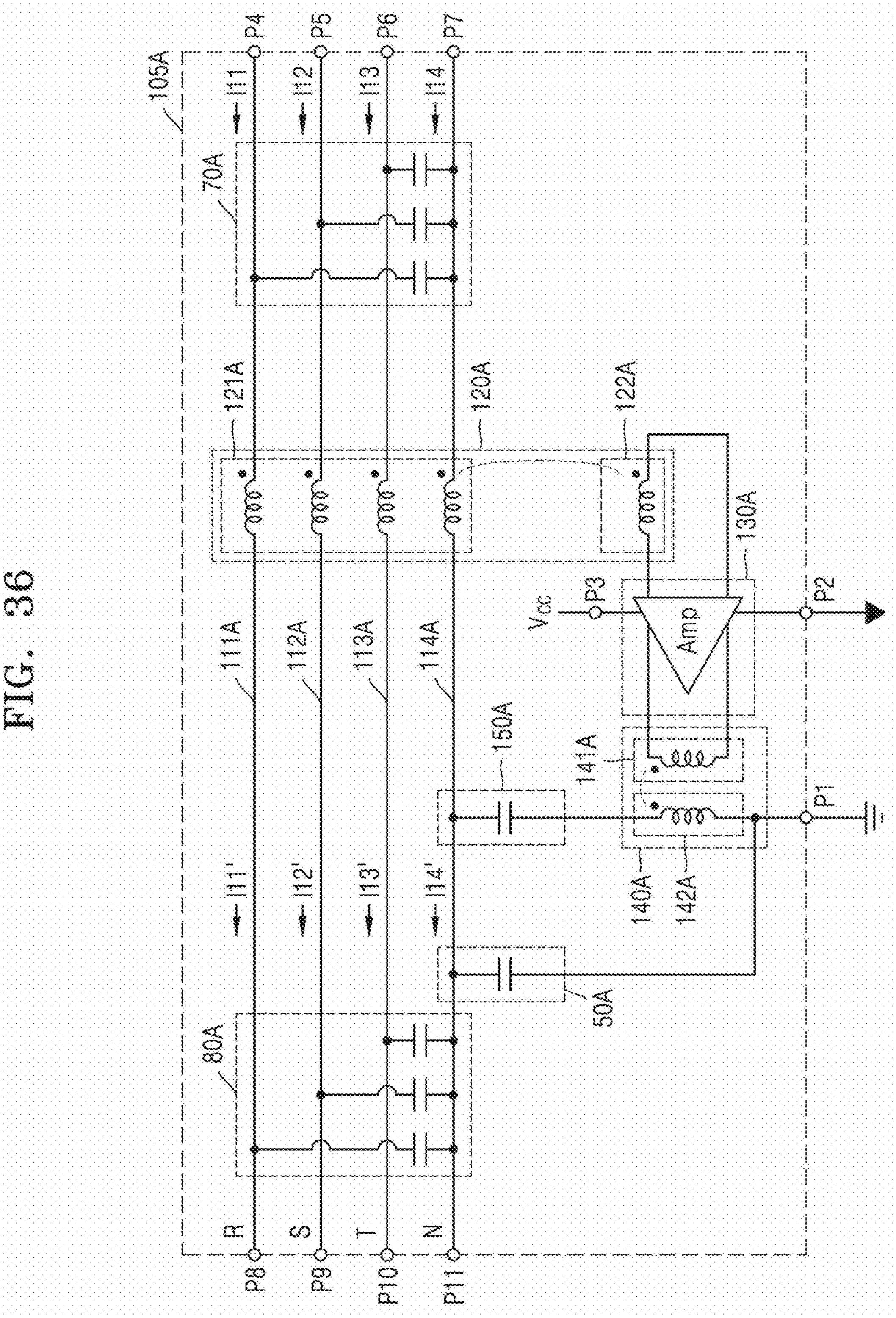
FIG. 36 is a diagram schematically showing the configuration of a compensating device used in a three-phase four-line system according to an embodiment of the present disclosure.

FIG. 36 is a diagram schematically showing the configuration of a compensating device 105A used in a three-phase four-line system according to an embodiment of the present disclosure.

The compensating device 105A of FIG. 35 may be different from the compensating device 104A described with reference to FIGS. 29 to 31 in a compensating capacitor unit 150A, and may further include an output impedance control unit 50A. Therefore, descriptions of contents overlapping with those of the compensating devices 104 and 104A will be omitted, and descriptions will focus on the compensating capacitor unit 150A and the output impedance control unit 50A. Hereinafter, the compensating device 105A will be described with reference to FIGS. 36 to 38 focusing on the compensating capacitor unit 150A and the output impedance control unit 50A.

In addition, the compensating device 105A may include terminals P1 to P11 connected to external devices. In this case, the terminal P1 may be a terminal connected to the reference potential 1, the terminal P2 may be a terminal connected to the reference potential 2, the terminal P3 may be a terminal connected to the third device that supplies power to an amplifying unit 130A, the terminals P4 to P7 may be terminals connected to the first device, and the terminals P8 to P11 may be terminals connected to the second device.

Meanwhile, the configuration and the operation of a first balancing unit 70A according to an embodiment may correspond to the description of those described with reference to FIG. 30.

Figure 37:
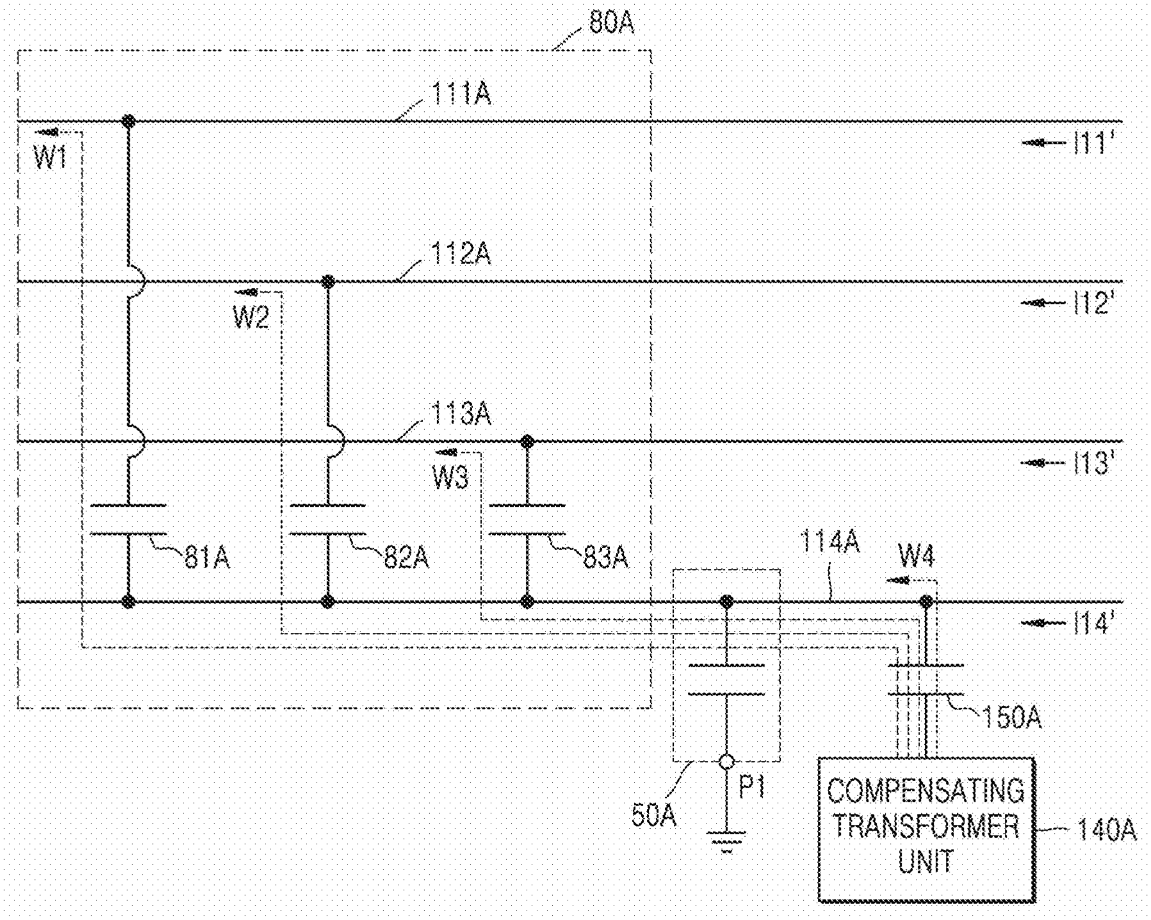
FIG. 37 is a diagram for describing a process in which a compensation current generated by a compensating transformer unit is distributed to high current paths through a compensating capacitor unit and a second balancing unit.

FIG. 37 is a diagram for describing a process in which a compensation current $I_c$ generated by a compensating transformer unit 140A is distributed to high current paths 111A, 112A, 113A, and 114A through the compensating capacitor unit 150A and a second balancing unit 80A.

The compensating capacitor unit 150A may provide a path through which the compensation current generated by the compensating transformer unit 140A flows to a reference high current path 114A. Meanwhile, the compensation current transmitted to the reference high current path 114A may be distributed to each of the high current paths 111A, 112A, 113A, and 114A through the second balancing unit 80A.

For example, the compensation current transmitted to the reference high current path 114A may be transmitted to a first high current path 111A through a first capacitor 81A of the second balancing unit 80A (a path W1). Similarly, the compensation current may be transmitted to each of a second high current path 112A and a third high current path 113A respectively through a second capacitor 82A and a third capacitor 83A (see paths W2 and W3). Meanwhile, the compensation current remaining after being transmitted to the high current paths 111A, 112A, and 113A may remain in a fourth high current path (or the reference high current path 114A) (see a path W4).

The compensation currents provided to the four high current paths 111A, 112A, 113A, and 114A may cancel balancing-adjusted first currents $I_{11}'$, $I_{12}'$, $I_{13}'$, and $I_{14}'$ on the high current paths 111A, 112A, 113A, and 114A, respectively, thereby preventing the balancing-adjusted first currents $I_{11}'$, $I_{12}'$, $I_{13}'$, and $I_{14}'$ from being transmitted to the second device 200A. In this case, the balancing-adjusted first currents $I_{11}'$, $I_{12}'$, $I_{13}'$, and $I_{14}'$ and the corresponding compensation currents may be, for example, currents having the same magnitude (or considered to be the same) and opposite phases (or phases corresponding to opposite phases).

In an embodiment, the compensating capacitor unit 150A may be configured such that the current flowing between the reference high current path 114A and a reference potential (the reference potential 1) of the compensating device 105A through the compensating capacitor satisfies a second predetermined condition. In this case, the second predetermined current condition may be a condition in which the magnitude of the current is less than a second predetermined threshold magnitude.

The second balancing unit 80 may not only distribute the compensation current provided by the compensating capacitor unit 150A to each of the high current paths 111A, 112A, 113A, and 114A as described above, but also adjust balancing of the synthetic currents to generate balancing-adjusted synthetic currents. In this case, the synthetic currents may mean currents generated by adding the distributed compensation currents to the first currents $I_{11}'$, $I_{12}'$, $I_{13}'$, and $I_{14}'$ whose balancing is adjusted by the first balancing unit 70A.

A configuration and an operation of the second balancing unit 80A according to an embodiment may correspond to the description given with reference to FIG. 31, and thus will be omitted.

Figure 38:
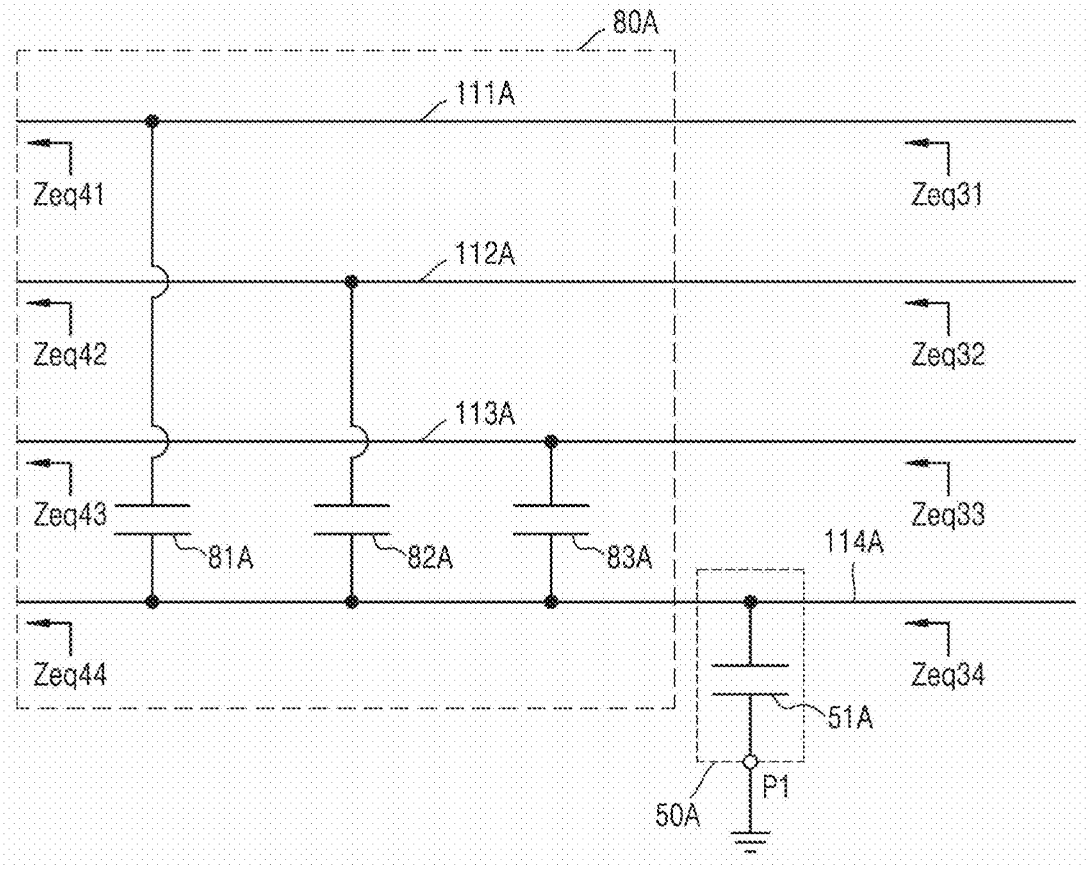
FIG. 38 is a diagram for describing a process in which output impedances are controlled by a second balancing unit and an output impedance control unit.

FIG. 38 is a diagram for describing a process in which output impedances Zeq31, Zeq32, Zeq33, and Zeq34 are controlled by the second balancing unit 80A and the output impedance control unit 50A.

In an embodiment, as shown in FIG. 38, the output impedance control unit 50A may include a capacitor 51A configured to provide a path through which a current flows between the reference high current path 114A and a reference potential of the compensating transformer unit 140A.

Further, as described above, the second balancing unit 80A may include the capacitors 81A, 82A, and 83A that provide paths through which currents flow between the reference high current path 114A and the other high current paths 111A, 112A, and 113A, respectively.

In an embodiment, the output impedances Zeq31, Zeq32, Zeq33, and Zeq34 viewed from the compensating transformer unit 140A to the side of the second device may be synthetic impedances obtained by respectively connecting impedances, which are obtained by connecting the capacitor 51A and each of the capacitors 81A, 82A, and 83A in series, to impedances Zeq41, Zeq42, Zeq43, and Zeq44 of the second device in parallel. For example, in the first high current path 111A, the output impedance Zeq31 may be the synthetic impedance obtained by connecting the impedance, which is obtained by connecting the capacitor 51A and the capacitor 81A in series, and the impedance Zeq41 of the second device in parallel.

As such, the second balancing unit 80A and the output impedance control unit 50A act as impedances that are connected to the impedances Zeq41, Zeq42, Zeq43, and Zeq44 of the second device in parallel to reduce the output impedances Zeq31, Zeq32, Zeq33, and Zeq34 viewed from the compensating transformer unit 140A to the side of the second device, so that current compensation by compensation currents is performed smoothly even in the impedances Zeq41, Zeq42, Zeq43, and Zeq44 of the second device of various magnitudes.

Figure 39:
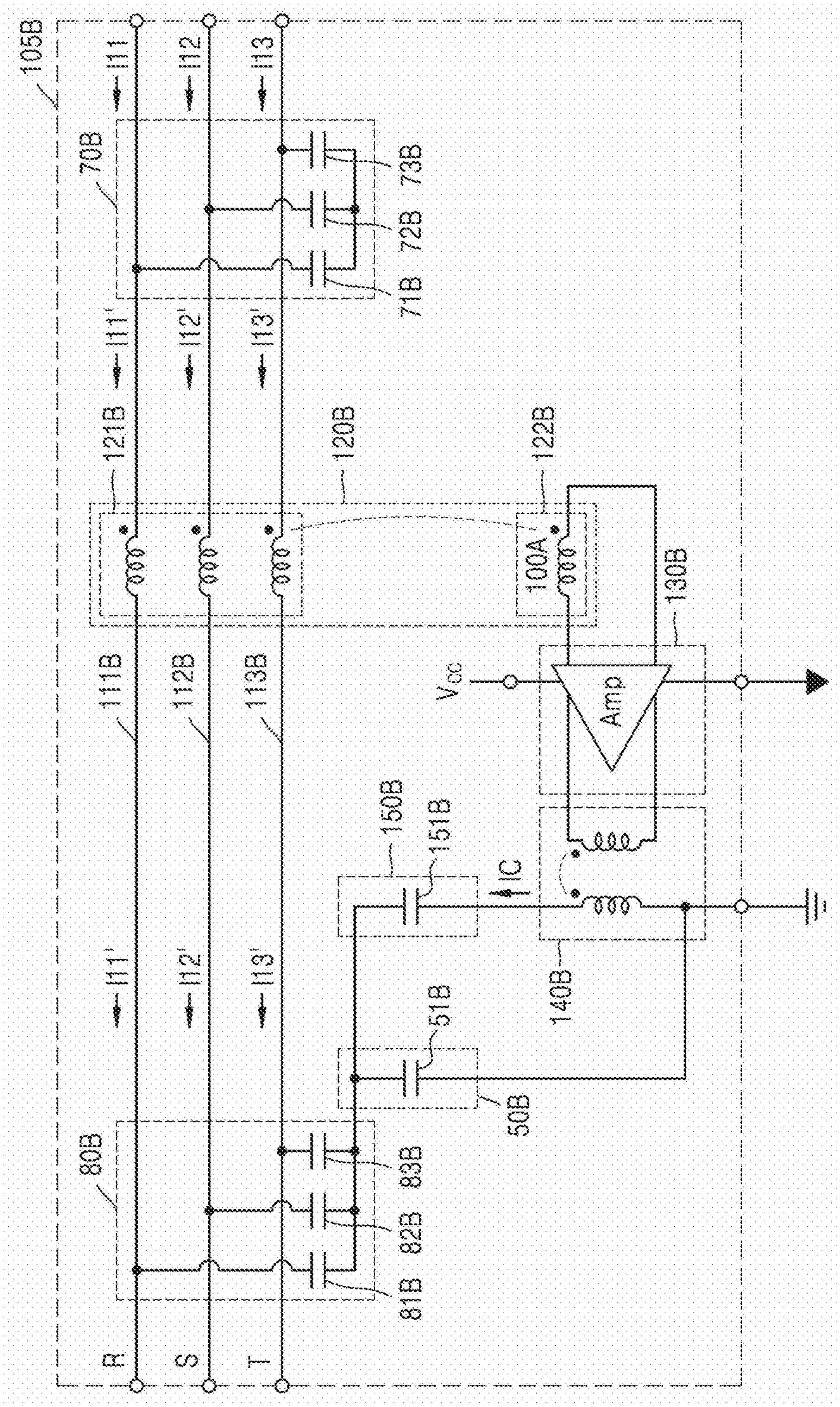
FIG. 39 is a diagram schematically showing the configuration of a compensating device used in a three-phase three-line system according to another embodiment of the present disclosure.

FIG. 39 is a diagram schematically showing the configuration of a compensating device 105B used in a three-phase three-line system according to another embodiment of the present disclosure.

The compensating device 105B of FIG. 39 may be different from the compensating device 104B described with reference to FIG. 32 in a compensating capacitor unit 150B and an output impedance control unit 50B. Therefore, descriptions of components overlapping with those of the compensating device 104B of FIG. 32 (e.g., the sensing transformer 120B, the amplifying unit 130B, the compensating transformer 140B, the first and second balancing units 70B and 80B, and the like) will be omitted, and descriptions will focus on the compensating capacitor unit 150B and the output impedance control unit 50B.

The compensating capacitor unit 150B may provide a path through which a compensation current $I_c$ generated by a compensating transformer flows to a third high current path 113B, which is a reference high current path. In this case, the reference high current path 113B means one of high current paths 111B, 112B, and 113B, and as the one is selected, the remaining high current path 111B or 112B may also correspond to a reference high current path.

In an embodiment, the compensating capacitor unit 150B may be implemented as a capacitor 151B.

A second balancing unit 80B may distribute the compensation current transmitted to the reference high current path 113B to each of the high current paths 111B, 112B, and 113B.

In an embodiment, the second balancing unit 80B may be implemented as capacitors 81B, 82B, and 83B having one ends connected the high current paths 111B, 112B, and 113B corresponding to an R-line, an S-line, and a T-line, respectively, and the other ends connected in common.

In an embodiment, the compensation current transmitted to the reference high current path 113B may be transmitted to a first high current path 111B through a first capacitor 81B of the second balancing unit 80B. Similarly, the compensation current may be transmitted to a second high current path 112B and a third high current path 113B through a second capacitor 82B and a third capacitor 83B, respectively.

The compensation current provided to each of the three high current paths 111B, 112B, and 113B may cancel (or compensate for) balancing-adjusted first currents I11', I12', and I13 on the high current paths 111B, 112B, and 113B.

In an embodiment, the compensating capacitor unit 150B may have a condition in which the magnitude of the current, which flows between the reference high current path 113B and a reference potential (reference potential 1) of the compensating device 105B through the compensating capacitor, is less than a second predetermined threshold magnitude.

The second balancing unit 80B may not only distribute the compensation current provided by the compensating capacitor unit 150B to each of the high current paths 111B, 112B, and 113B as described above, but also adjust balancing of the synthetic currents to generate balancing-adjusted synthetic currents.

Capacitances of the capacitors 81B, 82B, and 83B constituting the second balancing unit 80B may be determined such that only currents of the first frequency band, to which a frequency of the synthetic current belong, may selectively flow.

In an embodiment, the second balancing unit 80B may control an output impedance viewed from a compensating unit 140B to the side of the second device together with the output impedance control unit 50B.

In an embodiment, the output impedance control unit 50B may include a capacitor 51B that provides a path through which a current flows between the reference high current path 113B and a reference potential of the compensating unit 140B.

Since the principle of adjusting the output impedance viewed from the compensating unit 140B to the side of the second device by the second balancing unit 80B and the output impedance control unit 50B has been described in detail with reference to FIG. 38, a detailed description thereof will be omitted.

The compensating device 105B according to the embodiment may be used to cancel (or compensate for) the common-mode first currents $I_{11}$, $I_{12}$, and $I_{13}$ generated in a three-phase three-line power system.

Figure 40:
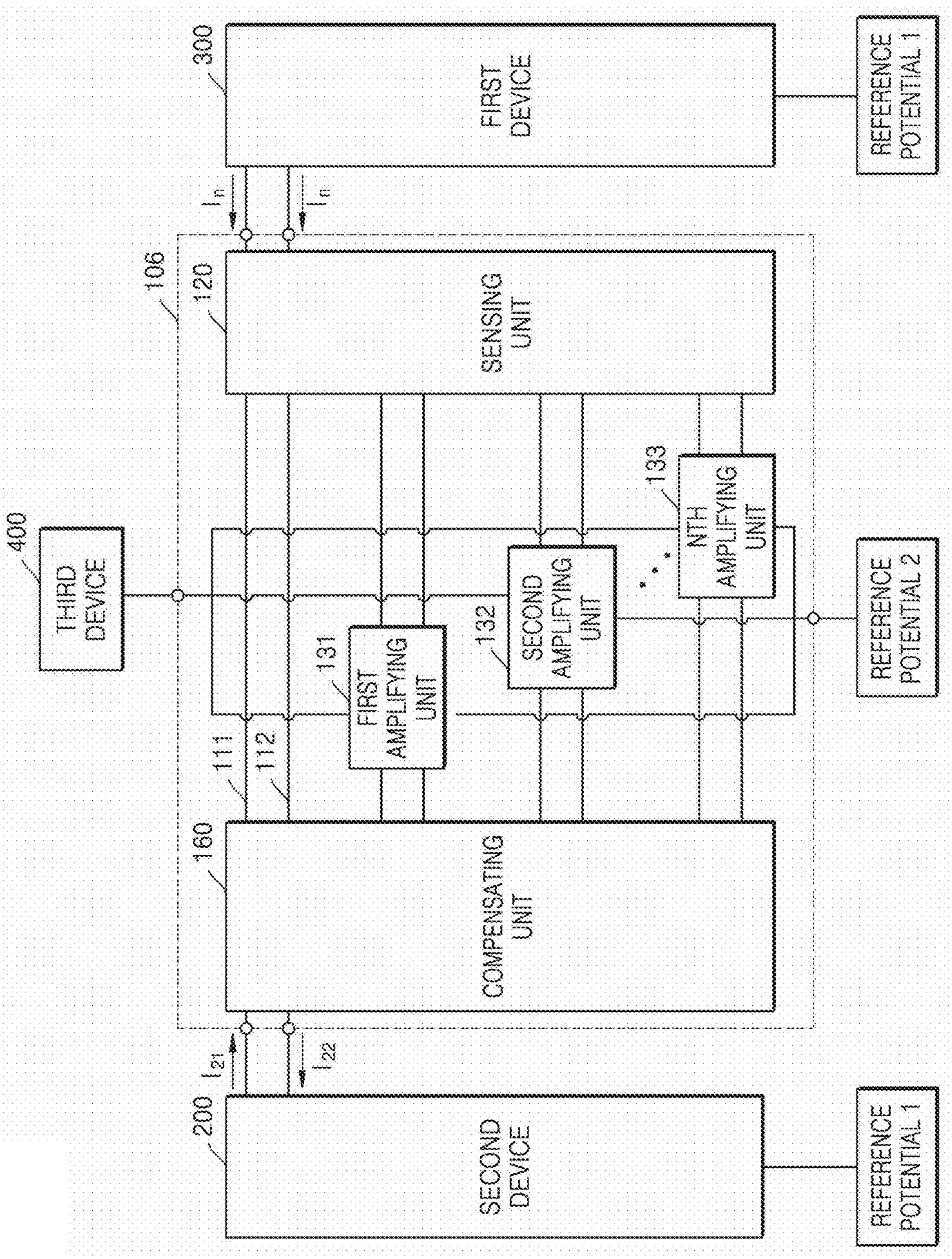
FIG. 40 is a schematic view of the configuration of a system including an active compensating device according to an embodiment of the present disclosure.

FIG. 40 is a schematic view of the configuration of a system including an active compensating device 106 according to an embodiment of the present disclosure. The active compensating device 106 may actively compensate for noise currents $I_n$ (e.g., electromagnetic interference (EMI) noise currents) or a noise voltage (e.g., an EMI noise voltage), which is generated as a common-mode current or voltage on two or more high current paths 111 and 112 from the first device 300.

The active compensating device 106 may include a sensing unit 120, a first amplifying unit 131, a second amplifying unit 132, an Nth amplifying unit 133, and a compensating unit 160. Here, N is a natural number greater than or equal to 2. That is, the active compensating device 106 according to various embodiments of the present disclosure may include two or more parallel amplifying units.

The compensating device 106 is related to an embodiment in which the amplifying unit 130 of the compensating device 100 shown in FIG. 1 is configured in a parallel structure of the first amplifying unit 131, the second amplifying unit 132, and the Nth amplifying unit 133. Therefore, descriptions of the contents of the components overlapping with those (e.g., the sensing unit 120, the compensating unit 160, and the like) described in the above-described compensating device 100 are omitted, and descriptions will focus on the first amplifying unit 131, the second amplifying unit 132, and the Nth amplifying unit 133.

For example, the common-mode noise currents $I_n$ may be input to high current paths 111 and 112 due to a switching operation of a power conversion device on the side of the first device 300. Alternatively, for example, a noise current leaked from the side of the first device 300 may flow into the high current paths 111 and 112 through the second device 200 via the ground (e.g., the reference potential 1), thereby generating the noise currents $I_n$.

The noise currents In generated in the same direction on the high current paths 111 and 112 may be referred to as a common-mode noise current. In addition, the common-mode noise voltage (not shown) may be a voltage generated between the ground (e.g., the reference potential 1) and the high current paths 111 and 112 rather than a voltage generated between the high current paths 111 and 112.

For example, the noise current $I_n$ may be a noise current due to a parasitic capacitance between the first device 300 and the surrounding environment. The noise current In may correspond to the above-described first current (e.g., I11, I12, I13, I14, or the like).

For example, the side of the first device 300 may correspond to a noise source, whereas the side of the second device 200 may correspond to a noise receiver.

The sensing unit 120 may sense the noise currents In on two or more high current paths 111 and 112, and generate output signals corresponding to the noise currents In toward the first to Nth amplifying units 131 to 133.

For example, the sensing unit 120 may be formed by re-winding an electric wire of the side of each of the amplifying units 131 and 132 on a CM choke on which power lines corresponding to the high current paths 111 and 112 is wound. The sensing unit 120 may induce the output signal (e.g., an induced voltage or an induced current), which is generated on the basis of the noise current $I_n$ on the high current paths 111 and 112, to an electric wire of the side of each of the first to Nth amplifying units 131 to 133 in a state of being isolated from the high current paths 111 and 112. That is, the sensing unit 120 may generate a plurality of output signals. The output signals (e.g., an induced voltage or an induced current) may be input signals of the first to Nth amplifying units 131 to 133. However, this is merely an embodiment.

Output signals. The output signals (e.g., an induced voltage or an induced current) may be input signals of the first to Nth amplifying units 131 to 133. However, this is merely an embodiment. 112. That is, the sensing unit 120 may generate a pluraling units on the basis of the noise current $I_n$ generated on the high current paths 111 and 112. The output signals from the sensing unit 120 may be respectively input to the plurality of amplifying units.

The first to Nth amplifying units 131 to 133 are illustrated in FIG. 40, but since N is a natural number greater than or equal to two, it goes without saying that the amplifying unit of the active compensating device according to various embodiments may include only two first and second amplifying units 131 and 132. Hereinafter, the first to Nth amplifying units 131 to 133 will be described as an example.

According to an embodiment, the sensing unit 120 may be differentially connected to input terminals of each of the first to Nth amplifying units 131 and 132.

The first to Nth amplifying units 131 to 133 may be electrically connected to the sensing unit 120, and may each amplify the output signal output by the sensing unit 120 to generate an amplified output signal. The amplifying units 131, 132, and 133 may be implemented by various means, and may each include active elements. In an embodiment, each of the amplifying units 131, 132, and 133 may include at least one of an OP-AMP and a BJT.

Each of the amplifying units 131, 132, and 133 may receive power from the third device 400 that is distinguished from the first device 300 and/or the second device 200 and generate an amplified current or voltage by amplifying the output signal output by the sensing unit 120.

Each of the plurality of amplifying units 131, 132, and 133 may be implemented by the above-described various amplifying units.

The output signal (e.g., current or voltage) amplified by each of the amplifying units 131, 132, and 133 may be input to the compensating unit 160. For example, the first amplifying unit 131 may output a first amplified current (or a first amplified voltage) toward the compensating unit 160, and the second amplifying unit 132 may output a second amplified current (or a second amplified voltage) toward the compensating unit 160, and the Nth amplifying unit 133 may output an Nth amplified current (or an Nth amplified voltage) toward the compensating unit 160.

The compensating unit 160 may generate a compensation current or a compensation voltage on the basis of the amplified signal output from each of the first to Nth amplifying units 131 to 133.

According to an embodiment, the compensating unit 160 may generate the compensation current on the basis of the first amplified current output from the first amplifying unit 131, the second amplified current output from the second amplifying unit 132, and the Nth amplified current output from the Nth amplifying unit 133. The compensation current may be injected into or drawn out of the high current paths 111 and 112 to cancel or reduce the noise current $I_n$ on the high current paths 111 and 112.

The compensation current may be injected into the high current paths 111 and 112 to cancel the noise current $I_n$, or may reduce the noise current $I_n$ by allowing at least a portion of the noise current $I_n$ to flow to the ground (e.g., the reference potential 1). In this case, the compensating unit 160 may correspond to current compensation. A detailed description of the current compensation will be made below with reference to FIGS. 41, 42, 48, and 49.

According to another embodiment, the compensating unit 160 may generate compensation voltages in series to the high current paths 111 and 112 on the basis of the first amplified voltage output from the first amplifying unit 131 and the second amplified voltage output from the second amplifying unit 132. An output side of the compensating unit 160 may generate the compensation voltages in series to the high current paths 111 and 112, but may be isolated from the amplifying units 131 and 132. For example, the compensating unit 160 may be formed of a compensating transformer for the isolation. The compensation voltage may have an effect of suppressing the noise current $I_n$ flowing through the high current paths 111 and 112. In this case, the compensating unit 160 may correspond to voltage compensation. A detailed description of the voltage compensation will be made below with reference to FIGS. 43 to 45.

The compensating unit 160 may be a feedforward type compensating unit that compensates for noise input from the side of the first device 300 at a front end thereof, which is a power source side. However, the present disclosure is not limited thereto, and the active compensating device 106 may include a compensating unit that compensates for the noise at a rear end thereof.

Figure 41:
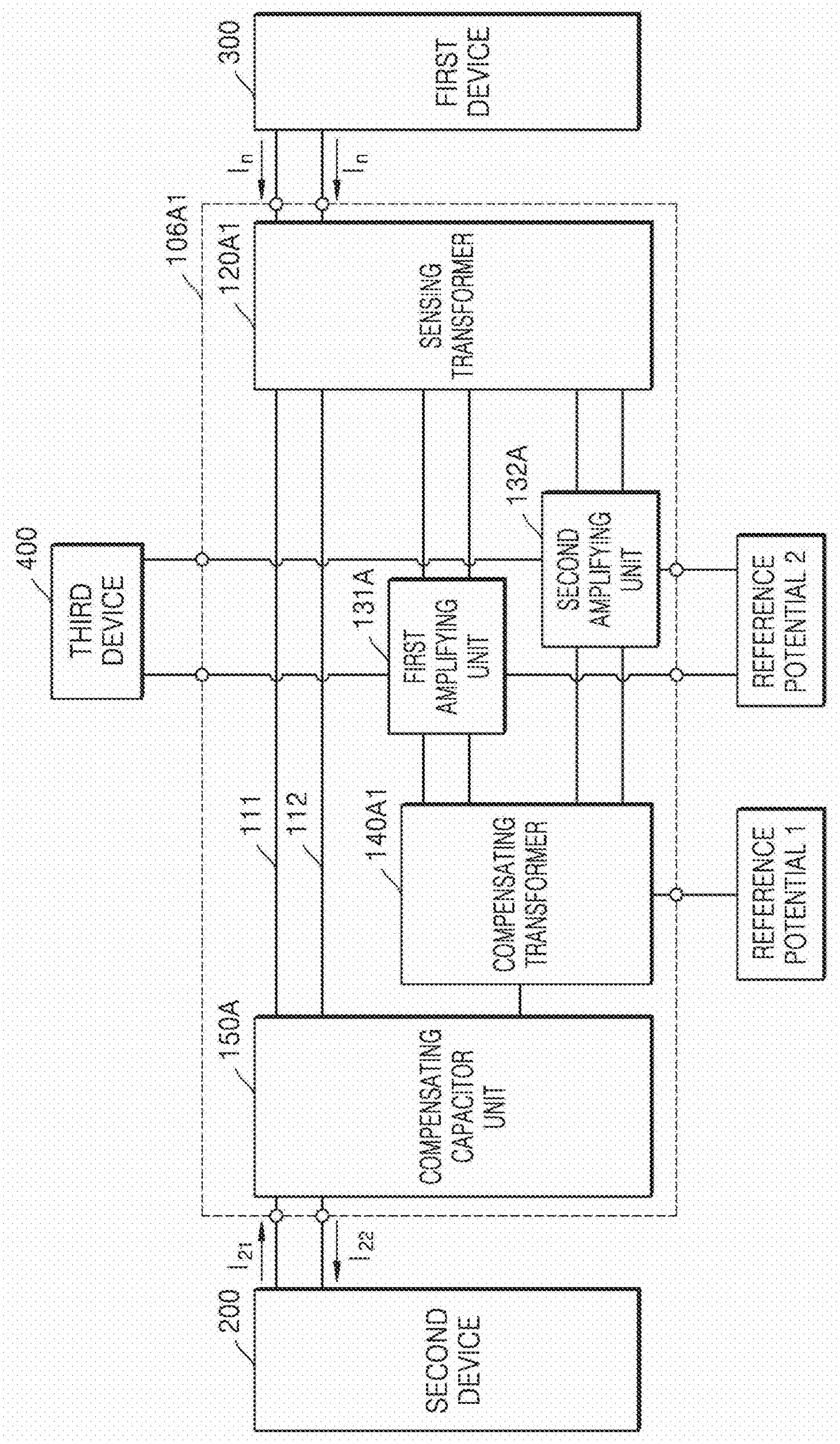
FIG. 41 shows a more specific example of an embodiment in which two amplifying units are used among the contents shown in FIG. 40.
Figure 42:
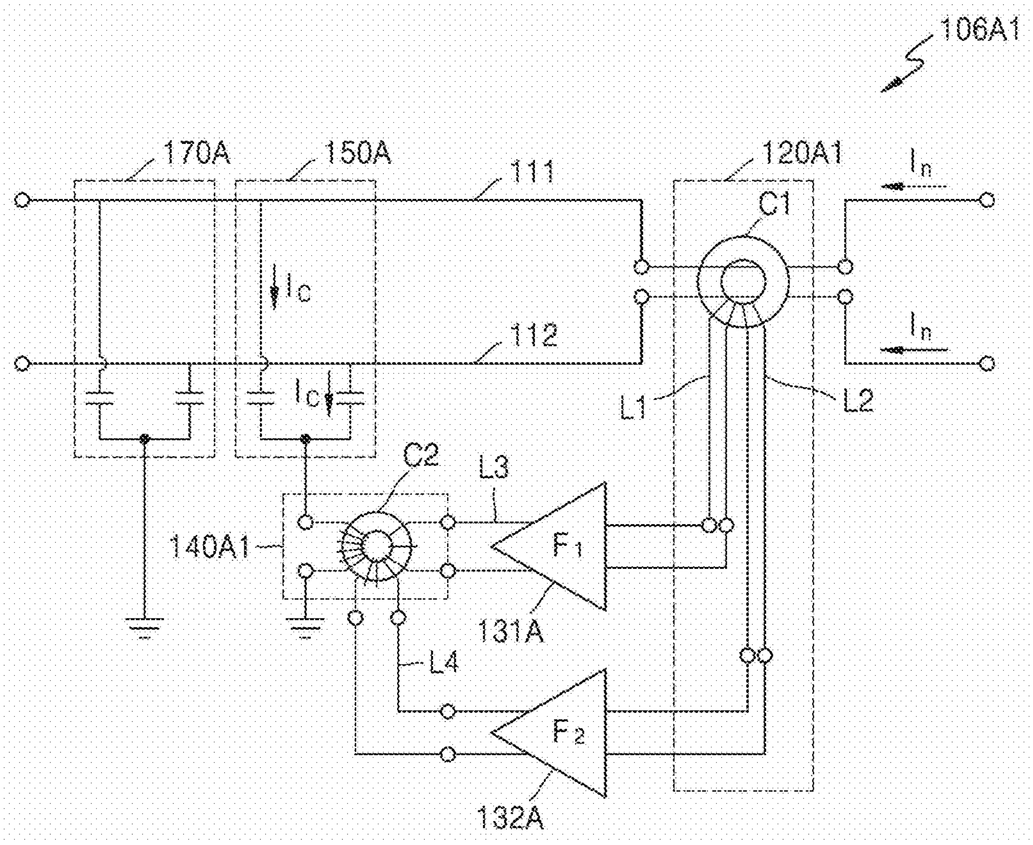
FIG. 42 a schematic view of a specific example of an active compensating device.

FIG. 41 shows a more specific example of an embodiment using two amplifying units among the contents described with reference to FIG. 40, and is a schematic view of a system including an active compensating device 106A1 according to an embodiment of the present disclosure. FIG. 42 is a schematic view of a specific example of the active compensating device 106A1.

Referring to FIGS. 41 and 42, the active compensating device 106A1 according to an embodiment of the present disclosure may include a sensing transformer 120A1, a first amplifying unit 131A, a second amplifying unit 132A, a compensating transformer 140A1, and a compensating capacitor unit 150A. The above-described compensating unit 160 may be implemented by, for example, the compensating transformer 140A1 and the compensating capacitor unit 150A.

According to an embodiment, the sensing transformer 120A1 is an example of the above-described sensing unit 120, and the first and second amplifying units 131A and 132A are examples of the above-described first and second amplifying units 131 and 132. Therefore, the descriptions of the above-described sensing unit 120 and first and second amplifying units 131 and 132 may correspond to descriptions of the sensing transformer 120A1 and the first and second amplifying units 131A and 132A. Thus, descriptions of contents overlapping with the contents described with reference to FIG. 40 will be omitted.

In an embodiment, the sensing transformer 120A1 may sense a voltage, which is induced at both ends of the sensing transformer 120A1 and caused by noise currents In input through the high current paths 111 and 112 (e.g., power lines).

The sensing transformer 120A1 may include a primary side (e.g., a primary winding) corresponding to a core C1 and high current paths 111 and 112 (e.g., power lines) and a secondary side (e.g., a secondary winding) connected input terminals of each of the amplifying units 131A and 132A. As an example, the high current paths 111 and 112 corresponding to the primary side pass through the core C1, and an electric wire of the side of the amplifying unit corresponding to the secondary side may be wound around the core C1. However, the present disclosure is not limited thereto.

According to an embodiment, the primary side of the sensing transformer 120A1 may be formed by passing or winding each of a first high current path 111 and a second high current path 112 through or around the core C1.

According to an embodiment, the secondary side of the sensing transformer 120A1 may have a form in which each of first electric wires L1 differentially connected to the input terminals of the first amplifying unit 131A and second electric wires L2 differentially connected to the input terminals of the second amplifying unit 132A is wound around the core C1.

The sensing transformer 120A1 may generate an induced current or an induced voltage, which is directed to the secondary side, on the basis of magnetic flux densities induced due to the noise current In at the primary side thereof in which the high current paths 111 and 112 pass through the core C1.

According to an embodiment of the present disclosure, the sensing transformer 120A1 may output a signal that is input to the first amplifying unit 131A and a signal that is input to the second amplifying unit 132A on the basis of the noise current In. That is, the sensing transformer 120A1 may output a plurality of output signals in parallel through the secondary side thereof.

For example, when a case of using two parallel amplifying units is described as an example, a first induced current generated in the first electric wires L1 on the secondary side of the sensing transformer 120A1 may be differentially input to the first amplifying unit 131A, and a second induced current generated in the second electric wires L2 on the secondary side of the sensing transformer 120A1 may be differentially input to the second amplifying unit 132A.

Alternatively, for example, depending on the configuration of the amplifying units 131A and 132A, the first electric wires L1 on the secondary side of the sensing transformer 120A1 may be disposed on a path connecting the input terminals of the first amplifying unit 131A and a reference potential (the reference potential 2) of the first amplifying unit 131A. That is, one end of the first electric wire L1 on the secondary side may be connected to the input terminal of the first amplifying unit 131A, and the other end of the first electric wire L1 on the secondary side may be connected to the reference potential (the reference potential 2) of the first amplifying unit 131A. Similarly, the second electric wires L2 on the secondary side of the sensing transformer 120A1 may be disposed on a path connecting the input terminals of the second amplifying unit 132A and a reference potential (reference potential 2) of the second amplifying unit 132A.

For example, in the sensing transformer 120A1, when a turns ratio of the primary side and the first electric wire L1 on the secondary side is $1:N_{sen1}$, a current induced in the first electric wires L1, that is, a current input to the first amplifying unit 131A is $I_n/2N_{sen1}$. In addition, in the sensing transformer 120A1, when a turns ratio of the primary side and the second electric wire L2 on the secondary side is $1:N_{sen2}$, a current induced in the second electric wire L2, that is, a current input to the second amplifying unit 132A is $I_n/2N_{sen2}$. That is, the first and second amplifying units 131A and 132A may be divided into two amplifying units to sense the noise current $I_n$ in parallel.

Therefore, according to an embodiment, when the number of windings of the first electric wire L1 and the number of windings of the second electric wire L2 are the same, the current input to the first amplifying unit 131A and the current input to the second amplifying unit 132A may be equal to or correspond to each other. That is, when the number of windings of the first electric wire L1 and the number of windings of the second electric wire L2 are the same, the output current caused by sensing the noise current $I_n$ may be divided by ½ and input to each of the first amplifying unit 131A and the second amplifying unit 132A. However, the present disclosure is not limited thereto, and according to other embodiments, the number of windings of the first electric wire L1 and the number of windings of the second electric wire L2 may be different from each other. In this case, the input current of the first amplifying unit 131A and the input current of the second amplifying unit 132A may also be different from each other.

The first amplifying unit 131A may amplify the first induced current, which is induced in the first electric wire L1 on the secondary side, according to a gain (e.g., F1) of the first amplifying unit 131A. Similarly, the second amplifying unit 132A may amplify the second induced current, which is induced in the second electric wire L2 on the secondary side, according to a gain (e.g., F2) of the second amplifying unit 132A.

According to an embodiment, the gain F1 of the first amplifying unit 131A and the gain F2 of the second amplifying unit 132A may be designed to have the same magnitude. For example, it may be designed to satisfy F1=−F2. In this case, the first amplifying unit 131A and the second amplifying unit 132A may operate complementary to each other. For example, the first amplifying unit 131A and the second amplifying unit 132A may each operate as a full-bridge amplifier.

However, the present disclosure is not limited thereto, and according to an embodiment, the gain F1 of the first amplifying unit 131A and the gain F2 of the second amplifying unit 132A may be different from each other.

The compensating transformer 140A1 and the compensating capacitor unit 150A may correspond to the above-described compensating unit 160. Each of the current amplified by the first amplifying unit 131A and the current amplified by the second amplifying unit 132A flows toward the primary side of the compensating transformer 140A1.

The compensating transformer 140A1 may include a primary side (e.g., a primary winding) connected to a core C2 and output terminals of each of the amplifying units 131A and 132A, and a secondary side (e.g. a secondary winding) connected to the high current paths 111 and 112. The compensating transformer 140A1 may have a form in which primary side electric wires L3 and L4 and a secondary side electric wire are wound around one core C2. The primary side of the compensating transformer 140A1 may have a form in which each of the electric wire L3 through which the output current of the first amplifying unit 131A flows and the electric wire L4 through which the output current of the second amplifying unit 132A flows is wound around the core C2.

The compensating transformer 140A1 may generate an induced current, which is toward the secondary side electric wire, on the basis of magnetic flux densities induced due to the currents flowing in the primary side.

Meanwhile, each of the third electric wire L3 through which the current output from the first amplifying unit 131A flows and the fourth electric wire L4 through which the current output from the second amplifying unit 132A flows is wound around on the primary side of the compensating transformer 140A1.

According to an embodiment, $F\mathbf{1}*I_n/2N_{sen1}$, which is the output current of the first amplifying unit 131A, may flow through the third electric wire L3. In addition, $F\mathbf{2}*I_n/2N_{sen2}$, which is the output current of the second amplifying unit 132A, may flow through the fourth electric wire L4.

For example, in the compensating transformer 140A1, a turns ratio of the third electric wire L3 on the primary side and the secondary side is $11:N_{inj1}$, and a turns ratio of the fourth electric wire L4 on the primary side and the secondary side is $1:N_{inj2}$, a current induced on the secondary side of the compensating transformer 140A1 may be equal to $F\mathbf{1}*In/2(N_{sen1}*N_{inj1})+F\mathbf{2}*I_n/2(N_{sen2}*N_{inj2})$.

According to an embodiment, the first amplifying unit 131A and the input/output terminals thereof, and the second amplifying unit 132A and the input/output terminals thereof may be symmetrical to each other (that is F1=F2, $N_{sen1}=N_{sen2}$, and $N_{inj1}=N_{inj2}$). However, the present disclosure is not limited thereto.

The current (i.e., a secondary side current) converted through the compensating transformer 140A1 may be injected into as a compensation current $I_c$ V or drawn out of the high current paths 111 and 112 (e.g., power lines) through the compensating capacitor unit 150A.

In an embodiment, when the compensation current $I_c$ is injected into the high current paths 111 and 112, in order to cancel the noise current In, the compensation current $I_c$ may have a phase opposite to that of the noise current In. In an embodiment, when the compensation current $I_c$ is drawn out of the high current paths 111 and 112, the compensation current $I_c$ may be proportional to the noise current In. Thus, the active compensating device 106A1 may reduce noise.

The first and second amplifying units 131A and 132A of the active compensating device 106A1 according to an embodiment of the present disclosure may receive and generate twice a current swing for the same DC voltage supply (e.g., voltage supply from the third device 400) using a full-bridge circuit.

Meanwhile, referring to FIG. 42, the active compensating device 106A1 according to an embodiment of the present disclosure may further include a decoupling capacitor unit 170A. A description of the decoupling capacitor unit 170A corresponds to the description of the decoupling capacitors 170 and 170A of FIGS. 14 and 15, and thus will be omitted.

Meanwhile, the amplifying unit according to the present disclosure is not limited to being composed of the first amplifying unit 131A and the second amplifying unit 132A, and may include a plurality of amplifying units including the first amplifying unit 131A, the second amplifying unit 132A, and an Nth amplifying unit (not shown), as shown in FIG. 40.

According to an embodiment, the plurality of amplifying units may be connected in parallel to each of the sensing transformer 120A1 and the compensating transformer 140A1 as shown in FIG. 42. A method in which the Nth amplifying unit (not shown) is connected to the sensing transformer 120A1 and the compensating transformer 140A1 may correspond to the method in which the first and second amplifying units 131A and 132A are connected to the sensing transformer 120A1 and the compensating transformer 140A1.

For example, referring to FIG. 42, Nth electric wires (not shown), which corresponds to the secondary side and is differentially connected to the input terminals of the Nth amplifying unit (not shown), may be additionally wound around the core C1 of the sensing transformer 120A1. For example, an Nth induced current generated through the Nth electric wire (not shown) on the secondary side of the sensing transformer 120A1 may be differentially input to the Nth amplifying unit.

In addition, the Nth amplifying unit (not shown) may output an output current on the basis of the input Nth induced current and a current gain of the Nth amplifying unit. The electric wire through which the output current of the Nth amplifying unit flows may be additionally wound around the core C2 of the compensating transformer 140A1. In this case, the compensating transformer 140A1 may generate a compensation current on the basis of the output current of each of the first, second, and Nth amplifying units and the turns ratio of each output terminal.

Figure 43:
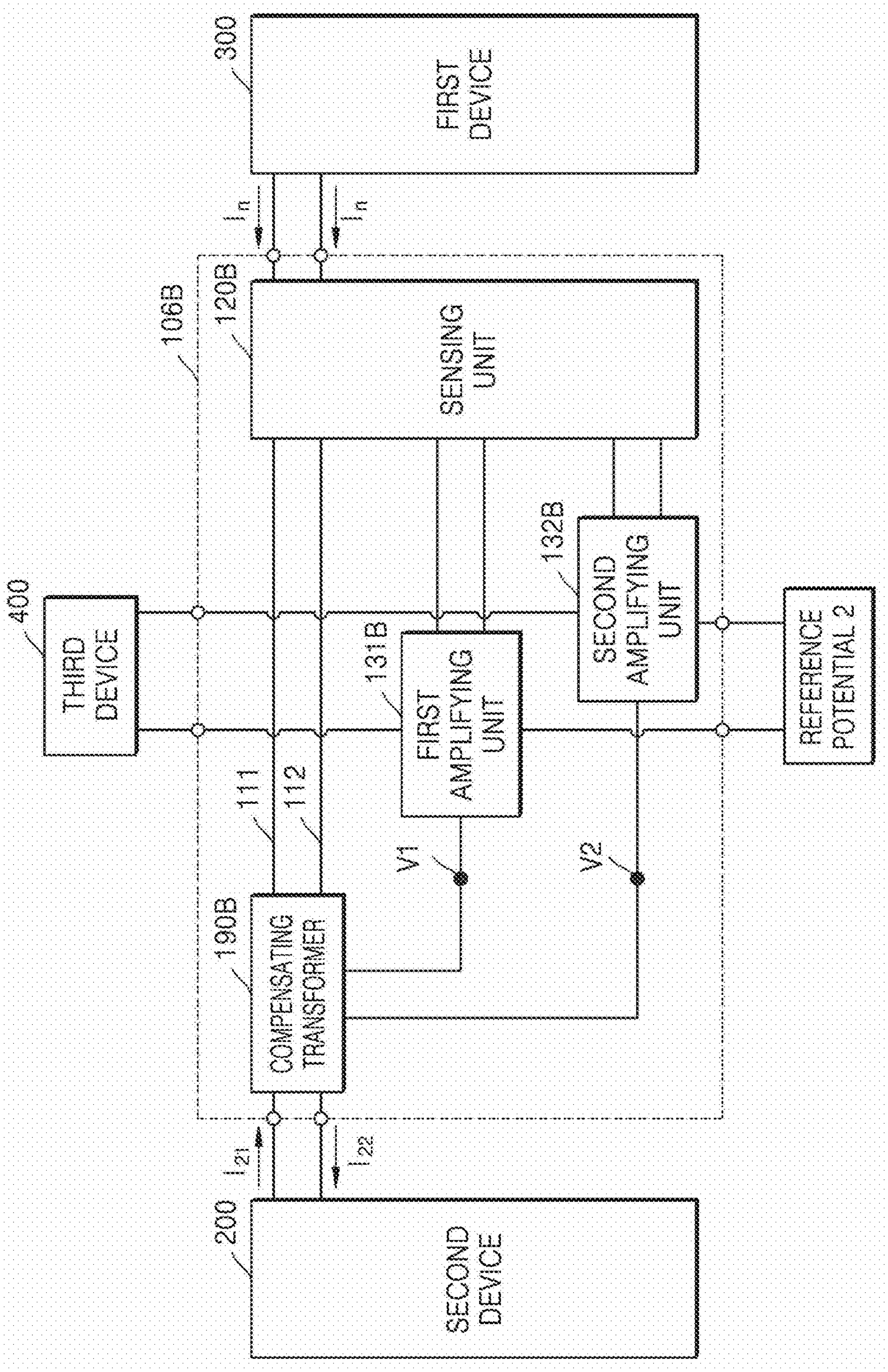
FIG. 43 a shows a more specific example of the embodiment described with reference to FIG. 40, and is a schematic view of a system including an active compensating device according to an embodiment of the present disclosure.

FIG. 43 shows a more specific example of the embodiment described with reference to FIG. 40, and is a schematic view of a system including an active compensating device 106B according to an embodiment of the present disclosure.

Figure 44:
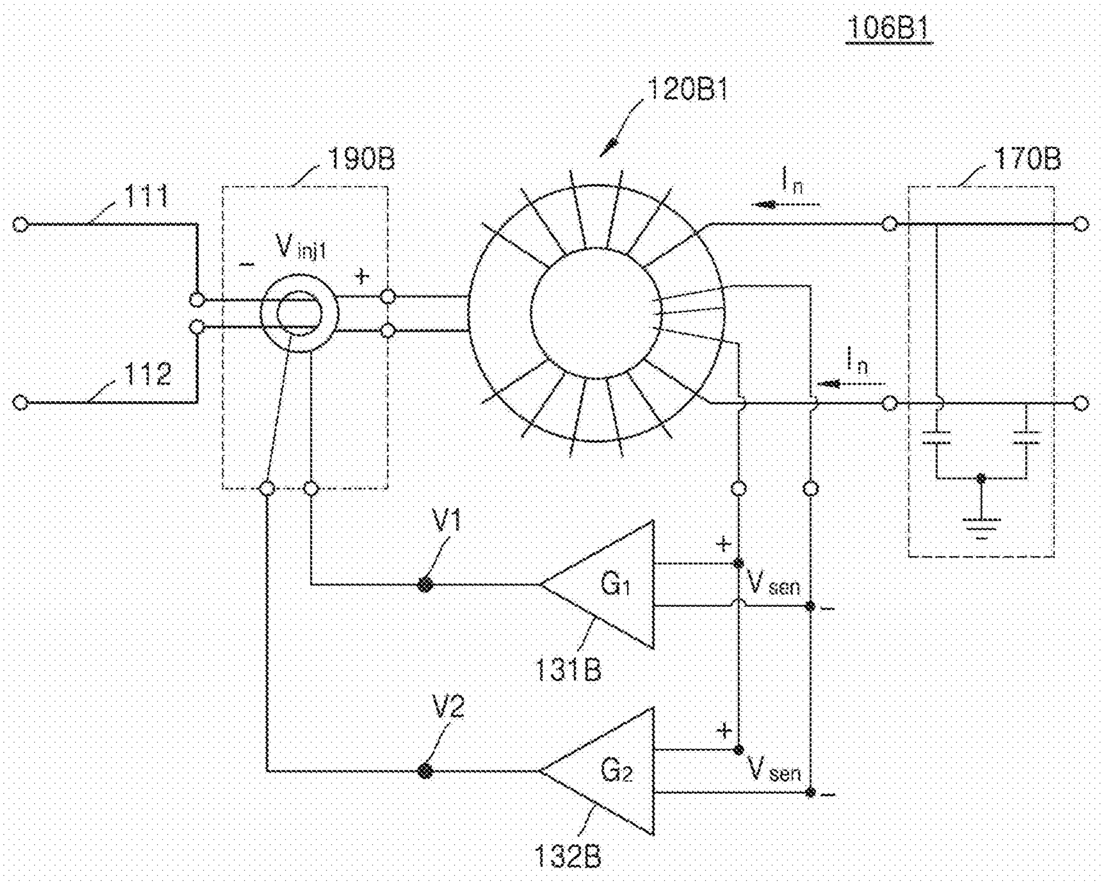
FIG. 44 is a schematic view of a compensating device as an example of a compensating device shown in FIG. 43.
Figure 45:
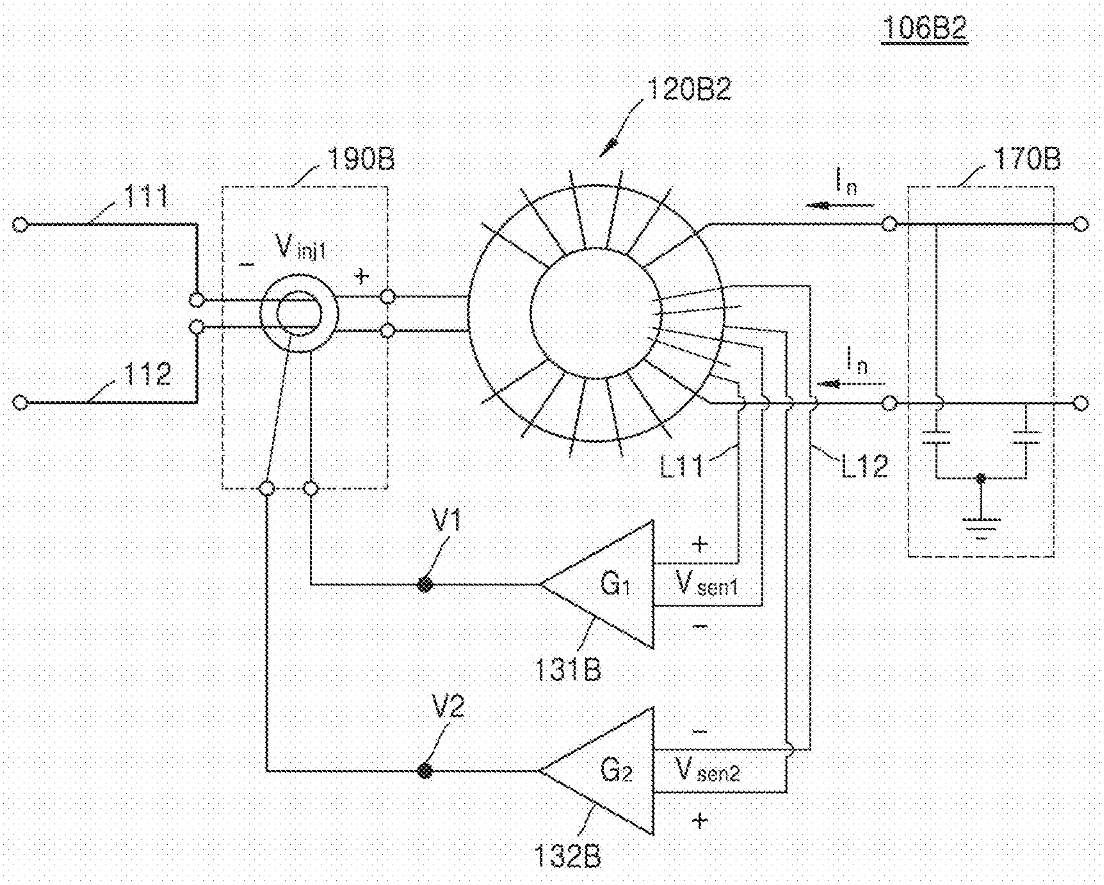
FIG. 45 is a schematic view of an active compensating device as another example of the active compensating device shown in FIG. 43.

FIG. 44 is a schematic view of a compensating device 106B1 illustrating as an example of the compensating device 106B shown in FIG. 43, and FIG. 45 is a schematic view of an active compensating device 106B2 illustrating as another example of the active compensating device 106B shown in FIG. 43.

Referring to FIG. 43, the compensating device 106B may include a sensing unit 120B, a first amplifying unit 131B, a second amplifying unit 132B, and a compensating transformer 190B. The sensing unit 120B, the first and second amplifying units 131B and 132B, and the compensating transformer 190B are examples of the above-described sensing unit 120, the first and second amplifying units 131 and 132, and the compensating unit 160, respectively. The descriptions of contents overlapping with those described above will be omitted.

The sensing unit 120B may output a first output signal and a second output signal on the basis of noise currents In, the first output signal may be input to the first amplifying unit 131B, and the second output signal may be input to the second amplifying unit 132B. For example, the first output signal may be input as a differential voltage to input terminals of the first amplifying unit 131B, and the second output signal may be input as a differential voltage to input terminals of the second amplifying unit 132B. According to the configuration of the sensing unit 120B, the first output signal and the second output signal may be the same or different from each other.

The first amplifying unit 131B may output a first output voltage V1 corresponding to a product of a voltage input to the first amplifying unit 131B and a voltage gain of the first amplifying unit 131B. The second amplifying unit 132B may output a second output voltage V2 corresponding to a product of a voltage input to the second amplifying unit 132B and a voltage gain of the second amplifying unit 132B. The first and second output voltages V1 and V2 may denote potentials with respect to the reference potential 2 of the amplifying units 131B and 132B, respectively.

In the compensating device 106B according to an embodiment of the present disclosure, a difference between the first output voltage V1 and the second output voltage V2 may be input to the compensating transformer 190B. That is, the difference between the first output voltage V1 and the second output voltage V2 may correspond to an input voltage of the compensating transformer 190B.

The compensating transformer 190B may be an example of the above-described compensating unit 160. In other words, in the compensating device 106B according to an embodiment, the above-described compensating unit 160 may be implemented as the compensating transformer 190B.

The voltage applied to a primary side of the compensating transformer 190B may correspond to the difference between the output voltage V1 of the first amplifying unit 131B and the output voltage of the second amplifying unit 131B described above.

The compensating transformer 190B may induce a compensation voltage in series to high current paths 111 and 112, which are on a secondary side of the compensating transformer 190B, on the basis of the voltage applied to the primary side. The compensation voltage generated in series to the high current paths 111 and 112 may have an effect of suppressing the noise currents In flowing through the high current paths 111 and 112.

In FIG. 43, the compensating transformer 190B is illustrated as generating the compensation voltage at a front end thereof (i.e., between the sensing unit 120B and the second device 200), which is on the power source side, but the present disclosure is not limited thereto. As an example, the compensating transformer 190B may generate the compensation voltage on the high current paths 111 and 112 between the sensing unit 120B and the first device 300.

Hereinafter, the compensating devices 106B1 and 106B2 that are examples of the compensating device 106B will be described with reference to FIGS. 44 and 45.

The amplifying units 131B and 132B and the compensating transformer 190B of each of the compensating device 106B1 and the compensating device 106B2 may correspond to each other. According to an embodiment, a sensing unit 120B1 of the compensating device 106B1 and a sensing unit 120B2 of the compensating device 106B2 may be different from each other.

The sensing units 120B1 and 120B2 of the compensating devices 106B1 and 106B2 according to an embodiment may each have a form in which an electric wire of a secondary side is re-wound around a CM choke around which a first high current path 111 and a second high current path 112 are wound. As described above, when each of the sensing units 120B1 and 120B2 is formed using the CM choke, the sensing units 120B1 and 120B2 may not only perform a function of sensing and transforming, but also serve as a passive filter as a CM choke.

That is, when the sensing units 120B1 and 120B2 are formed by re-winding the secondary side electric wire around the CM choke, the sensing units 120B1 and 120B2 may not only perform a function of sensing and transforming the noise current In, but also serve to suppress or block the noise current In.

A primary side of each of the sensing units 120B1 and 120B2 may be a winding in which the first high current path 111 and the second high current path 112 are wound around the CM choke.

Meanwhile, in an embodiment (see FIG. 44), in the secondary side of the sensing unit 120B1, a single electric wire may be re-wound around the CM choke. The single electric wire may be connected in parallel to the input terminals of the first amplifying unit 131B, and simultaneously connected in parallel to the input terminals of the second amplifying unit 132B. For example, a voltage $V_{sen}$ induced on the secondary side of the sensing unit 120B1 is differentially input to the input terminals of the first amplifying unit 131B, and simultaneously differentially input to the input terminals of the second amplifying unit 132B.

In the embodiment described with reference to FIG. 44, for example, the voltage $V_{sen}$ induced on the secondary side of the sensing unit 120B1 may be equally input to the first amplifying unit 131B and the second amplifying unit 132B.

The first amplifying unit 131B may output a first output voltage V1 corresponding to a value obtained by multiplying the differential input voltage $V_{sen}$ of the first amplifying unit 131B by a voltage gain G1 of the first amplifying unit 131B. The second amplifying unit 132B may output a second output voltage V2 corresponding to a value obtained by multiplying the differential input voltage $V_{sen}$ of the second amplifying unit 132B by a voltage gain G2 of the second amplifying unit 132B. The first output voltage V1 and the second output voltage V2 may be potentials based on the reference potential 2 of the amplifying units 131B and 132B. A difference between the first output voltage V1 and the second output voltage V2 may be an input voltage of the compensating transformer 190B. According to the embodiment described with reference to FIG. 44, G1=−G2 may be satisfied.

Meanwhile, in an embodiment (see FIG. 45), in the secondary side of the sensing unit 120B2, an electric wire corresponding to each of the first amplifying unit 131B and the second amplifying unit 132B may be re-wound around the CM choke. For example, the secondary side of the sensing unit 120B2 may have a form in which each of first electric wires L11 differentially connected to the input terminals of the first amplifying unit 131B and second electric wires L12 differentially connected to the input terminals of the second amplifying unit 132A is wound around the CM choke.

For example, a voltage $V_{sen1}$ induced on the first electric wires L11 of the secondary side of the sensing unit 120B2 may be differentially input to the first amplifying unit 131B, and a voltage $V_{sen2}$ induced on the second electric wires L12 of the secondary side of the sensing unit 120B2 may be differentially input to the second amplifying unit 132B.

In the embodiment described with reference to FIG. 45, the differential input voltage $V_{sen1}$ of the first amplifying unit 131B and the differential input voltage $V_{sen2}$ of the second amplifying unit 132B may be generated on the basis of the number of turns of the first electric wires L11 on the secondary side and the number of turns of second electric wires L12 on the secondary side. According to an embodiment, the first electric wires L11 and the second electric wires L12 may be wound so as to generate input voltages of opposite phases to the respective amplifying units 131B and 132B. For example, when the number of turns of each of the first electric wire L11 and the second electric wire L12 on the secondary side is the same, the differential input voltages $V_{sen1}$ and $V_{sen2}$ of the respective amplifying units 131B and 132B may have the same magnitude and opposite phases. That is, $V_{sen1}=-V_{sen2}$ may be satisfied. For example, the input voltage $V_{sen1}$ of the first amplifying unit 131B may correspond to a value obtained by multiplying the voltage induced on the primary side (that is, on both ends of the CM choke) of the sensing unit 120B2 by a turns ratio of the primary side and the first electric wire L11 on the secondary side. The input voltage $V_{sen2}$ of the second amplifying unit 132B may correspond to a value obtained by multiplying the voltage induced on the primary side of the sensing unit 120B2 by a turns ratio of the primary side and the second electric wire L12 on the secondary side. According to the embodiment described with reference to FIG. 45, G1=+G2 may be satisfied.

The first amplifying unit 131B may output a first output voltage V1 corresponding to a value obtained by multiplying the input voltage $V_{sen1}$ of the first amplifying unit 131B by a voltage gain G1 of the first amplifying unit 131B. The second amplifying unit 132B may output a second output voltage V2 corresponding to a value obtained by multiplying the differential input voltage $V_{sen2}$ of the second amplifying unit 132B by a voltage gain G2 of the second amplifying unit 132B. The first output voltage V1 and the second output voltage V2 are potentials based on the reference potential 2 of the amplifying units 131B and 132B. A difference between the first output voltage V1 and the second output voltage V2 may be an input voltage of the compensating transformer 190B.

Meanwhile, referring to FIGS. 44 and 45 together again, the compensating transformer 190B may have a structure in which the primary side electric wire and the secondary side electric wire pass through one core or are wound therearound at least one time. The primary side electric wire may be an electric wire connecting an output terminal of the first amplifying unit 131B and an output terminal of the second amplifying unit 132B. The secondary side electric wire may correspond to the high current paths 111 and 112.

A potential difference between the output of the first amplifying unit 131B and the output of the second amplifying unit 132B may be a primary side voltage of the compensating transformer 190B, and the compensating transformer 190B may generate a compensation voltage $V_{inj1}$ in series to the high current paths 111 and 112, which are on the secondary side, on the basis of the potential difference.

The compensation voltage $V_{inj1}$ induced on the secondary side of the compensating transformer 190B may correspond to a value obtained by multiplying the potential difference of the output of the first amplifying unit 131B and the output of the second amplifying unit 132B by the turns ratio of the primary side and the secondary side.

The compensating devices 106B1 and 106B2 according to an embodiment may perform voltage compensation ($V_{inj1}$) on the high current paths 111 and 112, which may have an effect corresponding to an effect of increasing an inductance of the CM choke of each of the sensing units 120B1 and 120B2, thereby achieving an effect of suppressing the noise current $I_n$ (L boost type).

Meanwhile, each of the compensating devices 106B1 and 106B2 according to an embodiment may further include a decoupling capacitor unit 170B.

According to an embodiment, the decoupling capacitor unit 170B may be disposed between the sensing unit 120B1 or 120B2 and the first device 300. The decoupling capacitor unit 170B may include two Y-capacitors having one ends connected to the reference potential 1 and the other ends respectively connected to the high current paths 111 and 112.

Figure 46:
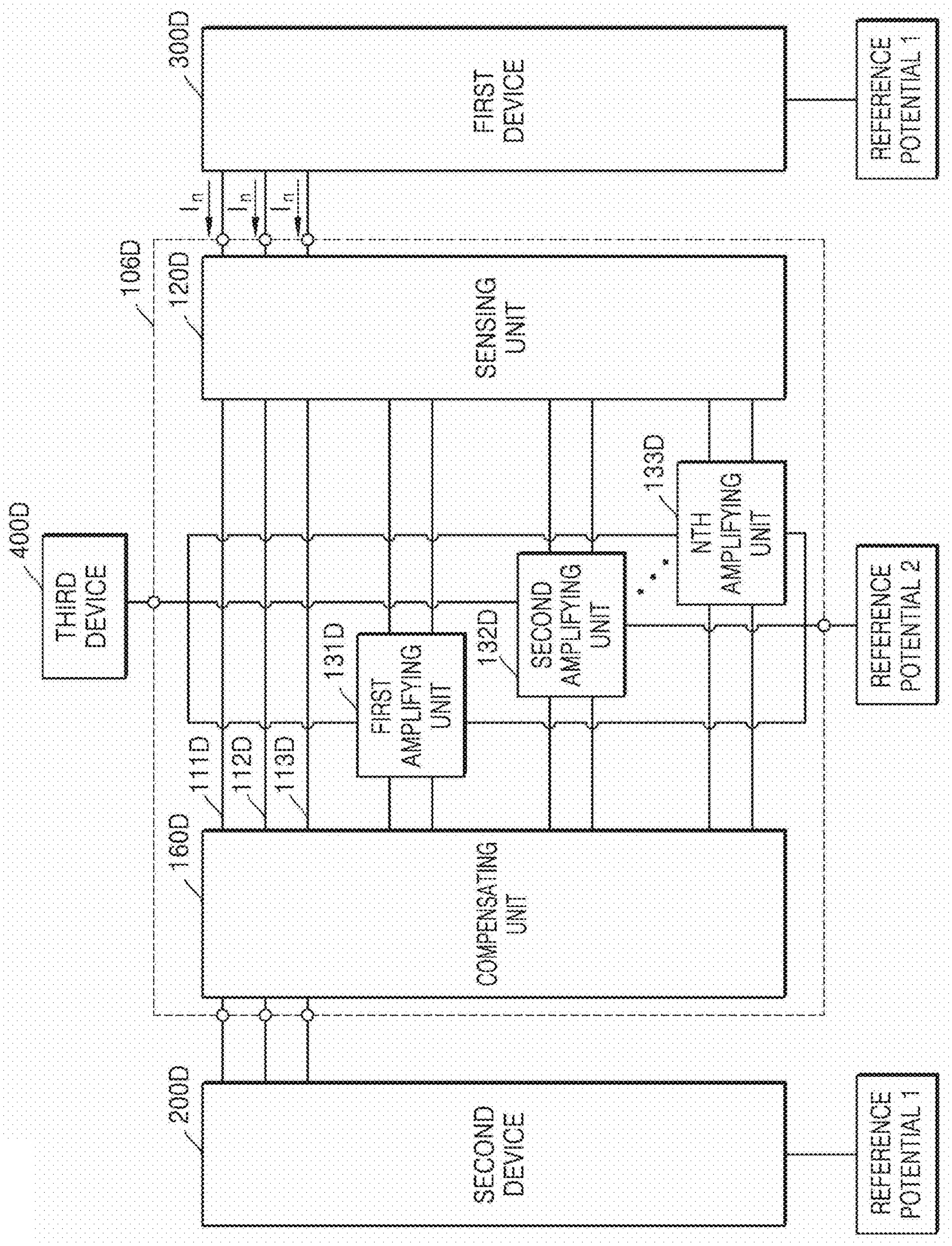
FIG. 46 is a schematic view of the configuration of a system including an active compensating device according to another embodiment of the present disclosure.

FIG. 46 is a schematic view of the configuration of a system including an active compensating device 106D according to another embodiment of the present disclosure. FIG. 46 is a diagram schematically showing the configuration in which various compensating devices (e.g., 106) as described above are used in a three-phase three-line system.

The compensating device 106D of FIG. 46 is different from the compensating device 106 in the single-phase two-line system described with reference to FIG. 40 in that the compensating device is used in a three-phase three-line system. Therefore, overlapping parts will be omitted, and differences will be mainly described.

When it is described in comparison with the above-described compensating device 106 (see FIG. 40), the compensating device 106D includes three high current paths 111D, 112D, and 113D, and thus, has differences in a primary side of a sensing unit 120D, and a secondary side of a compensating unit 160D.

According to an embodiment, a first high current path 111D may be an R-phase power line, a second high current path 112D may be an S-phase power line, and a third high current path 113D may be a T-phase power line. Noise currents $I_n$ may be input as a common-mode current to the first high current path 111D, the second high current path 112D, and the third high current path 113D, respectively.

The primary side of the sensing unit 120D may be disposed on each of the first high current path 111D, the second high current path 112D, and the third high current path 113D.

A secondary side of the sensing unit 120D may output a first output, a second output, and a third output in parallel to an input of a first amplifying unit 131D, an input of a second amplifying unit 132D, and an input of an Nth amplifying unit 133D, which are respectively corresponding to the first output, the second output, and the third output.

An input signal of a primary side of the compensating unit 160D may be based on an output signal output from each of the first, second, and N amplifying units 131D, 132D, and 133D.

The compensating unit 160D may correspond to the compensating transformer 140A and the compensating capacitor unit 150A, which perform current compensation as described above. Alternatively, the compensating unit 160D may correspond to the compensating transformer 190B, which performs voltage compensation as described above.

The secondary side of the compensating unit 160D may be disposed on each of the first high current path 111D, the second high current path 112D, and the third high current path 113D.

According to an embodiment, the compensating unit 160D may generate compensation voltages (i.e., secondary side voltages) in series in each of the three high current paths 111D, 112D, and 113D on the basis of voltages (i.e., primary side voltages) respectively output from the first and second amplifying units 131D and 132D. In this case, for example, the compensating unit 160D may include a compensating transformer (e.g., 190B).

According to another embodiment, the compensating unit 160D may inject a compensation current into each of the first high current path 111D, the second high current path 112D, and the third high current path 113D on the basis of induced currents, which are generated on the basis of currents respectively output from the first, second, and N amplifying units 131D, 132D, and 133D, or withdraw the compensation current to the reference potential 1. In this case, for example, the compensating unit 160D may include a compensating transformer (e.g., 140A1) and a compensating capacitor unit (e.g., 150A).

The active compensating device 106D according to the embodiment may compensate for common-mode noise on power lines of a three-phase three-line power system.

The compensating device 106D including a plurality of parallel amplifying units may be modified according to a three-phase four-line power system (see FIG. 12). A description of a compensating device for the three-phase four-line power system may correspond to the description given above with reference to FIG. 12.

FIG. 47 is a schematic view of the configuration of a system including an active compensating device 106F according to an embodiment of the present disclosure. As described above as another example of the embodiment described with reference to FIG. 40, the active compensating device 106F is a device of the embodiment of a type that senses noise at a front end, which is on a power source side, and returns to a rear end to perform compensation.

Figure 48:
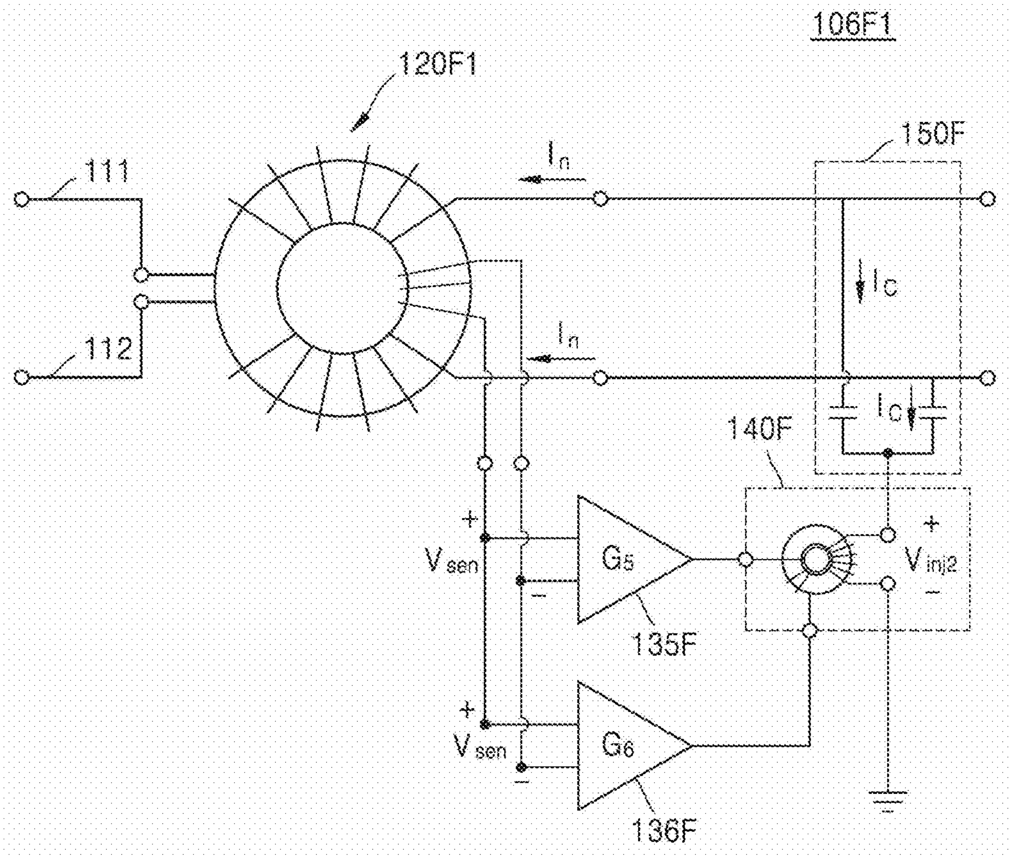
FIG. 48 is a schematic view of a compensating device illustrating as an example of the active compensating device shown in FIG. 47.
Figure 49:
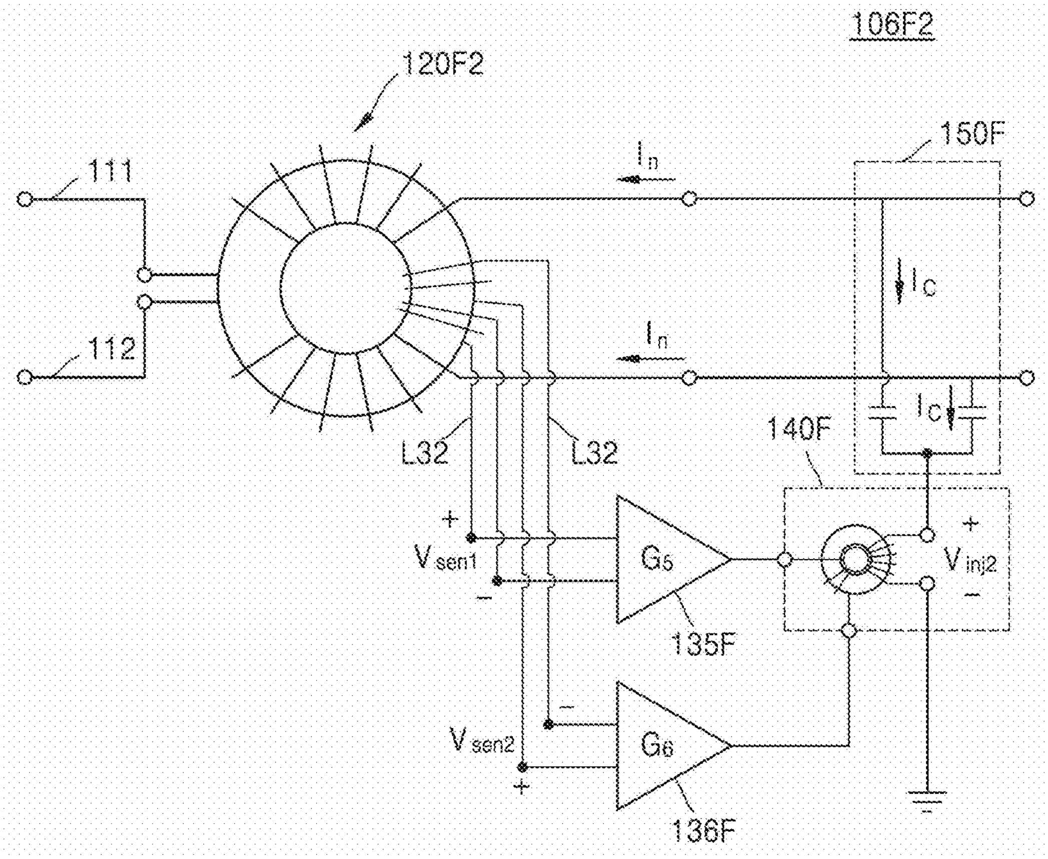
FIG. 49 is a schematic view of a compensating device illustrating as another example of the active compensating device shown in FIG. 47.

FIG. 48 is a schematic view of a compensating device 106F1 illustrating as an example of the active compensating device 106F shown in FIG. 47, and FIG. 49 is a schematic view of a compensating device 106F2 illustrating as another example of the active compensating device 106F shown in FIG. 47.

Referring to FIG. 47, the compensating device 106F may include a sensing unit 120F, a first amplifying unit 135F, a second amplifying unit 136F, and a compensating unit 160F. Referring to FIGS. 48 and 49, the compensating unit 160F may include a compensating transformer 140F and a compensating capacitor unit 150F.

The sensing unit 120F may sense noise currents In on high current paths 111 and 112 and output an output signal based on the noise currents In to each of the first and second amplifying units 135F and 136F. The sensing unit 120F may output a first output signal and a second output signal on the basis of the noise currents In, the first output signal may be input to the first amplifying unit 135F, and the second output signal may be input to the second amplifying unit 136F.

Referring to FIGS. 48 and 49, the sensing unit 120F may have a form in which a secondary side electric wire is re-wound around a CM choke around which a first high current path 111 and a second high current path 112 are wound. A primary side of each of sensing units 120F1 and 120F2 may be a winding in which each of the first high current path 111 and the second high current path 112 is wound around the CM choke.

Meanwhile, in an embodiment (refer to FIG. 48), a secondary side of the sensing unit 120F1 may have a form in which a single electric wire is re-wound around the CM choke. The single electric wire may be connected in parallel to input terminals of the first amplifying unit 135F and input terminals of the second amplifying unit 136F.

In this case, for example, a voltage $V_{sen}$ induced on the secondary side of the sensing unit 120F1 may be equally input to the first amplifying unit 135F and the second amplifying unit 136F. According to an embodiment, when a voltage gain of the first amplifying unit 135F is G5 and a voltage gain of the second amplifying unit 136F is G6, G5=−G6 may be satisfied. A difference between an output voltage of the first amplifying unit 135F and an output voltage of the second amplifying unit 136F may be an input voltage of the compensating unit 160F. That is, the difference may be an input voltage of the compensating transformer 140F.

Meanwhile, in an embodiment (see FIG. 49), a secondary side of the sensing unit 120F2 may have a form in which each of first electric wires L31 connected in parallel to input terminals of the first amplifying unit 135F and second electric wires L32 connected in parallel to input terminals of the second amplifying unit 136F is re-wound around the CM choke.

For example, a voltage $V_{sen1}$ induced in the first electric wires L31 on the secondary side of the sensing unit 120F2 may be differentially input to the first amplifying unit 135F. A voltage $V_{sen2}$ induced in the second electric wires L32 on the secondary side of the sensing unit 120F2 may be differentially input to the second amplifying unit 136F.

According to an embodiment, the first electric wires L31 and the second electric wires L32 may be wound so as to generate input voltages having the same magnitude and opposite phases to the first amplifying unit 135F and the second amplifying unit 136F. For example, when the number of turns of each of the first electric wire L21 and the second electric wire L22 on the secondary side is the same, $V_{sen1}=-V_{sen2}$ may be satisfied. In addition, when a voltage gain of the first amplifying unit 135F is G5 and a voltage gain of the second amplifying unit 136F is G6, G5=+G6 may be satisfied. A difference between an output voltage of the first amplifying unit 135F and an output voltage of the second amplifying unit 136F may be an input voltage of the compensating unit 160F. That is, the difference may be an input voltage of the compensating transformer 140F.

Meanwhile, referring to FIGS. 48 and 49 together again, the compensating transformer 140F may generate an induced voltage $V_{inj2}$ on a secondary side according to the input voltage and a turns ratio. The voltage $V_{inj2}$ converted through the compensating transformer 140F may withdraw a compensation current $I_c$ from the high current paths 111 and 112 (e.g., power lines) through the compensating capacitor unit 150F.

Meanwhile, it goes without saying that the compensating devices 106F, 106F1, and 106F2 shown in FIGS. 47, 48, and 49 are also applicable to the three-phase three-line system as shown in FIG. 46, and a three-phase four-line system.

According to an embodiment of the present disclosure, noise acceptable and compensable in the compensating devices (e.g., 106, 106A1, 106B, 106D, 106F, and the like) may increase in magnitude. For example, even for the same DC voltage supply (e.g., the voltage supplied from the third device 400), a noise current that may be accepted and compensated for by the active compensating device may be further increased in magnitude by using the parallel amplifying unit.

According to an embodiment of the present disclosure, even when the same noise is sensed and compensated for, stress received by the amplifying unit may be reduced. Specifically, a maximum noise tolerance may be increased in a limited DC voltage (e.g., the voltage supplied from the third device 400) by using a plurality of parallel amplifying units.

In addition, even when the compensating devices (e.g., 106, 106A1, 106B, 106D, 106F, and the like) according to various embodiments are used for high power, the degree of increase in size or the degree of increase in price may be insignificant, unlike the case in which only the CM choke is used alone.

Figure 50:
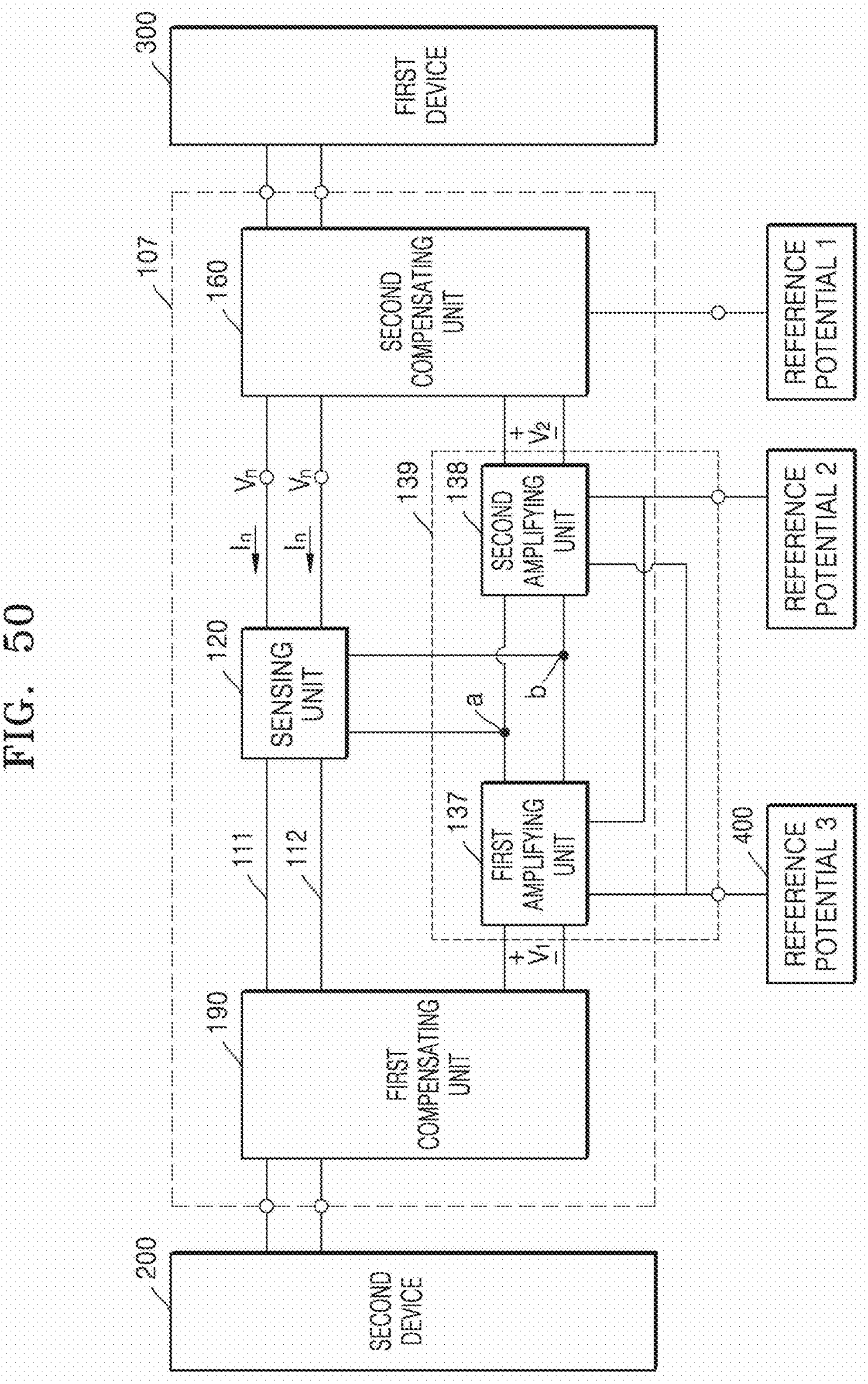
FIG. 50 is a schematic view of the configuration of a system including a compensating device according to an embodiment of the present disclosure.

FIG. 50 is a schematic view of the configuration of a system including a compensating device 107 according to an embodiment of the present disclosure. The compensating device 107 may actively compensate for a current In (e.g., an EMI noise current) or a voltage $V_n$ (e.g., an EMI noise voltage), which is generated as a common-mode current or voltage on two or more high current paths 111 and 112 from the first device 300.

Referring to FIG. 50, the compensating device 107 may include a sensing unit 120, an amplifying unit 139, a first compensating unit 190, and a second compensating unit 160. The amplifying unit 139 may include a first amplifying unit 137 and a second amplifying unit 138.

For example, the sensing unit 120 may correspond to the above-described sensing units (e.g., 120, 120A, and the like), the first compensating unit 190 may correspond to the compensating transformer 190B described with reference to FIGS. 43 to 45, and the second compensating unit 160 may correspond to the above-described compensating units (e.g., 160, 160A, and the like). Therefore, descriptions identical to those already given above will be omitted as much as possible.

A description of the noise current In and the noise voltage $V_n$ will be replaced with the description of the noise current and the noise voltage described above with reference to FIG. 40.

The two or more high current paths 111 and 112 may be paths through which the noise current In from the side of the first device 300 is transmitted to the second device 200. Alternatively, these may be paths on which the noise voltage $V_n$ is generated with respect to the ground (e.g., the reference potential 1).

The noise current $I_n$ or the noise voltage $V_n$ may be input to as a common-mode current or voltage with respect to each of the two or more high current paths 111 and 112.

In the drawing, the noise current In and the noise voltage $V_n$ are shown between a node, at which the second compensating unit 160 and the high current paths 111 and 112 meet, and the sensing unit 120, and as used herein, the terms the "noise current" or "noise voltage" are not limited thereto, and may refer to a current or voltage that may be generated as a common-mode current or voltage with a first frequency across the entire high current paths 111 and 112.

Meanwhile, the two or more high current paths 111 and 112 may include two paths as shown in FIG. 1, three paths (e.g., a three-phase three-line power system), or four paths (e.g., a three-phase four-line power system).

The sensing unit 120 may sense the noise current In on the two or more high current paths 111 and 112, and may generate an output signal corresponding to the noise current In toward the amplifying unit 139.

In order for the sensing unit 120 to sense the noise current In, at least some portions of the high current paths 111 and 112 may pass through the sensing unit 120, but a portion of the sensing unit 120, which generates the output signal according to the sensing, may be isolated from the high current paths 111 and 112. For example, the sensing unit 120 may have a form in which an electric wire of the amplifying unit 139 is re-wound around a CM choke around which power lines corresponding to the high current paths 111 and 112 are wound. However, the present disclosure is not limited thereto.

According to an embodiment, the sensing unit 120 may sense the noise current In on the high current paths 111 and 112 to generate an output signal toward the first amplifying unit 137 and the second amplifying unit 138. The output signal may correspond to a voltage between nodes a and b. The nodes a and b may be differentially connected to input terminals of the first amplifying unit 137, and may also be differentially connected to input terminals of the second amplifying unit 138. Therefore, the voltage between the nodes a and b may be input to the first amplifying unit 137 and the second amplifying unit 138 as an input voltage.

Each of the first amplifying unit 137 and the second amplifying unit 138 may amplify the input voltage and output a separate output signal (e.g., an output voltage). In this case, a gain (e.g., a voltage gain) of the first amplifying unit 137 and a gain (e.g., a voltage gain) of the second amplifying unit 138 may be different from each other.

An amplified voltage V1 output from the first amplifying unit 137 becomes an input signal of the first compensating unit 190, and the first compensating unit 190 may generate a compensation voltage in series to the high current paths 111 and 112 on the basis of V1.

An amplified voltage V2 output from the second amplifying unit 138 becomes an input signal of the second compensating unit 160. The second compensating unit 160 may reduce the noise current In by flowing a compensation current from the high current paths 111 and 112 to the reference potential 1 on the basis of v2.

Although the first amplifying unit 137 and the second amplifying unit 138 are functionally separated and expressed, according to an embodiment, the first amplifying unit 137 and the second amplifying unit 138 may be implemented as a single integrated circuit (IC).

Meanwhile, in order to isolate the high current paths 111 and 112 from the first amplifying unit 137 and the second amplifying unit 138, each of the first compensating unit 190 and the second compensating unit 160 may include a compensating transformer.

The first compensating unit 190 is a compensating unit of a type that compensates for a voltage at the front of or behind a CM choke in preparation for noise input from the side of the first device 300. The second compensating unit 160 is a compensating unit of a type that compensates for noise at a rear end thereof.

The first compensating unit 190 may generate a compensation voltage in series to the high current paths 111 and 112 on the basis of the amplified voltage output from the amplifying unit 139. For example, the first compensating unit 190 may be formed of a compensating transformer for isolation. The compensation voltage may have an effect of suppressing the noise current In flowing through the high current paths 111 and 112.

The second compensating unit 160 may generate a compensation current on the basis of the output signal that is amplified by the amplifying unit 139 and output to the second compensating unit 160. The second compensating unit 160 may be connected to each of the high current paths 111 and 112 to allow the compensation current to flow from the high current paths 111 and 112 to the reference potential 1. For example, in the second compensating unit 160, the compensation current may be branched from the high current paths 111 and 112. Thus, it is possible to compensate for the noise current In flowing through the high current paths 111 and 112. For example, the second compensating unit 160 may include a compensating transformer for isolation. The compensation current may reduce the noise current In by allowing at least a portion of the noise current In to flow to the ground (e.g., the reference potential 1).

As described above, the compensating device 107 according to various embodiments of the present disclosure may have a structure in which voltage compensation and current compensation are combined. For example, the first compensating unit 190 may perform the voltage compensation while the second compensating unit 160 may perform the current compensation.

Figure 51:
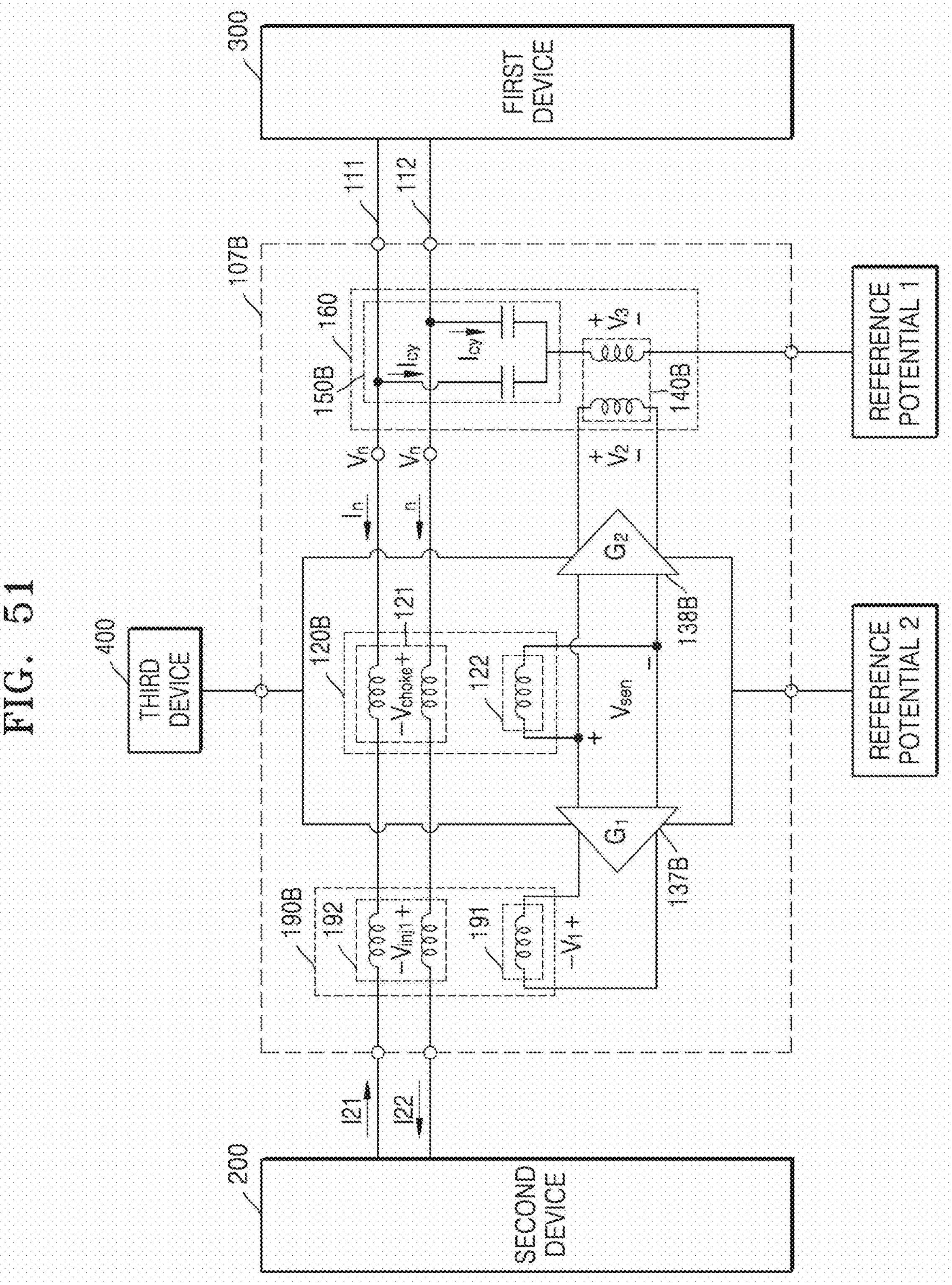
FIG. 51 shows a more specific example of the embodiment described with reference to FIG. 50, and is a schematic view of a compensating device according to an embodiment of the present disclosure.

FIG. 51 shows a more specific example of the embodiment described with reference to FIG. 50, and is a schematic view of a compensating device 107B according to an embodiment of the present disclosure.

Referring to FIG. 51, the compensating device 107B may include a sensing transformer 120B, a first amplifying unit 137B, and a second amplifying unit 138B, which may respectively correspond to the sensing unit 120, the first amplifying unit 137, and the second amplifying unit 138 described above.

Further, the compensating device 107B may include a first compensating transformer 190B disposed on an output side of the first amplifying unit 137B, and the first compensating transformer 190B may correspond to the above-described first compensating unit 190.

Further, the compensating device 107B includes a second compensating transformer 140B and a compensating capacitor unit 150B disposed on an output side of the second amplifying unit 138B, and these two components are combined and correspond to the above-described second compensating unit 160. Thus, descriptions of common contents will be omitted as much as possible.

The sensing transformer 120B may include a primary side 121 disposed on high current paths 111 and 112 and a secondary side 122 differentially connected to input terminals of each of the amplifying units 137B and 138B.

According to an embodiment of the present disclosure, the sensing transformer 120B may have a form in which an electric wire of the secondary side 122 is re-wound around a CM choke around which a first high current path 111 and a second high current path 112 are wound. As described above, when the sensing transformer 120B is formed using the CM choke, the sensing transformer 120B may not only perform a function of sensing and transforming, but also serve as a passive filter as a CM choke. That is, when the sensing transformer 120B is formed by re-winding the electric wire of the secondary side 122 around the CM choke, the sensing transformer 120B may not only perform a function of sensing and transforming a noise current In, but also serve to suppress or block the noise current In. Meanwhile, since the compensating devices 107, 107B, 107C1, and 107C2 according to various embodiments of the present disclosure are added together with the above-described CM choke, even in high-power systems, a common-mode noise voltage and current may be effectively reduced without increasing the size or number of CM chokes.

For example, in the sensing transformer 120B, when a turns ratio of the primary side 121 and the secondary side 122 is 1:$N_{sen}$, and a voltage that is induced at both ends of the primary side 121 of the sensing transformer 120B due to the noise current In is $V_{choke}$, a voltage $V_{sen}$ induced in the secondary side 122 is $N_{sen}$ times $V_{choke}$.

$$V_{sen}=N_{sen}*V_{choke} \quad \text{[Equation 9]}$$

Equation 9n the secondary side 122 is N ends of the primary side 121 of the sennected in parallel and differentially to the input terminals of the first amplifying unit 137B and the input terminals of the second amplifying unit 138B, and may supply the induced voltage $V_{sen}$ to the first amplifying unit 137B and the second amplifying unit 138B.

Each of the first amplifying unit 137B and the second amplifying unit 138B may amplify (e.g., adjusts a magnitude and/or a phase) the induced voltage $V_{sen}$ induced in the secondary side 122 of the sensing transformer 120B.

A voltage gain G1 of the first amplifying unit 137B and a voltage gain G2 of the second amplifying unit 138B may be different from each other. According to an embodiment of the present disclosure, the voltage gain G2 of the second amplifying unit 138B may be designed to be greater than the voltage gain G1 of the first amplifying unit 137B. A detailed description thereof will be provided below. However, the present disclosure is not limited thereto, and G1 and G2 may be determined according to various embodiments.

An output voltage V1 of the first amplifying unit 137B may be expressed as in Equation 10 below.

$$V_1=G_1*V_{sen}=G_1*N_{sen}*V_{choke} \quad \text{[Equation 10]}$$

The output voltage V1 of the first amplifying unit 137B becomes an input voltage (i.e., a voltage of a primary side 191) of the first compensating transformer 190B. The first compensating transformer 190B may generate a compensation voltage $V_{inj1}$ in series to the high current paths 111 and 112, which are on a secondary side 192, on the basis of V1.

The first compensating transformer 190B may have, for example, a structure in which an electric wire of the primary side 191 and an electric wire of the secondary side 192 pass through one core or are wound therearound at least one time. The electric wire of the primary side 191 may be an electric wire through which an output signal of the first amplifying unit 137B flows, and the electric wire of the secondary side 192 may correspond to the high current paths 111 and 112.

For example, in the first compensating transformer 190B, when a turns ratio of the primary side 191 and the secondary side 192 is 1:$N_{inj1}$, the voltage $V_{inj1}$ induced in the secondary side 192 is $N_{inj1}$ times V1. Therefore, the compensation voltage $V_{inj1}$ may be expressed as in Equation 11 below.

$$\begin{aligned} V_{inj1} &= N_{inj1} * V_1 = G_1 * N_{inj1} * V_{sen} \\ &= G_1 * N_{sen} * N_{inj1} * V_{choke} \end{aligned} \quad \text{[Equation 11]}$$

Meanwhile, when the voltage gain of the second amplifying unit 138B is G2, an output voltage V2 of the second amplifying unit 138B may be expressed as in Equation 12 below.

$$V_2=G_2*V_{sen}=G_2*N_{sen}*V_{choke} \quad \text{[Equation 12]}$$

The output voltage V2 of the second amplifying unit 138B becomes an input voltage of the second compensating unit 160, that is, an input voltage of the second compensating transformer 140B.

A configuration in which the second compensating transformer 140B and the compensating capacitor unit 150B are combined may correspond to the above-described second compensating unit 160. The second compensating transformer 140B may be a means for generating a compensation current $I_{cy}$ on a secondary side of the second compensating transformer 140B and branching the compensation current $I_{cy}$ from the high current paths 111 and 112 in a state of being isolated from the high current paths 111 and 112.

The second compensating transformer 140B may induce an induced voltage V3 on the secondary side on the basis of the amplified voltage V2 generated on a primary side. For example, in the second compensating transformer 140B, when a turns ratio of the primary side and the secondary side is $1:N_{inj2}$, the voltage $V_3$ induced in the secondary side is $N_{inj2}$ times $V_2$. Therefore, the induced voltage V3 may be expressed as in Equation 13 below.

$$\begin{aligned} V_3 &= N_{inj2}*V_2 = G_2*N_{inj2}*V_{sen} \\ &= G_2*N_{sen}*N_{inj2}*V_{choke} \end{aligned} \quad \text{[Equation 13]}$$

The secondary side of the second compensating transformer 140B may be disposed on a path connecting the compensating capacitor unit 150B, which will be described below, and a reference potential (the reference potential 1) of the compensating device 107B.

The compensating capacitor unit 150B may withdraw the compensation current Icy from the power line on the basis of the voltage $V_3$ that is induced by the second compensating transformer 140B. As the compensation current $I_{cy}$ compensates for (or cancels) the noise current on the high current paths 111 and 112, the compensating device 107B may reduce noise.

Meanwhile, when a common-mode noise voltage of a node, at which the compensating capacitor unit 150B meets the high current paths 111 and 112, is $V_n$, and a voltage between the first compensating transformer 190B and the second device 200 is $V_{LISN}$, a circuit equation between $V_n$ and $V_{LISN}$ may be solved as in Equation 14 below. $V_n$ and $V_{LISN}$ may denote potentials with respect to the reference potential 1 (e.g., the ground).

$$V_n-V_{choke}-V_{inj1}-V_{LISN}=0, V_n-V_{choke}-G_1N_{sen}N_{inj1}V_{choke}-V_{LISN}=0 \quad \text{[Equation 14]}$$

Meanwhile, since noise emitted toward the second device 200 by the operation of the compensating device 107B should correspond to near zero, $V_{LISN}$ should correspond to zero, and Equation 15 below may be derived.

$$V_n - V_{LISN} = (1+G_1N_{sen}N_{inj1})V_{choke} \approx V_n \quad \text{[Equation 15]}$$

$$V_{choke} \approx \frac{V_n}{(1+G_1N_{sen}N_{inj1})}$$

Meanwhile, using the above equation, an effective impedance of the high current paths 111 and 112 at a point between the sensing transformer 120B and the compensating capacitor unit 150B may be calculated as in Equation 16 below.

$$\begin{aligned} Z_{line,eff} &= \frac{V_n}{I_n} = \frac{(1+G_1N_{sen}N_{inj1})V_{choke}}{I_n} \\ &= (1+G_1N_{sen}N_{inj1})sL_{choke} \end{aligned} \quad \text{[Equation 16]}$$

In Equation 16, $s*L_{choke}$ may denote an impedance of the CM choke included in the sensing transformer 120B. Thus, $Z_{line,eff}$ indicates an effect that an impedance on the high current paths 111 and 112 (viewed at a point of $V_n$) is increased by $1+G_1N_{sen}N_{inj1}$ times an impedance $s*L_{choke}$ of the CM choke.

This may be an effect due to the first amplifying unit 137 (e.g., the first amplifying unit 137B) and the first compensating unit 190 (e.g., the first compensating transformer 190B). The first amplifying unit 137 and the first compensating unit 190 may perform voltage compensation ($V_{inj1}$) on the high current path, which has an effect corresponding to an effect of increasing inductance, thereby suppressing a noise current from flowing (L boost type).

In other words, the compensating device 107B according to an embodiment of the present disclosure may have an effect of an effective inductance $L_{choke,eff}$ (see Equation 17 below), which is increased by $1+G_1N_{sen}N_{inj1}$ times than an inductance $L_{choke}$ of the CM choke, and thus, may increase the noise suppression effect than in the case in which only the CM choke is present.

$$L_{choke,eff}(1+G_1N_{sen}N_{inj1})L_{choke} \quad \text{[Equation 17]}$$

For example, the noise suppression effect may be adjusted according to the voltage gain G1 of the first amplifier 137B, the turns ratio $N_{sen}$ of the sensing transformer 120B, and the turns ratio $N_{inj1}$ of the first compensating transformer 190B.

Meanwhile, a circuit equation from a node $V_n$, at which the compensating capacitor unit 150B meets the high current paths 111 and 112, to the reference potential 1 is solved as in Equation 18 below.

$$\begin{aligned} I_{cy} &= sC_y(V_n+V_3) \\ &= sC_y(V_n+G_2N_{sen}N_{inj2}V_{choke}) \end{aligned} \quad \text{[Equation 18]}$$

Where, Cy is a capacitance of a Y-capacitor included in the compensating capacitor unit 150B. Meanwhile, using the above equation, an effective Y-impedance $Z_{cy,eff}$ viewed from the node $V_n$, at which the compensating capacitor unit 150B meets the high current paths 111 and 112, toward the compensating capacitor unit 150B may be calculated as in Equation 19 below.

$$\begin{aligned} Z_{cy,eff} &= \frac{V_n}{I_{cy}} = \frac{V_n}{sC_y(V_n+G_2N_{sen}N_{inj2}V_{choke})} \\ &= \frac{1}{sC_y}\frac{1}{\left(1+\frac{G_2N_{inj2}}{G_1N_{inj1}}\right)} \end{aligned} \quad \text{[Equation 19]}$$

Equation 19 is obtained by substituting Equation 15 into $V_{choke}$. In Equation 19, 1/(s*Cy) denotes an impedance of the Y-capacitor included in the compensating capacitor unit

150B. $Z_{cy,eff}$ denotes an effective Y-impedance viewed from the node, at which the compensating capacitor unit 150B and the high current paths 111 and 112 meet, toward the compensating capacitor unit 150B.

Referring to Equation 19, Equation 19 indicates an effect that the effective Y-impedance $Z_{cy,eff}$ is reduced by $$1 + \frac{G_2 N_{inj2}}{G_1 N_{inj1}}$$

times an impedance 1/(s*Cy) of the Y-capacitor.

This may be an effect due to the second amplifying unit 138 (e.g., the second amplifying unit 138B) and the second compensating unit 160 (e.g., the first compensating transformer 140B and the compensating capacitor unit 150B). The second amplifying unit 138 and the second compensating unit 160 may perform current compensation (Icy) such that the noise current is branched from the high current path in a feedback manner, which may have an effect corresponding to an effect of increasing the Y-capacitance, thereby achieving an effect of effectively withdraw the noise current to the ground (i.e., the reference potential 1) (C boost type).

In other words, the compensating device 107B according to an embodiment of the present disclosure may have an effect of the effective Y-capacitance $C_{y,eff}$ (see Equation 20 below), which is increased by $$1 + \frac{G_2 N_{inj2}}{G_1 N_{inj1}}$$

times than a capacitance Cy of the Y-capacitor, and thus, may increase a noise extraction effect than in the case in which only the Y-capacitance is present.

$$C_{y,eff} = \left(1 + \frac{G_2 N_{inj2}}{G_1 N_{inj1}}\right) C_y \qquad \text{[Equation 20]}$$

For example, the noise extraction effect may be adjusted according to the voltage gain G1 of the first amplifier 137B, the voltage gain G2 of the second amplifier 138B, the turns ratio $N_{inj1}$ of the first compensating transformer 190B, and the turns ratio $N_{inj2}$ of the second compensating transformer 140B.

For example, the first compensating transformer 190B may be formed in a manner in which the electric wire of the primary side 191 passes through the core, and the electric wire (that is, the high current paths 111 and 112) of the secondary side 192 passes through the core or is wound therearound one time.

Figure 52:
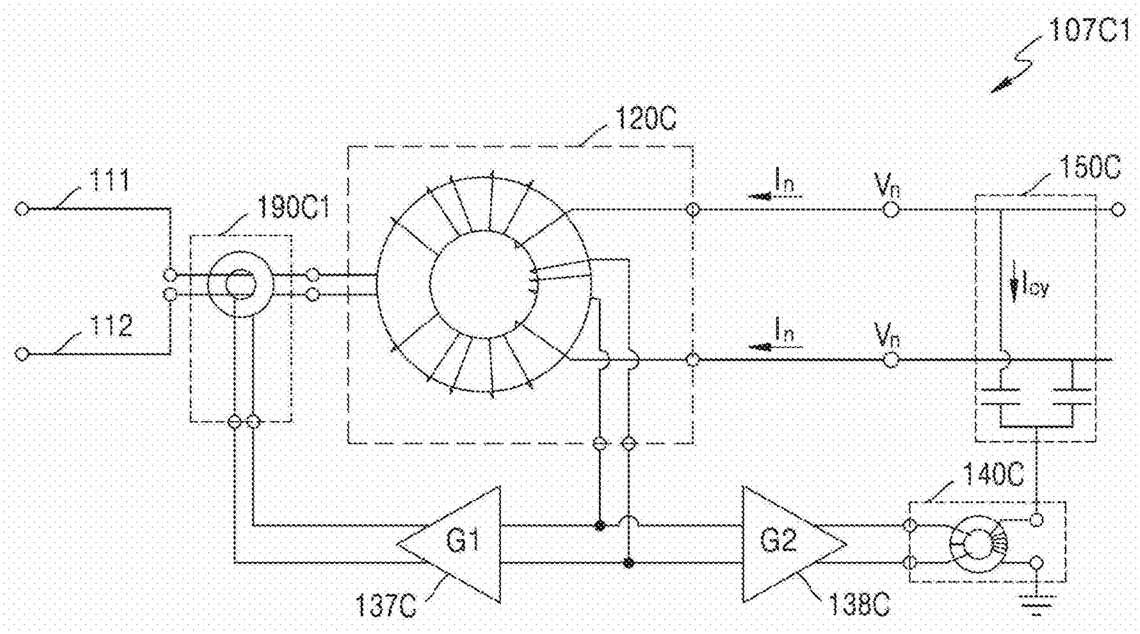
FIGS. 52 and 53 are schematic views of compensating devices according to an embodiment of the present disclosure as a specific example of the compensating device shown in FIG. 51.
Figure 53:
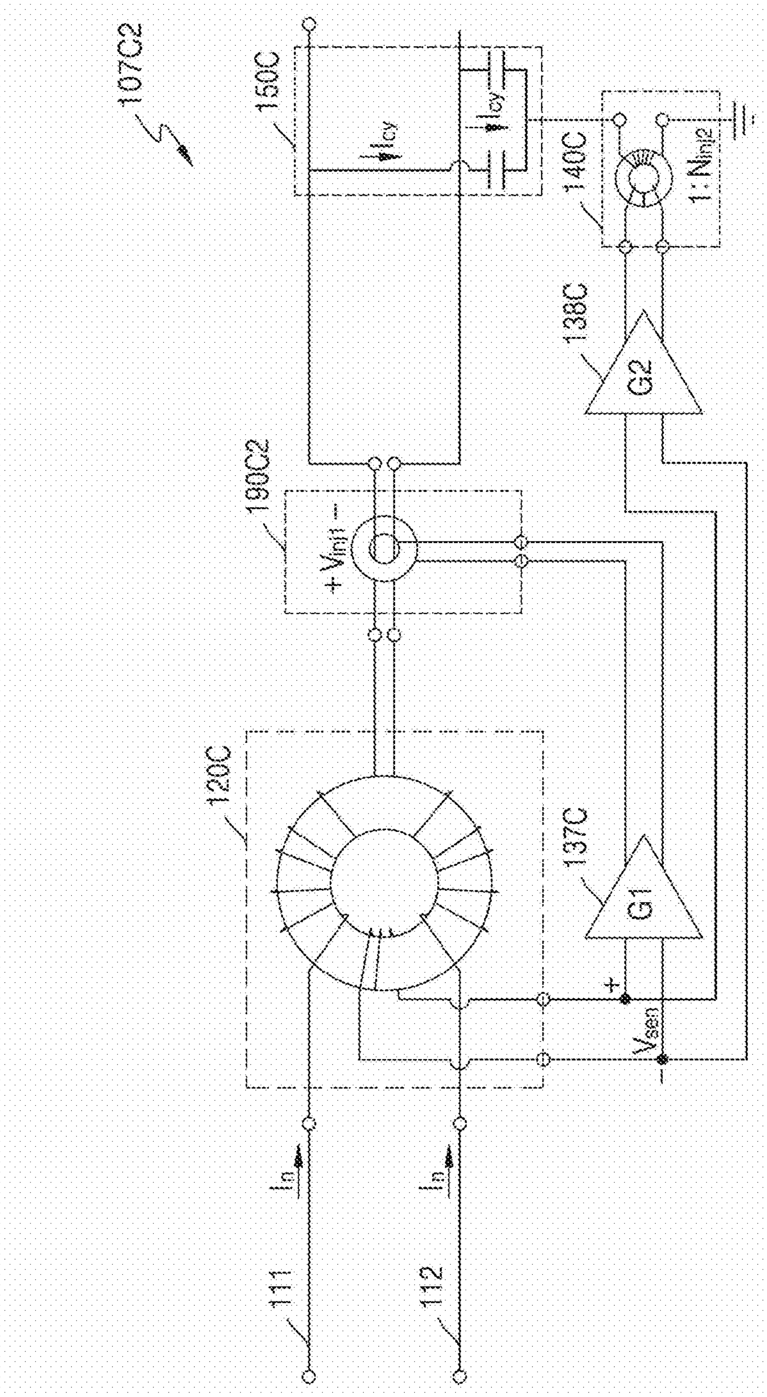

FIGS. 52 and 53 are schematic views of compensating devices 107C1 and 107C2 according to an embodiment of the present disclosure as a specific example of the compensating device shown in FIG. 51.

The compensating device 107C1 according to an embodiment shown in FIG. 52 may include a sensing transformer 120C, a first amplifier 137C, a second amplifier 138C, a first compensating transformer 190C1, a second compensating transformer 140C, and a compensating capacitor unit 150C.

The compensating device 107C1 illustrates an embodiment in which an electric wire of a primary side of the first compensating transformer 190C1, and high current paths 111 and 112, which are on a secondary side of the first compensating transformer 190C1, pass through a core, and the first compensating transformer 190C1 has a turns ratio $N_{inj1}$ of about 1. However, the present disclosure is not limited thereto, and as an example, the high current paths 111 and 112 on the secondary side may be wound around the core one time. In this case, the turns ratio $N_{inj1}$ may be about 2.

The sensing transformer 120C, the first amplifier 137C, the second amplifier 138C, the first compensating transformer 190C1, the second compensating transformer 140C, and the compensating capacitor unit 150C shown in FIG. 52 respectively correspond to the descriptions of the sensing transformer 120B, the first amplifier 137B, the second amplifier 138B, the first compensating transformer 190B, the second compensating transformer 140B, and the compensating capacitor unit 150B that are described in FIG. 51, and thus descriptions of the overlapping contents will be omitted.

Referring to FIG. 52, in the compensating device 107C1 according to an embodiment of the present disclosure, the sensing transformer 120C may be a device of a type different from those of the first compensating transformer 190C1 and the second compensating transformer 140C.

For example, unlike the first compensating transformer 190C1 and the second compensating transformer 140C, which only serve as transformers, the sensing transformer 120C may have a form in which electric wires on the side of the amplifying unit 137C and 138C is re-wound around a CM choke around which power lines corresponding to the high current paths 111 and 112 are wound. The CM choke is a passive filter and may serve to suppress a noise current by using an inductance thereof, and the sensing transformer 120C may sense the noise by simply re-winding a secondary side electric wire around the CM choke.

Meanwhile, the compensating device 107C2 according to an embodiment shown in FIG. 53 may include a sensing transformer 120C, a first amplifier 137C, a second amplifier 138C, a first compensating transformer 190C2, and a second compensating transformer 140C, and a compensating capacitor unit 150C.

The compensating device 107C2 according to an embodiment may actively compensate for a noise current In or a noise voltage $V_n$ generated as a common-mode current or voltage on the high current paths 111 and 112.

The sensing transformer 120C, the first amplifier 137C, the second amplifier 138C, the first compensating transformer 190C2, the second compensating transformer 140C, and the compensating capacitor unit 150C included in the compensating device 107C2 may respectively correspond to the descriptions of the sensing transformer 120B, the first amplifier 137B, the second amplifier 138B, the first compensating transformer 190B, the second compensating transformer 140B, and the compensating capacitor unit 150B that are described in FIG. 51.

In the compensating device 107C2 according to an embodiment, the first compensating transformer 190C2 is disposed behind the sensing transformer 120C (e.g., a CM choke), which is on the side of the first device 300 with respect to the sensing transformer 120C. The first compensating transformer 190C2 may generate a compensation voltage $V_{inj1}$ on high current paths 111 and 112 between the CM choke and the first device 300.

Figure 54:
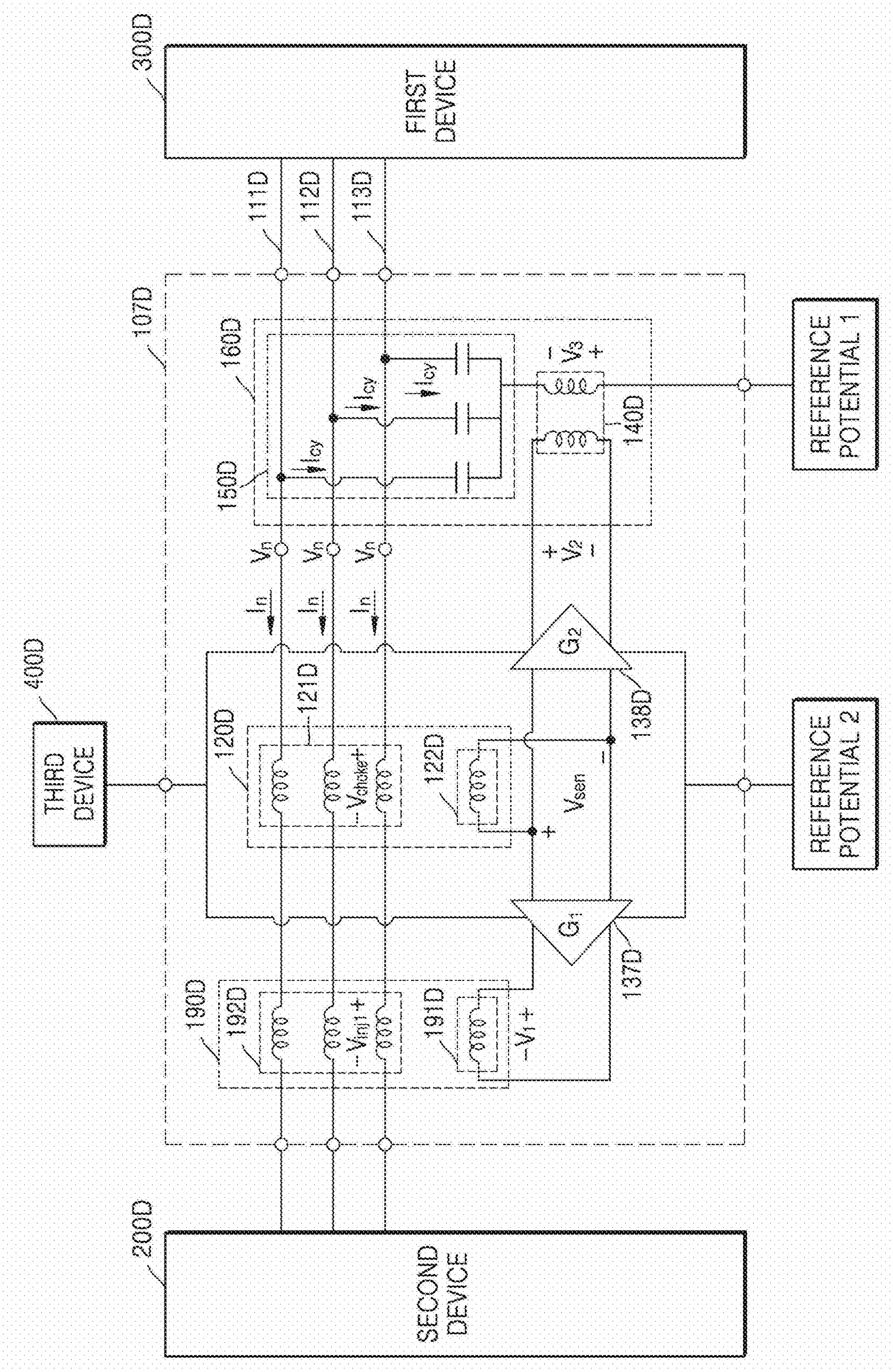
FIG. 54 is a schematic view of the configuration of a system including a compensating device according to another embodiment of the present disclosure.

FIG. 54 is a schematic view of the configuration of a system including a compensating device 107D according to another embodiment of the present disclosure.

FIG. 54 is a diagram schematically showing a configuration in which various compensating devices (e.g., 107, 107B, 107C1, and the like) described above are used in a three-phase three-line system.

The compensating device 107D of FIG. 54 is different from the compensating device 107B in the single-phase two-line system described with reference to FIG. 51 in that the compensating device 107D is used in a three-phase three-line system. Therefore, overlapping parts will be omitted, and differences will be mainly described.

Referring to FIG. 54, the compensating device 107D may actively compensate for a noise current In input as a common-mode current to each of high current paths 111D, 112D, and 113D connected to a first device 300D.

The compensating device 107D may include a first high current path 111D, a second high current path 112D, and a third high current path 113D that are distinguished from each other. According to an embodiment, the first high current path 111D may be an R-phase power line, the second high current path 112D may be an S-phase power line, and the third high current path 113D may be a T-phase power line. The noise current In may be input as a common-mode current to each of the first high current path 111D, the second high current path 112D, and the third high current path 113D.

A primary side 121D of a sensing transformer 120D may be disposed on each of the first high current path 111D, the second high current path 112D, and the third high current path 113D and generate an induced voltage $V_{sen}$ on a secondary side 122D thereof.

Meanwhile, in the compensating device 107D, first and second amplifying units 137D and 138D correspond to the amplifying units 137B and 138B.

The first amplifying unit 137D may output an amplified voltage V1 on the basis of an input voltage, and the second amplifying unit 138D may output an amplified voltage V2 on the basis of the input voltage.

V1 may be an input voltage of a first compensating transformer 190D, that is, a voltage on a primary side 191D of the first compensating transformer 190D. V2 may be an input voltage of a second compensating transformer 140D, that is, a voltage on a primary side of the second compensating transformer 140D.

Meanwhile, a secondary side 192D of the first compensating transformer 190D may be disposed in each of the first high current path 111D, the second high current path 112D, and the third high current path 113D. The first compensating transformer 190D may generate a compensation voltage $V_{inj1}$ in series to each of the three high current paths 111D, 112D, and 113D, which are on the secondary side 192D, on the basis of the voltage V1 of the primary side 191D, which is output from the first amplifying unit 137D.

Meanwhile, the second compensating transformer 140D and a compensating capacitor unit 150D are included in a second compensating unit 160D, and V2, which is the output voltage of the second amplifying unit 138D, is an input voltage of the second compensating unit 160D, that is, the voltage of the primary side 191D of the second compensating transformer 140D. The second compensating transformer 140D may generate an induced voltage V3 on a secondary side thereof on the basis of the voltage V2 of the primary side thereof.

The compensating capacitor unit 150D causes the compensation current Ic to be drawn from each of the first high current path 111D, the second high current path 112D, and the third high current path 113D to the reference potential 1 on the basis of the induced voltage V3 on the secondary side of the second compensating transformer 140D.

The compensating device 107D according to the embodiment may simultaneously perform voltage compensation and current compensation for common-mode noise on power lines of a three-phase three-line power system.

The compensating device 107D including the first and second amplifying units 137D and 138D and the first and second compensating units 190D and 160D may also be modified according to a three-phase four-line power system (see FIG. 12). A description of a compensating device for the three-phase four-line power system may correspond to the description given above with reference to FIG. 12.

Figure 55:
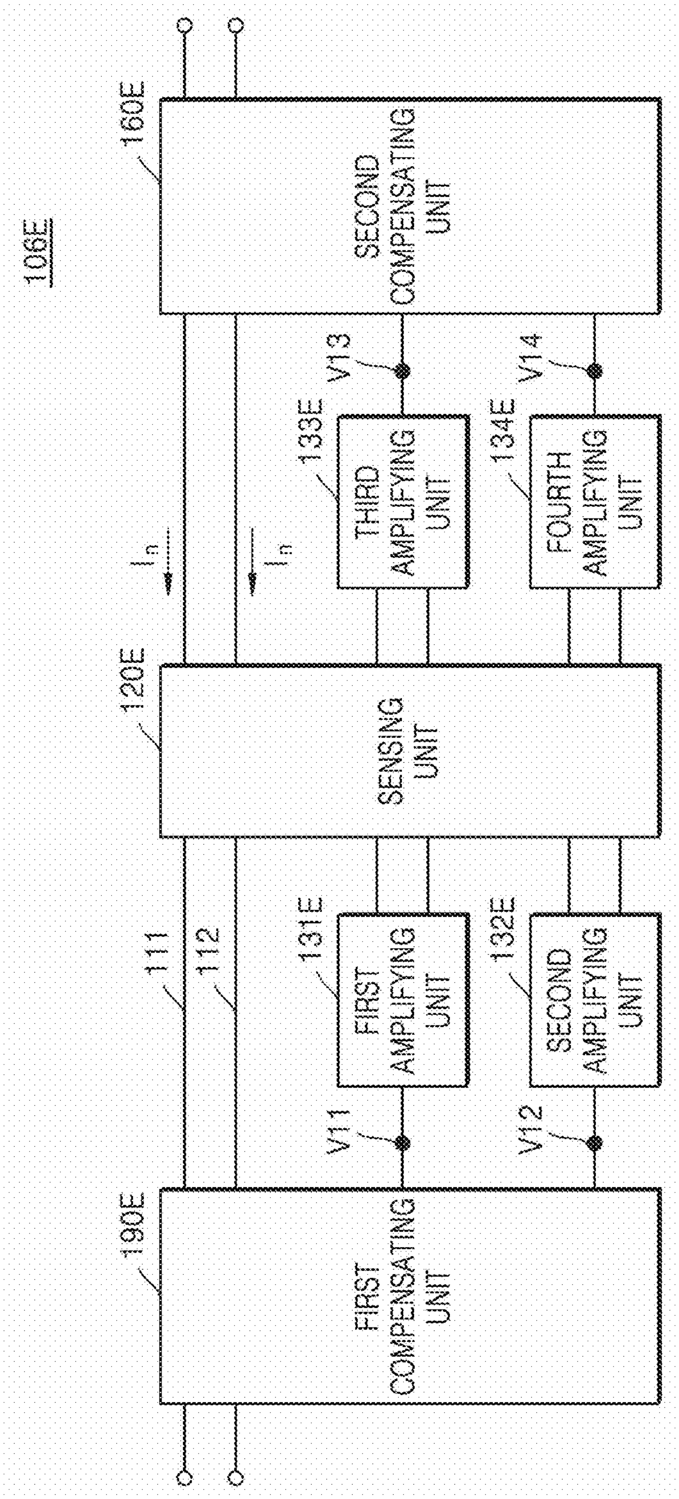
FIG. 55 is a schematic view of a functional configuration of an active compensating device according to another embodiment of the present disclosure.

FIG. 55 is a schematic view of a functional configuration of an active compensating device 106E according to another embodiment of the present disclosure.

Figure 56:
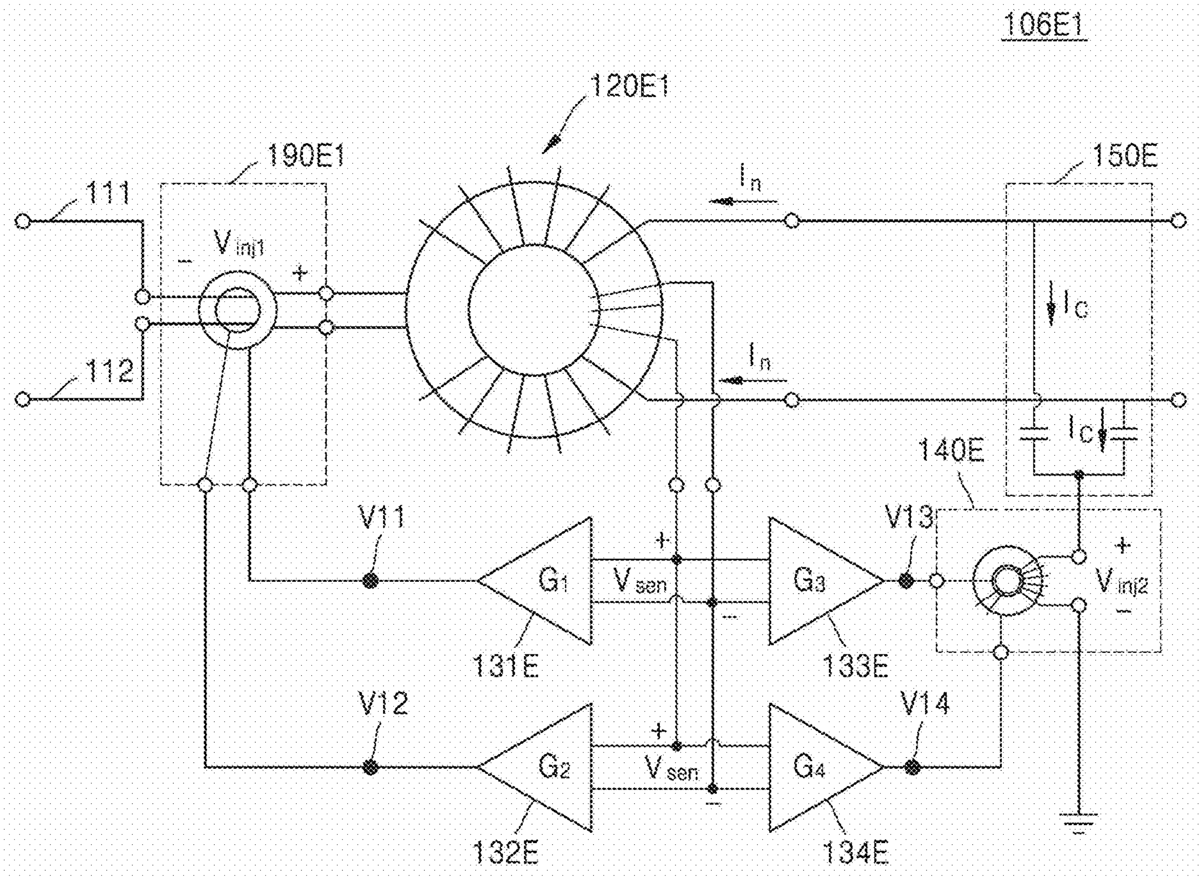
FIG. 56 is a schematic view of a compensating device illustrating as an example of the active compensating device shown in FIG. 55.
Figure 57:
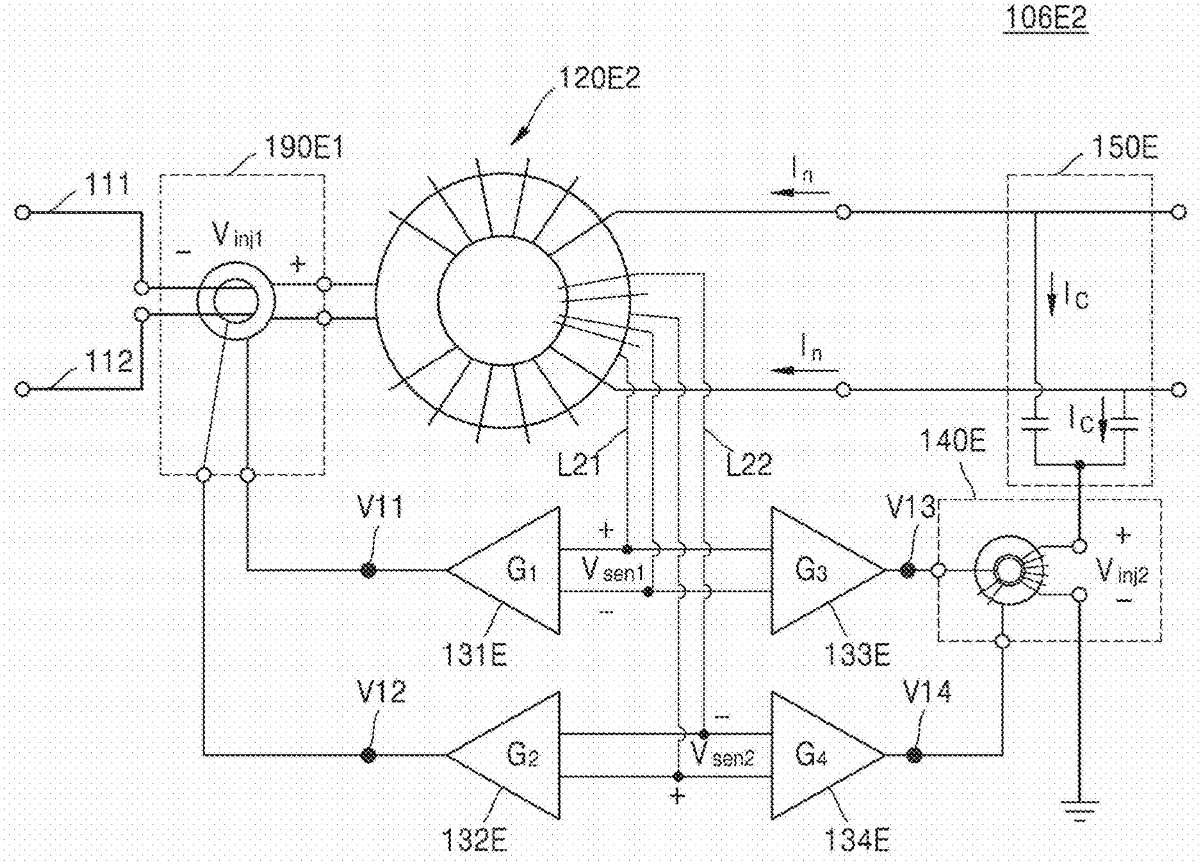
FIG. 57 is a schematic view of an active compensating device illustrating as another example of the active compensating device shown in FIG. 55.

FIG. 56 is a schematic view of a compensating device 106E1 illustrating as an example of the active compensating device 106E shown in FIG. 55, and FIG. 57 is a schematic view of an active compensating device 106E2 illustrating as another example of the active compensating device 106E shown in FIG. 55.

In addition, each component of the compensating devices 106E, 106E1, and 106E2 may at least partially correspond to each component of the above-described compensating devices, and thus, descriptions for the obvious contents in terms of the above-described embodiments will be omitted.

Referring to FIG. 55, the active compensating device 106E may include a sensing unit 120E, first, second, third, and fourth amplifying units 131E, 132E, 133E, and 134E, a first compensating unit 190E, and a second compensating unit 160E.

The sensing unit 120E is an example of the above-described sensing unit 120 and may correspond to the description of the sensing unit 120. The sensing unit 120E may output an output signal based on a noise current In to each the first, second, third, and fourth amplifying units 131E, 132E, 133E, and 134E. For example, the sensing unit 120E may output four output signals corresponding to the respective amplifying units 131E, 132E, 133E, and 134E on the basis of the noise current In. The four output signals may be input to the first, second, third, and fourth amplifying units 131E, 132E, 133E, and 134E, respectively.

For example, the first and second amplifying units 131E and 132E are components to generate an input signal of the first compensating unit 190E, and the third and fourth amplifying units 133E and 134E are components to generate an input signal of the second compensating unit 160E.

According to an embodiment, input terminals of the first amplifying unit 131E and input terminals of the third amplifying unit 133E may be connected to each other in parallel. For example, a differential input voltage of the first amplifying unit 131E and a differential input voltage of the third amplifying unit 133E may be equal to each other. Meanwhile, an output signal (e.g., current or voltage) of the first amplifying unit 131E and an output signal (e.g., current or voltage) of the third amplifying unit 133E may vary according to a gain of each of the first amplifying unit 131E and the third amplifying unit 133E. Meanwhile, the output signal of the first amplifying unit 131E may be connected to an input side of the first compensating unit 190E, and the output signal of the third amplifying unit 133E may be connected to an input side of the second compensating unit 160E.

According to an embodiment, input terminals of the second amplifying unit 132E and input terminals of the fourth amplifying unit 134E may be connected to each other in parallel. For example, a differential input voltage of the second amplifying unit 132E and a differential input voltage of the fourth amplifying unit 134E may be equal to each other. Meanwhile, an output signal (e.g., current or voltage) of the second amplifying unit 132E and an output signal (e.g., current or voltage) of the fourth amplifying unit 134E may vary according to a gain of each of the second amplifying unit 132E and the fourth amplifying unit 134E. Meanwhile, the output signal of the second amplifying unit 132E may be connected to an input side of the first compensating unit 190E, and the output signal of the fourth amplifying unit 134E may be connected to an input side of the second compensating unit 160E.

According to an embodiment, a difference between an output voltage V11 of the first amplifying unit 131E and an output voltage V12 of the second amplifying unit 132E may correspond to an input voltage of the first compensating unit 190E. According to an embodiment, a difference between an output voltage V13 of the second amplifying unit 133E and an output voltage V14 of the fourth amplifying unit 134E may correspond to an input voltage of the second compensating unit 160E.

Meanwhile, the output voltages V11, V12, V13, and V14 of the amplifying units 131E, 132E, 133E, and 134E may denote voltages based on the reference potential 2 of the amplifying units 131E, 132E, 133E, and 134E.

According to an embodiment, the first compensating unit 190E may induce a compensation voltage in series to high current paths 111 and 112 on the basis of the difference between the output voltage V11 of the first amplifying unit 131E and the output voltage V12 of the second amplifying unit 132E. The compensation voltage generated in series to the high current paths 111 and 112 may have an effect of suppressing the noise current In flowing through the high current paths 111 and 112.

According to an embodiment, the second compensating unit 160E may withdraw a compensation current from the high current paths 111 and 112 to the ground (e.g., the reference potential 1) on the basis of the difference between the output voltage V13 of the third amplifying unit 133E and the output voltage V14 of the fourth amplifying unit 134E. The compensation current may have an effect of reducing a magnitude of the noise current $I_n$ flowing through the high current paths 111 and 112. A detailed description of the second compensating unit 160E will be described below with reference to FIGS. 56 and 57.

Hereinafter, the compensating devices 106E1 and 106E2 that are examples of the active compensating device 106E will be described with reference to FIGS. 56 and 57.

Amplifying units 131E, 132E, 133E, and 134E, a first compensating transformer 190E1, a second compensating transformer 140E, and a compensating capacitor unit 150E of each of the compensating devices 106E1 and 106E2 may correspond to each other in a one-to-one manner. Meanwhile, the above-described first compensating unit 190E includes the first compensating transformer 190E1, and the second compensating unit 160E includes the second compensating transformer 140E and the compensating capacitor unit 150E.

According to an embodiment, a sensing unit 120E1 of the compensating device 106E1 and a sensing unit 120E2 of the compensating device 106E2 may be different from each other.

The sensing units 120E1 and 120E2 of the compensating devices 106E1 and 106E2 according to an embodiment may each have a form in which a secondary side electric wire is re-wound around a CM choke around which a first high current path 111 and a second high current path 112 are wound.

A primary side of each of the sensing units 120E1 and 120E2 may be a winding in which the first high current path 111 and the second high current path 112 are wound around the CM choke.

Meanwhile, in an embodiment (see FIG. 56), in a secondary side of the sensing unit 120E1, a single electric wire may be re-wound around the CM choke. The single electric wire may be connected in parallel to input terminals of each of the first, second, third, and fourth amplifying units 131E, 132E, 133E, and 134E. For example, a voltage $V_{sen}$ induced on the secondary side of the sensing unit 120E1 may be differentially input to the input terminals of each of all the first, second, third, and fourth amplifying units 131E, 132E, 133E, and 134E.

In the embodiment described with reference to FIG. 56, for example, the voltage $V_{sen}$ induced on the secondary side of the sensing unit 120E1 may be equally input to the first and third amplifying unit 131E and 133E, and equally input to the second and fourth amplifying unit 132E and 134E.

The first amplifying unit 131E may output a first output voltage V11 corresponding to a value obtained by multiplying the differential input voltage $V_{sen}$ of the first amplifying unit 131E by a voltage gain G1 of the first amplifying unit 131E. The second amplifying unit 132E may output a second output voltage V12 corresponding to a value obtained by multiplying the differential input voltage $V_{sen}$ of the second amplifying unit 132E by a voltage gain G2 of the second amplifying unit 132E. The first output voltage V11 and the second output voltage V12 may be potentials based on a reference potential (the reference potential 2) of the amplifying units 131E and 132E. A difference between the first output voltage V11 and the second output voltage V12 may be an input voltage of the first compensating transformer 190E1. According to the embodiment described with reference to FIG. 56, G1=−G2 may be satisfied.

The third amplifying unit 133E may output a third output voltage V13 corresponding to a value obtained by multiplying the differential input voltage $V_{sen}$ of the third amplifying unit 133E by a voltage gain G3 of the third amplifying unit 133E. The fourth amplifying unit 134E may output a fourth output voltage V14 corresponding to a value obtained by multiplying the differential input voltage $V_{sen}$ of the fourth amplifying unit 134E by a voltage gain G4 of the fourth amplifying unit 134E. The third output voltage V13 and the fourth output voltage V14 may be potentials based on a reference potential (the reference potential 2) of the amplifying units 133E and 134E. A difference between the third output voltage V13 and the fourth output voltage V14 may be an input voltage of the second compensating transformer 140E. According to the embodiment described with reference to FIG. 56, G3=−G4 may be satisfied.

Meanwhile, in an embodiment (see FIG. 57), a secondary side of the sensing unit 120E2 may have a form in which each of first electric wires L21 connected in parallel to input terminals of each of the first and third amplifying unit 131E and 133E and second electric wires L22 connected in parallel to input terminals of each of the second and fourth amplifying unit 132E and 134E is re-wound around a CM choke.

For example, a voltage $V_{sen1}$ induced in the first electric wires L21 on the secondary side of the sensing unit 120E2 may be differentially input to each of the first amplifying unit 131E and the third amplifying unit 133E. A voltage $V_{sen2}$ induced in the second electric wires L22 on the secondary side of the sensing unit 120E2 may be differentially input to each of the second amplifying unit 132E and the fourth amplifying unit 134E.

In the embodiment described with reference to FIG. 57, the input voltages $V_{sen1}$ and $V_{sen2}$ may be generated on the basis of the number of turns of the first electric wires L21 on the secondary side of the sensing unit 120E2 and the number of turns of the second electric wires L22 on the secondary side of the sensing unit 120E2. According to an embodiment, the first electric wires L21 and the second electric wires L22 may be wound so as to generate input voltages having opposite phases to the first and third amplifying unit 131E and 133E and the second and fourth amplifying unit 132E and 134E.

For example, when the number of turns of each of the first electric wires L21 and the second electric wires L22 on the secondary side is the same, the differential input voltages $V_{sen1}$ and $V_{sen2}$ of the respective amplifying units 131E, 132E, 133E, and 134E may have the same magnitude and opposite phases. That is, $V_{sen1}=-V_{sen2}$ may be satisfied. For example, the input voltage $V_{sen1}$ of each of the first and third amplifying unit 131E and 133E may correspond to a value obtained by multiplying the voltage induced on the primary side (that is, on both ends of the CM choke) of the sensing unit 120E2 by a turns ratio of the first electric wires L21 on the primary side. The input voltage $V_{sen2}$ of each of the second and fourth amplifying unit 132E and 134E may correspond to a value obtained by multiplying the voltage induced on the primary side of the sensing unit 120E2 by a turns ratio of the second electric wires L12 on the primary side.

The first amplifying unit 131E may output a first output voltage V11 corresponding to a value obtained by multiplying the input voltage $V_{sen1}$ of the first amplifying unit 131E by a voltage gain G1 of the first amplifying unit 131E. The second amplifying unit 132E may output a second output voltage V12 corresponding to a value obtained by multiplying the differential input voltage $V_{sen2}$ of the second amplifying unit 132E by a voltage gain G2 of the second amplifying unit 132E. The third amplifying unit 133E may output a third output voltage V13 corresponding to a value obtained by multiplying the input voltage $V_{sen1}$ of the third amplifying unit 133E by a voltage gain G3 of the third amplifying unit 133E. The fourth amplifying unit 134E may output a fourth output voltage V14 corresponding to a value obtained by multiplying the differential input voltage $V_{sen2}$ of the fourth amplifying unit 134E by a voltage gain G4 of the fourth amplifying unit 134E. According to the embodiment described with reference to FIG. 57, G1=+G2 and G3=+G4 may be satisfied.

The output voltages V11, V12, V13, and V14 are potentials based on the reference potential 2 of the amplifying units 131E, 132E, 133E, and 134E. A difference between the first output voltage V11 and the second output voltage V12 may be an input voltage of the first compensating transformer 190E1. A difference between the third output voltage V13 and the fourth output voltage V14 may be an input voltage of the second compensating transformer 140E.

Meanwhile, referring to FIGS. 56 and 57 together again, the first compensating transformer 190E1 may have a structure in which an electric wire of a primary side and an electric wire of a secondary side pass through one core or are wound therearound at least one time. The primary side electric wire may be an electric wire connecting an output terminal of the first amplifying unit 131E and an output terminal of the second amplifying unit 132E. The secondary side electric wire may correspond to the high current paths 111 and 112.

A potential difference (e.g., V11-V12) between the output of the first amplifying unit 131E and the output of the second amplifying unit 132E becomes a voltage on the primary side of the first compensating transformer 190E1, and the first compensating transformer 190E1 may generate a compensation voltage $V_{inj1}$ in series to the high current paths 111 and 112, which is on the secondary side, on the basis of the potential difference. The compensation voltage $V_{inj1}$ may correspond to a value obtained by multiplying the voltage on the primary side of the first compensating transformer 190E1 by a turns ratio of the primary side and the secondary side.

The active compensating devices 106E1 and 106E2 according to an embodiment may perform voltage compensation ($V_{inj1}$) on the high current paths 111 and 112, which may have an effect corresponding to an effect of increasing an inductance of the CM choke of each of the sensing units 120E1 and 120E2, thereby achieving an effect of suppressing the noise current In (L boost type).

Meanwhile, the second compensating transformer 140E and the compensating capacitor unit 150E may correspond to the above-described second compensating unit 160E.

According to an embodiment, the second compensating transformer 140E may include a primary side (e.g., a primary winding) connected to an output terminal of each of the second and fourth amplifying unit 132E and 134E, and a secondary side (e.g. a secondary winding) connected to the high current paths 111 and 112. For example, an electric wire connecting the output terminal of the second amplifying unit 132E and the output terminal of the fourth amplifying unit 134E may be wound around the primary side of the second compensating transformer 140E.

The second compensating transformer 140E may have a structure in which an electric wire of the primary side and an electric wire of the secondary side pass through one core or are wound therearound at least one time.

The secondary side of the second compensating transformer 140E may be disposed on a path connecting the compensating capacitor unit 150E and a reference potential (the reference potential 1) of the compensating devices 106E1 and 106E2.

A voltage of the primary side of the second compensating transformer 140E may be a potential difference (e.g., V13-V14) between the output of the third amplifying unit 133E and the output of the fourth amplifying unit 134E. The second compensating transformer 140E may generate an induced voltage $V_{inj2}$ on the secondary side on the basis of the voltage (e.g., V13-V14) of the primary side and a turns ratio. The induced voltage $V_{inj2}$ may correspond to a product of the voltage (e.g., V13-V14) the primary side and the turns ratio.

The voltage $V_{inj2}$ converted through the second compensating transformer 140E may withdraw a compensation current Ic from the high current paths 111 and 112 (e.g., power lines) through the compensating capacitor unit 150E.

The compensating capacitor unit 150E may withdraw the compensation current Ic from the power line on the basis of the voltage $V_{inj2}$ induced by the second compensating transformer 140E. As the compensation current Ic compensates for (or cancels) the noise current on the high current paths 111 and 112, the compensating devices 106E1 and 106E2 may reduce noise.

Figure 58:
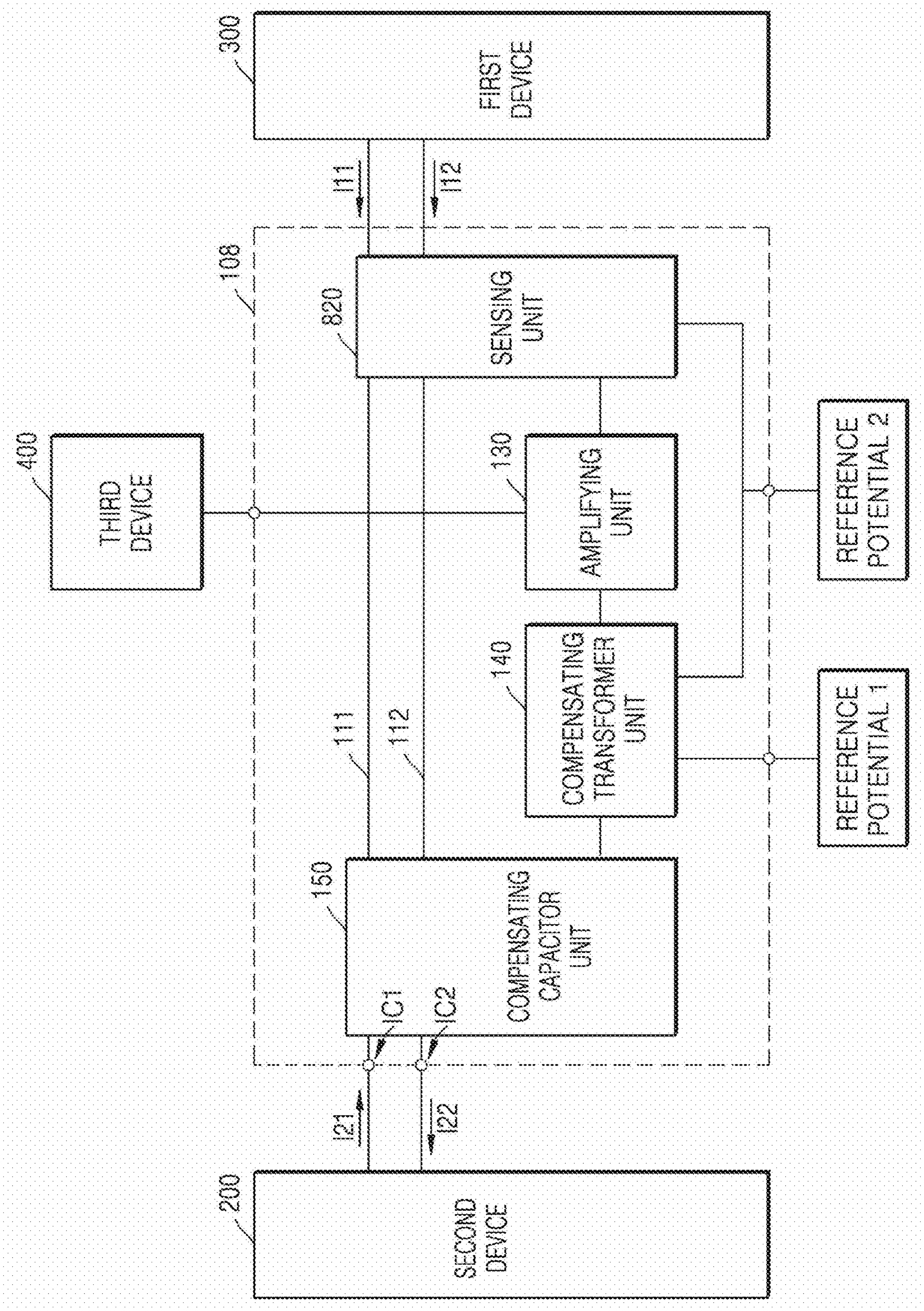
FIG. 58 is a schematic view of the configuration of a system including a compensating device according to an embodiment of the present disclosure.

FIG. 58 is a schematic view of the configuration of a system including a compensating device 108 according to an embodiment of the present disclosure.

The remaining components of the compensating device 108 except for a sensing unit 820 may correspond to the components described in the above-described embodiments with reference to from FIG. 2, and a specific configuration of the sensing unit 820 of the compensating device 108 is different from that of the sensing unit 120 described in the above-described embodiments with reference to from FIG. 2, and thus a different reference numeral is given to the sensing unit 820.

Therefore, descriptions of components corresponding to the above-described embodiments will be briefly described.

The compensating device 108 according to an embodiment of the present disclosure may actively compensate for first currents $I_{11}$ and $I_{12}$ or noise currents input as a common-mode current to at least two or more high current paths 111 and 112, respectively, connected to the first device 300.

Figure 64:
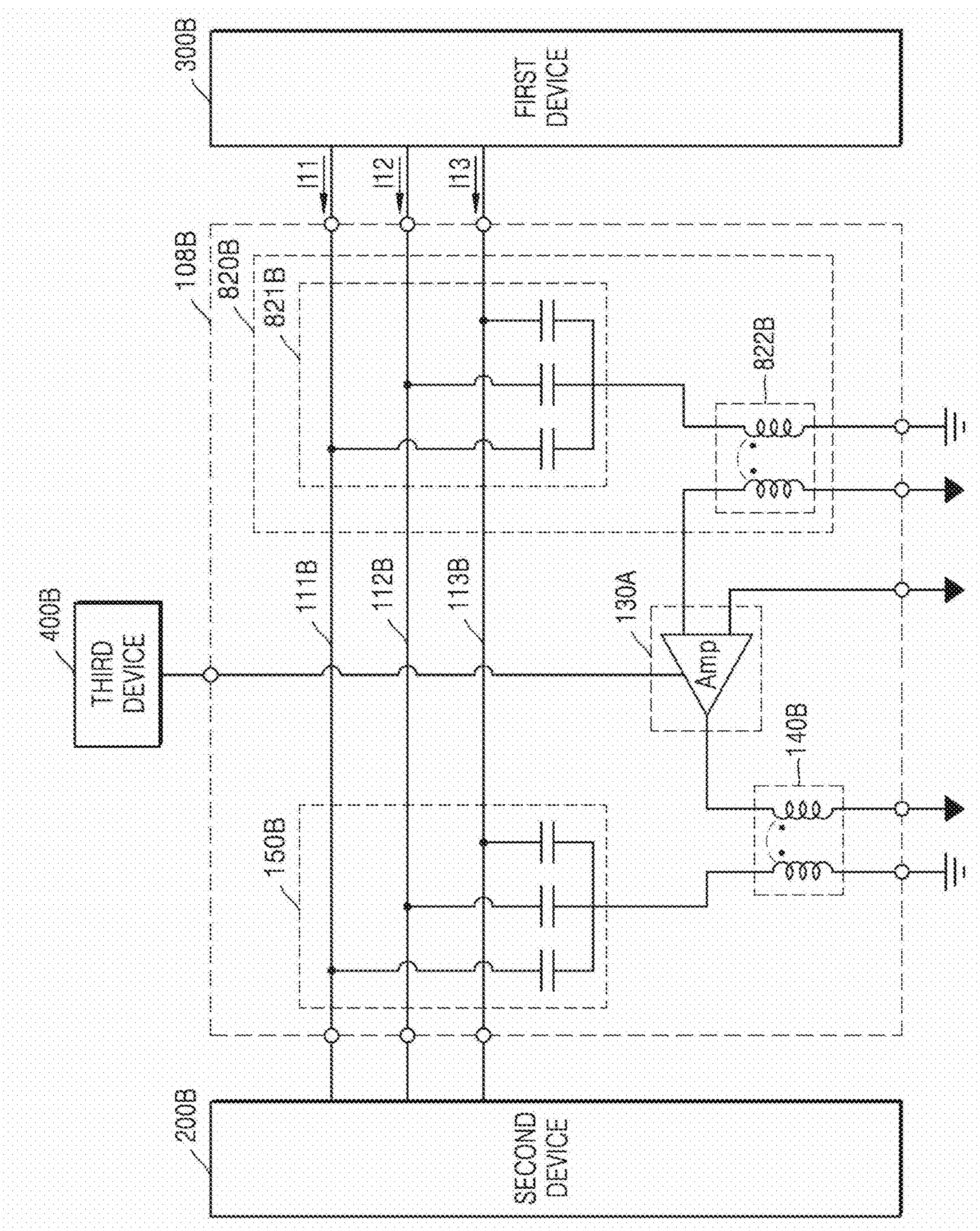
FIG. 64 is a diagram schematically showing the configuration of a compensating device according to another embodiment of the present disclosure.

Meanwhile, the two or more high current paths 111 and 112 may include two paths as shown in FIG. 58, three paths (e.g., three-phase three-line) as shown in FIG. 64, or four paths (e.g., three-phase four-line).

The sensing unit 820 may generate a sensing voltage on the basis of a noise voltage corresponding to the first currents $I_{11}$ and $I_{12}$ on the high current path. To this end, the sensing unit 820 may be electrically connected to each of the high current paths 111 and 112. In other words, the sensing unit 820 may refer to a means for sensing the first currents $I_{11}$ and $I_{12}$ on the high current paths 111 and 112.

According to an embodiment, the sensing unit 820 may be differentially connected to input terminals of an amplifying unit 130 to be described below.

The amplifying unit 130 may be electrically connected to the sensing unit 820, amplify a sensing signal output by the sensing unit 820, and generate an amplified signal.

Due to the amplification operation of the amplifying unit 130, the compensating device 108 may amplify the noise voltage corresponding to the first currents $I_{11}$ and $I_{12}$ to control a magnitude of the first current absorbed by a compensating capacitor unit. In other words, the compensating device 108 reduces an effective impedance of a capacitor of the compensating capacitor unit on the basis of the amplified voltage generated by the amplifying unit 130 to allow at least a portion of the first currents $I_{11}$ and $I_{12}$ to flow into the compensating device 108.

The amplifying unit 130 may be implemented by various means, as in the various embodiments described above.

The amplifying unit 130 may receive power from the third device 400 that is distinguished from the first device 300 and/or the second device 200 and generate an amplified voltage by amplifying a sensing voltage output by the sensing unit 820.

In an embodiment, a compensating transformer unit 140 may include a compensating transformer including a primary side electrically connected to the amplifying unit 130 and a secondary side electrically connected to a compensating capacitor unit 150 to be described below.

The compensating capacitor unit 150 may absorb at least a portion of the first currents $I_{11}$ and $I_{12}$ from the high current paths 111 and 112 on the basis of a compensation voltage generated by the above-described compensating transformer unit 140.

The compensating capacitor unit 150 may include at least two or more compensating capacitors respectively connecting the two or more high current paths 111 and 112 to a reference potential (the reference potential 1) of the compensating device 108.

Hereinafter, the compensating device 108 according to various embodiments will be described with reference to FIGS. 59 to 64 together with FIG. 58.

Figure 59:
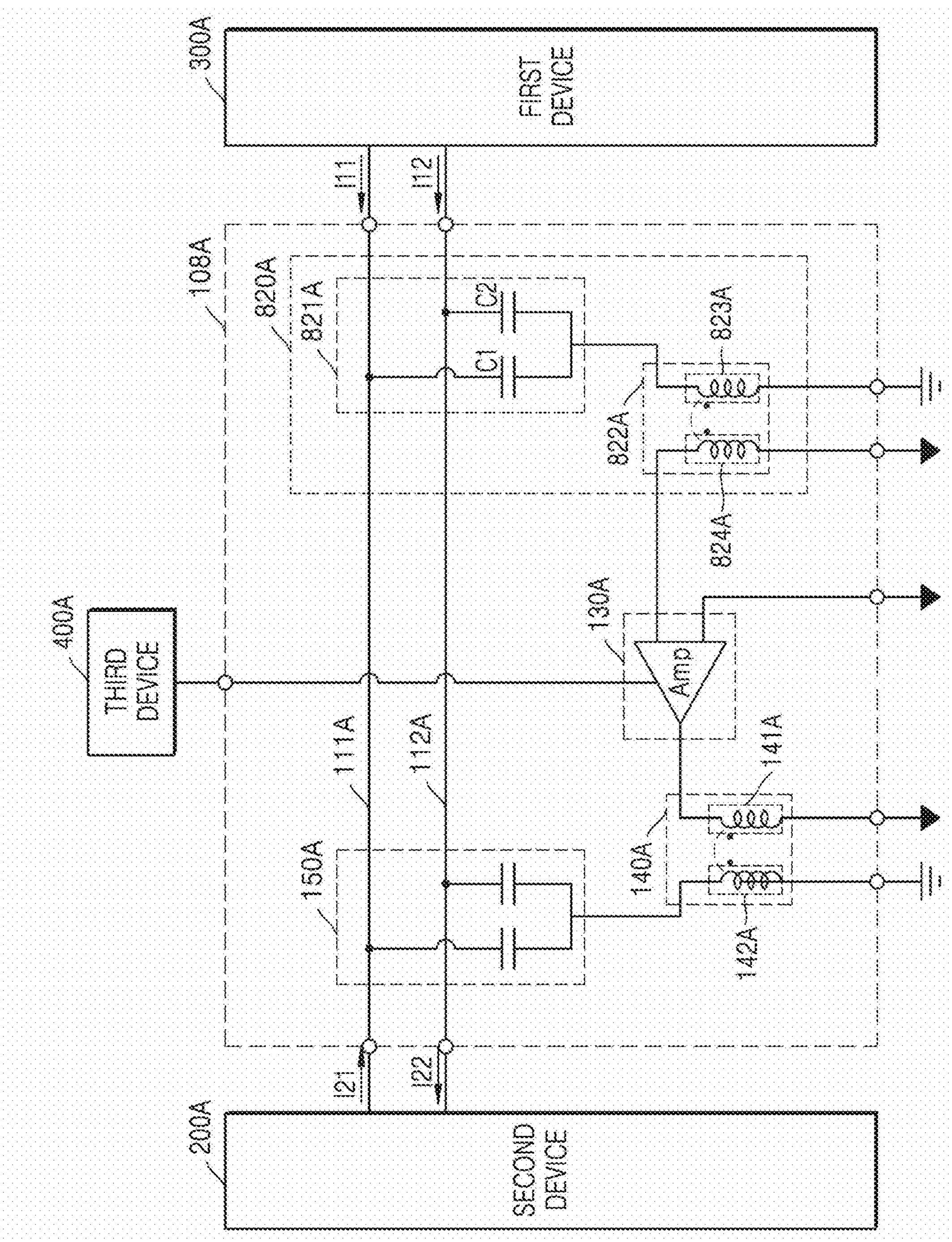
FIG. 59 is a diagram schematically showing the configuration of a compensating device used in a two-line system according to an embodiment of the present disclosure.

FIG. 59 is a diagram schematically showing the configuration of a compensating device 108A used in a two-line system according to an embodiment of the present disclosure.

A description of the respective components of the compensating device 108A may correspond to the amplifying unit 130A, the compensating transformer 140A, and the compensating capacitor unit 150A of the compensating devices according to the above-described embodiments. However, a sensing unit 820A of the compensating device 108A is different from the sensing unit 120 or the sensing transformer 120A of the above-described compensating devices, and thus descriptions will focus on these differences.

The sensing unit 820A according to an embodiment of the present disclosure may generate a sensing voltage on the basis of a noise voltage corresponding to first currents $I_{11}$ and $I_{12}$ on two or more high current paths 111 and 112.

According to an embodiment of the present disclosure, the above-described sensing unit 820A may include sensing capacitors 821A and a sensing transformer 822A. Specifically, the sensing unit 820A may include the sensing transformer 822A configured to generate the sensing voltage on a secondary side on the basis of the noise voltage applied to a primary side, and the sensing capacitor unit 821A connected to the primary side of the sensing transformer and configured to generate the noise voltage corresponding to the first current. In this case, the sensing transformer 822A may include a primary side 823A connected to the sensing capacitors 821A and a secondary side 824A connected to the amplifying unit 130A.

The sensing capacitors 821A may be means for sensing the first currents $I_{11}$ and $I_{12}$, or a noise voltage corresponding to a noise current. In this case, the sensing capacitors 821A may include a number of capacitors equal to the number of high current paths. In the present embodiment, the sensing capacitors 821A may include a first capacitor C1 and a second capacitor C2.

In this case, the first capacitor C1 of the sensing capacitors 821A may be connected to a first high current path 111A, and the second capacitor C2 of the sensing capacitors 821A may be connected to a second high current path 112A. Specifically, first terminals of the first capacitor C1 and the second capacitor C2 may be connected to the first high current path 111A and the second high current path 112A, respectively, and second terminals of the first capacitor C1 and the second capacitor C2 may be connected to one node to be connected to the primary side 823A of the sensing transformer 822A. That is, the first capacitor C1 and the second capacitor C2 may connect each of the at least two or more high current paths 111A and 112A to the primary side 823A of the sensing transformer 822A. In this case, the sensing capacitors 821A may be a means for sensing the noise voltage corresponding to the first currents $I_{11}$ and $I_{12}$ on the high current paths 111A and 112A while being isolated from the high current paths 111A and 112A.

Meanwhile, of the first currents $I_{11}$ and $I_{12}$ flowing through the two high current paths 111A and 112A, a minute current corresponding to an impedance of the compensating device 108A may pass through the first capacitor C1 and the second capacitor C2. According to an embodiment of the present disclosure, the sensing capacitors 821A may further include a sensor for sensing the minute current flowing through the first capacitor C1 and the second capacitor C2.

The noise voltage corresponding to the first currents $I_{11}$ and $I_{12}$ may be applied to a node between the second terminal of the sensing capacitor 821A and the sensing transformer 822A. Thereafter, the sensing transformer 822A may generate and output a sensing voltage on the basis of the noise voltage. That is, the sensing voltage may be applied between the secondary side 824A of the sensing transformer 822A and the amplifying unit 130A. In this case, the secondary side 824A of the sensing transformer 822A may be differentially connected to input terminals of the amplifying unit 130A, which will be described below.

The amplifying unit 130A of the present disclosure may generate an amplified voltage by amplifying the sensing voltage output by the above-described sensing unit 820A.

The amplifying unit 130A may generate the amplified voltage in consideration of a transformation ratio of the sensing transformer 820A and a transformation ratio of the compensating transformer unit 140. In this case, the amplifying unit 130A may be implemented by various means.

The compensating transformer unit 140 according to an embodiment may be implemented as a compensating transformer 140A. At this time, the compensating transformer 140A may be a means for outputting a compensation voltage to the side of the high current paths 111A and 112A (or a secondary side 142A to be described below) on the basis of the amplified voltage while being isolated from the high current paths 111A and 112A.

The compensation voltage may be applied to the secondary side 142A of the compensating transformer 140A. At this point, the secondary side 142A may be disposed on a path connecting the compensating capacitor unit 150A and a reference potential (the reference potential 1) of the compensating device.

Meanwhile, a primary side 141A of the compensating transformer 140A, the amplifying unit 130A, and the secondary side 822A of the sensing transformer 820A may be connected to a reference potential (the reference potential 2) that is distinguished from a reference potential to which the remaining components of the current compensating device 108A are connected.

As described above, the compensating capacitor unit 150 causes some currents corresponding to the compensation voltage, which is generated by the compensating transformer 140A, among the first currents $I_{11}$ and $I_{12}$ flowing through the two high current paths 111A and 112A to be absorbed into the compensating device 108A from each of the two high current paths 111A and 112A.

Figure 60:
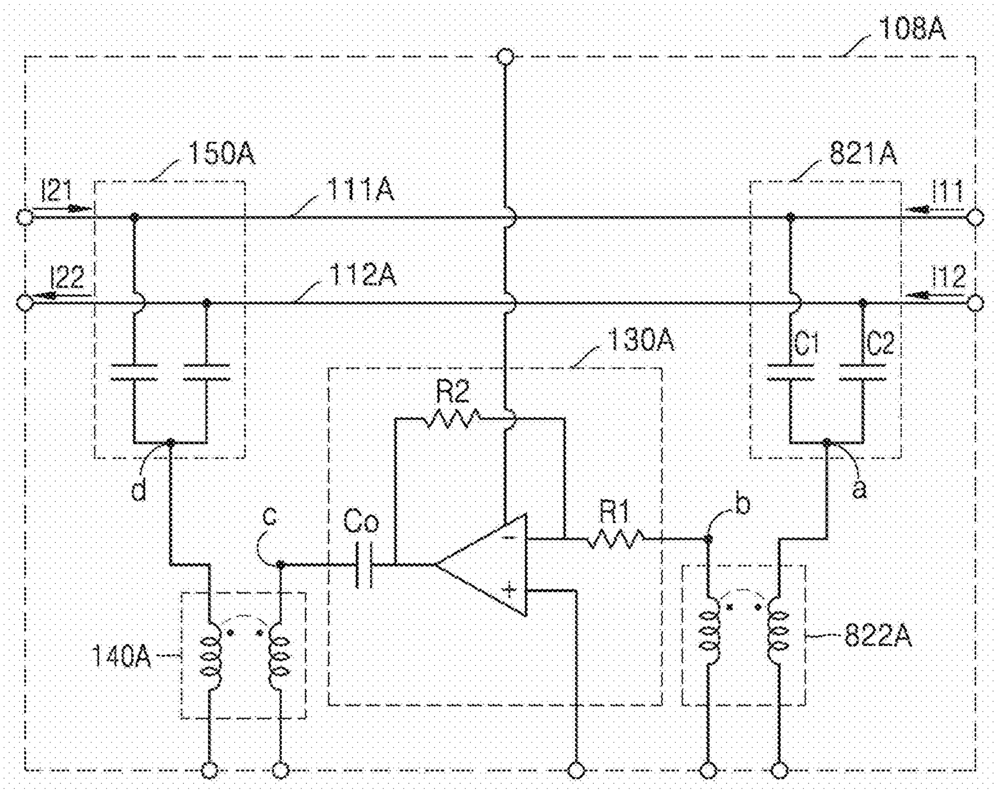
FIG. 60 is a diagram for describing a detailed operation of the compensating device according to an embodiment of the present disclosure.

FIG. 60 is a diagram for describing a detailed operation of the compensating device 108A according to an embodiment of the present disclosure.

The sensing capacitor unit 821A may sense a noise current flowing through the high current paths 111A and 112A or a noise voltage $V_n$ corresponding to first currents $I_{11}$ and $I_{12}$. The voltage applied to a node a between a second terminal of the sensing capacitor 821A and the sensing transformer 822A is a voltage (($\approx V_n$) similar to the noise voltage. Hereinafter, for convenience of description, the voltage applied to the node a will be referred to as the noise voltage $V_n$.

That is, when the noise voltage $V_n$ is applied to the node a of the compensating device 108A or the primary side of the sensing transformer 822A, the sensing transformer 822A may generate a sensing voltage on the basis of the noise voltage $V_n$. Specifically, when a transformation ratio of the sensing transformer 822A is 1:$N_{sen}$, the noise voltage $V_n$ passing through the sensing transformer 822A may be converted into a sensing voltage, and the sensing voltage may be $N_{sen}*V_n$. That is, the sensing voltage $N_{sen}*V_n$ may be applied to a node b between the secondary side 824A and the amplifying unit 130A.

In an embodiment, the amplifying unit 130A may be an inverting amplifier using an OP-amp. According to an embodiment of the present disclosure, an isolated-type voltage-sense current-compensation (VSCC) topology angular energy filter (AEF) may be implemented using an OP-amp to which power is applied from a DC power source through the third device 400.

The amplifying unit 130A may be an inverting amplifier including R1 and R2. The inverting amplifier is one of basic circuit structures of an operational amplifier. When "A" is a voltage gain of the amplifier, and β=R1/(R1+R2), a closed-loop voltage gain $A_{v.amp}$ is given as shown in Equation 21 below.

$$A_{v,amp} = -\frac{R_2}{R_1}\left(1 - \frac{1}{A\beta}\right) \quad \text{[Equation 21]}$$

Here, when Aβ>>1, $A_{v.amp}$≈R2/R1, and a polarity of the output voltage is reversed.

According to an embodiment of the present disclosure, the amplifying unit 130A may further include $C_o$. $C_o$ may be a high-pass filter for blocking the amplifier included in the amplifying unit 130A from operating at a low frequency lower than a target band for noise reduction.

Meanwhile, when the sensing voltage $N_{sen}*V_n$ is amplified through the amplifying unit 130A, the amplified voltage is applied to a node c between the amplifying unit 130A and the primary side 141A of the compensating transformer 140A. In this case, the amplified voltage may be $-N_{sen}*A_{v,amp}*V_n$.

When the amplified voltage $-N_{sen}*A_{v,amp}*V_n$ is applied to the node c of the compensating device 108A, the compensating transformer 140A may generate a compensation voltage on the basis of the amplified voltage $-N_{sen}*A_{v,amp}*V_n$. Specifically, it is assumed that a transformation ratio of the compensating transformer 140A is 1:Ninj.

In this case, the amplified voltage $-N_{sen}*A_{v,amp}*V_n$ after passing through the compensating transformer 822A may be converted into a compensation voltage, and the compensation voltage may be $-N_{sen}*N_{inj}*A_{v,amp}*V_n$. That is, the compensation voltage $-N_{sen}*N_{inj}*A_{v,amp}*V_n$ may be applied to a node d between the secondary side 142A of the compensating transformer and the compensating capacitor unit 150A.

At least two or more compensating capacitors of the compensating capacitor unit 150A may each have a first terminal connected to each of the high current paths 111A and 112A, and a second terminal of each of the compensating capacitors may be connected to one node d to be connected to the compensating transformer 140A. Each capacitor included in the compensating capacitor unit 150A has an effective impedance whose value is reduced due to the voltage applied to the high current paths 111A and 112A and the voltage applied to the node d.

Therefore, the compensating capacitor unit 150A may absorb at least a portion of the first currents $I_{11}$ and $I_{12}$ flowing through the high current paths 111A and 112A. That is, as a portion of the noise current is absorbed or flows into the compensating device 108A, the noise current transmitted to the second device 200A may be reduced or compensated for. This will be described in detail with reference to FIGS. 61 and 62.

Figure 61:
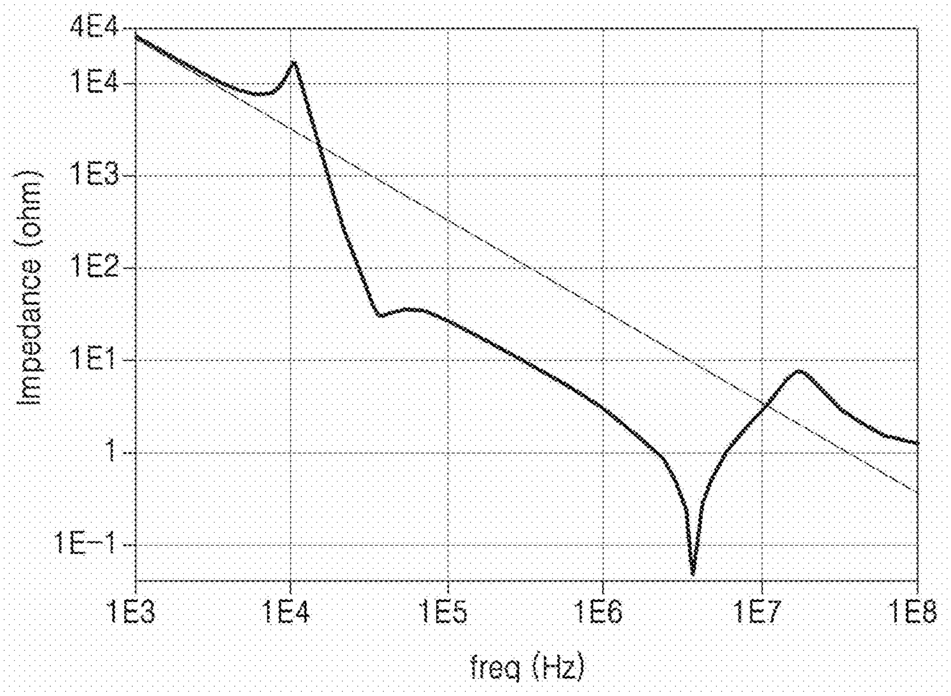
FIG. 61 is a graph for describing a reduction in impedance of a compensating capacitor unit in the compensating device according to an embodiment of the present disclosure.

FIG. 61 is a graph for describing a reduction in impedance of the compensating capacitor unit in the compensating device 108A according to an embodiment of the present disclosure.

Referring to FIG. 61, a first graph (thin straight line) on an impedance frequency response curve represents changes in impedance according to a frequency of a typical capacitor. On the other hand, a second graph (a thick line) represents changes in impedance according to a frequency of the compensating capacitor unit included in the compensating device 108A of the present disclosure.

An impedance of a capacitor $C_{inj}$—of a general compensating capacitor unit may be calculated as in Equation 22 below.

$$\frac{I_{inj}}{sC_{inj}} = V_n \qquad \text{[Equation 22]}$$

$$\frac{1}{sC_{inj}} = \frac{V_n}{I_{inj}} = \text{Impedance (Ohm)}$$

That is, the changes in impedance according to the frequency of a typical capacitor may be illustrated as shown in the first graph (the thin straight line).

On the other hand, the impedance of the capacitor $C_{inj}$ of the compensating capacitor unit included in the compensating device 108A of the present disclosure may be calculated as in Equation 23 below.

$$\frac{I_{inj}}{sC_{inj}} = (1 + N_{sen}N_{inj}A_{v,amp})V_n, \qquad \text{[Equation 23]}$$

$$\frac{1}{s(1 + N_{sen}N_{inj}A_{v,amp})C_{inj}} = \frac{V_n}{I_{inj}} = \text{Impedance (Ohm)}$$

In other words, in Equation 23, an effective impedance of the capacitor $C_{inj}$ may be expressed as in Equation 24.

$$C_{Y,eff}=(1+N_{sen}N_{inj}A_{v,amp})C_{inj} \qquad \text{[Equation 24]}$$

According to Equation 23 or Equation 24, the changes in impedance according to the frequency of the capacitor $C_{inj}$ included in the compensating capacitor unit 150A of the compensating device 108A may be illustrated as shown in the second graph (the thick line).

Specifically, referring to Equation 24, a value of $N_{sen}N_{inj}A_{v,amp}$ may increase or decrease according to the design of the sensing transformer 822A, the compensating transformer 140A, and the amplifying unit 130A of the compensating device 108A, and may have different characteristics depending on the frequency. For example, referring to FIG. 61, when the frequency is 6 MHz, the effective impedance may be the lowest.

That is, by designing the effective impedance of the capacitor $C_{inj}$ included in the compensating capacitor unit 150A to be reduced, the first current or the noise current may be absorbed from the high current paths 111A and 112A to the compensating capacitor unit 150A. In this regard, further description will be made with reference to FIG. 62.

Figure 62:
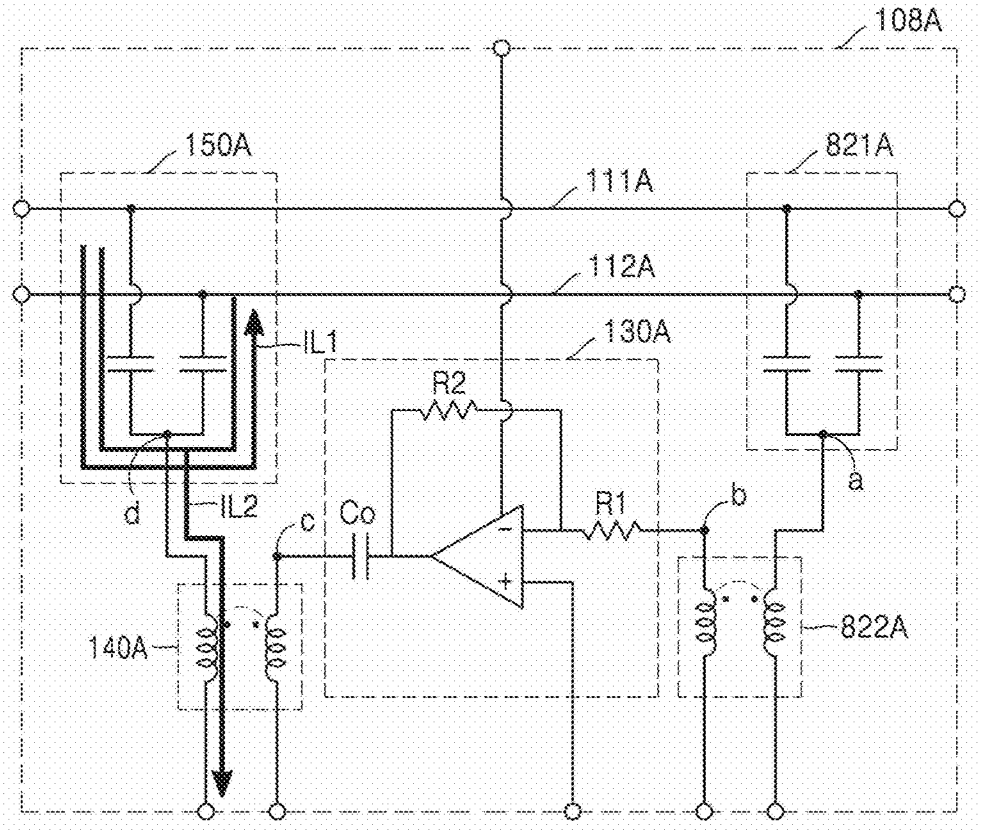
FIG. 62 is a view for describing a flow of first currents in the compensating device according to an embodiment of the present disclosure.

FIG. 62 is a view for describing a flow of the first currents $I_{11}$ and $I_{12}$ in the compensating device 108A according to an embodiment of the present disclosure.

Figure 63:
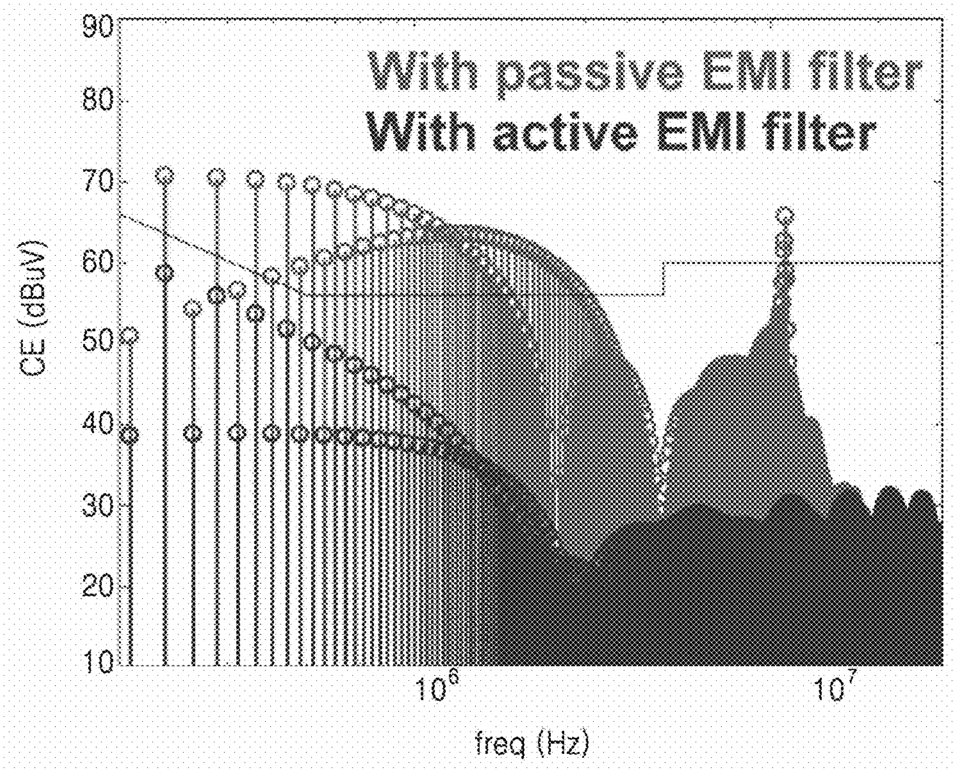
FIG. 63 is a simulation graph obtained by comparing noise reduction performance of the voltage-sense current-compensation (VSCC) compensating device according to an embodiment of the present disclosure and a passive electromagnetic interference (EMI) filter (or a passive compensating device) having the same capacitance value as the VSCC compensating device.

Referring to FIG. 63, the compensating capacitor unit 150A may be configured such that a current $IL_1$ flowing between the two high current paths 111A and 112A through the compensating capacitors satisfies a first predetermined current condition. In this case, the first predetermined current condition may be a condition in which a magnitude of the current $IL_1$ is smaller than a first predetermined threshold magnitude.

Meanwhile, the compensating capacitor unit 150A may be configured, such that a current $IL_2$ flowing between each of the two high current paths 111A and 112A and the reference potential (the reference potential 1) of the current compensating device 108A through the compensating capacitors satisfies a second predetermined condition.

Specifically, the compensation voltage applied to the node d may be $-N_{sen}N_{inj}A_{v,amp}V_n$, and therefore, the effective impedance of the compensating capacitor $C_{inj}$ may be reduced by $1/(1+N_{sen}N_{inj}A_{v,amp})$ times.

The first currents $I_{11}$ and $I_{12}$ (or noise current) flowing along the two high current paths 111A and 112A may be absorbed or flow into the capacitor $C_{inj}$ so as to flow to the reference potential (reference potential 1) of the compensating device 108A. That is, as the effective impedance of the capacitor $C_{inj}$ decreases, the current $IL_2$ may increase in response to the reduced effective impedance.

According to an embodiment of the present disclosure, the above-described second predetermined current condition may be a condition in which a magnitude of the current $IL_2$ is greater than or equal to a second predetermined threshold magnitude. In this case, the magnitude of the current $IL_2$ may vary according to a magnitude of the effective impedance of the capacitor $C_{inj}$. That is, in the compensating device 108A according to an embodiment of the present disclosure, the sensing transformer 822A, the compensating transformer 140A, and the amplifying unit 130A may be designed such that the current $IL_2$ is greater than or equal to the second threshold magnitude.

According to the above-described embodiment, as the first currents I11 and I22 flow from the two high current paths 111A and 112A along the compensating capacitor unit 150A, the first currents I11 and I22 transmitted to the second device 200A may be reduced.

FIG. 63 is a simulation graph obtained by comparing noise reduction performance of the VSCC compensating device 108A according to an embodiment of the present disclosure and a passive EMI filter (or a passive compensating device) having the same capacitance value as the VSCC compensating device 108A.

Referring to FIG. 63, in the graph, a horizontal axis represents a frequency, and a vertical axis represents a noise level of CM conducted emission (CE). A solid line represents an EMI noise standard. That is, when it exceeds the solid line (EMI noise standard), a product may not be shipped.

As can be seen from the above graph, it can be seen that, when the VSCC active EMI filter unit 108A of the present disclosure is used, the noise level is stably lower than the EMI noise standard as compared with the case in which the passive EMI filter is used. Specifically, it is confirmed in the simulation that when the VSCC active EMI filter unit 108A of the present disclosure operates, an additional noise reduction of 10 to 30 dB is achieved.

Therefore, the VSCC active EMI filter unit 108A may be reduced in area and weight while having better noise reduction performance as compared with the passive EMI filter.

FIG. 64 is a diagram schematically showing the configuration of a compensating device 108B according to another embodiment of the present disclosure.

The compensating device 108B of FIG. 64 is different from the compensating device 108A in the single-phase two-line system described with reference to FIG. 59 in that the compensating device 108B is used in a three-phase three-line system. Therefore, hereinafter, descriptions of contents overlapping with those described with reference to FIGS. 58 to 63 will be omitted, and descriptions will focus on differences.

The compensating device 108B includes three high current paths 111B, 112B, and 113B (e.g., R-phase, S-phase, and T-phase), and thus, has differences in sensing capacitors 821B and a compensating capacitor unit 150B.

The sensing capacitors 821B according to an embodiment are respectively connected to a first high current path 111B, a second high current path 112B, and a third high current path 113B to sense a noise voltage corresponding to first currents. Since the process of sensing a noise voltage corresponding to first currents $I_{11}$, $I_{12}$, and $I_{13}$ has already been described, a detailed description thereof will be omitted.

Meanwhile, the compensating capacitor unit 150B according to an embodiment provides a path through which at least a portion of a current, which corresponds to a compensation voltage generated by a compensating transformer 140B, among the first currents $I_{11}$, $I_{12}$, and $I_{13}$ is absorbed and flows.

The compensating device 108B according to the embodiment may be used to reduce (or cut off) the first currents $I_{11}$, $I_{12}$, and $I_{13}$ moving from a load of the three-phase three-line power system to a power source.

The compensating device 108B including the sensing capacitors 821B and a sensing transformer 822B may also be modified according to a three-phase four-line power system (see FIG. 12). The description of the compensating device for the three-phase four-line power system may correspond to the descriptions given above with reference to FIG. 12.

Meanwhile, in the compensating devices 100, 101, 102, 103, 104, 105, 106, 107, and 108 according to all the above-described embodiments and sub-embodiments thereof, at least some of the components may be compatible with each other. That is, one component of the compensating device described through an arbitrary embodiment may be incorporated into one component of the compensating device according to another embodiment.

[2] Active Current Compensation Device Capable of Detecting Malfunction

Figure 65:
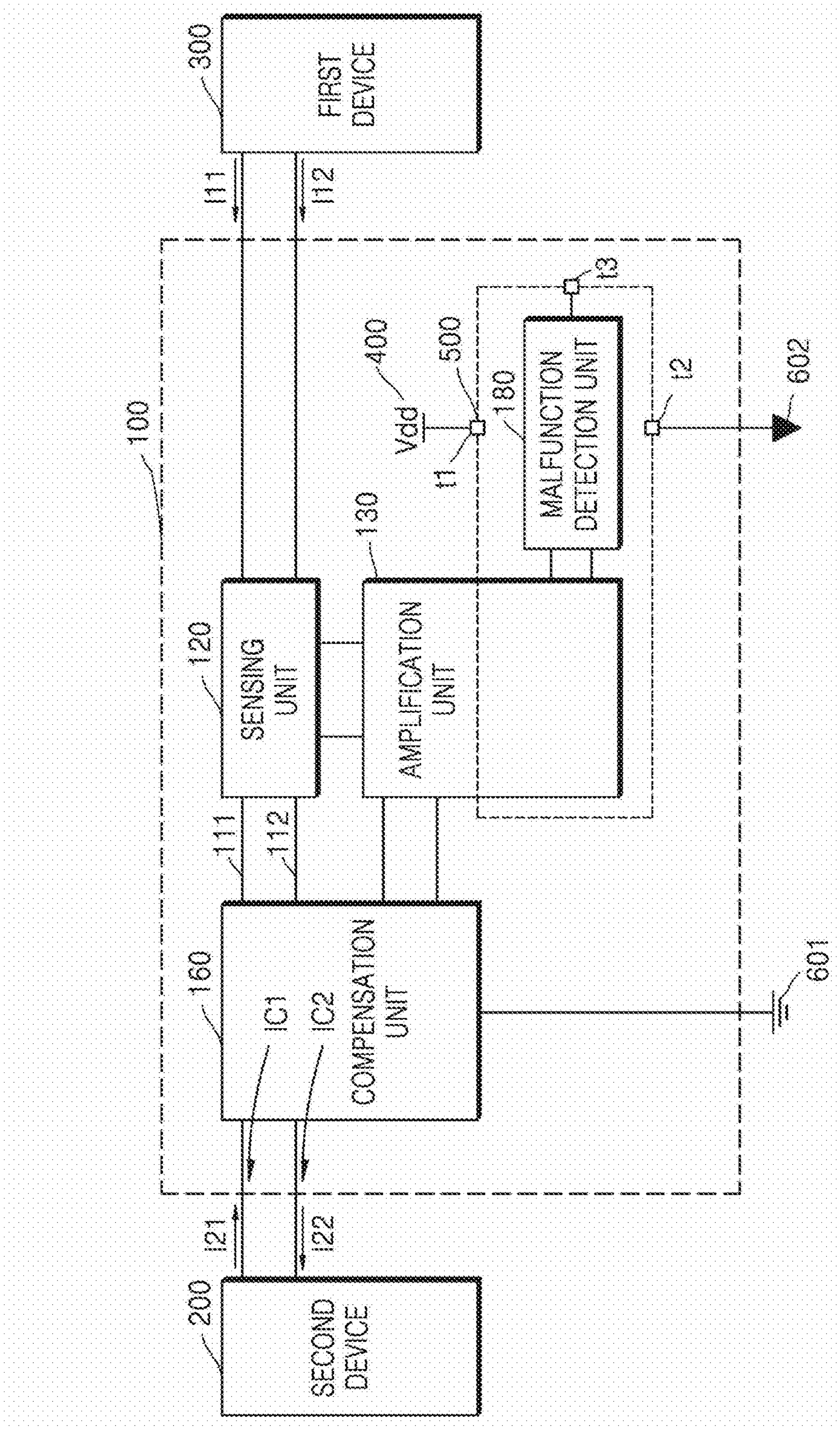
FIG. 65 schematically illustrates a configuration of a system including an active current compensation device according to an embodiment of the present disclosure.

FIG. 65 schematically illustrates a configuration of a system including an active current compensation device 100 according to an embodiment of the present disclosure. The active current compensation device 100 may actively compensate for first currents I11 and I12 (e.g., electromagnetic interference (EMI) noise current) that are input as a common-mode (CM) current through two or more high-current paths 111 and 112 from a first device 300.

Referring to FIG. 65, the active current compensation device 100 may include a sensing unit 120, an amplification unit 130, a malfunction detection unit 180, and a compensation unit 160.

In the present specification, the first device 300 may be any of various types of power systems using power supplied by a second device 200. For example, the first device 300 may be a load that is driven using the power supplied by the second device 200. In addition, the first device 300 may be a load (e.g., an electric vehicle) that stores energy using the power supplied by the second device 200 and is driven using the stored energy. However, the present disclosure is not limited thereto.

In the present specification, the second device 200 may be any of various types of systems for supplying power to the first device 300 in the form of current and/or voltage. For example, the second device 200 may be a device that produces and supplies power, and may also be a device (e.g., an electric vehicle charging device) that supplies power produced by another device. Of course, the second device 200 may also be a device that supplies stored energy. However, the present disclosure is not limited thereto.

A power converter may be located on the first device 300 side. For example, the first currents I11 and I12 may be input to the current compensation device 100 due to a switching operation of the power converter. That is, the first device 300 side may correspond to a noise source and the second device 200 side may correspond to a noise receiver.

The two or more high-current paths 111 and 112 may be paths for transmitting the power supplied from the second device 200, that is, second currents I21 and I22, to the first device 300, for example, may be power lines. For example, the two or more high-current paths 111 and 112 may be a live line and a neutral line. At least some portions of the high-current paths 111 and 112 may pass through the current compensation device 100. The second currents I21 and I22 may be an alternating current having a frequency of a second frequency band. The second frequency band may be, for example, a band having a range of 50 Hz to 60 Hz.

Further, the two or more high-current paths 111 and 112 may also be paths through which noise generated by the first device 300, that is, the first currents I11 and I12, is transmitted to the second device 200. The first currents I11 and I12 may be input as a common-mode current with respect to each of the two or more high-current paths 111 and 112. The first currents I11 and I12 may be currents that are unintentionally generated in the first device 300 due to various causes. For example, the first currents I11 and I12 may be noise currents generated by virtual capacitance between the first device 300 and the surrounding environment. Alternatively, the first currents I11 and I12 may be noise currents generated due to a switching operation of the power converter of the first device 300. The first currents I11 and I12 may be currents having a frequency of a first frequency band. The first frequency band may be a frequency band higher than the second frequency band described above. The first frequency band may be, for example, a band having a range of 150 KHz to 30 MHz.

Figure 73:
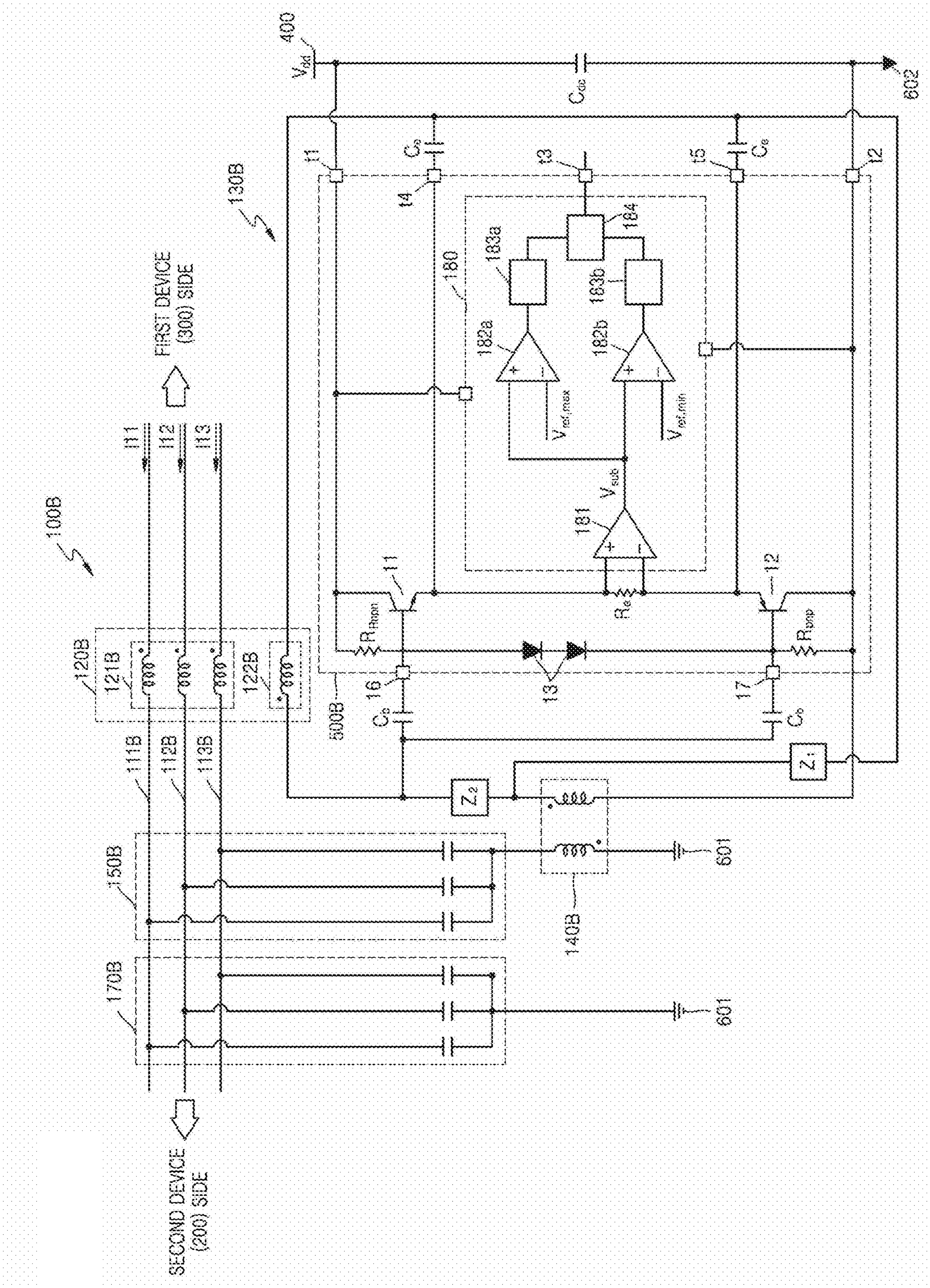
FIG. 73 schematically illustrates a configuration of an active current compensation device according to an embodiment of the present disclosure.

Meanwhile, the two or more high-current paths 111 and 112 may include two paths as shown in FIG. 65, may include three paths as shown in FIG. 73, or may include four paths. The number of the high-current paths 111 and 112 may vary depending on the type and/or form of power used by the first device 300 and/or the second device 200.

The sensing unit 120 may sense the first currents I11 and I12 on the two or more high-current paths 111 and 112 and generate an output signal corresponding to the first currents I11 and I12. That is, the sensing unit 120 may refer to a component that senses the first currents I11 and I12 on the high-current paths 111 and 112. In order for the sensing unit 120 to sense the first currents I11 and I12, at least some portions of the high-current paths 111 and 112 may pass through the sensing unit 120, but a portion of the sensing unit 120, which generates the output signal according to the sensing result, may be isolated from the high-current paths 111 and 112. For example, the sensing unit 120 may be implemented as a sensing transformer. The sensing transformer may sense the first currents I11 and I12 on the high-current paths 111 and 112 in a state of being isolated from the high-current paths 111 and 112.

According to an embodiment, the sensing unit 120 may be differentially connected to input terminals of the amplification unit 130.

The amplification unit 130 may be electrically connected to the sensing unit 120, and may amplify the output signal output from the sensing unit 120 to generate an amplified output signal. The term "amplification" by the amplification unit 130, as used herein, may mean that the magnitude and/or phase of an object to be amplified is adjusted. The amplification unit 130 may be implemented by various components, and may include active elements. In an embodiment, the amplification unit 130 may include bipolar junction transistors (BJTs). For example, the amplification unit 130 may include a plurality of passive elements, such as resistors and capacitors, in addition to the BJTs. However, the present disclosure is not limited thereto, and the component for the "amplification" described in the present disclosure may be used without being limited to the amplification unit 130 of the present disclosure. A second reference potential 602 of the amplification unit 130 and a first reference potential 601 of the current compensation device 100 may be distinguished from each other.

The malfunction detection unit 180 may detect a malfunction or failure of the amplification unit 130. According to an embodiment, signals at two nodes included in the amplification unit 130 may be differentially input to the malfunction detection unit 180. The malfunction detection unit 180 may detect a differential signal between the two nodes included in the amplification unit 130. The malfunction detection unit 180 may detect the malfunction of the amplification unit 130 using the input differential signal. For example, the malfunction detection unit 180 may detect the malfunction of the amplification unit 130 by determining whether the differential signal satisfies a predetermined condition. The malfunction detection unit 180 may output a signal indicating whether the amplification unit 130 is malfunctioning. According to an embodiment, the malfunction detection unit 180 may include active elements.

The malfunction detection unit 180 and at least a portion of the amplification unit 130 may be physically embedded into one IC chip 500.

Figure 66:
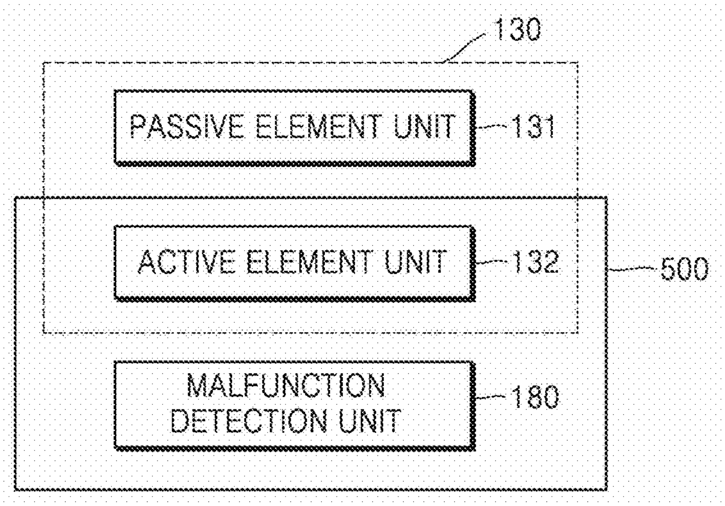
FIG. 66 illustrates an inclusion relation of an amplification unit and a malfunction detection unit with respect to an integrated circuit (IC) chip, according to an embodiment of the present disclosure.

FIG. 66 illustrates an inclusion relation of the amplification unit 130 and the malfunction detection unit 180 with respect to the IC chip 500, according to an embodiment of the present disclosure.

Referring to FIG. 66, the amplification unit 130 may include a passive element unit 131 and an active element unit 132. The passive element unit 131 includes only passive elements, and the active element unit 132 includes active elements. In an embodiment, the active element unit 132 may further include passive elements as well as the active elements. Examples of a detailed configuration of the amplification unit 130 including the passive element unit 131 and the active element unit 132 will be described below with reference to FIGS. 68 and 69.

Referring to FIGS. 65 and 66 together, a combination of the passive element unit 131 and the active element unit 132 may perform a function of generating an amplified signal from the output signal output from the sensing unit 120. The amplified signal may be input to the compensation unit 160.

As described above, signals at two nodes included in the amplification unit 130 may be differentially input to the malfunction detection unit 180. The malfunction detection unit 180 may sense a differential signal of the two nodes. The two nodes may be two nodes included in the active element unit 132. In an embodiment, the two nodes may also be connected to the passive element unit 131.

In an embodiment, the active element unit 132 of the amplification unit 130 and the malfunction detection unit 180 may be physically integrated into the single IC chip 500. However, this is merely an embodiment, and of course, in other embodiments, the passive element unit 131 and the active element unit 132 of the amplification unit 130 and the malfunction detection unit 180 may be physically integrated into the single IC chip 500.

The malfunction detection unit 180 may include active elements. Here, a reference potential of the malfunction detection unit 180 may be equal to the second reference potential 602, which is the reference potential of the amplification unit 130. The reference potential of the malfunction detection unit 180 may be different from the first reference potential 601, which is the reference potential of the current compensation device 100 (e.g., a reference potential of the compensation unit 160).

The amplification unit 130 and the malfunction detection unit 180 may receive power from a power supply 400 that is distinguished from the first device 300 and/or the second device 200. The amplification unit 130 may receive the power from the power supply 400, and amplify the output signal output from the sensing unit 120 to generate an amplified current. The malfunction detection unit 180 may receive power from a power supply 600 and generate an output signal indicating whether a differential signal input from the amplification unit 130 is in a predetermined range. The output signal may indicate whether the amplification unit 130 is malfunctioning.

The power supply 400 may be a device that receives power from a power source that is independent of the first device 300 and the second device 200 and generates input power of the amplification unit 130 and the malfunction detection unit 180. Alternatively, the power supply 400 may also be a device that receives power from any one of the first device 300 and the second device 200 and generates input power of the amplification unit 130 and the malfunction detection unit 180.

The IC chip 500 may include a terminal t1 to be connected to the power supply 400, a terminal t2 to be connected to the second reference potential 602, and a terminal t3 for outputting the output signal of the malfunction detection unit 180. The IC chip 500 may further include other terminals.

For example, in an embodiment in which only the active element unit 132 of the amplification unit 130 other than the passive element unit 131 is integrated into the IC chip 500 together with the malfunction detection unit 180, the other terminals may be connected to the passive element unit 131.

For another example, in an embodiment in which the passive element unit 131 and the active element unit 132, which are included in the amplification unit 130, and the malfunction detection unit 180 are all integrated into the single IC chip 500, the other terminals may be connected to an output terminal of the sensing unit 120 and an input terminal of the compensation unit 160.

The compensation unit 160 may generate a compensation current on the basis of the amplified output signal generated by the amplification unit 130. An output side of the compensation unit 160 may be connected to the high-current paths 111 and 112 to allow compensation currents IC1 and IC2 to flow to the high-current paths 111 and 112, but may be isolated from the amplification unit 130. For example, the compensation unit 160 may include a compensation transformer for the isolation. For example, the output signal of the amplification unit 130 may flow through a primary side of the compensation transformer, and the compensation current based on the output signal may be generated on a secondary side of the compensation transformer.

In order to cancel the first currents I11 and I12, the compensation unit 160 may inject the compensation currents IC1 and IC2 into the high-current paths 111 and 112 through the two or more high-current paths 111 and 112, respectively. The compensation currents IC1 and IC2 may have the same magnitude and an opposite phase compared to the first currents I11 and I12.

Figure 67:
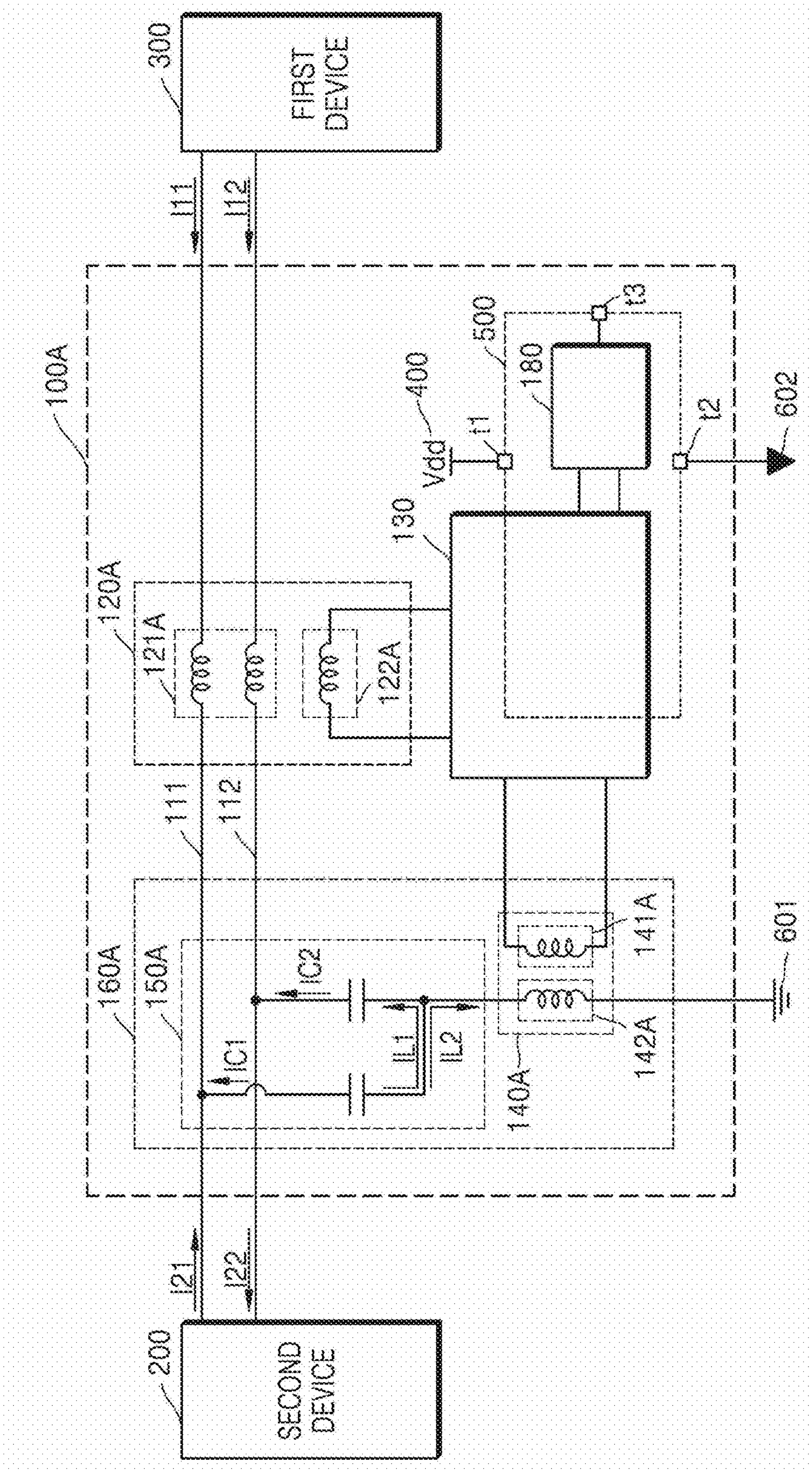
FIG. 67 illustrates a more specific example of the embodiment described with reference to FIG. 65, and schematically illustrates an active current compensation device according to an embodiment of the present disclosure.

FIG. 67 illustrates a more specific example of the embodiment described with reference to FIG. 65, and schematically illustrates an active current compensation device 100A according to an embodiment of the present disclosure. The active current compensation device 100A may actively compensate for first currents I11 and I12 (e.g., a noise current) input as a common-mode current with respect to each of two high-current paths 111 and 112 connected to the first device 300.

Referring to FIG. 67, the active current compensation device 100A may include a sensing transformer 120A, an amplification unit 130, a malfunction detection unit 180, and a compensation unit 160A.

In an embodiment, the sensing unit 120 described above may include the sensing transformer 120A. In this case, the sensing transformer 120A may be a component for sensing the first currents I11 and I12 on the high-current paths 111 and 112 in a state of being isolated from the high-current paths 111 and 112. The sensing transformer 120A may sense the first currents I11 and I12 that are noise currents input through the high-current paths 111 and 112 (e.g., power lines) from the first device 300 side.

The sensing transformer 120A may include a primary side 121A disposed on the high-current paths 111 and 112 and a secondary side 122A differentially connected to input terminals of the amplification unit 130. The sensing transformer 120A may generate an induced current, which is directed to the secondary side 122A (e.g., a secondary winding), on the basis of magnetic flux densities induced due to the first currents I11 and I12 at the primary side 121A (e.g., a primary winding) disposed on the high-current paths 111 and 112. The primary side 121A of the sensing transformer 120A may be, for example, a winding in which each of a first high-current path 111 and a second high-current path 112 is wound around one core. However, the present disclosure is not limited thereto, and the primary side 121A of the sensing transformer 120A may have a form in which the first high-current path 111 and the second high-current path 112 pass through the core.

Specifically, the sensing transformer 120A may be configured such that the magnetic flux density induced due to the first current I11 on the first high-current path 111 (e.g., a live line) and the magnetic flux density induced due to the first current $I_{12}$ on the second high-current path 112 (e.g., neutral line) are overlapped (or reinforced) with each other. In this case, the second currents I21 and I22 also flow through the high-current paths 111 and 112, and thus the sensing transformer 120A may be configured such that a magnetic flux density induced due to the second current I21 on the first high-current path 111 and a magnetic flux density induced due to the second current I22 on the second high-current path 112 cancel each other. In addition, as an example, the sensing transformer 120A may be configured such that magnitudes of the magnetic flux densities, which are induced due to the first currents I11 and I12 of a first frequency band (e.g., a band having a range of 150 KHz to 30 MHz), are greater than magnitudes of the magnetic flux densities induced due to the second currents I21 and I22 of a second frequency band (for example, a band in a range of 50 Hz to 60 Hz).

As described above, the sensing transformer 120A may be configured such that the magnetic flux densities induced due to the second currents I21 and I22 may cancel each other so that only the first currents I11 and I12 may be sensed. That is, the current induced in the secondary side 122A of the sensing transformer 120A may be a current into which the first currents I11 and I12 are converted at a predetermined ratio.

For example, in the sensing transformer 120A, when a turns ratio of the primary side 121A and the secondary side 122A is $1:N_{sen}$, and a self-inductance of the primary side 121A of the sensing transformer 120A is Lsen, the secondary side 122A may have a self-inductance of $N_{sen2}$*Lsen. In this case, the current induced in the secondary side 122A has a magnitude that is $1/N_{sen}$ times that of the first currents I11 and I12. For example, the primary side 121A and the secondary side 122A of the sensing transformer 120A may be coupled with a coupling coefficient of Ksen.

The secondary side 122A of the sensing transformer 120A may be connected to the input terminals of the amplification unit 130. For example, the secondary side 122A of the sensing transformer 120A may be differentially connected to the input terminals of the amplification unit 130 and supply the induced current to the amplification unit 130.

The amplification unit 130 may amplify the current that is sensed by the sensing transformer 120A and induced in the secondary side 122A. For example, the amplification unit 130 may amplify the magnitude of the induced current at a predetermined ratio and/or adjust a phase of the induced current.

The malfunction detection unit 180 may detect a malfunction or failure of the amplification unit 130. According to an embodiment, a differential signal between two nodes included in the amplification unit 130 may be input to the malfunction detection unit 180. The malfunction detection unit 180 may detect whether the amplification unit 130 is malfunctioning by detecting whether the input differential signal is in a predetermined range. The malfunction detection unit 180 may output a signal, which indicates whether the amplification unit 130 is malfunctioning, through an output terminal t3. The malfunction detection unit 180 may include active elements.

According to various embodiments of the present disclosure, the malfunction detection unit 180 and at least a portion of the amplification unit 130 may be physically integrated together into the single IC chip 500.

The amplification unit 130 and the malfunction detection unit 180 may be connected to the second reference potential 602, and the second reference potential 602 may be distinguished from the first reference potential 601 of the current compensation device 100A (or the compensation unit 160A). The amplification unit 130 and the malfunction detection unit 180 may be connected to a power supply 400.

The IC chip 500 may include a terminal t1 to be connected to the power supply 400, a terminal t2 to be connected to the second reference potential 602, and the terminal t3 through which the output signal of the malfunction detection unit 180 is output.

According to an embodiment, only an active element unit 132 of the amplification unit 130 other than a passive element unit 131 may be integrated into the IC chip 500 together with the malfunction detection unit 180. In this case, the IC chip 500 may further include a terminal to be connected to the passive element unit 131.

According to an embodiment, both the passive element unit 131 and the active element unit 132 included in the amplification unit 130 may be integrated into the IC chip 500 together with the malfunction detection unit 180. In this case, the IC chip 500 may further include a terminal to be connected to an output terminal of the sensing unit 120 and a terminal to be connected to an input terminal of the compensation unit 160.

The compensation unit 160A may be an example of the compensation unit 160 described above. The compensation unit 160A may include a compensation transformer 140A and a compensation capacitor unit 150A. An amplified current amplified by the above-described amplification unit 130 flows through a primary side 141A of the compensation transformer 140A.

The compensation transformer 140A may be a component for isolating the amplification unit 130 including active elements from the high-current paths 111 and 112. That is, the compensation transformer 140A may be a component for generating a compensation current (in a secondary side 142A) to be injected into the high-current paths 111 and 112 on the basis of the amplified current in a state of being isolated from the high-current paths 111 and 112.

The compensation transformer 140A may include the primary side 141A differentially connected to output terminals of the amplification unit 130 and the secondary side 142A connected to the high-current paths 111 and 112. The compensation transformer 140A may induce a compensation current, which is directed toward the secondary side 142A (e.g., a secondary winding), on the basis of a magnetic flux density induced due to the amplified current flowing through the primary side 141A (e.g., a primary winding).

In this case, the secondary side 142A may be disposed on a path connecting the compensation capacitor unit 150A, which will be described below, and the first reference potential 601 of the current compensation device 100A. That is, one end of the secondary side 142A is connected to the high-current paths 111 and 112 through the compensation capacitor unit 150A, and the other end of the secondary side 142A may be connected to the first reference potential 601 of the active current compensation device 100A. Meanwhile, the primary side 141A of the compensation transformer 140A, the amplification unit 130, the malfunction detection unit 180, and the secondary side 122A of the sensing transformer 120A may be connected to the second reference potential 602, which is distinguished from the reference potential of the other components of the active current compensation device 100A. The first reference potential 601 of the current compensation device 100A and the second reference potential 602 of the amplification unit 130 may be distinguished from each other.

As described above, in an embodiment of the present disclosure, the component generating the compensation current uses a reference potential (i.e., the second reference potential 602) different from that of the other components and uses the separate power supply 400 and thus may operate in a state of being isolated from the other components, thereby improving the reliability of the active current compensation device 100A.

In the compensation transformer 140A, when a turns ratio of the primary side 141A and the secondary side 142A is 1:Ninj, and a self-inductance of the primary side 141A of the compensation transformer 140A is Linj, the secondary side 142A may have a self-inductance of $N_{inj2}$*Linj. In this case, the current induced in the secondary side 142A has a magnitude that is $1/N_{inj}$ times that of the current (i.e., the amplified current) flowing in the primary side 141A. The primary side 141A and the secondary side 142A of the compensation transformer 140A may be coupled with a coupling coefficient of kinj.

The current converted through the compensation transformer 140A may be injected into the high-current paths 111 and 112 (e.g., power lines) through the compensation capacitor unit 150A as compensation currents IC1 and IC2. Accordingly, the compensation currents IC1 and IC2 may have the same magnitude and an opposite phase compared to the first currents I11 and I12 to cancel the first currents I11 and I12. Accordingly, a magnitude of a current gain of the amplification unit 130 may be designed to be Nsen*Ninj.

As described above, the compensation capacitor unit 150A may provide a path through which the current generated by the compensation transformer 140A flows to each of the two high-current paths 111 and 112.

The compensation capacitor unit 150A may include two Y-capacitors (Y-caps) each having one end connected to the secondary side 142A of the compensation transformer 140A and the other end connected to the high-current paths 111 and 112. One ends of the two Y-caps share a node connected to the secondary side 142A of the compensation transformer 140A, and the opposite ends of the two Y-caps may have a node connected to the first high-current path 111 and the second high-current path 112.

The compensation capacitor unit 150A may allow the compensation currents IC1 and IC2 induced by the compensation transformer 140A to flow in the power line. As the compensation currents IC1 and IC2 compensate (cancel) for the first currents I11 and I12, the current compensation device 100A may reduce noise.

Meanwhile, the compensation capacitor unit 150A may be configured such that a current IL1 flowing between the two high-current paths 111 and 112 through the compensation capacitors has a magnitude less than a first threshold magnitude. In addition, the compensation capacitor unit 150A may be configured such that a current IL2 flowing between each of the two high-current paths 111 and 112 and the first reference potential 601 through the compensation capacitors has a magnitude less than a second threshold magnitude.

The active current compensation device 100A may be implemented as an isolated structure by using the compensation transformer 140A and the sensing transformer 120A.

Figure 68:
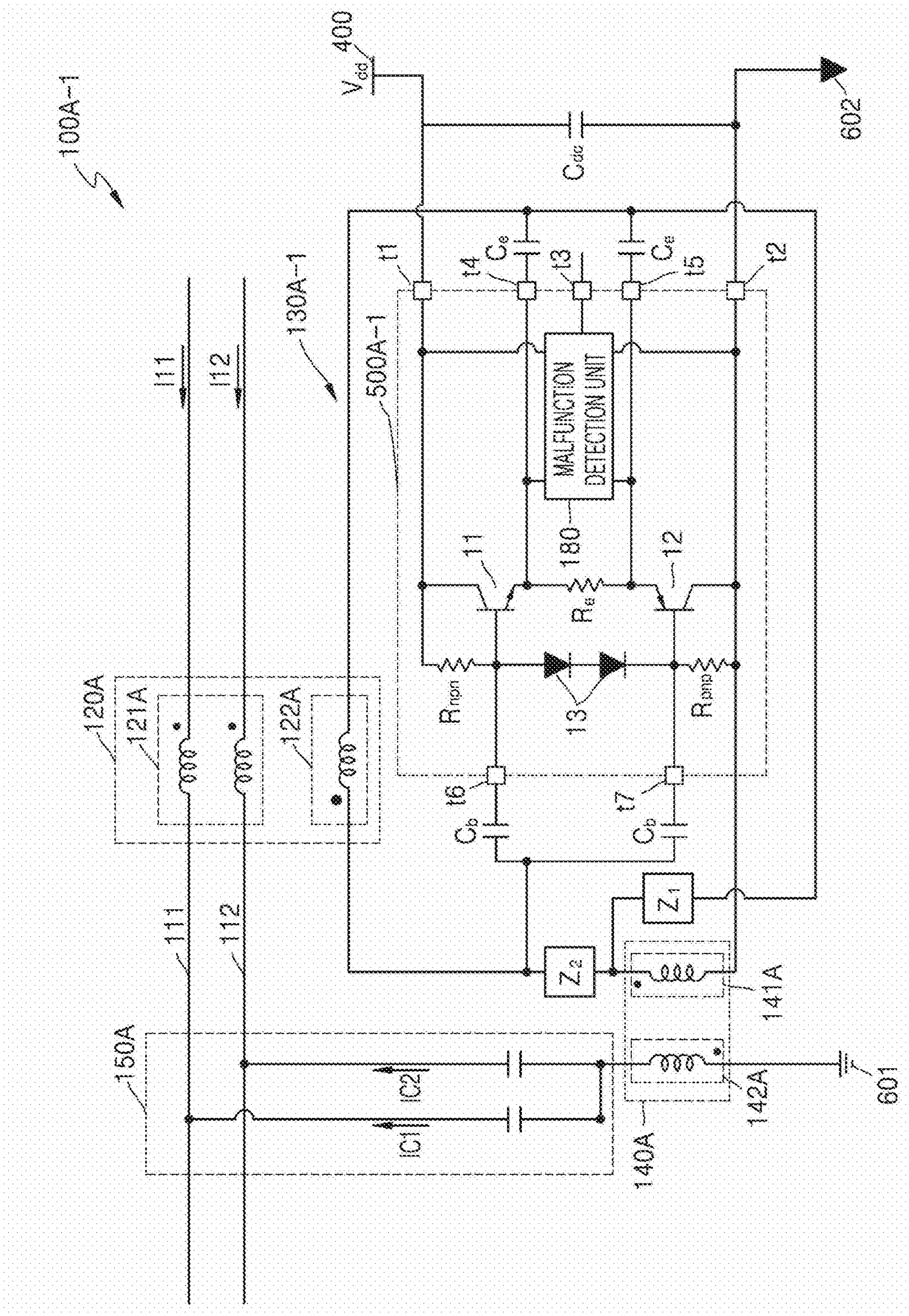
FIG. 68 illustrates a more specific example of the embodiment described with reference to FIG. 67, and schematically illustrates an active current compensation device according to an embodiment of the present disclosure.

FIG. 68 illustrates a more specific example of the embodiment described with reference to FIG. 67, and schematically illustrates an active current compensation device 100A-1 according to an embodiment of the present disclosure. The active current compensation device 100A-1 shown in FIG. 68 is an example of the active current compensation device 100A shown in FIG. 67. An amplification unit 130A-1 included in the active current compensation device 100A-1 is an example of the amplification unit 130 of the active current compensation device 100A.

The amplification unit 130A-1 included in the active current compensation device 100A-1 may include a passive element unit and an active element unit. The passive element unit of the amplification unit 130A-1 may include Cb, Ce, Z1, Z2, and Cdc. The active element unit of the amplification unit 130A-1 may include a first transistor 11, a second transistor 12, a diode 13, Rnpn, Rpnp, and Re.

In an embodiment, the first transistor 11 may be an npn BJT, and the second transistor 12 may be a pnp BJT. For example, the amplification unit 130A-1 may have a push-pull amplifier structure including an npn BJT and a pnp BJT.

An induced current induced in a secondary side 122A by a sensing transformer 120A may be differentially input to the amplification unit 130A-1. Only alternating current (AC) signals may be selectively coupled through Cb and Ce included in the amplification unit 130A-1.

The power supply 400 supplies a DC voltage Vdd, which is based on the second reference potential 602, to drive the amplification unit 130A-1 and a malfunction detection unit

180. Cdc is a DC decoupling capacitor for the DC voltage Vdd, and may be connected in parallel between the power supply 400 and the second reference potential 602. Only AC signals may be coupled between both collectors of the first transistor 11 (e.g., an npn BJT) and the second transistor 12 (e.g., a pnp BJT) through Cdc.

In the active element unit of the amplification unit 130A-1, an operating point of each of the first and second transistors 11 and 12 may be controlled through Rnpn, Rpnp, and Re. Rnpn may connect a collector terminal of the first transistor 11 (e.g., an npn BJT), which is a terminal of the power supply 400, and a base terminal of the first transistor 11 (e.g., npn BJT). Rpnp may connect a collector terminal of the second transistor 12 (e.g., a pnp BJT), which is a terminal of the second reference potential 602, and a base terminal of the second transistor 12 (e.g., a pnp BJT). Re may connect an emitter terminal of the first transistor 11 and an emitter terminal of the second transistor 12.

The secondary side 122A of the sensing transformer 120A according to an embodiment may be connected between a base side and an emitter side of each of the first and second transistors 11 and 12. A primary side 141A of a compensation transformer 140A according to an embodiment may be connected between a collector side and the base side of each of the first and second transistors 11 and 12. Here, the connection includes an indirectly connected case. The amplification unit 130A-1 according to an embodiment may have a regression structure in which an output current is injected back into the base of each of the first and second transistors 11 and 12. Due to the regression structure, the amplification unit 130A-1 may stably obtain a constant current gain for operating the active current compensation device 100A-1.

When an input voltage of the amplification unit 130A-1 has a positive swing of greater than zero due to a noise signal, the first transistor 11 (e.g., an npn BJT) may operate. In this case, an operating current may flow through a first path passing through the first transistor 11. When the input voltage of the amplification unit 130A-1 has a negative swing of less than zero due to a noise signal, the second transistor 12 (e.g., a pnp BJT) may operate. In this case, the operating current may flow through a second path passing through the second transistor 12.

In various embodiments, noise to be compensated for may have a high level depending on the first device 300, and thus it may be desirable to use the power supply 400 with voltage as high as possible. For example, the power supply 400 may be independent of the first device 300 and the second device 200.

As power is supplied from the power supply 400, the nodes of the first transistor 11 and the second transistor 12 may swing greatly in a common mode. For example, voltages at base and emitter nodes of each of the first and second transistors 11 and 12 may swing in a common mode.

By confirming whether the active element unit of the amplification unit 130A-1 operates normally as described above, it is possible to confirm whether the active current compensation device 100A-1 itself operates normally. In other words, it is possible to confirm whether the active current compensation device 100A-1 operates normally by confirming whether a DC bias of the amplification unit 130A-1 is normal.

As described above, since the voltage swings at the nodes of each of the first and second transistors 11 and 12 in a common mode, a malfunction may be detected by sensing only a differential DC voltage between the first transistor 11 and the second transistor 12. That is, in order to detect the malfunction of the amplification unit 130A-1, only the differential DC voltage between the first transistor 11 and the second transistor 12 may be selectively sensed.

For example, when the differential DC voltage between one node of the first transistor 11 and one node of the second transistor 12 satisfies a predetermined condition, the active current compensation device 100A-1 may be determined to be normal.

Accordingly, the malfunction detection unit 180 according to an embodiment may output a signal indicating the malfunction of the amplification unit 130A-1 by using the differential DC voltage between two nodes included in the amplification unit 130A-1.

For example, a differential signal between one node of the first transistor 11 and one node of the second transistor 12 may be input to the malfunction detection unit 180. In an embodiment, the differential signal may be a differential DC voltage between the emitter of the first transistor 11 and the emitter of the second transistor 12.

According to an embodiment, the malfunction detection unit 180 may output a signal indicating a normal state through an output terminal t3 when the differential DC voltage between the emitter of the first transistor 11 and the emitter of the second transistor 12 is in a predetermined range. The malfunction detection unit 180 may output a signal indicating a malfunction state through the output terminal t3 when the differential DC voltage is outside the predetermined range.

In embodiments of the present disclosure, the malfunction detection unit 180 and at least a portion of the amplification unit 130A-1 may be physically integrated into one IC chip 500A-1.

In an embodiment, as shown in FIG. 68, the active element unit of the amplification unit 130A-1 and the malfunction detection unit 180 may be integrated into the single IC chip 500A-1. For example, the first transistor 11, the second transistor 12, the diode 13, Rnpn, Rpnp, and Re of the active element unit and the malfunction detection unit 180 may be integrated into the single IC chip 500A-1. In this case, the IC chip 500A-1 may include a terminal t1 to be connected to the power supply 400, a terminal t2 to be connected to the second reference potential 602, the terminal t3 through which the output signal of the malfunction detection unit 180 is output, and terminals (e.g., t4, t5, t6, and t7) to be connected to the passive element unit. For example, the terminals to be connected to the passive element unit may include the terminal t4 corresponding to the emitter of the first transistor 11 and the terminal t5 corresponding to the emitter of the second transistor 12. In the embodiment described with reference to FIG. 68, two terminals t4 and t5 each corresponding to the emitter may also correspond to differential inputs of the malfunction detection unit 180. Each of the terminals t4 and t5 corresponding to the emitters may be connected to Ce of the passive element unit. In addition, the terminals to be connected to the passive element unit may include the terminal t6 corresponding to the base of the first transistor 11 and the terminal t7 corresponding to the base of the second transistor 12. Each of the terminals t6 and t7 corresponding to the bases may be connected to Cb of the passive element unit.

However, the present disclosure is not limited thereto. In other embodiments, the IC chip 500A-1 may further include at least a portion of the passive element unit of the amplification unit 130A-1. In other embodiments, the IC chip 500A-1 may include all of the active element unit and the passive element unit of the amplification unit 130A-1 and the malfunction detection unit 180.

According to embodiments of the present disclosure, by embedding the malfunction detection unit 180 in the IC chip 500A-1 in which the active element unit of the amplification unit 130A-1 is integrated, it is possible to achieve a reduction in size and price as compared to a case of separately configuring the malfunction detection unit 180 using commonly used commercial elements. In addition, by integrating the malfunction detection unit 180 and at least a portion of the amplification unit 130A-1 into the single IC chip 500A-1, the IC chip 500A-1 or the current compensation device 100A-1 may have versatility as an independent component and may be commercialized.

A detailed description of the malfunction detection unit 180 will be given below with reference to FIGS. 70 to 72.

Figure 69:
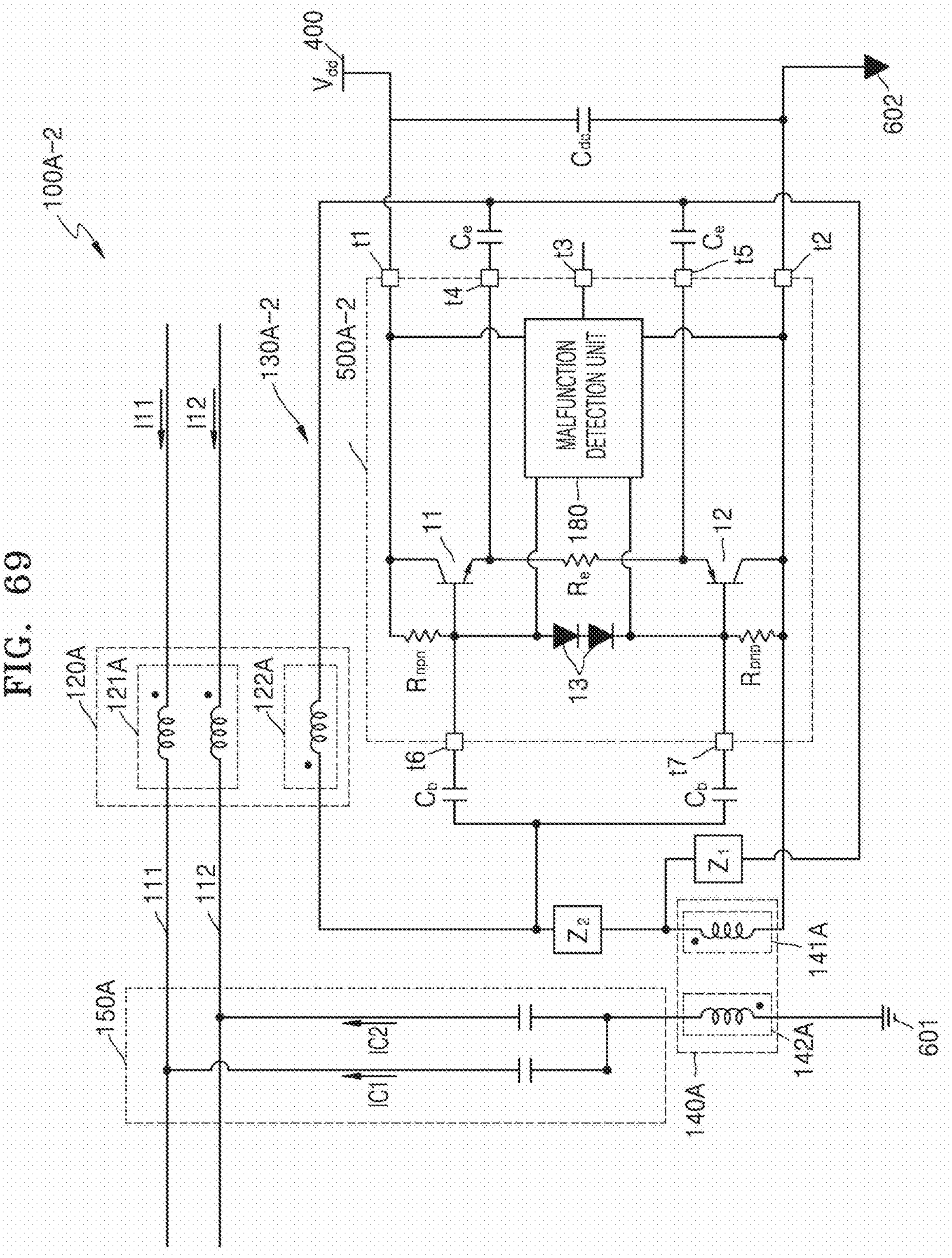
FIG. 69 illustrates another more specific example of the embodiment described with reference to FIG. 67, and schematically illustrates an active current compensation device according to an embodiment of the present disclosure.

FIG. 69 illustrates another more specific example of the embodiment described with reference to FIG. 67, and schematically illustrates an active current compensation device 100A-2 according to an embodiment of the present disclosure. The active current compensation device 100A-2 shown in FIG. 69 is an example of the active current compensation device 100A shown in FIG. 67. An amplification unit 130A-2 included in the active current compensation device 100A-2 is an example of the amplification unit 130 of the active current compensation device 100A.

The amplification unit 130A-2 shown in FIG. 69 corresponds to the amplification unit 130A-1 shown in FIG. 68, but positions (nodes) to which a malfunction detection unit 180 is connected are different. Specifically, in an IC chip 500A-2, a differential DC voltage between a base of a first transistor 11 and a base of a second transistor 12 may be input to the malfunction detection unit 180. Accordingly, since a description of the amplification unit 130A-2 corresponds to the description of the amplification unit 130A-1, the amplification unit 130A-2 will be briefly described.

In an embodiment, a passive element unit of the amplification unit 130A-2 may include Cb, Ce, Z1, Z2, and Cdc. An active element unit of the amplification unit 130A-2 may include the first transistor 11, the second transistor 12, a diode 13, Rnpn, Rpnp, and Re. In an embodiment, the first transistor 11 may be an npn BJT, and the second transistor 12 may be a pnp BJT. For example, the amplification unit 130A-2 may have a push-pull amplifier structure including an npn BJT and a pnp BJT. The amplification unit 130A-2 according to an embodiment may have a regression structure in which an output current is injected back into the base of each of the first and second transistors 11 and 12.

When an input voltage of the amplification unit 130A-2 has a positive swing of greater than zero due to a noise signal, the first transistor 11 (e.g., an npn BJT) may operate. When the input voltage of the amplification unit 130A-2 has a negative swing of less than zero due to a noise signal, the second transistor 12 (e.g., a pnp BJT) may operate.

As power is supplied from the power supply 400, a voltage may swing greatly at base and emitter nodes of each of the first and second transistors 11 and 12 in a common mode. Here, it is possible to confirm whether the active current compensation device 100A-2 operates normally by confirming whether a DC bias of the amplification unit 130A-2 is normal.

As described above, since the voltage swings at the base and emitter nodes of each of the first and second transistors 11 and 12 in a common mode, a malfunction may be detected by sensing only a differential DC voltage between one node of the first transistor 11 and one node of the second transistor 12.

According to the embodiment described with reference to FIG. 69, the differential DC voltage between the base of the first transistor 11 and the base of the second transistor 12 may be input to the malfunction detection unit 180. According to an embodiment, the malfunction detection unit 180 may output a signal indicating a normal state through an output terminal t3 when the differential DC voltage between the base of the first transistor 11 and the base of the second transistor 12 is in a predetermined range. The malfunction detection unit 180 may output a signal indicating a malfunction state through the output terminal t3 when the differential DC voltage between the base of the first transistor 11 and the base of the second transistor 12 is outside the predetermined range.

In embodiments of the present disclosure, the malfunction detection unit 180 and at least a portion of the amplification unit 130A-2 may be physically integrated into the single IC chip 500A-2.

In an embodiment, as shown in FIG. 69, the active element unit of the amplification unit 130A-2 and the malfunction detection unit 180 may be integrated into the single IC chip 500A-2. For example, the first transistor 11, the second transistor 12, the diode 13, Rnpn, Rpnp, and Re of the active element unit and the malfunction detection unit 180 may be integrated into the single IC chip 500A-2. In this case, the IC chip 500A-2 may include a terminal t1 to be connected to the power supply 400, a terminal t2 to be connected to the second reference potential 602, the terminal t3 through which the output signal of the malfunction detection unit 180 is output, and terminals (e.g., t4, t5, t6, and t7) to be connected to the passive element unit. For example, the terminals to be connected to the passive element unit may include the terminal t4 corresponding to an emitter of the first transistor 11 and the terminal t5 corresponding to an emitter of the second transistor 12. Each of the terminals t4 and t5 corresponding to the emitters may be connected to Ce of the passive element unit. In addition, the terminals to be connected to the passive element unit may include the terminal t6 corresponding to the base of the first transistor 11 and the terminal t7 corresponding to the base of the second transistor 12. In the embodiment described with reference to FIG. 69, two terminals t6 and t7 each corresponding to the base may also correspond to differential inputs of the malfunction detection unit 180. Each of the terminals t6 and t7 corresponding to the bases may be connected to Cb of the passive element unit.

However, the present disclosure is not limited thereto. In other embodiments, the IC chip 500A-2 may further include at least a portion of the passive element unit of the amplification unit 130A-2. In other embodiments, the IC chip 500A-2 may include all of the active element unit and the passive element unit of the amplification unit 130A-2 and the malfunction detection unit 180.

A detailed description of the malfunction detection unit 180 will be given below with reference to FIGS. 70 to 72.

In the following, the description of the amplification unit 130 is equally applicable to the amplification units 130A-1 and 130A-2.

Figure 70:
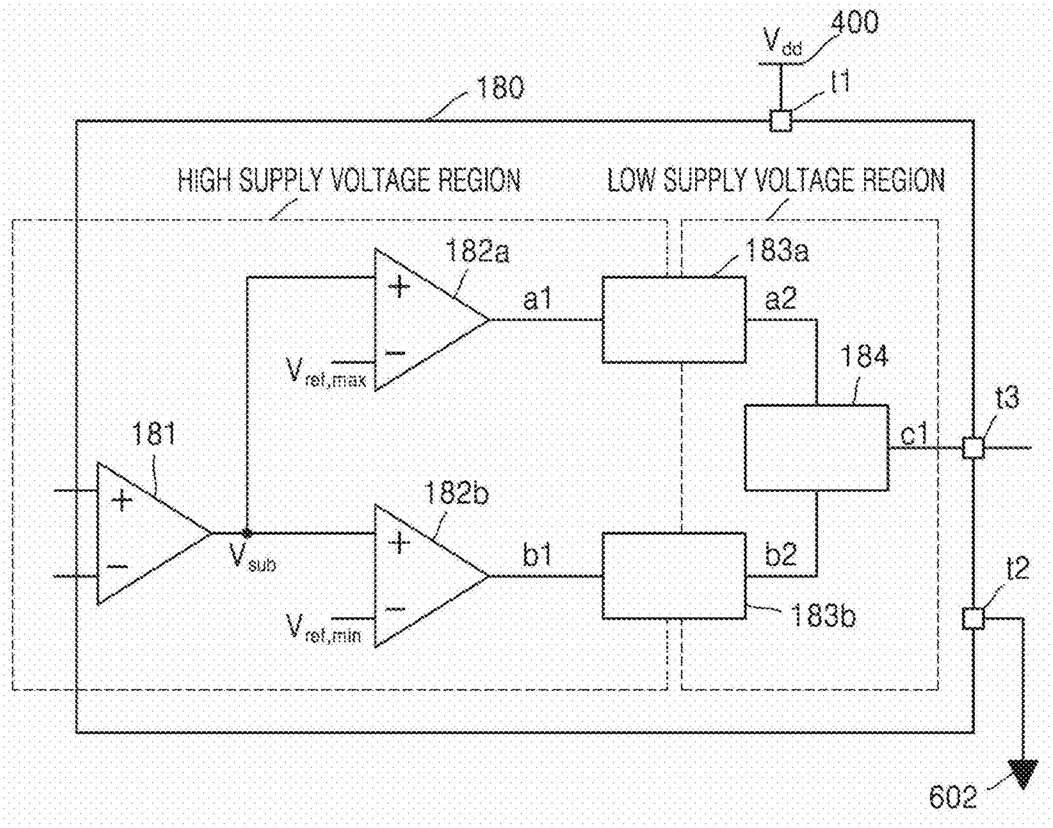
FIG. 70 illustrates a functional configuration of the malfunction detection unit according to an embodiment of the present disclosure.

FIG. 70 illustrates a functional configuration of the malfunction detection unit 180 according to an embodiment of the present disclosure.

Referring to FIG. 70, the malfunction detection unit 180 may include a subtractor 181, a first comparator 182*a*, a second comparator 182*b*, a first level shifter 183*a*, a second level shifter 183*b*, and a logic circuit 184. However, this is merely an embodiment, the malfunction detection unit 180 of the present disclosure is not limited thereto.

The malfunction detection unit 180 is applicable to the IC chips 500, 500A-1, and 500A-2 according to the various embodiments described above.

In various embodiments, signals of the two nodes included in the amplification unit 130, 130A-1, or 130A-2 may be differentially input to the subtractor 181 of the malfunction detection unit 180. As described above, a signal of one node of the first transistor 11 and a signal of one node of the second transistor 12 may be differentially input to the subtractor 181.

The subtractor 181 may selectively sense only a differential DC voltage between the node of the first transistor 11 and the node of the second transistor 12. Since the subtractor 181 senses a differential voltage at the two nodes, the subtractor 181 may ignore a common mode swing at the two nodes. The subtractor 181 may output the sensed differential DC voltage as a differential DC voltage Vsub.

In an embodiment, in the case of the IC chip 500A-1 shown in FIG. 68, the subtractor 181 may output the differential DC voltage Vsub between the emitter of the first transistor 11 and the emitter of the second transistor 12. In this case, input terminals of the subtractor 181 may share nodes with the emitters of the first and second transistors 11 and 12.

In an embodiment, in the case of the IC chip 500A-2 shown in FIG. 69, the subtractor 181 may output the differential DC voltage Vsub between the base of the first transistor 11 and the base of the second transistor 12. In this case, the input terminals of the subtractor 181 may share nodes with the bases of the first and second transistors 11 and 12.

Meanwhile, a voltage at each input terminal of the subtractor 181 may swing, and the swing may correspond to a magnitude of a rated voltage Vdd of the amplification unit 130. Thus, the subtractor 181 should have a rated voltage corresponding to the rated voltage Vdd of the amplification unit 130. Accordingly, the subtractor 181 may be driven by receiving the supply voltage Vdd of the power supply 400 as it is.

Since the malfunction detection unit 180 should not affect the operation of the amplification unit 130, the subtractor 181 of the malfunction detection unit 180 may have a high input impedance. For example, the subtractor 181 may be configured as a circuit having an input impedance of greater than 10 KOhm.

According to an embodiment, the subtractor 181 may include a rail-to-rail operational amplifier.

The first and second comparators 182*a* and 182*b* may detect whether a magnitude of the differential DC voltage Vsub, which is an output of the subtractor 181, is in a predetermined range. When the magnitude of the differential DC voltage Vsub is in the predetermined range, the amplification unit 130 may be determined to be normal, and when the magnitude of the differential DC voltage Vsub is outside the predetermined range, the amplification unit 130 may be determined to be malfunctioning. For example, when the differential DC voltage Vsub is between a maximum reference voltage Vref, max and a minimum reference voltage Vref, min, the amplification unit 130 may be normal. When the differential DC voltage Vsub is higher than the maximum reference voltage Vref, max or lower than the minimum reference voltage Vref, min, the amplification unit 130 may be malfunctioning.

The maximum reference voltage Vref, max and the minimum reference voltage Vref, min may be preset according to various embodiments. Hereinafter, criteria for setting the maximum reference voltage Vref, max and the minimum reference voltage Vref, min will be described.

In the embodiment described with reference to in FIG. 68, the subtractor 181 may sense the differential DC voltage Vsub between the emitter of the first transistor 11 and the emitter of the second transistor 12. When the amplification unit 130 operates normally, the differential DC voltage Vsub may correspond to Ie*Re. Here, Re is a resistor connecting the emitter terminal of the first transistor 11 and the emitter terminal of the second transistor 12, and Ie represents current flowing through Re. Ie and Re may be determined according to the design. In the present embodiment, the maximum reference voltage Vref, max may be set to be higher than Ie*Re by a specified magnitude. The minimum reference voltage Vref, min may be set to be lower than Ie*Re by a specified magnitude.

In the embodiment described with reference to FIG. 69, the subtractor 181 may sense the differential DC voltage Vsub between the base of the first transistor 11 and the base of the second transistor 12. When the amplification unit 130 operates normally, the differential DC voltage Vsub may correspond to Ie*Re+2Vbe, bjt. Here, Re is a resistor connecting the emitter terminal of the first transistor 11 and the emitter terminal of the second transistor 12, and Ie represents current flowing through Re. Ie and Re may be determined according to the design. Vbe, bjt represents voltage between the base and the emitter of the first transistor 11 or the second transistor 12. In the present embodiment, the maximum reference voltage Vref, max may be set to be higher than Ie*Re+2Vbe, bjt by a specified magnitude. The minimum reference voltage VREF, MIN may be set to be lower than Ie*Re+2Vbe, bjt by a specified magnitude. For example, the maximum reference voltage Vref, max may be set to 2 V and the minimum reference voltage Vref, min may be set to 1.4 V. However, the present disclosure is not limited thereto.

The first comparator 182*a* may output a first signal a1 indicating whether the differential DC voltage Vsub is lower than the maximum reference voltage Vref, max. The second comparator 182*b* may output a second signal b1 indicating whether the differential DC voltage Vsub is higher than the minimum reference voltage Vref, min.

Meanwhile, a high voltage may still exist at the input terminal of each of the first and second comparators 182*a* and 182*b*, and thus the first and second comparators 182*a* and 182*b* may each have a rated voltage corresponding to the rated voltage Vdd of the amplification unit 130. Accordingly, the first and second comparators 182*a* and 182*b* may be driven by receiving the supply voltage Vdd of the power supply 400 as it is.

According to an embodiment, the first and second comparators 182*a* and 182*b* may include an open-loop two-stage operational amplifier.

The first and second level shifters 183*a* and 183*b* may lower voltages of the output signals of the comparators 182*a* and 182*b*, respectively.

Since a gate voltage of a metal oxide semiconductor field effect transistor (MOSFET) included in the logic circuit 184 is lower than the rated voltage Vdd of each of the comparators 182*a* and 182*b*, the first and second signals a1 and b1 may be input to the logic circuit 184 after the voltage thereof is lowered. Accordingly, by using the level shifters 183*a* and 183*b*, only the voltage level of the first and second signals a1 and b1 may be lowered while a sign thereof is maintained.

The first signal a1 output from the first comparator 182*a* may be input to the first level shifter 183*a*. The first level shifter 183$a$ may output a third signal a2 by lowering the voltage level of the first signal a1.

The second signal b1 output from the second comparator 182$b$ may be input to the second level shifter 183$b$. The second level shifter 183$b$ may output a fourth signal b2 by lowering the voltage level of the second signal b1.

A rated voltage of an input terminal of each of the level shifters 183$a$ and 183$b$ may correspond to the supply voltage Vdd of the power supply 400. A rated voltage of an output terminal of each of the level shifters 183$a$ and 183$b$ may be lower than the supply voltage Vdd.

For example, the supply voltage Vdd of the power supply 400 may be 12 V, and the rated voltage of the output terminal of each of the level shifters 183$a$ and 183$b$ may be 5 V.

The third signal a2 and the fourth signal b2 may be input to the logic circuit 184. The logic circuit 184 may use the third signal a2 and the fourth signal b2 to output a fifth signal c1 indicating whether the differential DC voltage Vsub is between the maximum reference voltage Vref, max and the minimum reference voltage Vref, min. The fifth signal c1 may be a digital signal of "0" or "1." For example, when the fifth signal c1 indicates "0," the amplification unit 130 may be in a normal state, and when the fifth signal c1 indicates "1," the amplification unit 130 may be in a malfunction state. Of course, the reverse of the above description may be possible.

Figure 71:
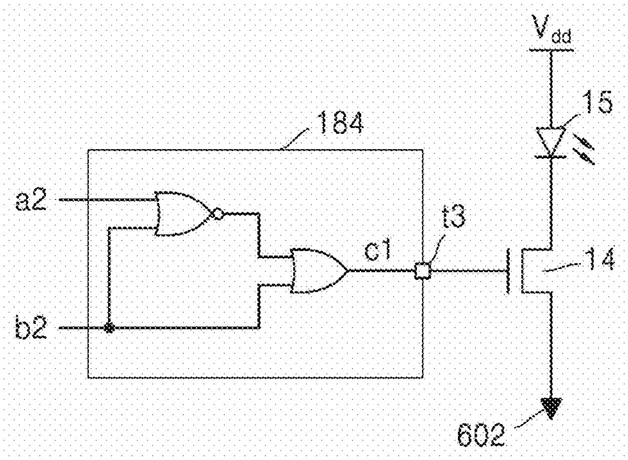
FIG. 71 is a schematic view of a logic circuit according to an embodiment of the present disclosure.

FIG. 71 is a schematic view of the logic circuit 184 according to an embodiment of the present disclosure.

Referring to FIG. 71, the third signal a2, which is an output of the first level shifter 183$a$, and the fourth signal b2, which is an output of the second level shifter 183$b$, may be input to the logic circuit 184. The logic circuit may output the fifth signal c1 on the basis of inputs of the third signal a2 and the fourth signal b2. For example, the logic circuit 184 may have a truth table as shown in Table 1 below.

TABLE 1

| Inputs | | Outputs |
|---|---|---|
| a2 | b2 | c1 |
| 0 | 0 | 1 |
| 0 | 1 | 1 |
| 1 | 0 | 0 |
| 1 | 1 | 1 |

In an embodiment, the first comparator 182$a$ may output a high signal indicating "1" when the differential DC voltage Vsub is less than the maximum reference voltage Vref, max. In this case, since the first signal a1 indicates "1," the third signal a2 may also indicate "1."

In an embodiment, the second comparator 182$b$ may output a low signal indicating "0" when the differential DC voltage Vsub is greater than the minimum reference voltage Vref, min. In this case, since the second signal b1 indicate "0," the fourth signal b2 may also indicate "0."

According to the above-described embodiment, when the fifth signal c1 in Table 1 indicates "0," the amplification unit 130 is determined to operate normally. When the fifth signal c1 indicates "1," the amplification unit 130 is determined to be malfunctioning.

However, the logic circuit 184 and the truth table shown in FIG. 71 are merely examples, and the present disclosure is not limited thereto. According to various embodiments, the malfunction detection unit 180 may be designed to output the fifth signal c1 indicating whether the amplification unit 130 is malfunctioning.

Referring to FIG. 71, a light-emitting diode (LED) driver 14 may be connected to the output terminal t3 of the logic circuit 184. The LED driver 14 may drive an LED 15 outside the IC chip 500 on the basis of the fifth signal c1.

For example, when the fifth signal c1 indicates "1," the LED driver 14 may turn on the external LED 15. The turned-on external LED 15 may indicate a malfunction state. When the fifth signal c1 indicates "0," the LED driver 14 may turn off the external LED 15. The turned-off external LED 15 may indicate a normal state.

The logic circuit 184 may be provided as a small size MOSFET for efficiency. The fifth signal c1, which is an output of the logic circuit 184, may have, for example, a magnitude of 0 V or more and 5 V or less. The LED driver 14 connected to the output terminal t3 of the logic circuit 184 may be, for example, an N-type metal-oxide-semiconductor (NMOS) LED driver.

Meanwhile, as described above, the output terminal of each of the level shifters 183$a$ and 183$b$ and the logic circuit 184 may have a rated voltage lower than that of the input terminal of each of the subtractor 181, the comparators 182$a$ and 182$b$, and the level shifters 183$a$ and 183$b$.

Accordingly, supply voltage Vdd may be supplied to the input terminal each of the subtractor 181, the comparators 182$a$ and 182$b$, and the level shifters 183$a$ and 183$b$. A supply voltage lower than supply voltage Vdd may be supplied to the logic circuit 184 and the output terminals of the level shifters 183$a$ and 183$b$. As an example, the input terminal of each of the subtractor 181, the comparators 182$a$ and 182$b$, and the level shifters 183$a$ and 183$b$ may be driven by 12 V. The logic circuit 184 and the output terminals of the level shifters 183$a$ and 183$b$ may be driven by the voltage of 5 V. Accordingly, referring to FIG. 70, the input terminals of the subtractor 181, the comparators 182$a$ and 182$b$, and the level shifters 183$a$ and 183$b$ are illustrated as being included in a high supply voltage region, and the logic circuit 184 and the output terminals of the level shifters 183$a$ and 183$b$ are illustrated as being included in a low supply voltage region. The high supply voltage region and the low supply voltage region are terms used to distinguish between components driven by a high supply voltage and components driven by a low supply voltage, rather than representing actual physical regions.

Figure 72:
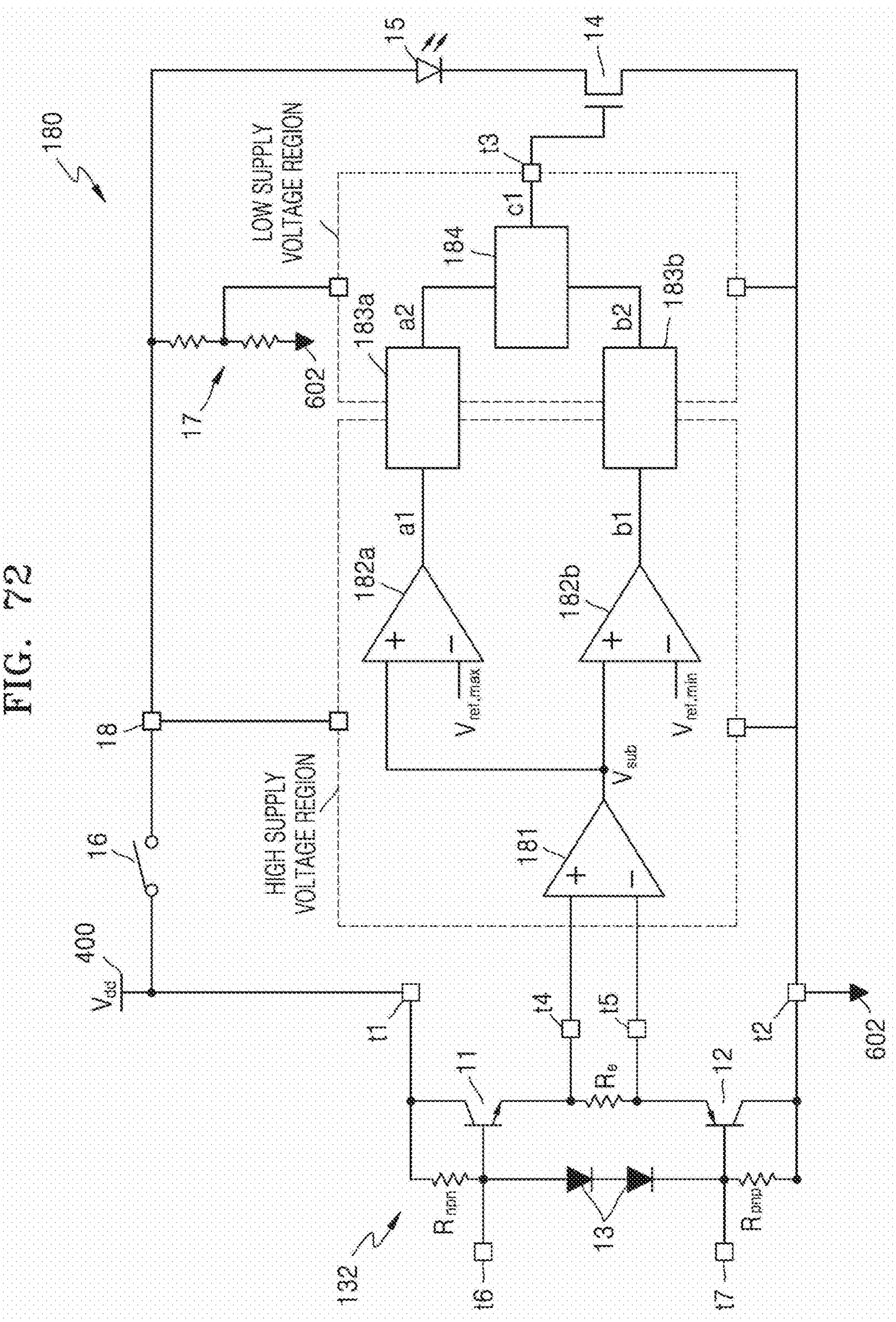
FIG. 72 is a circuit diagram of an active element unit and the malfunction detection unit according to an embodiment of the present disclosure.

FIG. 72 is a circuit diagram of an active element unit 132 and a malfunction detection unit 180 according to an embodiment of the present disclosure.

Referring to FIG. 72, the active element unit 132 of the amplification unit 130 may include a first transistor 11, a second transistor 12, a diode 13, Rnpn, Rpnp, and Re.

The malfunction detection unit 180 may include a subtractor 181, first and second comparators 182$a$ and 182$b$, first and second level shifters 183$a$ and 183$b$, and a logic circuit 184. The malfunction detection unit 180 may further include an LED driver 14 at an output terminal of the logic circuit 184.

Since the malfunction detection unit 180 should not affect an operation of the amplification unit 130 including the active element unit 132, the subtractor 181 of the malfunction detection unit 180 may have a high input impedance.

The malfunction detection unit 180 may only operate when a malfunction test is required without having to always operate. Accordingly, in order to reduce unnecessary power consumption, a switch 16 may be provided to selectively turn off only the malfunction detection unit 180.

The switch 16 may be present outside an IC chip 500. The IC chip 500 may further include a separate terminal t8 to selectively supply power to the malfunction detection unit 180 on the basis of the state of the switch 16. The switch 16 may be connected between the power supply 400 and the terminal t8.

Meanwhile, the malfunction detection unit 180 may include components driven by a high supply voltage and components driven by a low supply voltage. For example, input terminals of the subtractor 181, the comparators 182*a* and 182*b*, and the level shifters 183*a* and 183*b* may be driven by the high supply voltage Vdd. The logic circuit 184 and output terminals of the level shifters 183*a* and 183*b* may be driven by a voltage lower than the supply voltage Vdd due to a voltage dividing circuit 17.

In an embodiment, the active element unit 132 and the malfunction detection unit 180 may be physically integrated into the single IC chip 500. For example, the IC chip 500 may include a terminal t1 to be connected to the power supply 400, a terminal t2 to be connected to the second reference potential 602, and an output terminal t3 of the malfunction detection unit 180, terminals (e.g., t4, t5, t6, and t7) to be connected to a passive element unit, and the terminal t8 used for turning on/off the operation of the malfunction detection unit 180.

Meanwhile, the embodiment in which an emitter node of each of the first and second transistors 11 and 12 is connected to the input terminal of the subtractor 181 is illustrated in FIG. 72, but according to an embodiment, a base node of each of the first and second transistors 11 and 12 may be connected to the input terminal of the subtractor 181.

FIG. 73 schematically illustrates a configuration of an active current compensation device 100B according to an embodiment of the present disclosure. Hereinafter, descriptions of contents overlapping with contents described with reference to FIGS. 65 to 72 will be omitted.

Referring to FIG. 73, the active current compensation device 100B may actively compensate for first currents I11, I12, and I13 input as a common-mode current with respect to each of first through third high-current paths 111B, 112B, and 113B connected to the first device 300.

To this end, the active current compensation device 100B according to an embodiment of the present disclosure may include first through third high-current paths 111B, 112B, and 113B, a sensing transformer 120B, an amplification unit 130B, a malfunction detection unit 180, a compensation transformer 140B, and a compensation capacitor unit 150B.

When it is described in comparison with the active current compensation devices 100A, 100A-1, and 100A-2 according to the above-described embodiments, the active current compensation device 100B according to the embodiment described with reference to FIG. 73 includes first through third high-current paths 111B, 112B, and 113B and thus has differences in the sensing transformer 120B and the compensation capacitor unit 150B. Thus, the active current compensation device 100B will now be described below focusing on differences described above.

The active current compensation device 100B may include a first high-current path 111B, a second high-current path 112B, and a third high-current path 113B that are distinguished from each other. According to an embodiment, the first high-current path 111B may be an R-phase power line, the second high-current path 112B may be an S-phase power line, and the third high-current path 113B may be a T-phase power line. The first currents I11, I12, and I13 may be input as a common-mode current with respect to each of the first high-current path 111B, the second high-current path 112B, and the third high-current path 113B.

A primary side 121B of the sensing transformer 120B may be disposed in each of the first to third high-current paths 111B to 113B to generate an induced current in a secondary side 122B. Magnetic flux densities generated by the sensing transformer 120B due to the first currents I11, I12, and I13 on the first through third high-current paths 111B, 112B, and 113B may be reinforced with each other.

Meanwhile, in the active current compensation device 100B, the amplification unit 130B may be implemented as one of the amplification units including the amplification unit 130A-1 and the amplification unit 130A-2. FIG. 73 illustrates the amplification unit 130B corresponding to the amplification unit 130A-1 as an example.

The malfunction detection unit 180 and at least a portion of the amplification unit 130B may be physically integrated into one IC chip 500B. For example, as shown in FIG. 73, an active element unit of the amplification unit 130B and the malfunction detection unit 180 may be integrated into the single IC chip 500B. The active element unit may include, for example, a first transistor 11, a second transistor 12, a diode 13, Rnpn, Rpnp, and Re. However, the present disclosure is not limited thereto, and at least some components of a passive element unit including Cb, Ce, Z1, Z2, and Cdc may also be integrated into the IC chip 500B.

Meanwhile, FIG. 73 illustrates an embodiment in which a voltage of an emitter node of the first transistor 11 and a voltage of an emitter node of the second transistor 12 are differentially input to the malfunction detection unit 180. However, the present disclosure is not limited thereto, and according to an embodiment, the voltage of a base node of the first transistor 11 and a voltage of a base node of the second transistor 12 may be differentially input to the malfunction detection unit 180. The first transistor 11 may be an npn BJT, and the second transistor 12 may be a pnp BJT.

The IC chip 500B may include a terminal t1 to be connected to the power supply 400, a terminal t2 to be connected to the second reference potential 602, a terminal t3 through which an output signal of the malfunction detection unit 180 is output, and terminals (e.g., t4, t5, t6, and t7) to be connected to the passive element unit. However, the present disclosure is not limited thereto, and according to an embodiment, as shown in FIG. 72, the IC chip 500B may further include a terminal t8 to be connected to a switch 16 for selectively supplying power to the malfunction detection unit 180. In this case, the switch 16 may be connected between the power supply 400 and the terminal t8.

Although not shown in FIG. 73, according to an embodiment, as shown in FIG. 72, an LED driver 14 and an external LED 15 may be connected to the output terminal t3 of the malfunction detection unit 180. The external LED 15 may indicate a normal or malfunction state of the active current compensation device 100B.

Meanwhile, the compensation capacitor unit 150B may provide paths through which compensation currents IC1, IC2, and IC3 generated by the compensation transformer 140B flow to the first to third high-current paths 111B to 113B, respectively.

The active current compensation device 100B may further include a decoupling capacitor unit 170B on an output side thereof (i.e., the second device 200 side). One ends of capacitors included in the decoupling capacitor unit 170B may be connected to the first high-current path 111B, the second high-current path 112B, and the third high-current path 113B, respectively. The opposite end of each of the capacitors may be connected to the first reference potential 601 of the current compensation device 100B.

The decoupling capacitor unit 170B may prevent the performance of outputting the compensation current of the active current compensation device 100B from being significantly changed according to a change in an impedance value of the second device 200. An impedance ZY of the decoupling capacitor unit 170B may be designed to have a value less than a value specified in a first frequency band for which noise reduction is to be performed. As the decoupling capacitor unit 170B is coupled, the current compensation device 100B may be used as an independent module in any system (e.g., a three-phase three-wire system).

According to an embodiment, the decoupling capacitor unit 170B may be omitted from the active current compensation device 100B.

The active current compensation device 100B according to the embodiment described above may be used to compensate (or cancel) for the first currents I11, I12, and I13 traveling from a load of a three-phase three-wire power system to a power source.

Of course, according to the technical spirit of the present disclosure, the active current compensation device according to various embodiments may be modified to be also applicable to a three-phase four-wire system.

The active current compensation devices 100, 100A, 100A-1, 100A-2, and 100B according to various embodiments have little increase in size and heat generation, in high-power systems as compared with passive EMI filters. By integrating the active element unit and the malfunction detection unit into the single IC chip 500, 500A-1, 500A-2, or 500B, the IC chip 500, 500A-1, 500A-2, or 500B may have versatility as an independent component and may be commercialized. In addition, the current compensation device 100, 100A, 100A-1, 100A-2, or 100B respectively including the IC chip 500, 500A-1, 500A-2, or 500B may also be manufactured as an independent module and commercialized. The current compensation device 100, 100A, 100A-1, 100A-2, or 100B may detect a malfunction as an independent module regardless of the characteristics of a peripheral electrical system.

Figure 74:
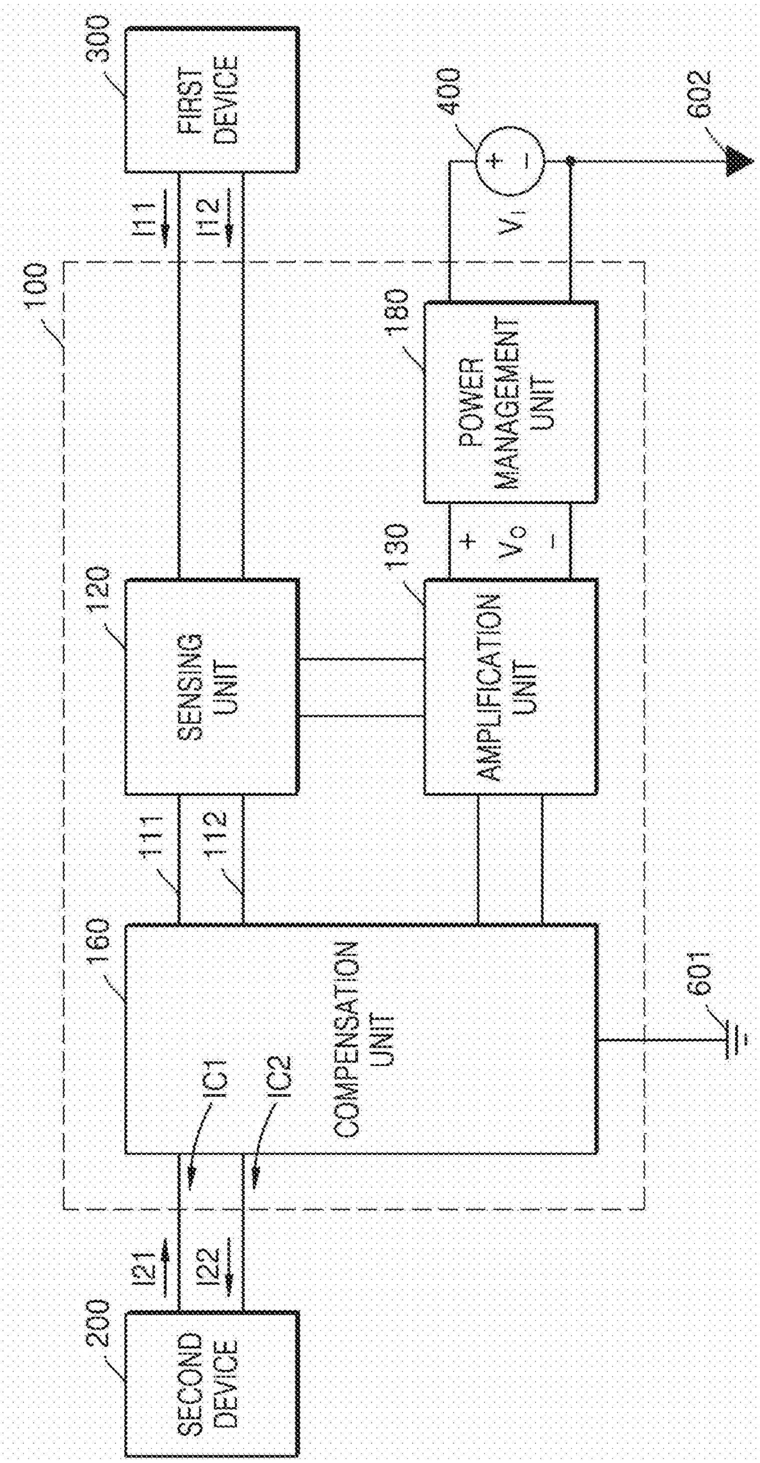
FIG. 74 schematically illustrates a configuration of a system including an active current compensation device according to an embodiment of the present disclosure.

[3] Active Current Compensation Device Including Power Conversion Unit Embedded Therein FIG. 74 schematically illustrates a configuration of a system including an active current compensation device 100 according to an embodiment of the present disclosure. The active current compensation device 100 may actively compensate for first currents I11 and I12 (e.g., EMI noise current) that are input as a common-mode current through two or more high-current paths 111 and 112 from a first device 300.

Referring to FIG. 74, the active current compensation device 100 may include a sensing unit 120, an amplification unit 130, a power management unit 180, and a compensation unit 160.

In the present specification, the first device 300 may be any of various types of power systems using power supplied by a second device 200. For example, the first device 300 may be a load that is driven using the power supplied by the second device 200. In addition, the first device 300 may be a load (e.g., an electric vehicle) that stores energy using the power supplied by the second device 200 and is driven using the stored energy. However, the present disclosure is not limited thereto.

In the present specification, the second device 200 may be any of various types of systems for supplying power to the first device 300 in the form of current and/or voltage. The second device 200 may be a device that supplies stored energy. However, the present disclosure is not limited thereto.

A power converter may be located on the first device 300 side. For example, the first currents I11 and I12 may be input to the current compensation device 100 due to a switching operation of the power converter. That is, the first device 300 side may correspond to a noise source and the second device 200 side may correspond to a noise receiver.

The two or more high-current paths 111 and 112 may be paths for transmitting the power supplied from the second device 200, that is, second currents I21 and I22, to the first device 300, for example, may be power lines. For example, the two or more high-current paths 111 and 112 may be a live line and a neutral line. At least some portions of the high-current paths 111 and 112 may pass through the current compensation device 100. The second currents I21 and I22 may be an alternating current having a frequency of a second frequency band. The second frequency band may be, for example, a band having a range of 50 Hz to 60 Hz.

Further, the two or more high-current paths 111 and 112 may also be paths through which noise generated by the first device 300, that is, the first currents I11 and I12, is transmitted to the second device 200. The first currents I11 and I12 may be input as a common-mode current with respect to each of the two or more high-current paths 111 and 112. The first currents I11 and I12 may be currents that are unintentionally generated in the first device 300 due to various causes. For example, the first currents I11 and I12 may be noise currents generated by virtual capacitance between the first device 300 and the surrounding environment. Alternatively, the first currents I11 and I12 may be noise currents generated due to a switching operation of the power converter of the first device 300. The first currents I11 and I12 may be currents having a frequency of a first frequency band. The first frequency band may be a frequency band higher than the second frequency band described above. The first frequency band may be, for example, a band having a range of 150 KHz to 30 MHz.

Figure 80:
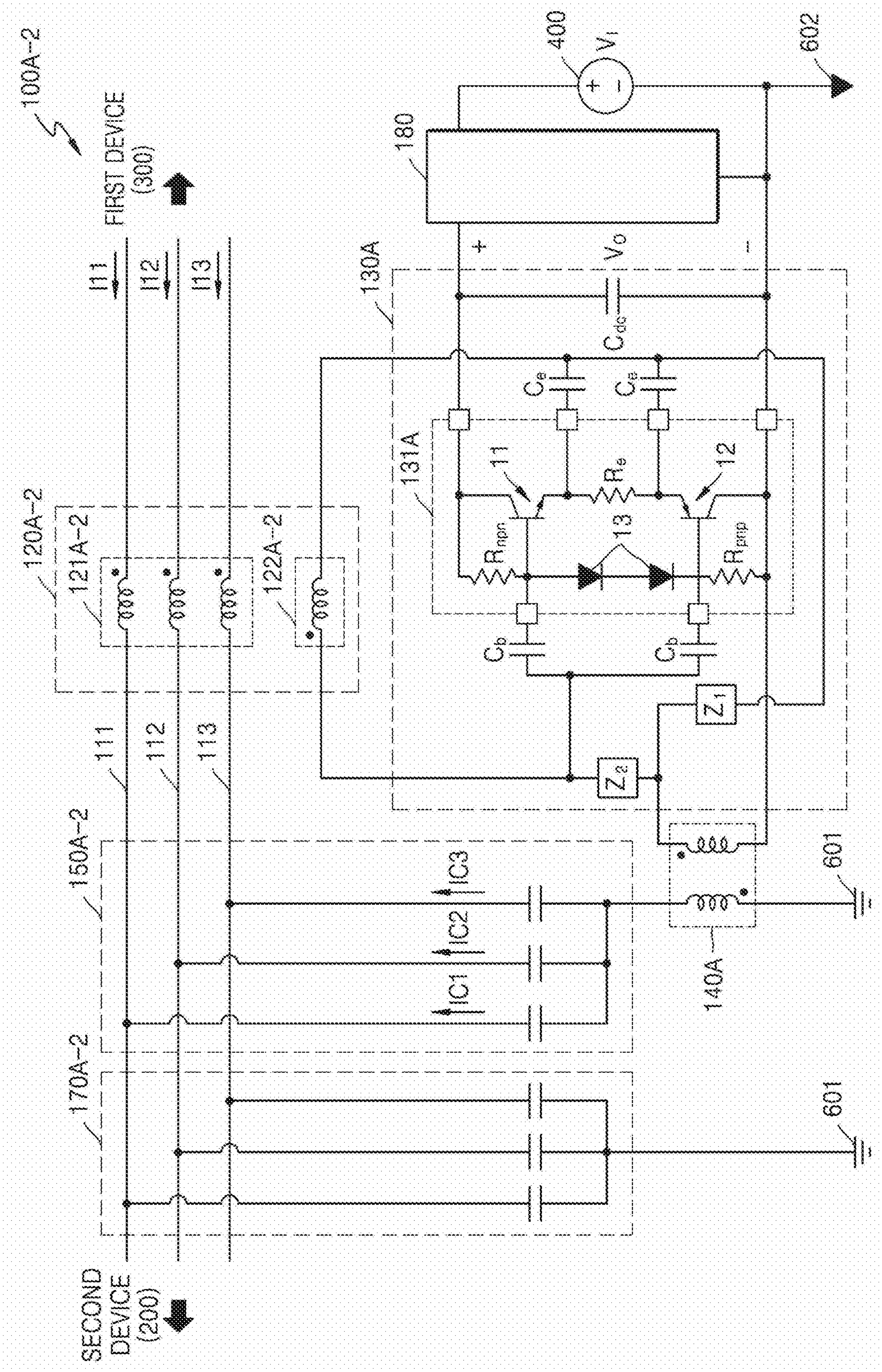
FIG. 80 schematically illustrates a configuration of an active current compensation device according to an embodiment of the present disclosure.

Meanwhile, the two or more high-current paths 111 and 112 may include two paths as shown in FIG. 74, or may include three paths as shown in FIG. 80. In addition, the two or more high-current paths 111 and 112 may include four paths. The number of the high-current paths 111 and 112 may vary depending on the type and/or form of power used by the first device 300 and/or the second device 200.

The sensing unit 120 may sense the first currents I11 and I12 on the two or more high-current paths 111 and 112 and generate an output signal corresponding to the first currents I11 and I12. That is, the sensing unit 120 may refer to a component that senses the first currents I11 and I12 on the high-current paths 111 and 112. In order for the sensing unit 120 to sense the first currents I11 and I12, at least some portion of the high-current paths 111 and 112 may pass through the sensing unit 120, but a portion of the sensing unit 120, which generates an output signal according to the sensing, may be isolated from the high-current paths 111 and 112. For example, the sensing unit 120 may be implemented as a sensing transformer. The sensing transformer may sense the first currents I11 and I12 on the high-current paths 111 and 112 in a state of being isolated from the high-current paths 111 and 112. However, the sensing unit 120 is not limited to the sensing transformer.

According to an embodiment, the sensing unit 120 may be differentially connected to input terminals of the amplification unit 130.

The amplification unit 130 may be electrically connected to the sensing unit 120, and may amplify the output signal output from the sensing unit 120 to generate an amplified output signal. The term "amplification" by the amplification unit 130, as used herein, may mean that the magnitude and/or phase of an object to be amplified is adjusted. The amplification unit 130 may be implemented by various components, and may include active elements. In an embodiment, the amplification unit 130 may include BJTs. For example, the amplification unit 130 may include a plurality of passive elements, such as resistors and capacitors, in addition to the BJTs. However, the present disclosure is not limited thereto, and the component for the "amplification" described in the present disclosure may be used without being limited to the amplification unit 130 of the present disclosure.

According to an embodiment, a second reference potential 602 of the amplification unit 130 and a first reference potential 601 of the current compensation device 100 may be distinguished from each other. For example, when the amplification unit 130 is isolated from the high-current paths 111 and 112, the second reference potential 602 of the amplification unit 130 and the first reference potential 601 of the current compensation device 100 may be distinguished from each other.

However, the present disclosure is not limited thereto. For example, when the amplification unit 130 is not isolated from the high-current paths 111 and 112, the reference potential of the amplification unit and the reference potential of the current compensation device may not be distinguished from each other.

The amplification unit 130 may receive power from a power supply 400 that is distinguished from the first device 300 and/or the second device 200. The amplification unit 130 may receive the power from the power supply 400, and amplify the output signal output from the sensing unit 120 to generate an amplified current.

The power supply 400 may be, for example, a device that receives power from any one of the first device 300 and the second device 200 and generates input power of the amplification unit 130. The power supply 400 may be, for example, a switching mode power supply (SMPS) of the first device 300 or the second device 200. The power supply 400 may output a DC voltage V1 based on the second reference potential 602. The output voltage V1 of the power supply 400 may be used to drive the amplification unit 130.

Meanwhile, there is an optimized DC voltage level required for the amplification unit 130, but the power supply 400 may not be able to output the optimized voltage level required for the amplification unit 130. Specifically, the output DC voltage V1 of the power supply 400 may vary depending on the system (e.g., the first device 300 or the second device 200). For example, although the optimal supply voltage of the amplification unit 130 is 12 V, the output voltage V1 of the power supply 400 may vary depending on the system, such as 15 V, 24 V, 48 V, or the like. Thus, when the output voltage V1 of the power supply 400 is directly supplied to the amplification unit 130, the amplification unit 130 may be unstable in operation or cause a malfunction.

Accordingly, the active current compensation device 100 according to an embodiment of the present disclosure may include the power management unit 180 between the amplification unit 130 and the power supply 400. The power management unit 180 may receive the voltage V1 output from the power supply 400 and convert the voltage V1 into an output voltage VO. The output voltage VO of the power management unit 180 may be input to the amplification unit 130. V1 may vary as 15 V, 24V, 48V, or the like depending on the system, but VO is a value fixed to the optimized voltage level required for the amplification unit 130.

The power management unit 180 may be a DC-DC converter. The power management unit 180 may be a power management IC (PMIC).

According to an embodiment of the present disclosure, at least a portion of the amplification unit 130 and at least a portion of the power management unit 180 may be integrated into one IC chip. For example, by embedding at least a portion of the amplification unit 130 and at least a portion of the power management unit 180 into the single IC chip, the IC chip may have versatility as an independent component and may be commercialized.

The compensation unit 160 may generate compensation currents IC1 and IC2 on the basis of the amplified output signal generated by the amplification unit 130. An output side of the compensation unit 160 may be connected to the high-current paths 111 and 112 to allow the compensation currents IC1 and IC2 to flow to the high-current paths 111 and 112.

According to an embodiment, the output side of the compensation unit 160 may be isolated from the amplification unit 130. For example, the compensation unit 160 may include a compensation transformer for the isolation. For example, the output signal of the amplification unit 130 may flow through a primary side of the compensation transformer, and the compensation current based on the output signal may be generated on a secondary side of the compensation transformer.

However, the present disclosure is not limited thereto. According to an embodiment, the output side of the compensation unit 160 may also be isolated from the amplification unit 130. In this case, the amplification unit 130 may not be isolated from the high-current paths 111 and 112.

In order to cancel the first currents I11 and I12, the compensation unit 160 may inject the compensation currents IC1 and IC2 into the high-current paths 111 and 112 through the two or more high-current paths 111 and 112, respectively. The compensation currents IC1 and IC2 may have the same magnitude and an opposite phase compared to the first currents I11 and I12.

Figure 75:
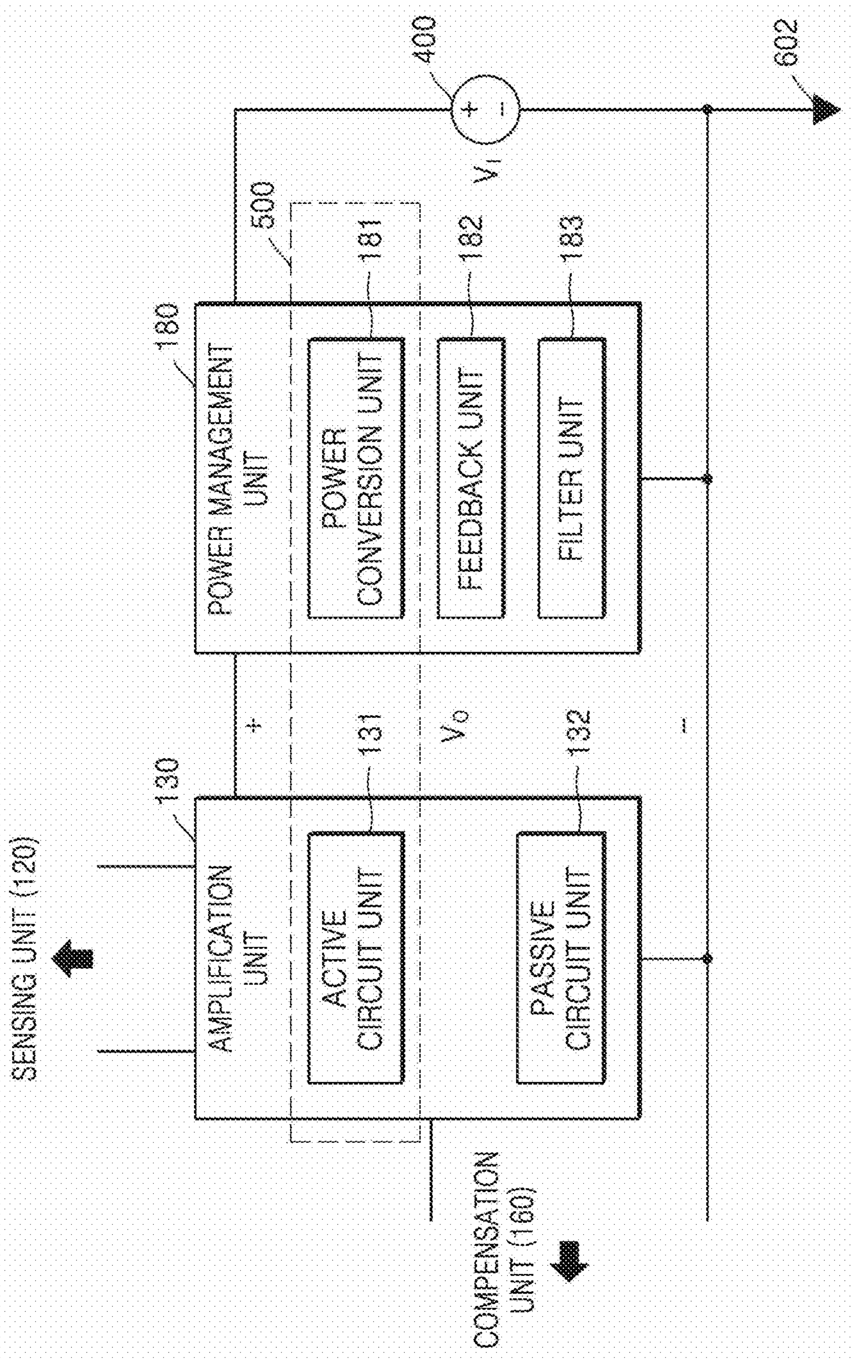
FIG. 75 illustrates an example of a functional configuration of an amplification unit and a power management unit according to an embodiment of the present disclosure.

FIG. 75 illustrates an example of a functional configuration of the amplification unit 130 and the power management unit 180 according to an embodiment of the present disclosure.

Referring to FIG. 75, the amplification unit 130 may include an active circuit unit 131 and a passive circuit unit 132. The passive circuit unit 132 includes only passive elements, and the active circuit unit 131 includes active elements. The active circuit unit 131 may further include passive elements as well as the active elements. Examples of a detailed configuration of the amplification unit 130 including the active circuit unit 131 and the passive circuit unit 132 will be described below with reference to FIG. 77.

The power management unit 180 may include a power conversion unit 181, a feedback unit 182, and a filter unit 183. The power conversion unit 181 may convert the arbitrary input voltage V1 into the output voltage VO. The feedback unit 182 is a feedback control system that allows the same output voltage VO to be output even when the arbitrary input voltage V1 is input. The filter unit 183 is a DC voltage/current filter. The filter unit 183 may be located at an input terminal or an output terminal of the power management unit 180. Examples of a detailed configuration of the power management unit 180 will be described below with reference to FIGS. 78 and 79.

According to an embodiment, the active circuit unit 131 of the amplification unit 130 and the power conversion unit 181 of the power management unit 180 may be physically integrated into one IC chip 500. However, this is merely an embodiment, and in other embodiments, at least some elements of the active circuit unit 131, the power management unit 180, and the feedback unit 182 may be physically integrated into the single IC chip 500. Of course, in other embodiments, all of the amplification unit 130 and the power management unit 180 may be physically integrated into the single IC chip 500.

The power management unit 180 may include active elements. Here, a reference potential of the power management unit 180 may be equal to the second reference potential 602, which is a reference potential of the amplification unit 130. The reference potential of the power management unit 180 may be different from the first reference potential 601, which is a reference potential of the current compensation device 100 (e.g., a reference potential of the compensation unit 160).

The amplification unit 130 may receive power from the power supply 400 through the power management unit 180. The amplification unit 130 may receive the output voltage VO of the power management unit 180, and amplify the output signal output by the sensing unit 120 to generate the amplified current. The amplified current may be input to the compensation unit 160.

Figure 76:
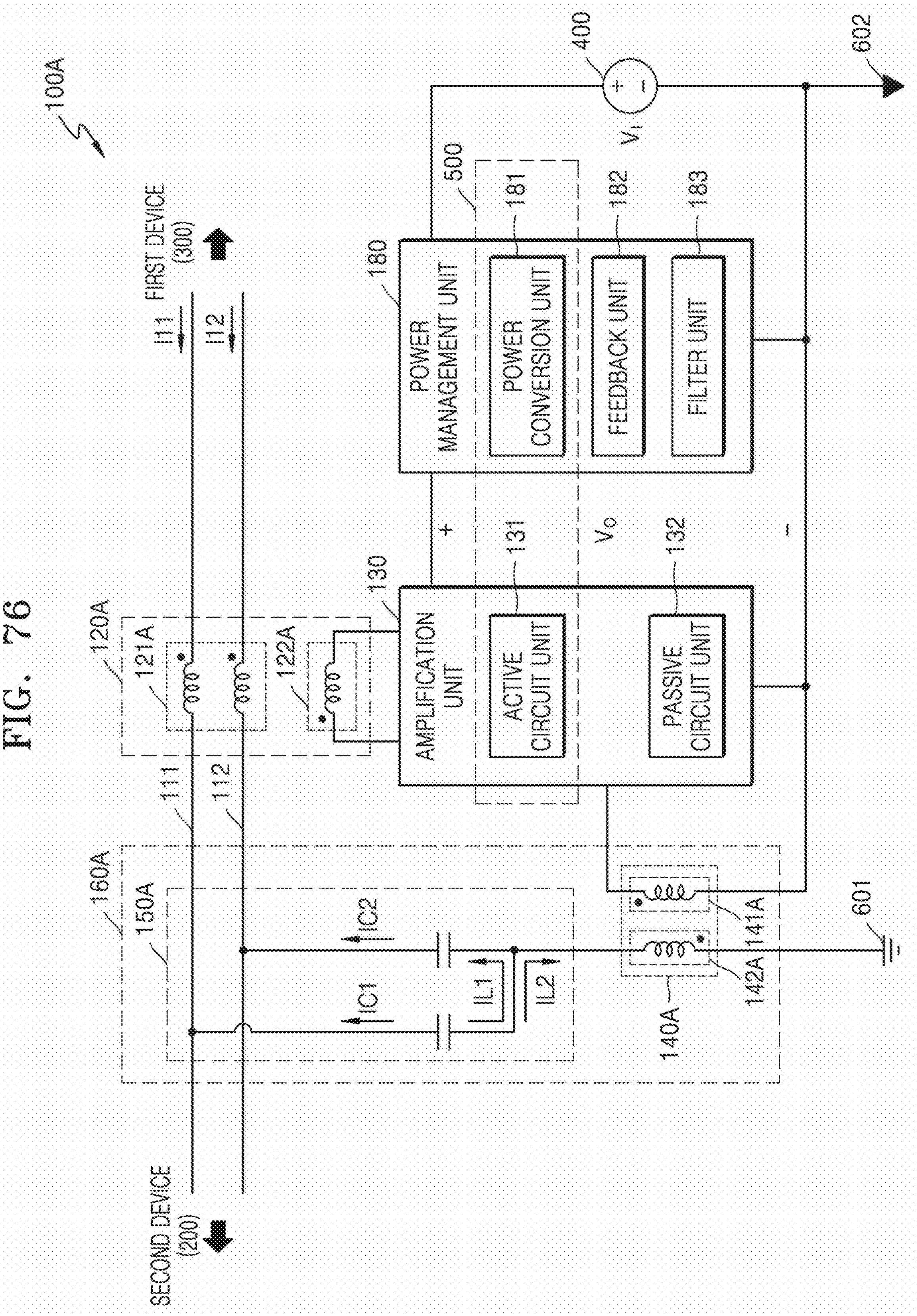
FIG. 76 illustrates a more specific example of the embodiment described with reference to FIG. 74, and schematically illustrates an active current compensation device according to an embodiment of the present disclosure.

FIG. 76 illustrates a more specific example of the embodiment described with reference to FIG. 74, and schematically illustrates an active current compensation device 100A according to an embodiment of the present disclosure. The active current compensation device 100A may actively compensate for first currents I11 and I12 (e.g., a noise current) input as a common-mode current with respect to each of two high-current paths 111 and 112 connected to the first device 300.

Referring to FIG. 76, the active current compensation device 100A may include a sensing transformer 120A, an amplification unit 130, and a compensation unit 160A.

In an embodiment, the sensing unit 120 described above may include the sensing transformer 120A. In this case, the sensing transformer 120A may be a component for sensing the first currents I11 and I12 on the high-current paths 111 and 112 in a state of being isolated from the high-current paths 111 and 112. The sensing transformer 120A may sense the first currents I11 and I12 that are noise currents input through the high-current paths 111 and 112 (e.g., power lines) from the first device 300 side.

The sensing transformer 120A may include a primary side 121A disposed on the high-current paths 111 and 112 and a secondary side 122A differentially connected to input terminals of the amplification unit 130. The sensing transformer 120A may generate an induced current, which is directed to the secondary side 122A (e.g., a secondary winding), on the basis of magnetic flux densities induced due to the first currents I11 and I12 at the primary side 121A (e.g., a primary winding) disposed on the high-current paths 111 and 112. The primary side 121A of the sensing transformer 120A may be, for example, a winding in which each of a first high-current path 111 and a second high-current path 112 is wound around one core. However, the present disclosure is not limited thereto, and the primary side 121A of the sensing transformer 120A may have a form in which the first high-current path 111 and the second high-current path 112 pass through the core.

Specifically, the sensing transformer 120A may be configured such that the magnetic flux density induced due to the first current I11 on the first high-current path 111 (e.g., a live line) and the magnetic flux density induced due to the first current I12 on the second high-current path 112 (e.g., neutral line) are overlapped (or reinforced) with each other. In this case, the second currents I21 and I22 also flow through the high-current paths 111 and 112, and thus the sensing transformer 120A may be configured such that a magnetic flux density induced due to the second current I21 on the first high-current path 111 and a magnetic flux density induced due to the second current I22 on the second high-current path 112 cancel each other. In addition, as an example, the sensing transformer 120A may be configured such that magnitudes of the magnetic flux densities, which are induced due to the first currents I11 and I12 of a first frequency band (e.g., a band having a range of 150 KHz to 30 MHz), are greater than magnitudes of the magnetic flux densities induced due to the second currents I21 and I22 of a second frequency band (for example, a band in a range of 50 Hz to 60 Hz).

As described above, the sensing transformer 120A may be configured such that the magnetic flux densities induced due to the second currents I21 and I22 may cancel each other so that only the first currents I11 and I12 may be sensed. That is, the current induced in the secondary side 122A of the sensing transformer 120A may be a current into which the first currents I11 and I12 are converted at a predetermined ratio.

For example, in the sensing transformer 120A, when a turns ratio of the primary side 121A and the secondary side 122A is 1:Nsen, and a self-inductance of the primary side 121A of the sensing transformer 120A is Lsen, the secondary side 122A may have a self-inductance of Nsen2*Lsen. In this case, the current induced in the secondary side 122A has a magnitude that is 1/Nsen times that of the first currents I11 and I12. In an example, the primary side 121*a* and the secondary side 122*a* of the sensing transformer 120*a* may be coupled with a coupling coefficient of Ksen.

The secondary side 122A of the sensing transformer 120A may be connected to the input terminals of the amplification unit 130. For example, the secondary side 122A of the sensing transformer 120A may be differentially connected to the input terminals of the amplification unit 130 and provide the induced current or an induced voltage to the amplification unit 130.

The amplification unit 130 may amplify the current that is sensed by the sensing transformer 120A and induced in the secondary side 122A. For example, the amplification unit 130 may amplify the magnitude of the induced current at a predetermined ratio and/or adjust a phase of the induced current.

According to various embodiments of the present disclosure, the amplification unit 130 may include an active circuit unit 131 and a passive circuit unit 132 that is a configuration other than the active circuit unit.

The active circuit unit 131 may include active elements. The active circuit unit 131 may be connected to the power supply 400 to drive the active elements. The active circuit unit 131 may receive power from the power supply 400 through a power management unit 180. The power management unit 180 may receive an arbitrary DC voltage V1 from the power supply 400 and output a constant output voltage VO to the active circuit unit 131. The power supply 400, the power management unit 180, and the amplification unit 130 may all be connected to the second reference potential 602. Thus, both the input voltage V1 and the output voltage VO of the power management unit 180 are voltages based on the second reference potential 602. The second reference potential 602 may be distinguished from the first reference potential 601 of the current compensation device 100A (or the compensation unit 160A).

The power management unit 180 may include a filter unit 183, a feedback unit 182, and a power conversion unit 181 that is a configuration other than the filter unit 183 and the feedback unit 182. According to an embodiment, the active circuit unit 131 of the amplification unit 130 and the power conversion unit 181 of the power management unit 180 may be physically embedded into one IC chip 500. The IC chip 500 may convert the input voltage V1 having an arbitrary level into the voltage VO of a level optimized for the active circuit unit 131 and operate the active circuit unit 131. The IC chip 500 may have versatility as an independent component and may be commercialized.

The compensation unit 160A may be an example of the compensation unit 160 described above. In an embodiment, the compensation unit 160A may include a compensation transformer 140A and a compensation capacitor unit 150A. The amplified current amplified by the above-described amplification unit 130 flows through a primary side 141A of the compensation transformer 140A.

The compensation transformer 140A according to an embodiment may be a component for isolating the amplification unit 130 including active elements from the high-current paths 111 and 112. That is, the compensation transformer 140A may be a component for generating compensation current (in a secondary side 142A) to be injected into the high-current paths 111 and 112 on the basis of the amplified current in a state of being isolated from the high-current paths 111 and 112.

The compensation transformer 140A may include the primary side 141A differentially connected to output terminals of the amplification unit 130 and the secondary side 142A connected to the high-current paths 111 and 112. The compensation transformer 140A may induce a compensation current, which is directed toward the secondary side 142A (e.g., a secondary winding), on the basis of a magnetic flux density induced due to the amplified current flowing through the primary side 141A (e.g., a primary winding).

In this case, the secondary side 142A may be disposed on a path connecting the compensation capacitor unit 150A, which will be described below, and the first reference potential 601 of the current compensation device 100A. That is, one end of the secondary side 142A is connected to the high-current paths 111 and 112 through the compensation capacitor unit 150A, and the other end of the secondary side 142A may be connected to the first reference potential 601 of the active current compensation device 100A. Meanwhile, the primary side 141A of the compensation transformer 140A, the amplification unit 130, and the secondary side 122A of the sensing transformer 120A may be connected to the second reference potential 602, which is distinguished from the reference potential of the other components of the active current compensation device 100A. The first reference potential 601 of the current compensation device 100A according to an embodiment and the second reference potential 602 of the amplification unit 130 may be distinguished from each other.

As described above, in the current compensation device 100A according to an embodiment, the component generating the compensation current uses a reference potential (i.e., the second reference potential 602) different from that of the other components and thus may operate in a state of being isolated from the other components, thereby improving the reliability of the active current compensation device 100A. However, the current compensation device according to the present disclosure is not limited to such an isolating structure.

In the compensation transformer 140A according to an embodiment, when a turns ratio of the primary side 141A and the secondary side 142A is 1:Ninj, and a self-inductance of the primary side 141A of the compensation transformer 140A is Linj, the secondary side 142A may have a self-inductance of Ninj2*Linj. In this case, the current induced in the secondary side 142A has a magnitude that is 1/Ninj times that of the current (i.e., the amplified current) flowing in the primary side 141A. In an example, the primary side 141A and the secondary side 142A of the compensation transformer 140A may be coupled with a coupling coefficient of kinj.

The current converted through the compensation transformer 140A may be injected into the high-current paths 111 and 112 (e.g., power lines) through the compensation capacitor unit 150A as compensation currents IC1 and IC2. Accordingly, the compensation currents IC1 and IC2 may have the same magnitude and an opposite phase compared to the first currents I11 and I12 to cancel the first currents I11 and I12. Accordingly, a magnitude of a current gain of the amplification unit 130 may be designed to be Nsen*Ninj. However, since a magnetic coupling loss may occur in an actual situation, a target current gain of the amplification unit 130 may be designed to be higher than Nsen*Ninj.

As described above, the compensation capacitor unit 150A may provide a path through which the current generated by the compensation transformer 140A flows to each of the two high-current paths 111 and 112.

The compensation capacitor unit 150A may include Y-capacitors (Y-cap) each having one end connected to the secondary side 142A of the compensation transformer 140A and the other end connected to the high-current paths 111 and 112. For example, one ends of the two Y-caps share a node connected to the secondary side 142A of the compensation transformer 140A, and the opposite ends of the two Y-caps may have a node connected to the first high-current path 111 and the second high-current path 112.

The compensation capacitor unit 150A may allow the compensation currents IC1 and IC2 induced by the compensation transformer 140A to flow to the power line. As the compensation currents IC1 and IC2 compensate (cancel) for the first currents I11 and I12, the current compensation device 100A may reduce noise.

Meanwhile, the compensation capacitor unit 150A may be configured such that a current IL1 flowing between the two high-current paths 111 and 112 through the compensation capacitors has a magnitude less than a first threshold magnitude. In addition, the compensation capacitor unit 150A may be configured such that a current IL2 flowing between each of the two high-current paths 111 and 112 and the first reference potential 601 through the compensation capacitors has a magnitude less than a second threshold magnitude.

The active current compensation device 100A according to an embodiment may be implemented as an isolated structure by using the compensation transformer 140A and the sensing transformer 120A.

Figure 77:
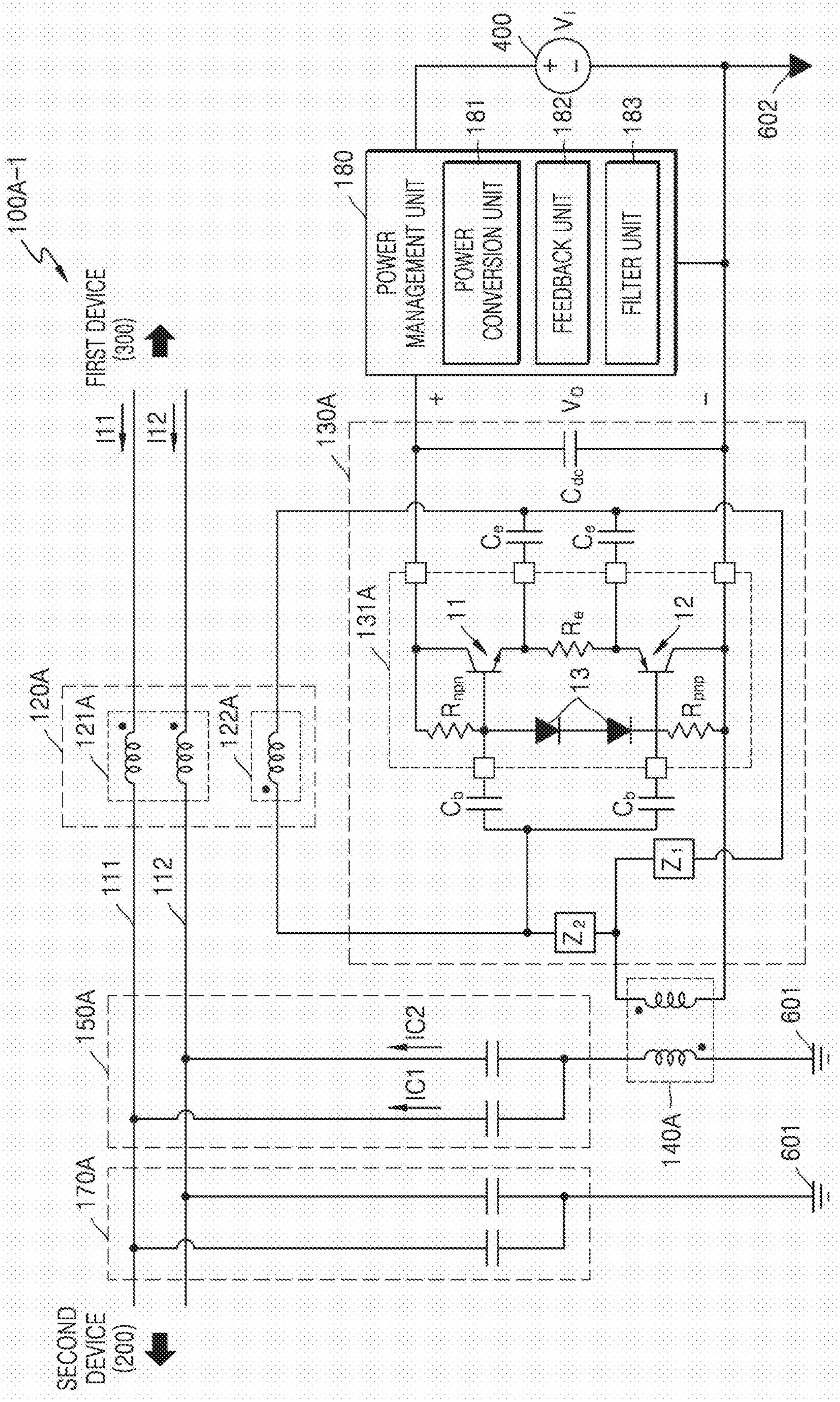
FIG. 77 illustrates a more specific example of the embodiment described with reference to FIG. 76, and schematically illustrates an active current compensation device according to an embodiment of the present disclosure.

FIG. 77 illustrates a more specific example of the embodiment described with reference to FIG. 76, and schematically illustrates an active current compensation device 100A-1 according to an embodiment of the present disclosure. The active current compensation device 100A-1, an amplification unit 130A, and an active circuit unit 131A illustrated in FIG. 77 are respectively exemplary of the active current compensation device 100A, the amplification unit 130, and the active circuit unit 131 illustrated in FIG. 76.

The active current compensation device 100A-1 according to an embodiment may include a sensing transformer 120A, the amplification unit 130A, a compensation transformer 140A, and a compensation capacitor unit 150A. In an embodiment, the active current compensation device 100A-1 may further include a decoupling capacitor unit 170A on an output side thereof (i.e., the second device 200 side). In other embodiments, the decoupling capacitor unit 170A may be omitted. Descriptions of the sensing transformer 120A, the compensation transformer 140A, and the compensation capacitor unit 150A are redundant and thus omitted.

In an embodiment, an induced current induced in a secondary side 122A by the sensing transformer 120A may be differentially input to the amplification unit 130A.

The amplification unit 130A of the active current compensation device 100A-1 according to an embodiment may include the active circuit unit 131A and a passive circuit unit. In the amplification unit 130A, the other components other than the active circuit unit 131A may be included in the passive circuit unit. In embodiments of the present disclosure, the active circuit unit 131A is physically implemented in one chip together with a power conversion unit 181 of a power management unit 180. Components included in the passive circuit unit may be commercial discrete elements. The passive circuit unit may be implemented differently depending on an embodiment. The passive circuit unit may be modified so that the active circuit unit 131A is applicable to the active current compensation device 100 of various designs.

The active circuit unit 131A may include an npn BJT 11, a pnp BJT 12, a diode 13, and one or more resistors.

In an embodiment, the one or more resistors included in the active circuit unit 131A may include Rnpn, Rpnp, and/or Re. In the active circuit unit 131A, the resistor Rnpn may connect a collector node and a base node of the npn BJT 11. In the active circuit unit 131A, the resistor Rpnp may connect a collector node and a base node of the pnp BJT 12. In the active circuit unit 131A, the resistor Re may connect an emitter node of the npn BJT 11 and an emitter node of the pnp BJT 12.

The active circuit unit 131A may be driven by power supplied from the power supply 400 through the power management unit 180. To this end, an output terminal of the power management unit 180 may supply a DC voltage VO between the collector node of the npn BJT 11 and the collector node of the pnp BJT 12. The collector node of the pnp BJT 12 may correspond to the second reference potential 602, and the collector node of the npn BJT 11 may correspond to the output voltage VO of the power management unit 180, which is based on the second reference potential 602.

In an embodiment, in the active circuit unit 131A, the biasing diode 13 may connect the base node of the npn BJT 11 and the base node of the pnp BJT 12. That is, one end of the diode 13 may be connected to the base node of the npn BJT 11, and the other end of the diode 13 may be connected to the base node of the pnp BJT 12.

According to embodiments of the present disclosure, the resistors Rnpn, Rpnp, Re, and/or the biasing diode 13 included in the active circuit unit 131A may be used for DC biasing of the BJTs 11 and 12. In an embodiment of the present disclosure, the resistors Rnpn, Rpnp, and Re, and the biasing diode 13 are general-purpose components in various active current compensation devices 100 and 100A, and thus may be integrated in an IC chip 500.

Although omitted in FIG. 77, the active circuit unit 131A and the power conversion unit 181 may be integrated into the single IC chip 500 in various embodiments of the present disclosure. The IC chip 500 may include a terminal corresponding to a base of the npn BJT 11, a terminal corresponding to a collector of the npn BJT 11, a terminal corresponding to an emitter of the npn BJT 11, and a terminal corresponding to a base of the pnp BJT 12, a terminal corresponding to a collector of the pnp BJT 12, and a terminal corresponding to an emitter of the pnp BJT 12. In addition, the IC chip 500 may further include terminals of the power conversion unit 181 to be described below with reference to FIG. 78.

At least one of the above-described terminals of the IC chip 500 may be connected to the passive circuit unit. The active circuit unit 131A and the passive circuit unit may be combined together to function as the amplification unit 130A.

In an embodiment, the passive circuit unit may include capacitors Cb, Ce, and Cdc, and impedances Z1 and Z2.

According to an embodiment, the capacitors Cb of the passive circuit unit may be connected to base terminals, respectively, in the active circuit unit 131A. The capacitors Ce of the passive circuit unit may be connected to emitter terminals, respectively, in the active circuit unit 131A. In the outside of the IC chip 500, a collector terminal of the pnp BJT 12 may be connected to the second reference potential 602. In the outside of the IC chip 500, the capacitor Cdc of the passive circuit unit may be connected between both collector terminals.

The capacitors Cb and Ce included in the passive circuit unit may respectively block DC voltages at the base node and the emitter node of each of the BJTs 11 and 12. Only AC signals may be selectively coupled through the capacitors Cb and Ce.

The capacitor Cdc is a DC decoupling capacitor for the voltage VO, and may be connected in parallel with respect to the output voltage VO of the power management unit 180. Only AC signals may be selectively coupled between both collectors of the npn BJT 11 and the pnp BJT 12 through the capacitors Cdc.

A current gain of the amplification unit 130A may be controlled by a ratio of the impedances Z1 and Z2. Z1 and Z2 may be flexibly designed depending on a turns ratio of each of the sensing transformer 120A and the compensation transformer 140A and a required target current gain. Thus, Z1 and Z2 may be implemented outside the IC chip 500 (i.e., in the passive circuit unit).

A combination of the active circuit unit 131A and Cb, Ce, Cdc, Z1, and Z2 of the passive circuit unit may function as the amplification unit 130A. For example, the amplification unit 130A may have a push-pull amplifier structure including an npn BJT and a pnp BJT.

In an embodiment, a secondary side 122A of the sensing transformer 120A may be connected between a base side and an emitter side of each of the BJTs 11 and 12. In an embodiment, a primary side 141A side of the compensation transformer 140A may be connected between the collector side and the base side of each of the BJTs 11 and 12. Here, the connection includes an indirectly connected case.

In an embodiment, the amplification unit 130A may have a regression structure in which an output current is injected back into a base of each of the BJTs 11 and 12. Due to the regression structure, the amplification unit 130A may stably obtain a constant current gain for operating the active current compensation device 100A-1.

For example, when an input voltage of the amplification unit 130A has a positive swing of greater than zero due to a noise signal, the npn BJT 11 may operate. In this case, the operating current may flow through a first path passing through the npn BJT 11. When the input voltage of the amplification unit 130A has a negative swing of less than zero due to a noise signal, the pnp BJT 12 may operate. In this case, the operating current may flow through a second path passing through the pnp BJT 12.

In the active circuit unit 131A, an operating point of each of the BJTs may be controlled through the resistors Rnpn, Rpnp, and Re. The resistors Rnpn, Rpnp, and Re may be designed according to the operating point of the BJT.

An inductor, the capacitors (e.g., Cb, Ce, and Cdc), Z1, and Z2 of the passive circuit unit are discrete components, and may be implemented around the IC chip 500.

Capacitance of each of the capacitors Cb, Ce, and Cdc required for an AC signal to couple through each of the capacitors Cb, Ce, and Cdc may be several F or more (e.g., 10 μF). Such a capacitance value is difficult to be implemented in the IC chip 500, and thus the capacitors Cb, Ce, and Cdc may be implemented outside the IC chip 500.

The impedances Z1 and Z2 may be implemented outside the IC chip 500 to achieve design flexibility for various power systems or various first devices 300. Z1 and Z2 may be flexibly designed depending on the turns ratio of each of the sensing transformer 120A and the compensation transformer 140A and the required target current gain.

Meanwhile, the active current compensation device 100A-1 may further include the decoupling capacitor unit 170A on an output side thereof (i.e., the second device 200 side). One ends of capacitors included in the decoupling capacitor unit 170A may be connected to the first high-current path 111 and the second high-current path 112, respectively. The opposite end of each of the capacitors may be connected to the first reference potential 601 of the current compensation device 100A-1.

The decoupling capacitor unit 170A may prevent the performance of outputting the compensation current of the active current compensation device 100A-1 from being significantly changed according to a change in an impedance value of the second device 200. An impedance ZY of the decoupling capacitor unit 170A may be designed to have a value less than a value specified in a first frequency band for which noise reduction is to be performed. As the decoupling capacitor unit 170A is coupled, the current compensation device 100A-1 may be used as an independent module in any system.

According to an embodiment, the decoupling capacitor unit 170A may be omitted from the active current compensation device 100A-1.

Figure 78:
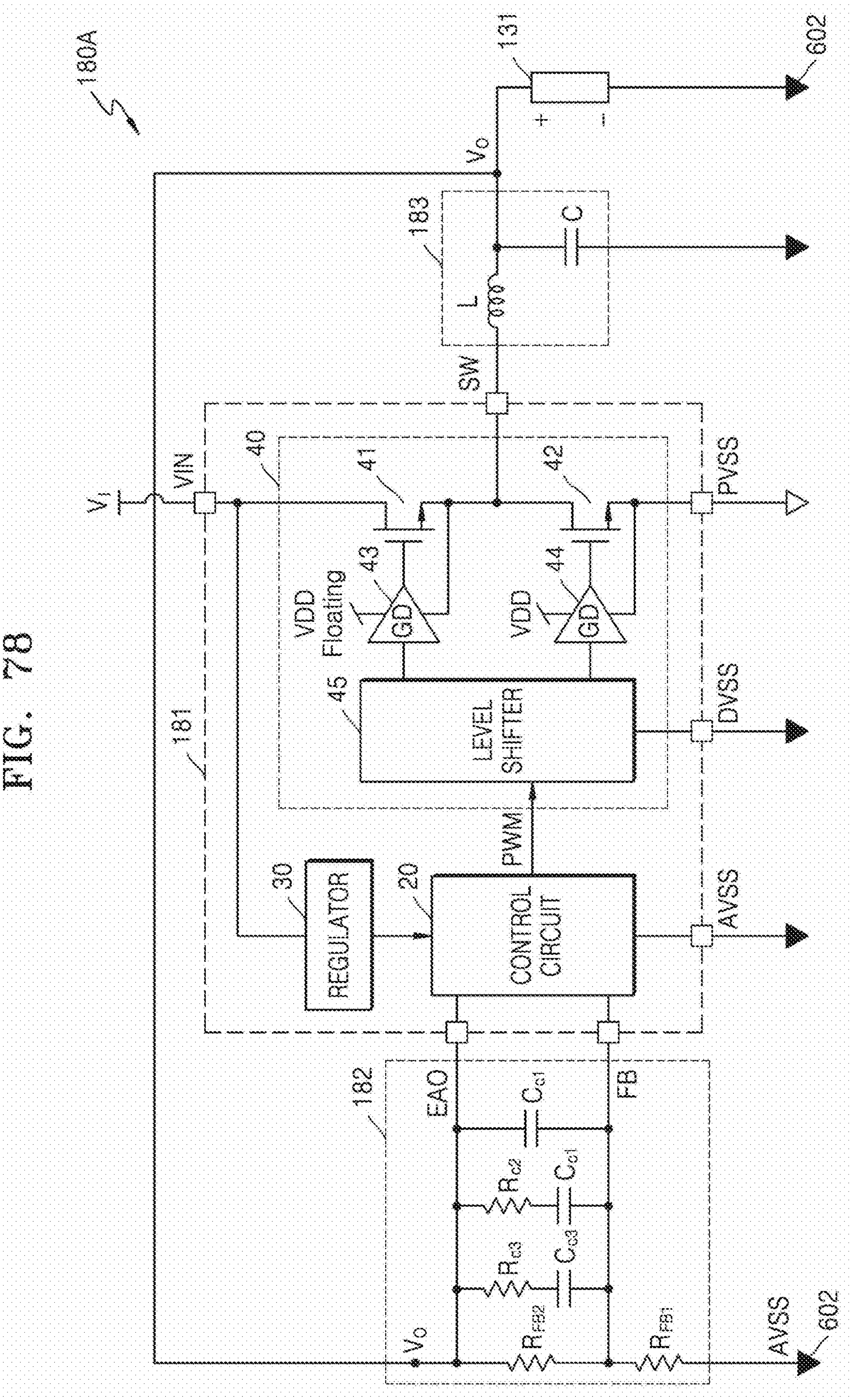
FIG. 78 schematically illustrates the power management unit according to an embodiment of the present disclosure.

FIG. 78 schematically illustrates a power management unit 180 according to an embodiment of the present disclosure. The power management unit 180 may include a power conversion unit 181, a feedback unit 182, and a filter unit 183. FIG. 78 illustrates the components of the power management unit 180 in more detail.

The power management unit 180 may be a PMIC. In an embodiment, the power management unit 180 may be a voltage drop converter, for example, a buck converter.

An output DC voltage V1 of the power supply 400 is input through an input terminal VIN of the power conversion unit 181. V1 may vary depending on the system, such as 15 V, 24 V, 48 V, or the like.

The power conversion unit 181 may convert the arbitrary input voltage V1 into a set output voltage VO. A value of VO may be set to an optimized voltage level (e.g., 12 V) required for the active circuit unit 131.

The power conversion unit 181 may include a control circuit 20, a regulator 30, and a switch portion 40. The components of the power conversion unit 181 are embedded in one IC chip 500 together with the active circuit unit 131.

The regulator 30 may generate a DC low voltage, for driving internal circuits (e.g., the control circuit 20), from the input voltage V1. For example, the input voltage V1 may have a high voltage range of 12 V or more, and the internal circuits of the power conversion unit 181 may be efficient only when being driven by a voltage as low as 5 V. Accordingly, the regulator 30 is a circuit configured to supply a DC low voltage (e.g., 5 V) for an internal IC of the power conversion unit 181. The regulator 30 may be referred to as a linear regulator, a pre-regulator, an on-chip supply, a low dropout (LDO) regulator, or the like.

The control circuit 20 is driven by receiving the DC low voltage generated by the regulator 30. The control circuit 20 includes circuits necessary to generate a constant output voltage from an input voltage in an arbitrary range. The control circuit 20 may generate a pulse width modulation (PWM) signal that is a switching signal required to output a constant voltage from the input voltage in an arbitrary range. A detailed configuration of the control circuit 20 will be described below with reference to FIG. 79.

The switch portion 40 may generate a constant output voltage VO by performing a switching operation according to the switching signal (i.e., the PWM signal) input from the control circuit 20. The switch portion 40 may include a level shifter 45, a first driver 43, a second driver 44, a first switch 41, and a second switch 42. The first and second switches 41 and 42 may be MOSFETs. The first switch 41 may be a high-side MOSFET, and the second switch 42 may be a low-side MOSFET. Since an input capacitance of a gate terminal of the MOSFET is high, the first and second drivers 43 and 44, each of which has a sufficient output, may be placed in the front end of the MOSFET.

In various embodiments of the present disclosure, the control circuit 20, the regulator 30, and the switch portion 40 are embedded in the single IC chip 500 together with the active circuit unit 131.

The feedback unit 182 is connected to the control circuit 20 and is disposed outside the IC chip 500. The feedback unit 182 is a feedback control system that allows the same output voltage VO to be output even when the arbitrary input voltage V1 is input. The feedback unit 182 may be composed of commercial discrete elements. Accordingly, necessary tuning may be performed on the compensation circuit according to the situation from the outside of the IC chip 500. However, the present disclosure is not limited thereto, and according to embodiments, some elements (e.g., resistors) of the feedback unit 182 may be embedded together in the IC chip 500.

The filter unit 183 is a DC voltage/current filter, and may be located at an output terminal of the power conversion unit 181. However, the present disclosure is not limited thereto, and when the power management unit 180 is a boost converter, the filter unit 183 may be located at an input terminal of the power conversion unit 181. Meanwhile, the filter unit 183 may be configured by commercial discrete elements in the outside of the IC chip 500.

The power management unit 180 may finally output VO through the power conversion unit 181, the feedback unit 182, and the filter unit 183. The final output voltage VO of the power management unit 180 is input to the active circuit unit 131 of the amplification unit 130. VO may be set to an optimal voltage level for driving the active circuit unit 131.

Figure 79:
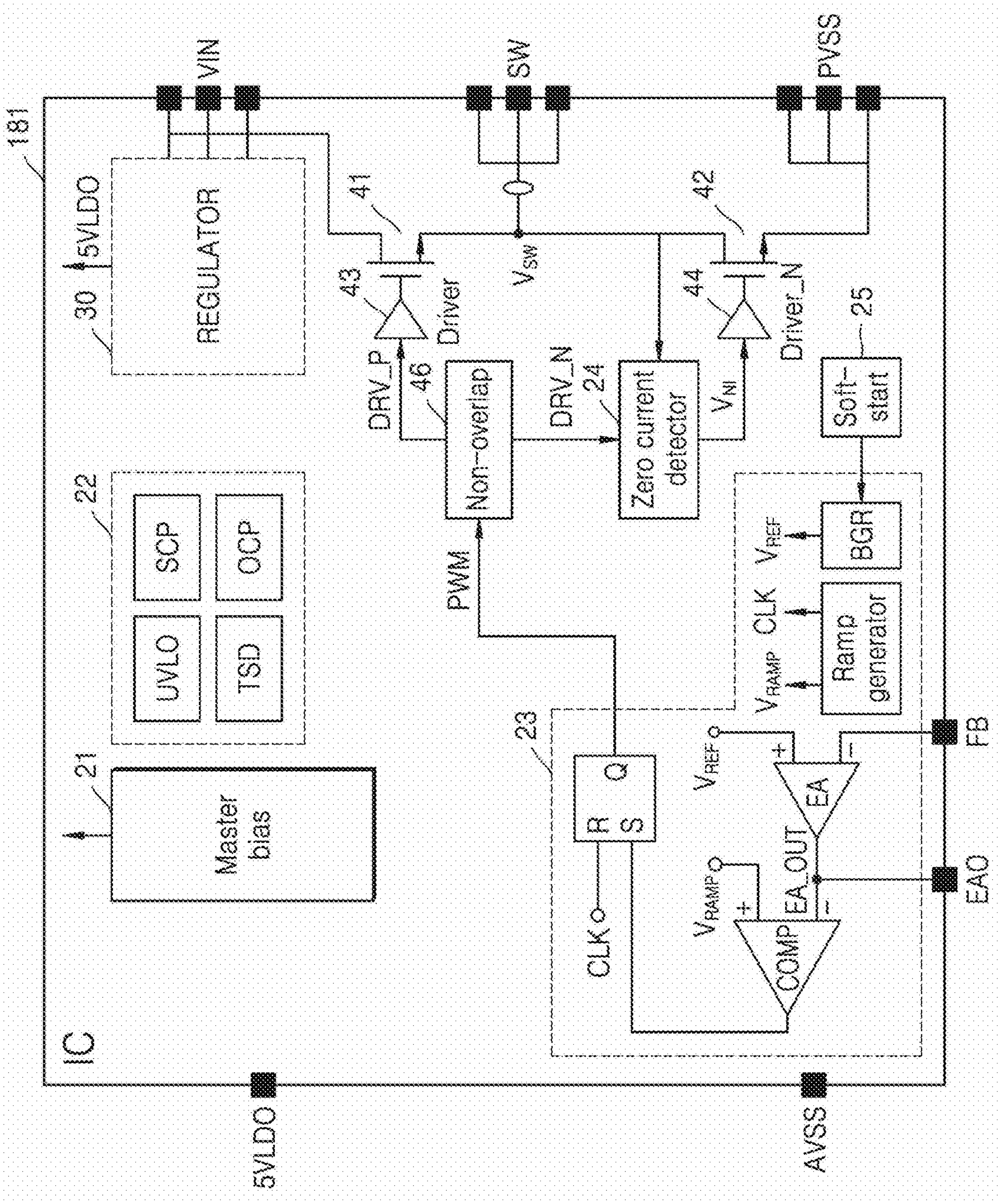
FIG. 79 illustrates a more specific example of a power conversion unit shown in FIG. 78.

FIG. 79 illustrates a more specific example of the power conversion unit 181 shown in FIG. 78.

Referring to FIGS. 78 and 79 together, the control circuit 20 of the power conversion unit 181 may include a voltage redistribution circuit 21, a protection circuit 22, a pulse width modulation circuit 23, a zero current detector 24, and a soft start circuit 25. The regulator 30 of FIG. 79 corresponds to the regulator 30 of FIG. 78.

The regulator 30 may generate a DC low voltage, for driving the internal circuit of the power conversion unit 181, from the input voltage V1. The DC low voltage generated from the regulator 30 may be, for example, about 5 V.

The voltage redistribution circuit 21 may receive the DC low voltage generated by the regulator 30. The voltage redistribution circuit 21 redistributes the DC low voltage input from the regulator 30 into DC bias voltages suitable for IC internal circuit blocks. For example, the voltage redistribution circuit 21 may redistribute the DC bias voltages to a band gap reference (BGR) block, a Ramp generator block, and the like. The voltage redistribution circuit 21 may be referred to as a master bias or the like.

The protection circuit 22 may include one or more protection circuits for various situations. In an embodiment, the protection circuit 22 may include an under voltage lock out (UVLO) circuit. When the output voltage of the regulator 30 drops below a specified voltage, the UVLO circuit may forcibly turn off an operation of the power conversion unit 181 to block unstable operation.

In an embodiment, the protection circuit 22 may include a short current protection (SCP) circuit. The SCP circuit may protect the power conversion unit 181 from a short-circuit current.

In an embodiment, the protection circuit 22 may include an over current protection (OCP) circuit. The OCP circuit may protect the power conversion unit 181 from overcurrent.

In an embodiment, the protection circuit 22 may include a thermal shutdown (TSD) circuit. The TSD circuit may shut down the circuit for protection when a temperature of the IC exceeds a specified value for reasons such as, for example, the overcurrent.

The pulse width modulation circuit 23 performs a core function of the control circuit 20. The pulse width modulation circuit 23 generates a PWM signal that is a switching signal necessary to output a constant output voltage VO from the input voltage in an arbitrary range. The first switch 41 and the second switch 42 may be selectively turned on or off according to the PWM signal generated by the pulse width modulation circuit 23 to generate a voltage signal VSW. The voltage signal output through one terminal SW of the IC chip 500 may be supplied to the active circuit unit 131 as the DC output voltage VO through the filter unit 183 and the feedback unit 182.

According to an embodiment, the pulse width modulation circuit 23 may include a BGR block, a Ramp generator block, an error amplifier EA, a comparator, and an RS latch.

In an embodiment, the BGR block is a voltage bias circuit for outputting a constant voltage VREF even when a temperature or voltage changes. The BGR block may supply the constant voltage VREF to the error amplifier EA even when a temperature or voltage changes.

The Ramp generator block may generate a ramp signal VRAMP and a clock signal CLK that are required to generate the PWM signal.

The error amplifier EA is an amplifier necessary for a feedback circuit. One of input terminals of the error amplifier EA may be connected to the feedback unit 182 through one terminal FB of the IC chip 500. The feedback unit 182 outside the IC chip 500 may be connected to an non-inverting terminal of the error amplifier EA through the terminal FB of the IC chip 500.

The comparator may output a digital signal that is generated based on a comparison between an output signal EA_OUT of the error amplifier EA and the ramp signal VRAMP. Meanwhile, an output terminal of the error amplifier EA may form one terminal EAO of the IC chip 500. The feedback unit 182 outside the IC chip 500 may be connected to the output terminal of the error amplifier EA through the terminal EAO. The terminal EAO may correspond to the non-inverting terminal among the input terminals of the comparator.

The RS latch may transmit the PWM signal to the switch portion 40 in response to the clock signal CLK.

The first switch 41 and the second switch 42 may each be turned on according to an on or off digital signal of the PWM signal. At this point, when the first switch 41 and the second switch 42 are simultaneously turned on even for a short period of time, the MOSFETs may be damaged due to overcurrent. Accordingly, in order to prevent a situation in which the first and second switches 41 and 42 are simultaneously turned on, the switch portion 40 may include a non-overlap circuit 46.

The PWM signal output from the RS latch may be transmitted to the non-overlap circuit 46 of the switch portion 40. The non-overlap circuit 46 may generate a short-time section in which both the first switch 41 and the second switch 42 are turned off. The short period of time may be referred to as a dead-time, and may be, for example, several tens of nanoseconds (nsec). The non-overlap circuit 46 may be referred to as a dead-time generator.

Meanwhile, the first and second switches 41 and 42 may be MOSFETs. The first switch 41 may be a high-side MOSFET, and the second switch 42 may be a low-side MOSFET. Since an input capacitance of a gate terminal of the MOSFET is high, the first and second drivers 43 and 44, each of which has a sufficient output, may be placed in the front end of the MOSFET.

Meanwhile, the control circuit 20 may further include a zero current detector 24.

In a situation in which a current of 0 A or a reverse current is generated in the second switch 42, which is a low-side MOSFET, the power management unit 180 should operate in a discontinuous current mode (DCM) for efficiency. To this end, when the reverse current in the second switch 42 is detected, the zero current detector 24 may block the PWM signal that is input to the second switch 42.

Meanwhile, the control circuit 20 may further include the soft start circuit 25.

When the power management unit 180 (i.e., a converter) is suddenly driven in an OFF state, a voltage may be instantaneously applied to an output capacitor or the like to generate a transient current, and the MOSFET may be malfunctioning. In order to prevent this, the soft start circuit 25 may slowly increase the output voltage or the like even in a situation in which the converter is suddenly driven.

FIG. 80 schematically illustrates a configuration of an active current compensation device 100A-2 according to an embodiment of the present disclosure. Hereinafter, descriptions of contents overlapping with contents described with reference to FIGS. 74 to 79 will be omitted.

Referring to FIG. 80, the active current compensation device 100A-2 may actively compensate for first currents I11, I12, and I13 input as a common-mode current with respect to each of first through third high-current paths 111, 112, and 113 connected to the first device 300.

To this end, the active current compensation device 100A-2 may include first through third high-current paths 111, 112, and 113, a sensing transformer 120A-2, an amplification unit 130A, a compensation transformer 140A, and a compensation capacitor unit 150A-2.

When it is described in comparison with the active current compensation devices 100A and 100A-1 according to the above-described embodiments, the active current compensation device 100A-2 according to the embodiment described with reference to FIG. 80 includes first through third high-current paths 111, 112, and 113, and thus has differences in the sensing transformer 120A-2 and the compensation capacitor unit 150A-2. Thus, the active current compensation device 100A-2 will now be described below focusing on differences described above.

The active current compensation device 100A-2 may include a first high-current path 111, a second high-current path 112, and a third high-current path 113 that are distinguished from each other. According to an embodiment, the first high-current path 111 may be an R-phase power line, the second high-current path 112 may be an S-phase power line, and the third high-current path 113 may be a T-phase power line. The first currents I11, I12, and I13 may be input as a common-mode current with respect to each of the first high-current path 111, the second high-current path 112, and the third high-current path 113.

A primary side 121A-2 of the sensing transformer 120A-2 may be disposed in each of the first to third high-current paths 111 to 113 to generate an induced current in a secondary side 122A-2. Magnetic flux densities generated by the sensing transformer 120A-2 due to the first currents I11, I12, and I13 on the first through third high-current paths 111, 112, and 113 may be reinforced with each other.

In the active current compensation device 100A-2 according to the embodiment described with reference to FIG. 80, the amplification unit 130A may correspond to the above-described amplification unit 130A.

The compensation capacitor unit 150A-2 may provide paths through which compensation currents IC1, IC2, and IC3 generated by the compensation transformer 140A flow to the first to third high-current paths 111 to 113, respectively.

The active current compensation device 100A-2 may further include a decoupling capacitor unit 170A-2 on an output side thereof (i.e., the second device 200 side). One ends of capacitors included in the decoupling capacitor unit 170A-2 may be connected to the first high-current path 111, the second high-current path 112, and the third high-current path 113, respectively. The opposite end of each of the capacitors may be connected to the first reference potential 601 of the current compensation device 100A-2.

The decoupling capacitor unit 170A-2 may prevent the performance of outputting the compensation current of the active current compensation device 100A-2 from being significantly changed according to a change in an impedance value of the second device 200. An impedance ZY of the decoupling capacitor unit 170A-2 may be designed to have a value less than a value specified in a first frequency band for which noise reduction is to be performed. As the decoupling capacitor unit 170A-2 is coupled, the current compensation device 100A-2 may be used as an independent module in any system (e.g., a three-phase three-wire system).

According to an embodiment, the decoupling capacitor unit 170A-2 may be omitted from the active current compensation device 100A-2.

The active current compensation device 100A-2 according to the embodiment described above may be used to compensate (or cancel) for the first currents I11, I12, and I13 traveling from a load of a three-phase three-wire power system to a power source.

Of course, according to the technical spirit of the present disclosure, the active current compensation device according to various embodiments may be modified to be also applicable to a three-phase four-wire system.

In various embodiments of the present disclosure, an active circuit unit 131A included in the amplification unit 130A and a power conversion unit 181 included in a power management unit 180 may be physically integrated into one IC chip 500. Even when a voltage V1 in an arbitrary range is input from the power supply 400, the IC chip 500 may convert the voltage V1 into a voltage VO optimized for driving the active circuit unit 131A thereinside through the power conversion unit 181, and drive the active circuit unit 131A. Accordingly, the IC chip 500 may have versatility as an independent component and may be commercialized. In addition, the active circuit unit 131A included in the amplification unit 130A may stably operate regardless of the characteristics of a peripheral system.

Figure 81:
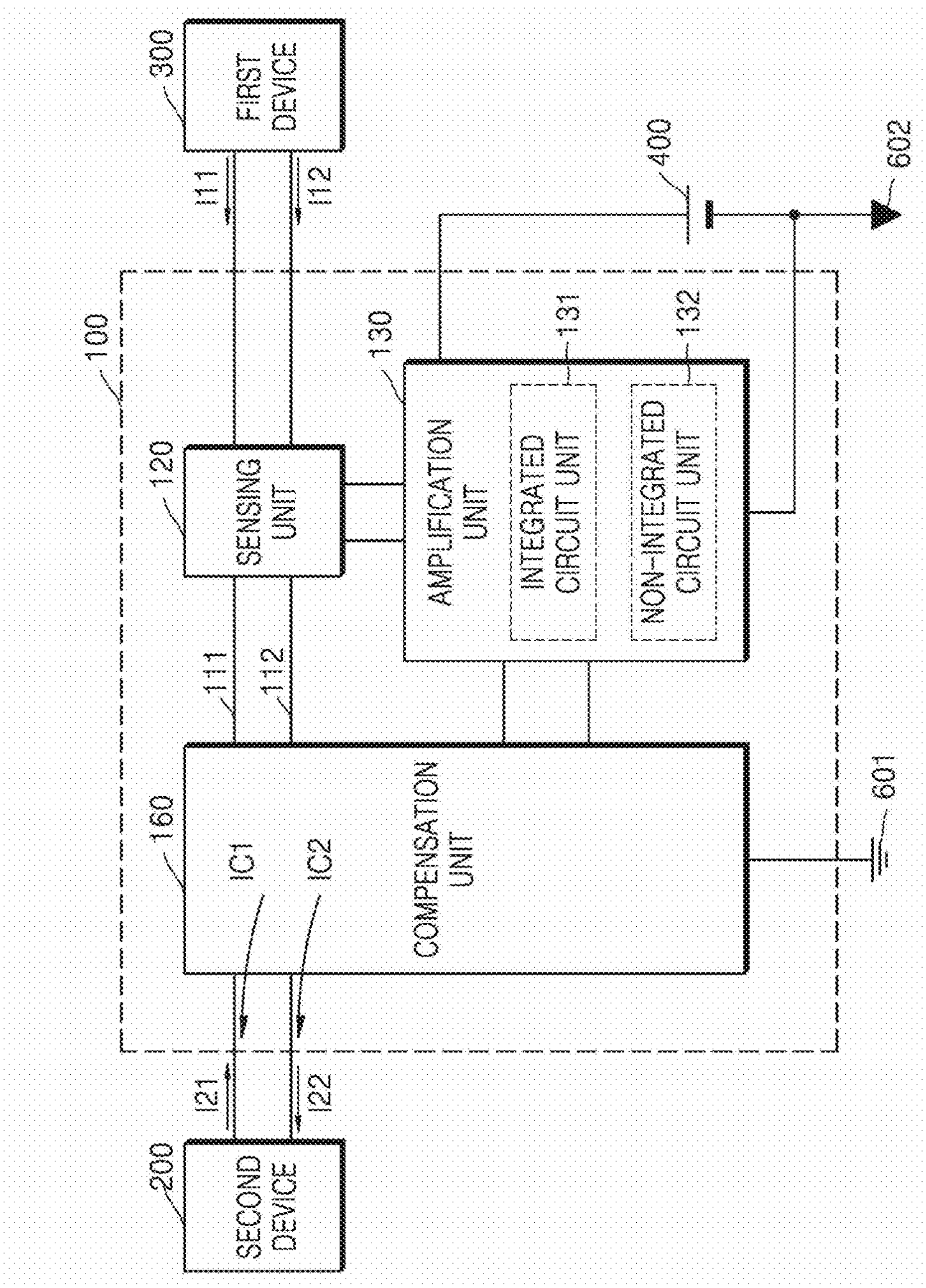
FIG. 81 schematically illustrates a configuration of a system including an active current compensation device according to an embodiment of the present disclosure.

[4] Active Current Compensation Device Including Integrated Circuit Unit and Non-Integrated Circuit Unit FIG. 81 schematically illustrates a configuration of a system including an active current compensation device 100 according to an embodiment of the present disclosure. The active current compensation device 100 may actively compensate for first currents I11 and I12 (e.g., an EMI noise current) that are input as a common-mode current through two or more high-current paths 111 and 112 from a first device 300.

Referring to FIG. 81, the active current compensation device 100 may include a sensing unit 120, an amplification unit 130, and a compensation unit 160.

In the present specification, the first device 300 may be any of various types of power systems using power supplied by a second device 200. For example, the first device 300 may be a load that is driven using the power supplied by the second device 200. In addition, the first device 300 may be a load (e.g., an electric vehicle) that stores energy using the power supplied by the second device 200 and is driven using the stored energy. However, the present disclosure is not limited thereto.

In the present specification, the second device 200 may be any of various types of systems for supplying power to the first device 300 in the form of current and/or voltage. The second device 200 may also be a device that supplies stored energy. However, the present disclosure is not limited thereto.

A power converter may be located on the first device 300 side. For example, the first currents I11 and I12 may be input to the current compensation device 100 due to the switching operation of the power converter. That is, the first device 300 side may correspond to a noise source and the second device 200 side may correspond to a noise receiver.

The two or more high-current paths 111 and 112 may be paths for transmitting the power supplied from the second device 200, that is, second currents I21 and I22, to the first device 300, for example, may be power lines. For example, the two or more high-current paths 111 and 112 may be a live line and a neutral line. At least some portions of the high-current paths 111 and 112 may pass through the current compensation device 100. The second currents I21 and I22 may be an alternating current having a frequency of a second frequency band. The second frequency band may be, for example, a band having a range of 50 Hz to 60 Hz.

Further, the two or more high-current paths 111 and 112 may also be paths through which noise generated by the first device 300, that is, the first currents I11 and I12, is transmitted to the second device 200. The first currents I11 and I12 may be input as a common-mode current with respect to each of the two or more high-current paths 111 and 112. The first currents I11 and I12 may be currents that are unintentionally generated in the first device 300 due to various causes. For example, the first currents I11 and I12 may be noise currents generated by virtual capacitance between the first device 300 and the surrounding environment. Alternatively, the first currents I11 and I12 may be noise currents generated due to a switching operation of the power converter of the first device 300. The first currents I11 and I12 may be currents having a frequency of a first frequency band. The first frequency band may be a frequency band higher than the second frequency band described above. The first frequency band may be, for example, a band having a range of 150 KHz to 30 MHz.

Figure 84:
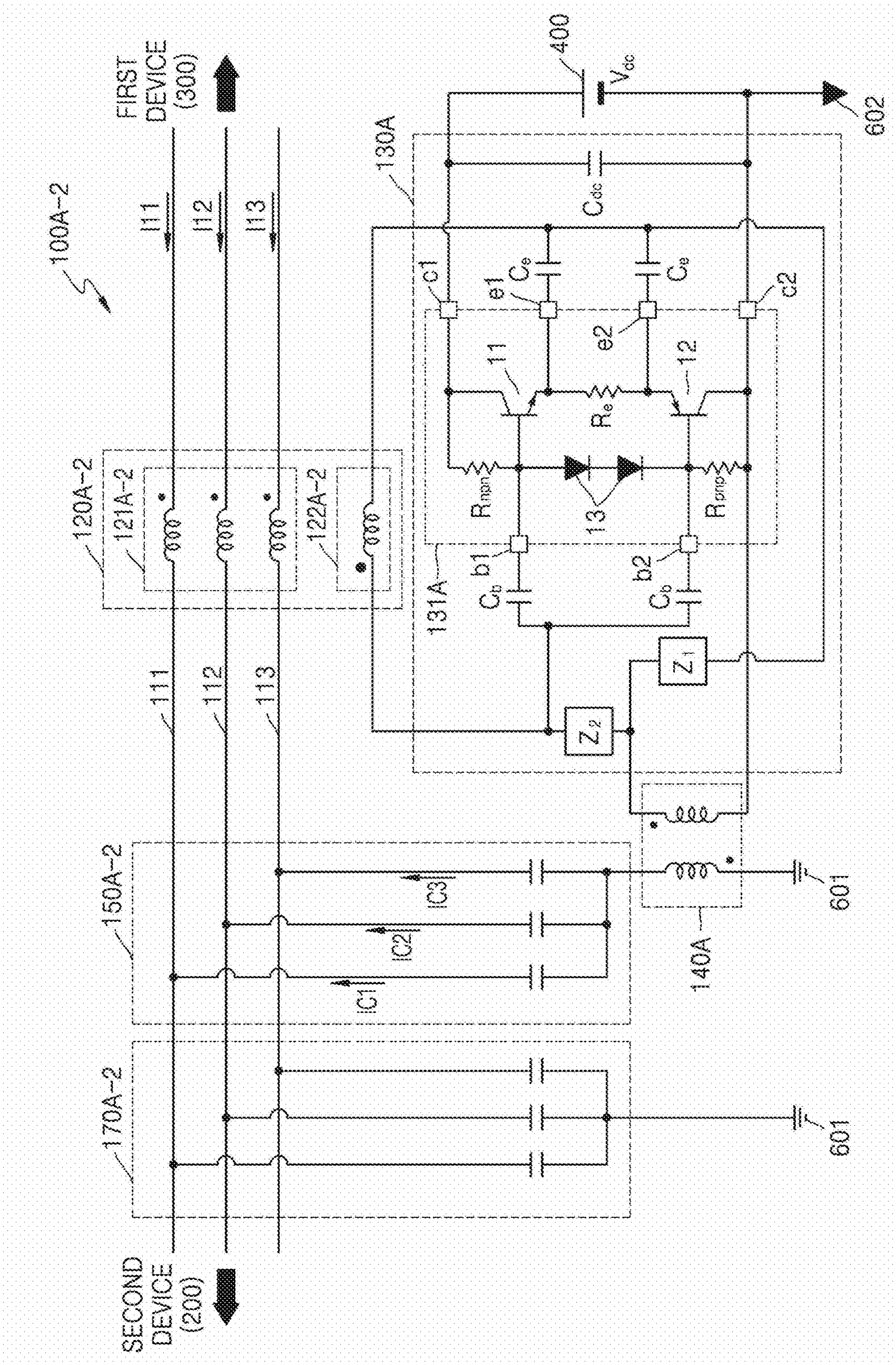
FIG. 84 schematically illustrates a configuration of an active current compensation device according to an embodiment of the present disclosure.
Figure 86:
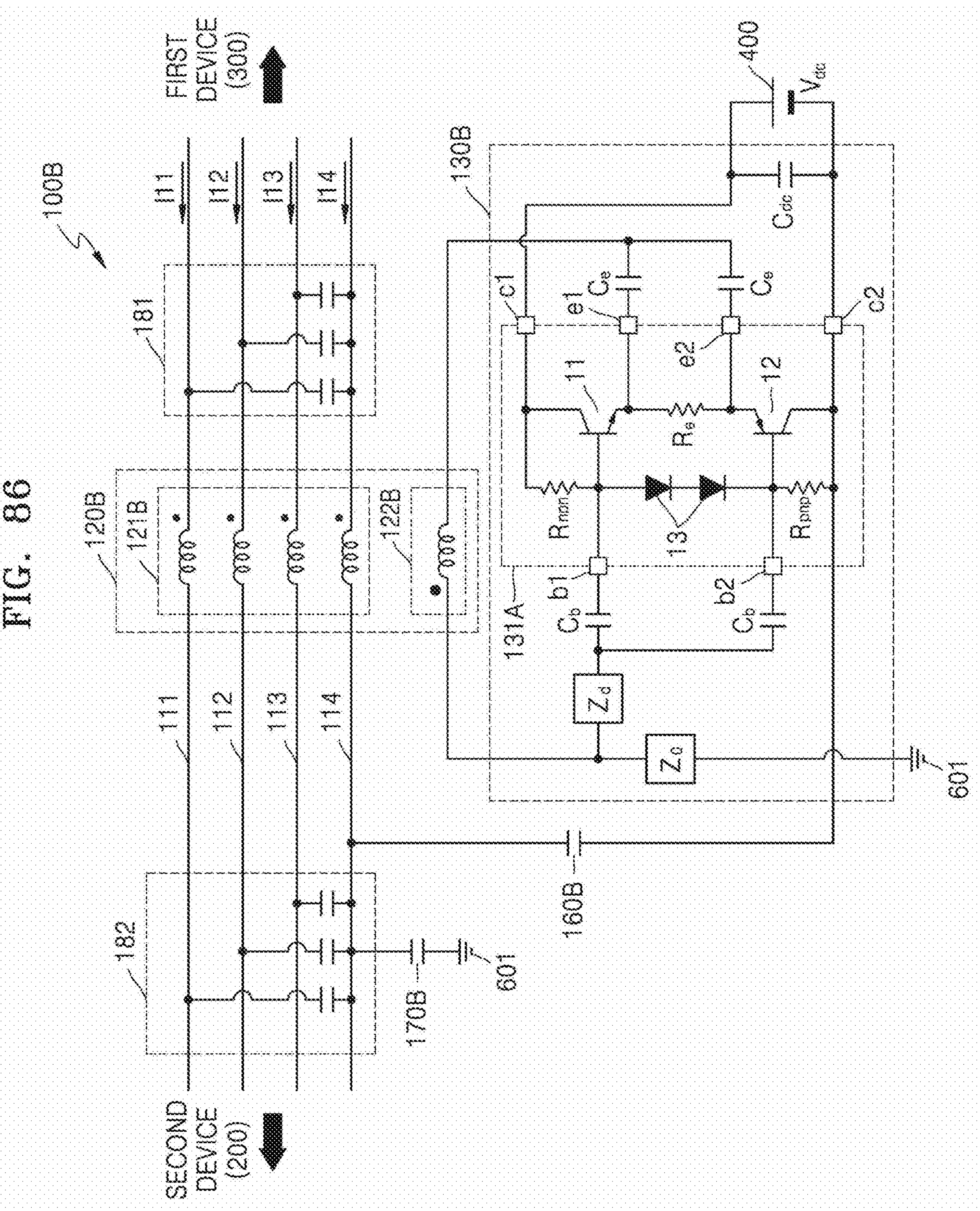
FIG. 86 schematically illustrates a configuration of an active current compensation device according to an embodiment of the present disclosure.

Meanwhile, the two or more high-current paths 111 and 112 may include two paths as shown in FIG. 81, or may include three paths or four paths as shown in FIGS. 84 and 86. The number of the high-current paths 111 and 112 may vary depending on the type and/or form of power used by the first device 300 and/or the second device 200.

The sensing unit 120 may sense the first currents I11 and I12 on the two or more high-current paths 111 and 112 and generate an output signal corresponding to the first currents I11 and I12. That is, the sensing unit 120 may refer to a component that senses the first currents I11 and I12 on the high-current paths 111 and 112. In order for the sensing unit 120 to sense the first currents I11 and I12, at least some portion of the high-current paths 111 and 112 may pass through the sensing unit 120, but a portion of the sensing unit 120, which generates an output signal according to the sensing, may be isolated from the high-current paths 111 and 112. For example, the sensing unit 120 may be implemented as a sensing transformer. The sensing transformer may sense the first currents I11 and I12 on the high-current paths 111 and 112 in a state of being isolated from the high-current paths 111 and 112. However, the sensing unit 120 is not limited to the sensing transformer.

According to an embodiment, the sensing unit 120 may be differentially connected to input terminals of the amplification unit 130.

The amplification unit 130 may be electrically connected to the sensing unit 120, and may amplify the output signal output from the sensing unit 120 to generate an amplified output signal. The term "amplification" by the amplification unit 130, as used herein, may mean that the magnitude and/or phase of an object to be amplified is adjusted. The amplification unit 130 may be implemented by various components, and may include active elements. In an embodiment, the amplification unit 130 may include BJTs. For example, the amplification unit 130 may include a plurality of passive elements, such as resistors and capacitors, in addition to the BJTs. However, the present disclosure is not limited thereto, and the component for the "amplification" described in the present disclosure may be used without being limited to the amplification unit 130 of the present disclosure.

According to an embodiment, a second reference potential 602 of the amplification unit 130 and a first reference potential 601 of the current compensation device 100 may be distinguished from each other. For example, when the amplification unit 130 is isolated from the high-current paths 111 and 112, the second reference potential 602 of the amplification unit 130 and the first reference potential 601 of the current compensation device 100 may be distinguished from each other.

However, the present disclosure is not limited thereto. For example, in a case in which an amplification unit 130B is not isolated from the high-current paths 111 and 112 as shown in FIG. 86, a reference potential of the amplification unit 130B and a reference potential of a current compensation device 100B may not be distinguished from each other.

The amplification unit 130 according to various embodiments of the present disclosure may include an integrated circuit unit 131 and a non-integrated circuit unit 132. The integrated circuit unit 131 may include essential components of the active current compensation device 100. The essential components may include, for example, active elements. Accordingly, the active elements included in the amplification unit 130 may be integrated in the integrated circuit unit 131 of the amplification unit 130. In the amplification unit 130, the non-integrated circuit unit 132 may not include active elements. The integrated circuit unit 131 may further include passive elements as well as the active elements.

The integrated circuit unit 131 according to an embodiment of the present disclosure may physically be one IC chip. The integrated circuit unit 131 according to an embodiment of the present disclosure is applicable to the active current compensation device 100 of various designs. The one-chip integrated circuit unit 131 according to an embodiment of the present disclosure has versatility as an independent module and is applicable to the current compensation device 100 of various designs.

The non-integrated circuit unit 132 according to an embodiment of the present disclosure may be modified according to the design of the active current compensation device 100.

The integrated circuit unit 131 may include terminals to be connected to the non-integrated circuit unit 132. The integrated circuit unit 131 and the non-integrated circuit unit 132 may be combined together to function as the amplification unit 130. The combination of the integrated circuit unit 131 and the non-integrated circuit unit 132 may perform a function of generating an amplified signal from the output signal output from the sensing unit 120. The amplified signal may be input to the compensation unit 160.

Examples of the detailed configuration of the amplification unit 130 including the integrated circuit unit 131 and the non-integrated circuit unit 132 will be described below with reference to FIGS. 83 to 86.

As described above, the active current compensation device 100 according to various embodiments is characterized in that the amplification unit is divided into the integrated circuit unit and the non-integrated circuit unit.

The amplification unit 130 may receive power from a power supply 400 that is distinguished from the first device 300 and/or the second device 200. The amplification unit 130 may receive the power from the power supply 400, and amplify the output signal output from the sensing unit 120 to generate an amplified current.

The power supply 400 may be a device that receives power from a power source that is independent of the first device 300 and the second device 200 and generates input power of the amplification unit 130. Alternatively, the power supply 400 may also be a device that receives power from any one of the first device 300 and the second device 200 and generates input power of the amplification unit 130.

The integrated circuit unit 131, which is an IC chip, may include a terminal to be connected to the power supply 400, a terminal to be connected to the second reference potential 602, and a terminal to be connected to the non-integrated circuit unit 132.

The compensation unit 160 may generate compensation currents IC1 and IC2 on the basis of the amplified output signal generated by the amplification unit 130. An output side of the compensation unit 160 may be connected to the high-current paths 111 and 112 to allow the compensation currents IC1 and IC2 to flow to the high-current paths 111 and 112.

According to an embodiment, the output side of the compensation unit 160 may be isolated from the amplification unit 130. For example, the compensation unit 160 may include a compensation transformer for the isolation. For example, the output signal of the amplification unit 130 may flow through a primary side of the compensation transformer, and the compensation current based on the output signal may be generated on a secondary side of the compensation transformer.

However, the present disclosure is not limited thereto. According to an embodiment, as shown in FIG. 86, an output side of a compensation unit 160B may not be isolated from the amplification unit 130B. In this case, the amplification unit 130B may not be isolated from the high-current paths 111 and 112.

Referring to FIG. 81 again, in order to cancel the first currents I11 and I12, the compensation unit 160 may inject the compensation currents IC1 and IC2 to the high-current paths 111 and 112 through the two or more high-current paths 111 and 112, respectively. The compensation currents IC1 and IC2 may have the same magnitude and an opposite phase compared to the first currents I11 and I12.

Figure 82:
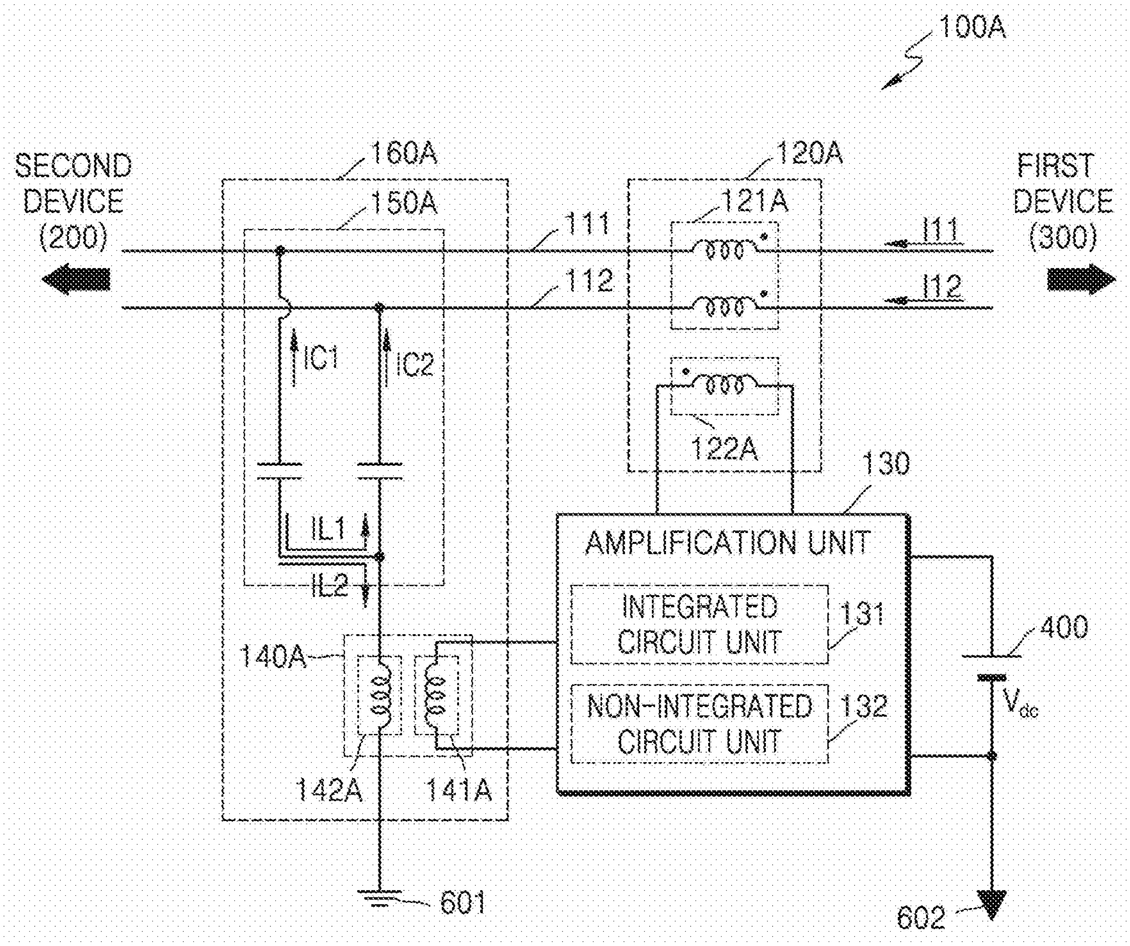
FIG. 82 illustrates a more specific example of the embodiment described with reference to FIG. 81, and schematically illustrates an active current compensation device according to an embodiment of the present disclosure.

FIG. 82 illustrates a more specific example of the embodiment described with reference to FIG. 81, and schematically illustrates an active current compensation device 100A according to an embodiment of the present disclosure. The active current compensation device 100A may actively compensate for first currents I11 and I12 (e.g., a noise current) input as a common-mode current with respect to each of two high-current paths 111 and 112 connected to the first device 300.

Referring to FIG. 82, the active current compensation device 100A may include a sensing transformer 120A, an amplification unit 130, and a compensation unit 160A.

In an embodiment, the sensing unit 120 described above may include the sensing transformer 120A. In this case, the sensing transformer 120A may be a component for sensing the first currents I11 and I12 on the high-current paths 111 and 112 in a state of being isolated from the high-current paths 111 and 112. The sensing transformer 120A may sense the first currents I11 and I12 that are noise currents input through the high-current paths 111 and 112 (e.g., power lines) from the first device 300 side.

The sensing transformer 120A may include a primary side 121A disposed on the high-current paths 111 and 112 and a secondary side 122A differentially connected to input terminals of the amplification unit 130. The sensing transformer 120A may generate an induced current, which is directed to the secondary side 122A (e.g., a secondary winding), on the basis of magnetic flux densities induced due to the first currents I11 and I12 at the primary side 121A (e.g., a primary winding) disposed on the high-current paths 111 and 112. The primary side 121A of the sensing transformer 120A may be, for example, a winding in which each of a first high-current path 111 and a second high-current path 112 is wound around one core. However, the present disclosure is not limited thereto, and the primary side 121A of the sensing transformer 120A may have a form in which the first high-current path 111 and the second high-current path 112 pass through the core.

Specifically, the sensing transformer 120A may be configured such that the magnetic flux density induced due to the first current I11 on the first high-current path 111 (e.g., a live line) and the magnetic flux density induced due to the first current I12 on the second high-current path 112 (e.g., neutral line) are overlapped (or reinforced) with each other. In this case, the second currents I21 and I22 also flow through the high-current paths 111 and 112, and thus the sensing transformer 120A may be configured such that a magnetic flux density induced due to the second current I21 on the first high-current path 111 and a magnetic flux density induced due to the second current I22 on the second high-current path 112 cancel each other. In addition, as an example, the sensing transformer 120A may be configured such that magnitudes of the magnetic flux densities, which are induced due to the first currents I11 and I12 of a first frequency band (e.g., a band having a range of 150 KHz to 30 MHz), are greater than magnitudes of the magnetic flux densities induced due to the second currents I21 and I22 of a second frequency band (for example, a band in a range of 50 Hz to 60 Hz).

As described above, the sensing transformer 120A may be configured such that the magnetic flux densities induced due to the second currents I21 and I22 may cancel each other so that only the first currents I11 and I12 may be sensed. That is, the current induced in the secondary side 122A of the sensing transformer 120A may be a current into which the first currents I11 and I12 are converted at a predetermined ratio.

For example, in the sensing transformer 120A, when a turns ratio of the primary side 121A and the secondary side 122A is 1:Nsen, and a self-inductance of the primary side 121A of the sensing transformer 120A is Lsen, the secondary side 122A may have a self-inductance of Nsen2*Lsen. In this case, the current induced in the secondary side 122A has a magnitude that is 1/Nsen times that of the first currents I11 and I12. For example, the primary side 121A and the secondary side 122A of the sensing transformer 120A may be coupled with a coupling coefficient of Ksen.

The secondary side 122A of the sensing transformer 120A may be connected to the input terminals of the amplification unit 130. For example, the secondary side 122A of the sensing transformer 120A may be differentially connected to the input terminals of the amplification unit 130 and supply the induced current or an induced voltage to the amplification unit 130.

The amplification unit 130 may amplify the current or voltage that is sensed by the sensing transformer 120A and induced in the secondary side 122A. For example, the amplification unit 130 may amplify the magnitude of the induced current or voltage at a predetermined ratio and/or adjust the phase of the induced current or voltage.

According to various embodiments of the present disclosure, the amplification unit 130 may include an integrated circuit unit 131 configured as one IC chip, and a non-integrated circuit unit 132 that is a component other than one IC chip.

According to an embodiment, the amplification unit 130 may be connected to the second reference potential 602, and the second reference potential 602 may be distinguished from the first reference potential 601 of the current compensation device 100A (or the compensation unit 160A). The amplification unit 130 may be connected to the power supply 400.

The IC chip, which is the integrated circuit unit 131, may include a terminal to be connected to the power supply 400, a terminal to be connected to the second reference potential 602, and a terminal to be connected to the non-integrated circuit unit 132.

The compensation unit 160A may be an example of the compensation unit 160 described above. In an embodiment, the compensation unit 160A may include a compensation transformer 140A and a compensation capacitor unit 150A. The amplified current amplified by the above-described amplification unit 130 flows through a primary side 141A of the compensation transformer 140A.

The compensation transformer 140A according to an embodiment may be a component for isolating the amplification unit 130 including active elements from the high-current paths 111 and 112. That is, the compensation transformer 140A may be a component for generating compensation current (in a secondary side 142A) to be injected into the high-current paths 111 and 112 on the basis of the amplified current in a state of being isolated from the high-current paths 111 and 112.

The compensation transformer 140A may include the primary side 141A differentially connected to output terminals of the amplification unit 130 and the secondary side 142A connected to the high-current paths 111 and 112. The compensation transformer 140A may induce a compensation current, which is directed toward the secondary side 142A (e.g., a secondary winding), on the basis of a magnetic flux density induced due to the amplified current flowing through the primary side 141A (e.g., a primary winding).

In this case, the secondary side 142A may be disposed on a path connecting the compensation capacitor unit 150A, which will be described below, and the first reference potential 601 of the current compensation device 100A. That is, one end of the secondary side 142A is connected to the high-current paths 111 and 112 through the compensation capacitor unit 150A, and the other end of the secondary side 142A may be connected to the first reference potential 601 of the active current compensation device 100A. Meanwhile, the primary side 141A of the compensation transformer 140A, the amplification unit 130, and the secondary side 122A of the sensing transformer 120A may be connected to the second reference potential 602, which is distinguished from the reference potential of the other components of the active current compensation device 100A. The first reference potential 601 of the current compensation device 100A according to an embodiment and the second reference potential 602 of the amplification unit 130 may be distinguished from each other.

As described above, in the current compensation device 100A according to an embodiment, the component generating the compensation current uses a reference potential (i.e., the second reference potential 602) different from that of the other components and uses the separate power supply 400, and thus may operate in a state of being isolated from the other components, thereby the improving reliability of the active current compensation device 100A. However, the active current compensation device including the integrated circuit unit 131 and the non-integrated circuit unit 132 according to the present disclosure is not limited to such an isolating structure. The active current compensation device 100B having a non-isolating structure according to an embodiment of the present disclosure will be described below with reference to FIG. 86.

In the compensation transformer 140A according to an embodiment, when a turns ratio of the primary side 141A and the secondary side 142A is 1:Ninj, and a self-inductance of the primary side 141A of the compensation transformer 140A is Linj, the secondary side 142A may have a self-inductance of Ninj2*Linj. In this case, the current induced in the secondary side 142A has a magnitude that is 1/Ninj times that of the current (i.e., the amplified current) flowing in the primary side 141A. The primary side 141A and the secondary side 142A of the compensation transformer 140A may be coupled with a coupling coefficient of kinj.

The current converted through the compensation transformer 140A may be injected into the high-current paths 111 and 112 (e.g., power lines) through the compensation capacitor unit 150A as compensation currents IC1 and IC2. Accordingly, the compensation currents IC1 and IC2 may have the same magnitude and an opposite phase compared to the first currents I11 and I12 to cancel the first currents I11 and I12. Accordingly, a magnitude of a current gain of the amplification unit 130 may be designed to be Nsen*Ninj.

As described above, the compensation capacitor unit 150A may provide a path through which the current generated by the compensation transformer 140A flows to each of the two high-current paths 111 and 112.

The compensation capacitor unit 150A may include two Y-capacitors (Y-caps) each having one end connected to the secondary side 142A of the compensation transformer 140A and the other end connected to the high-current paths 111 and 112. One ends of the two Y-caps share a node connected to the secondary side 142A of the compensation transformer 140A, and the opposite ends of the two Y-caps may have a node connected to the first high-current path 111 and the second high-current path 112.

The compensation capacitor unit 150A may allow the compensation currents IC1 and IC2 induced by the compensation transformer 140A to flow to the power line. As the compensation currents IC1 and IC2 compensate (cancel) for the first currents I11 and I12, the current compensation device 100A may reduce noise.

Meanwhile, the compensation capacitor unit 150A may be configured such that a current IL1 flowing between the two high-current paths 111 and 112 through the compensation capacitors has a magnitude less than a first threshold magnitude. In addition, the compensation capacitor unit 150A may be configured such that a current IL2 flowing between each of the two high-current paths 111 and 112 and the first reference potential 601 through the compensation capacitors has a magnitude less than a second threshold magnitude.

The active current compensation device 100A according to an embodiment may be implemented as an isolated structure by using the compensation transformer 140A and the sensing transformer 120A.

Figure 83:
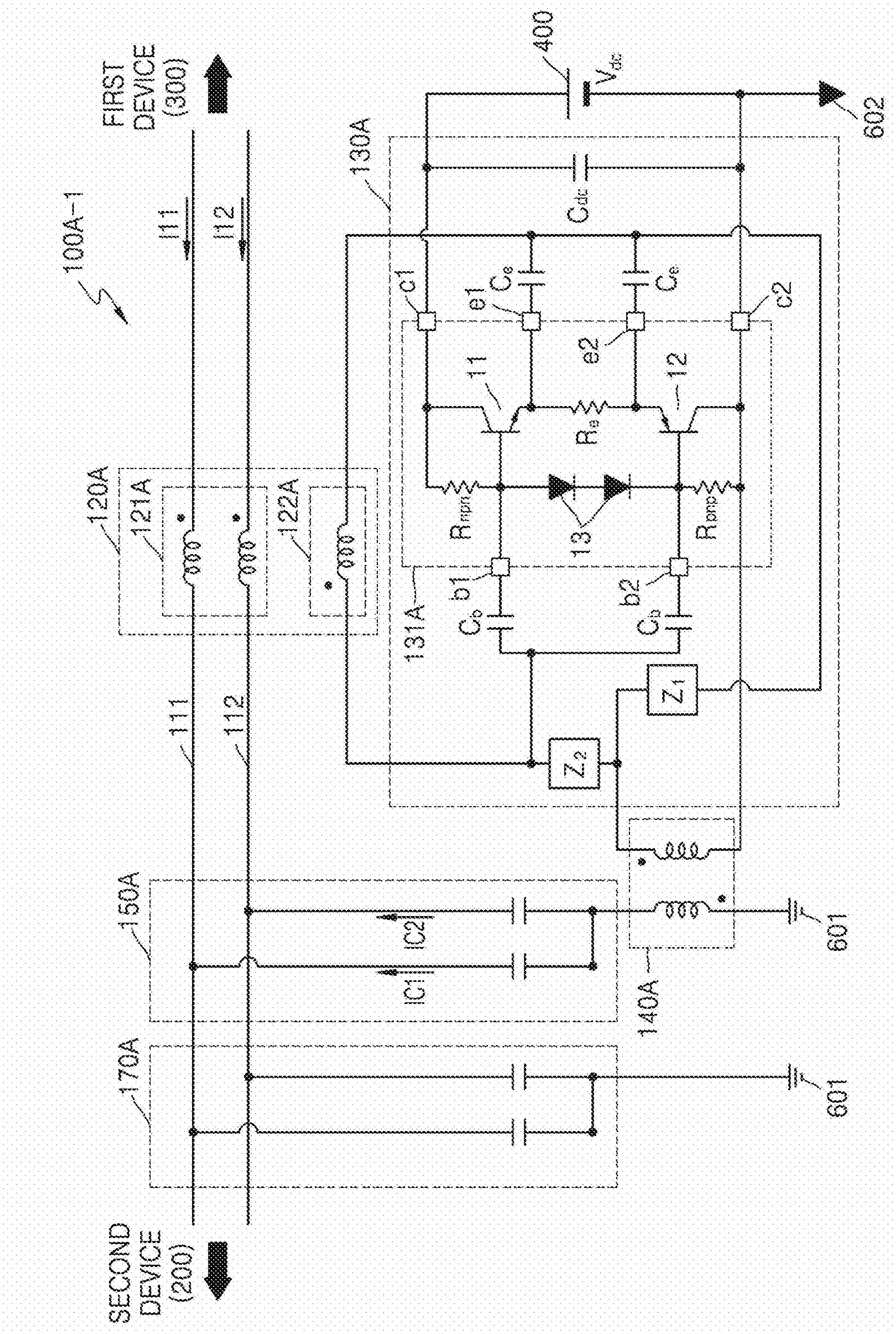
FIG. 83 illustrates a more specific example of the embodiment described with reference to FIG. 82, and schematically illustrates an active current compensation device according to an embodiment of the present disclosure.

FIG. 83 illustrates a more specific example of the embodiment described with reference to FIG. 82, and schematically illustrates an active current compensation device 100A-1 according to an embodiment of the present disclosure. The active current compensation device 100A-1 shown in FIG. 83 is an example of the active current compensation device 100A shown in FIG. 82. An amplification unit 130A included in the active current compensation device 100A-1 is an example of the amplification unit 130 of the active current compensation device 100A.

The active current compensation device 100A-1 according to an embodiment may include a sensing transformer 120A, the amplification unit 130A, a compensation transformer 140A, and a compensation capacitor unit 150A. In an embodiment, the active current compensation device 100A-1 may further include a decoupling capacitor unit 170A on an output side thereof (i.e., the second device 200 side). In other embodiments, the decoupling capacitor unit 170A may be omitted. Descriptions of the sensing transformer 120A, the compensation transformer 140A, and the compensation capacitor unit 150A are redundant and thus omitted.

The amplification unit 130A of the active current compensation device 100A-1 according to an embodiment may include an integrated circuit unit 131A and a non-integrated circuit unit. In the amplification unit 130A, the other components other than the integrated circuit unit 131A may be included in the non-integrated circuit unit. For example, in the amplification unit 130A, components included in the non-integrated circuit unit may be commercial discrete elements, but the present disclosure is not limited thereto.

In an embodiment, the integrated circuit unit 131A may include a first transistor 11, a second transistor 12, and/or one or more resistors. In an embodiment, the first transistor 11 may be an npn BJT, and the second transistor 12 may be a pnp BJT. For example, the amplification unit 130A may have a push-pull amplifier structure including an npn BJT and a pnp BJT.

For example, the one or more resistors included in the integrated circuit unit 131A may include resistors Rnpn, Rpnp, and/or Re. For example, the resistor Rnpn may connect a collector terminal and a base terminal of the first transistor 11, the resistor Rpnp may connect a collector terminal and a base terminal of the second transistor 12, and the resistor Re may connect an emitter terminal of the first transistor 11 and an emitter terminal of the second transistor 12.

In an embodiment, the integrated circuit unit 131A of the amplification unit 130A may further include a diode 13 in addition to the first transistor 11, the second transistor 12, and the one or more resistors. For example, one end of the diode 13 may be connected to the base terminal of the first transistor 11, and the other end of the diode 13 may be connected to the base terminal of the second transistor 12. In an embodiment, the diode 13 may be replaced by a resistor.

In an embodiment, the resistors Rnpn, Rpnp, Re, and/or the biasing diode 13 included in the integrated circuit unit 131A may be used for DC biasing of the BJTs. The above-described components are general-purpose components in various active current compensation devices, and may be integrated into the one-chip integrated circuit unit 131A.

In the amplification unit 130A, the components other than the integrated circuit unit 131A may be included in the non-integrated circuit unit. The integrated circuit unit 131A may be physically implemented as one IC chip. The non-integrated circuit unit may include commercial discrete elements. The non-integrated circuit unit may be implemented differently depending on an embodiment.

In the embodiment described with reference to FIG. 83, the non-integrated circuit unit may include, for example, capacitors Cb, Ce, and Cdc, and impedances Z1 and Z2.

In an embodiment, an induced current induced in a secondary side 122A by the sensing transformer 120A may be differentially input to the amplification unit 130A. Only AC signals may be selectively coupled through the capacitors Cb and Ce included in the amplification unit 130A. The capacitors Cb and Ce may respectively block DC voltages at the base node and the emitter node of each of the first and second transistors 11 and 12.

In an embodiment, the power supply 400 supplies a DC voltage Vdc, which is based on the second reference potential 602, to drive the amplification unit 130A. The capacitor Cdc is a DC decoupling capacitor for the voltage Vdc, and may be connected in parallel between the power supply 400 and the second reference potential 602. Only AC signals may be coupled between both collectors of the first transistor 11 (e.g., an npn BJT) and the second transistor 12 (e.g., a pnp BJT) through the capacitor Cdc.

A current gain of the amplification unit 130A may be controlled by a ratio of the impedances Z1 and Z2. Accordingly, Z1 and Z2 may be implemented outside the one-chip integrated circuit unit 131A. Z1 and Z2 may be flexibly designed depending on a turns ratio of each of the sensing transformer 120A and the compensation transformer 140A and a required target current gain.

In the integrated circuit unit 131A, an operating point of each of the first and second transistors 11 and 12 (e.g., BJT) may be controlled through the resistors Rnpn, Rpnp, and Re. The resistors Rnpn, Rpnp, and Re may be designed according to the operating point of the BJT. The resistor Rnpn may connect the collector terminal of the first transistor 11 (e.g., an npn BJT), which is a terminal of the power supply 400, and the base terminal of the first transistor 11 (e.g., an npn BJT). The resistor Rpnp may connect the collector terminal of the second transistor 12 (e.g., a pnp BJT), which is a terminal of the second reference potential 602, and the base terminal of the second transistor 12 (e.g., a pnp BJT). The resistor Re may connect the emitter terminal of the first transistor 11 and the emitter terminal of the second transistor 12.

The secondary side 122A of the sensing transformer 120A according to an embodiment may be connected between a base side and an emitter side of each of the first and second transistors 11 and 12. A primary side 141A of the compensation transformer 140A according to an embodiment may be connected between a collector side and the base side of each of the first and second transistors 11 and 12. Here, the connection includes an indirectly connected case. The amplification unit 130A according to an embodiment may have a regression structure in which an output current is injected back into a base of each of the first and second transistors 11 and 12. Due to the regression structure, the amplification unit 130A may stably obtain a constant current gain for operating the active current compensation device 100A-1.

When an input voltage of the amplification unit 130A has a positive swing of greater than zero due to a noise signal, the first transistor 11 (e.g., an npn BJT) may operate. In this case, an operating current may flow through a first path passing through the first transistor 11. When the input voltage of the amplification unit 130A has a negative swing of less than zero due to a noise signal, the second transistor 12 (e.g., a pnp BJT) may operate. In this case, the operating current may flow through a second path passing through the second transistor 12.

The integrated circuit unit 131A may be implemented as a one-chip IC. According to an embodiment, the first transistor 11, the second transistor 12, the diode 13, Rnpn, Rpnp, and Re of the integrated circuit unit 131A may be integrated into the one-chip IC.

The one-chip IC may include a terminal b1 corresponding to the base of the first transistor 11, a terminal c1 corresponding to the collector of the first transistor 11, a terminal e1 corresponding to an emitter of the first transistor 11, a terminal b2 corresponding to the base of the second transistor 12, a terminal c2 corresponding to the collector of the second transistor 12, and a terminal e2 corresponding to an emitter of the second transistor 12. However, the present disclosure is not limited thereto, and the one-chip IC of the integrated circuit unit 131A may further include other terminals in addition to the terminals b1, b2, c1, c2, e1, and e2.

In various embodiments, at least one of the terminals b1, b2, c1, c2, e1, and e2 of the integrated circuit unit 131A may be connected to the non-integrated circuit unit. The integrated circuit unit 131A and the non-integrated circuit unit may be combined together to function as the amplification unit 130A according to an embodiment.

According to the embodiment described with reference to FIG. 83, the capacitors Cb of the non-integrated circuit unit may be connected to the base terminal b1 of the first transistor 11 and the base terminal b2 of the second transistor 12, respectively. The capacitors Ce of the non-integrated circuit unit may be connected to the emitter terminal e1 of the first transistor 11 and the emitter terminal e2 of the second transistor 12, respectively. The external power supply 400 may be connected between the collector terminal c1 of the first transistor 11 and the collector terminal c2 of the second transistor 12. The collector terminal c2 of the second transistor 12 may correspond to the second reference potential 602. The decoupling capacitor Cdc of the non-integrated circuit unit may be connected between the collector terminal c1 of the first transistor 11 and the collector terminal c2 of the second transistor 12.

A combination of the integrated circuit unit 131A and Cb, Ce, Cdc, Z1, and Z2 of the non-integrated circuit unit may function as the amplification unit 130A according to the embodiment described with reference to FIG. 83.

According to various embodiments of the present disclosure, essential components of the active current compensation device 100A or 100A-1 may be integrated in the one-chip integrated circuit unit 131A. Accordingly, the size of the amplification unit 130 or 130A may be minimized by using the one-chip integrated circuit unit 131 or 131A as compared with a case of using discrete semiconductor devices.

An inductor, the capacitors (e.g., Cb, Ce, and Cdc), Z1, and Z2 of the non-integrated circuit unit are discrete components, and may be implemented around the one-chip integrated circuit unit 131A.

Capacitance of each of the capacitors Cb, Ce, and Cdc required for an AC signal to couple through each of the capacitors Cb, Ce, and Cdc may be several F or more (e.g., 10 μF). Such a capacitance value is difficult to be implemented in the one-chip integrated circuit unit, and thus the capacitors Cb, Ce, and Cdc may be implemented outside the integrated circuit unit, that is, in the non-integrated circuit unit.

The impedances Z1 and Z2 may be implemented outside the integrated circuit unit, i.e., in the non-integrated circuit unit, to achieve design flexibility for various power systems or various first devices 300. Z1 and Z2 may be flexibly designed depending on a turns ratio of each of the sensing transformer 120A and the compensation transformer 140A and a required target current gain. It is possible to design various current compensation devices that allow the same integrated circuit unit 131A to be applied to various power systems by adjusting the impedances Z1 and Z2. In particular, the size and impedance characteristics of the sensing transformer 120A should vary depending on a maximum rated current of the first device 300. Thus, in order to make a ratio of an injected current to a sensed noise current uniform in a wide frequency range, a proper design of Z1 and Z2 is required. Z1 and Z2 may be designed so that the ratio of the injected current to the sensed noise current becomes 1 in a wide frequency range by adjusting the turns ratio of each of the sensing transformer 120A and the compensation transformer 140A and a ratio of Z1 and Z2. To this end, the impedances Z1 and Z2 may be implemented outside the integrated circuit unit 131A for design flexibility. In an embodiment, each of Z1 and Z2 may include a series connection of a resistor and a capacitor.

The integrated circuit unit 131A according to various embodiments of the present disclosure is designed in consideration of scalability, and thus may be used in various types of active current compensation devices. For example, the integrated circuit unit 131A may use the current compensation device 100A-1 shown in FIG. 83, a current compensation device 100A-2 shown in FIG. 84, and a current compensation device 100A-3 shown in FIG. 85, and the current compensation device 100B shown in FIG. 86. The same type of integrated circuit unit 131A may be used in various embodiments, and the non-integrated circuit unit may be designed differently depending on an embodiment.

In various embodiments of the present disclosure, since the amplification unit 130 is divided into the integrated circuit unit and the non-integrated circuit unit, various types of active current compensation devices may be mass-produced by mass-producing the integrated circuit unit. In addition, the size of the active current compensation device may be minimized.

As described above, the active current compensation devices 100, 100A, 100A-1, 100A-2, 100A-3, and 100B according to various embodiments are characterized in that the amplification unit is divided into the integrated circuit unit and the non-integrated circuit unit.

Meanwhile, the active current compensation device 100A-1 may further include the decoupling capacitor unit 170A on an output side thereof (i.e., the second device 200 side). One ends of capacitors included in the decoupling capacitor unit 170A may be connected to the first high-current path 111 and the second high-current path 112, respectively. The opposite end of each of the capacitors may be connected to the first reference potential 601 of the current compensation device 100A-1.

The decoupling capacitor unit 170A may prevent the performance of outputting the compensation current of the active current compensation device 100A-1 from being significantly changed according to a change in an impedance value of the second device 200. An impedance ZY of the decoupling capacitor unit 170A may be designed to have a value less than a value specified in a first frequency band for which noise reduction is to be performed. As the decoupling capacitor unit 170A is coupled, the current compensation device 100A-1 may be used as an independent module in any system.

According to an embodiment, the decoupling capacitor unit 170A may be omitted from the active current compensation device 100A-1.

FIG. 84 schematically illustrates a configuration of the active current compensation device 100A-2 according to an embodiment of the present disclosure. Hereinafter, descriptions of contents overlapping with contents described with reference to FIGS. 82 and 83 will be omitted.

Referring to FIG. 84, the active current compensation device 100A-2 may actively compensate for first currents I11, I12, and I13 input as a common-mode current with respect to each of first through third high-current paths 111, 112, and 113 connected to the first device 300.

To this end, the active current compensation device 100A-2 may include first through third high-current paths 111, 112, and 113, a sensing transformer 120A-2, an amplification unit 130A, a compensation transformer 140A, and a compensation capacitor unit 150A-2.

When it is described in comparison with the active current compensation devices 100A and 100A-1 according to the above-described embodiments, the active current compensation device 100A-2 according to the embodiment described with reference to FIG. 84 includes first through third high-current paths 111, 112, and 113, and thus has differences in the sensing transformer 120A-2 and the compensation capacitor unit 150A-2. Thus, the active current compensation device 100A-2 will now be described below focusing on differences described above.

The active current compensation device 100A-2 may include a first high-current path 111, a second high-current path 112, and a third high-current path 113 that are distinguished from each other. According to an embodiment, the first high-current path 111 may be an R-phase power line, the second high-current path 112 may be an S-phase power line, and the third high-current path 113 may be a T-phase power line. The first currents I11, I12, and I13 may be input as a common-mode current with respect to each of the first high-current path 111, the second high-current path 112, and the third high-current path 113.

A primary side 121A-2 of the sensing transformer 120A-2 may be disposed in each of the first to third high-current paths 111 to 113 to generate an induced current in a secondary side 122A-2. Magnetic flux densities generated by the sensing transformer 120A-2 due to the first currents I11, I12, and I13 on the first through third high-current paths 111, 112, and 113 may be reinforced with each other.

In the active current compensation device 100A-2 according to the embodiment described with reference to FIG. 84, the amplification unit 130A may correspond to the above-described amplification unit 130A.

The compensation capacitor unit 150A-2 may provide paths through which compensation currents IC1, IC2, and IC3 generated by the compensation transformer 140A flow to the first to third high-current paths 111 to 113, respectively.

The active current compensation device 100A-2 may further include a decoupling capacitor unit 170A-2 on an output side thereof (i.e., the second device 200 side). One ends of capacitors included in the decoupling capacitor unit 170A-2 may be connected to the first high-current path 111, the second high-current path 112, and the third high-current path 113, respectively. The opposite end of each of the capacitors may be connected to the first reference potential 601 of the current compensation device 100A-2.

The decoupling capacitor unit 170A-2 may prevent the performance of outputting the compensation current of the active current compensation device 100A-2 from being significantly changed according to a change in an impedance value of the second device 200. An impedance ZY of the decoupling capacitor unit 170A-2 may be designed to have a value less than a value specified in a first frequency band for which noise reduction is to be performed. As the decoupling capacitor unit 170A-2 is coupled, the current compensation device 100A-2 may be used as an independent module in any system (e.g., a three-phase three-wire system).

According to an embodiment, the decoupling capacitor unit 170A-2 may be omitted from the active current compensation device 100A-2.

The active current compensation device 100A-2 according to the embodiment described above may be used to compensate (or cancel) for the first currents I11, I12, and I13 traveling from a load of a three-phase three-wire power system to a power source.

Of course, according to the technical spirit of the present disclosure, the active current compensation device according to various embodiments may be modified to be also applicable to a three-phase four-wire system.

The amplification unit 130A according to an embodiment of the present disclosure is applicable to the single-phase (two-wire) system shown in FIG. 82, the three-phase three-wire system shown in FIG. 83, and a three-phase four-wire system not shown in the drawing. Since a one-chip integrated circuit unit 131A is applicable to several systems, the integrated circuit unit 131A may have versatility in the active current compensation devices according to various embodiments.

As described above with reference to FIG. 83, the integrated circuit unit 131A may include a first transistor 11, a second transistor 12, and/or one or more resistors. In addition, according to an embodiment, the integrated circuit unit 131A may further include a diode 13. $I_n$ an embodiment, the diode 13 may be replaced by a resistor.

An IC chip having the integrated circuit unit 131A embedded therein may include a base terminal b1 of the first transistor 11, a collector terminal c1 of the first transistor 11, an emitter terminal e1 of the first transistor 11, a base terminal b2 of the second transistor 12, a collector terminal c2 of the second transistor 12, and an emitter terminal e2 of the second transistor 12. However, the present disclosure is not limited thereto, and the one-chip IC of the integrated circuit unit 131A may further include other terminals in addition to the terminals b1, b2, c1, c2, e1, and e2.

The integrated circuit unit 131A may be combined with a non-integrated circuit unit including discrete components such as an inductor, capacitors (e.g., Cb, Ce, and Cdc), Z1 and Z2 to configure the current compensation device according to various embodiments. For example, the discrete components of the non-integrated circuit unit may be commonly used commercial elements. However, the present disclosure is not limited thereto.

Discrete components such as the inductor, the capacitors (e.g., Cb, Ce, and Cdc), Z1 and Z2 are implemented around the IC chip in which the integrated circuit unit 131A is embedded.

Capacitance of each of the capacitors Cb, Ce, and Cdc required for a low-frequency AC signal to couple through each of the capacitors Cb, Ce, and Cdc may be several F or more. Such a capacitance value is difficult to be implemented in the IC chip in which the integrated circuit unit 131A is embedded, and thus the capacitors Cb, Ce, and Cdc may be implemented outside the integrated circuit unit, that is, in the non-integrated circuit unit.

The impedances Z1 and Z2 may be implemented outside the integrated circuit unit, i.e., in the non-integrated circuit unit, to achieve design flexibility for various first devices 300. It is possible to design various current compensation devices that allow the same integrated circuit unit 131A to be applied to various power systems by adjusting the impedances Z1 and Z2. In particular, the size and impedance characteristics of the sensing transformer 120A should vary depending on a maximum rated current of the first device 300. Thus, in order to make a ratio of an injected current to a sensed noise current uniform in a wide frequency range, a proper design of Z1 and Z2 is required. Accordingly, Z1 and Z2 may be implemented outside the integrated circuit unit 131A, that is, in the non-integrated circuit unit for design flexibility. In an embodiment, Z1 may be a series connection of a resistor R1 and a capacitor C1, and Z2 may be a series connection of a resistor R2 and a capacitor C2. Since C1 and C2 are additionally implemented in series next to R1 and R2 respectively, the ratio of the injected current to the sensed noise current in a low-frequency range may exhibit better performance.

Figure 85:
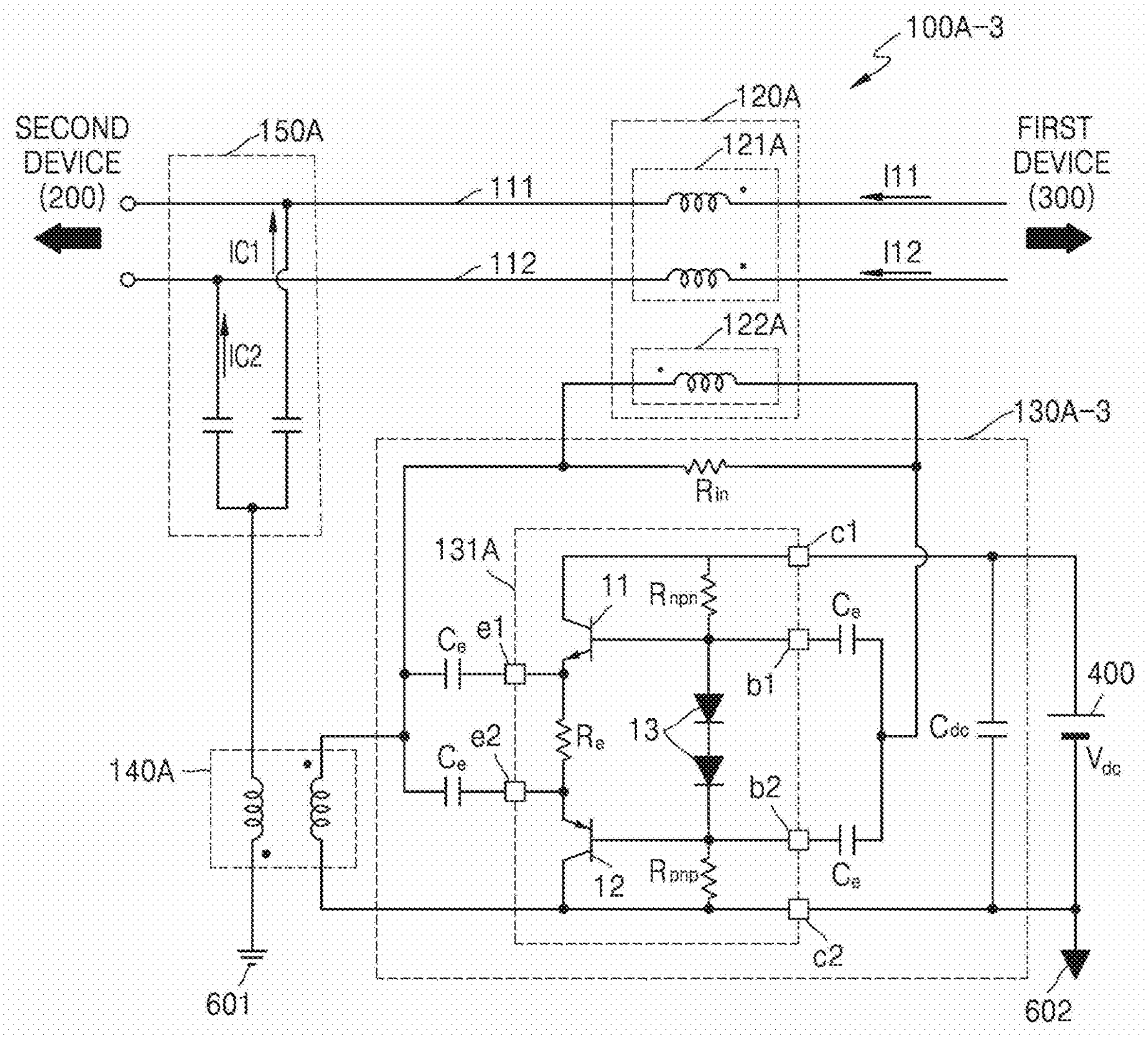
FIG. 85 schematically illustrates a configuration of an active current compensation device according to an embodiment of the present disclosure.

FIG. 85 schematically illustrates a configuration of the active current compensation device 100A-3 according to an embodiment of the present disclosure. Hereinafter, descriptions of contents overlapping with contents described with reference to FIGS. 82 and 83 will be omitted.

Referring to FIG. 85, the active current compensation device 100A-3 may actively compensate for first currents I11 and I12 input as a common-mode current with respect to each of high-current paths 111 and 112 connected to the first device 300.

To this end, the active current compensation device 100A-3 may include two high-current paths 111 and 112, a sensing transformer 120A, an amplification unit 130A-3, a compensation transformer 140A, and a compensation capacitor unit 150A.

The active current compensation device 100A-3 may be an example of the active current compensation device 100A illustrated in FIG. 82. The amplification unit 130A-3 may be an example of the amplification unit 130 illustrated in FIG. 82.

The amplification unit 130A-3 of the active current compensation device 100A-3 according to an embodiment may include an integrated circuit unit 131A and a non-integrated circuit unit. From among components of the amplification unit 130A-3, other components than the integrated circuit unit 131A may be included in the non-integrated circuit unit.

The integrated circuit unit 131A may correspond to the above-described integrated circuit unit 131A. That is, the above-described integrated circuit unit 131A is also applicable to the active current compensation device 100A-3 according to the embodiment described with reference to FIG. 85. Accordingly, since a description of the integrated circuit unit 131A is redundant, the integrated circuit unit 131A will be briefly described.

As described above, the integrated circuit unit 131A may include a first transistor 11, a second transistor 12, and/or one or more resistors. In an embodiment, the first transistor 11 may be an npn BJT, and the second transistor 12 may be a pnp BJT. For example, the amplification unit 130A-3 may have a push-pull amplifier structure including an npn BJT and a pnp BJT. The integrated circuit unit 131A may further include a diode 13 in addition to the first transistor 11, the second transistor 12, and the one or more resistors. For example, one end of the diode 13 may be connected to a base terminal of the first transistor 11, and the other end of the diode 13 may be connected to a base terminal of the second transistor 12. In an optional embodiment, the diode 13 may be replaced by a resistor.

An induced current induced in a secondary side 122A by the sensing transformer 120A may be differentially input to the amplification unit 130A-3. A resistor Rin may be connected in parallel to the secondary side 122A at an input end of the amplification unit 130A-3. An input impedance of the amplification unit 130A-3 may be adjusted through the resistor Rin. Only AC signals may be selectively coupled through the capacitors Cb and Ce.

The power supply 400 supplies a DC low voltage Vdc, which is based on the second reference potential 602, to drive the amplification unit 130A-3. Cdc is a DC decoupling capacitor and may be connected in parallel to the power supply 400. Only AC signals may be coupled between both collectors of the first transistor 11 (e.g., an npn BJT) and the second transistor 12 (e.g., a pnp BJT) through Cdc.

The above-described resistor Rin and capacitors Cb, Ce, and Cdc may be included in the non-integrated circuit unit.

Meanwhile, in the sensing transformer 120A, when a turns ratio of a primary side 121A and the secondary side 122A is 1:Nsen, current induced in the secondary side 122A has a magnitude of 1/Nsen times that of the first currents I11 and I12. In addition, in the compensation transformer 140A, when a turns ratio of a primary side 141A and a secondary side 142A is 1:Ninj, current (e.g., amplified current) induced in the secondary side 142A has a magnitude of 1/Ninj times that of current flowing in the primary side 141A. Accordingly, in order to generate compensation currents IC1 and IC2, which have the same magnitude and an opposite phase compared to the first currents I11 and I12 to cancel the first currents I11 and I12, a current gain of the amplification unit 130A-3 may be designed to be Nsen*Ninj.

Meanwhile, a current flowing through a collector and an emitter of a BJT varies according to a voltage applied between a base and the emitter of the BJT. When an input voltage of the amplification unit 130A-3 has a positive swing of greater than zero due to noise, the first transistor 11 (e.g., an npn BJT) may operate. When the input voltage of the amplification unit 130A-3 has a negative swing of less than zero due to a noise signal, the second transistor 12 (e.g., a pnp BJT) may operate.

The active current compensation device 100A-3 according to the embodiment described above may be used to compensate (or cancel) for the first currents I11 and I12 traveling from a load of a single-phase (two-wire) power system to a power source. However, the present disclosure is not limited thereto.

FIG. 86 schematically illustrates a configuration of the active current compensation device 100B according to an embodiment of the present disclosure.

Referring to FIG. 86, the active current compensation device 100B may actively compensate for first currents I11, I12, I13, and I14 input as a common-mode current with respect to each of first through fourth high-current paths 111, 112, 113, and 114 connected to the first device 300.

The active current compensation device 100B according to an embodiment may include first through fourth high-current paths 111, 112, 113, and 114, a noise coupling capacitor unit 181, a sensing transformer 120B, the amplification unit 130B, and the compensation unit 160B, a compensation distribution capacitor unit 182, and a decoupling capacitor 170B.

Unlike the current compensation devices 100A, 100A-1, 100A-2, and 100A-3 according to the above-described embodiments, the active current compensation device 100B may not be isolated from the first through fourth high-current paths 111, 112, 113, and 114. However, the same integrated circuit unit 131A as in the above-described embodiments may also be used in the active current compensation device 100B.

The active current compensation device 100B according to an embodiment may include a first high-current path 111, a second high-current path 112, a third high-current path 113, and a fourth high-current path 114 that are distinguished from each other. According to an embodiment, the first high-current path 111 may be an R-phase power line, the second high-current path 112 may be an S-phase power line, the third high-current path 113 may be a T-phase power line, and the fourth high-current path 114 may be an N-phase power line. The first currents I11, I12, I13, and I14 may be input as a common-mode current with respect to each of the first high-current path 111, the second high-current path 112, the third high-current path 113, and the fourth high-current path 114.

In an embodiment, the active current compensation device 100B may include the noise-coupling capacitor unit 181 on an input side thereof (i.e., the first device 300 side). The noise-coupling capacitor unit 181 may include X-capacitors (X-cap) for coupling noise between phases.

A primary side 121B of the sensing transformer 120B is disposed on each of the first high-current path 111, the second high-current path 112, the third high-current path 113, and the fourth high-current path 114 to generate an induced current in a secondary side 122B. Magnetic flux densities generated by the sensing transformer 120B due to the first currents I11, I12, I13, and I14 on the first through fourth high-current paths 111, 112, 113, and 114 may be reinforced with each other.

The amplification unit 130B may be divided into an integrated circuit unit 131A and a non-integrated circuit unit. In the amplification unit 130B, the other components other than the integrated circuit unit 131A may be included in the non-integrated circuit unit. For example, the components included in the non-integrated circuit unit may be commercial discrete elements, but the present disclosure is not limited thereto.

The integrated circuit unit 131A may correspond to the above-described integrated circuit unit 131A. That is, the above-described integrated circuit unit 131A is also applicable to the active current compensation device 100B according to the embodiment described with reference to FIG. 86. Accordingly, since a description of the integrated circuit unit 131A is redundant, the description thereof will be omitted.

In the amplification unit 130B, the non-integrated circuit unit may be implemented differently from the above-described embodiments. In this embodiment, the non-integrated circuit unit may include impedances Z0 and Zd, and capacitors Cb, Ce, and Cdc.

The impedances Z0 and Zd may be connected to a base side of each of first and second transistors 11 and 12. Here, the connection includes an indirect connection. The impedance Zd may be provided for high-frequency stabilization. For example, impedance Zd may be a resistor or a ferrite bead. However, the present disclosure is not limited thereto. The impedance Z0 may be provided for low-frequency stabilization. In addition, impedance Z0 may block DC signals. For example, impedance Z0 may be a series connection of a resistor and a capacitor. However, the present disclosure is not limited thereto.

Meanwhile, the amplification unit of the current compensation device 100B is not limited to the amplification unit 130B. The amplification unit of the current compensation device 100B may be implemented by one of the amplification units including the above-described amplification unit 130A, amplification unit 130A-1, amplification unit 130A-2, and amplification unit 130A-3. However, the present disclosure is not limited thereto.

The compensation unit 160B may inject a compensation current into one high-current path (e.g., the fourth high-current path 114). The compensation distribution capacitor unit 182 may be provided on an output side of the active current compensation device 100B (i.e., the second device 200 side). The compensation distribution capacitor unit 182 may include X-capacitors.

The active current compensation device 100B may include the decoupling capacitor 170B on the output side thereof (i.e., the second device 200 side). The decoupling capacitor 170B may be a Y-capacitor for impedance decoupling at an AC power terminal.

The active current compensation device 100B according to the embodiment described above may be used to compensate (or cancel) for the first currents I11, I12, I13, and I14 traveling from a load of a three-phase four-wire power system to a power source.

The active current compensation devices 100, 100A, 100A-1, 100A-2, 100A-3, and 100B according to various embodiments have little increase in size and heat generation in high-power systems as compared with passive EMI filters.

The active current compensation devices according to various embodiments include the one-chip integrated circuit unit 131 or 131A, so that the size thereof is minimized as compared with a case in which discrete semiconductor devices are included. The integrated circuit unit 131A is commonly and universally applicable to the active current compensation devices including the active current compensation devices 100, 100A, 100A-1, 100A-2, 100A-3, and 100B according to various embodiments.

The integrated circuit unit 131A and the active current compensation device including the same according to various embodiments may be used in various power electronic products regardless of a power rating. The integrated circuit unit 131A and the active current compensation device including the same according to various embodiments are expandable to a high power/high noise system.

Due to the one-chip integrated circuit unit 131A, the function of the active current compensation device may be expanded without having additional components.

The integrated circuit unit 131A according to various embodiments may have sufficient durability against an excessive voltage of the high-current path in which the active current compensation device is installed.

[5] Active Current Compensation Device Including One-Chip Integrated Circuit

Figure 87:
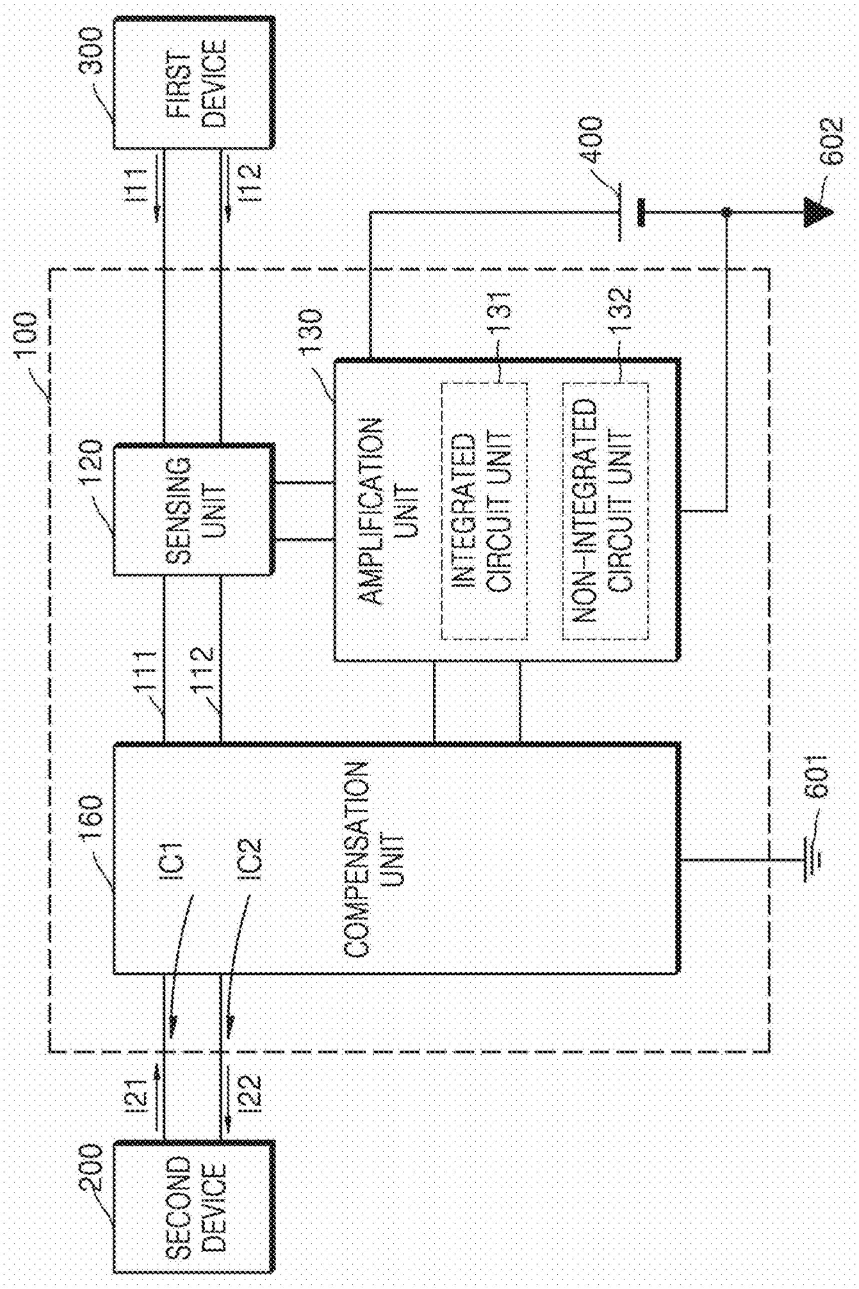
FIG. 87 schematically illustrates a configuration of a system including an active current compensation device according to an embodiment of the present disclosure.

FIG. 87 schematically illustrates a configuration of a system including an active current compensation device 100 according to an embodiment of the present disclosure. The active current compensation device 100 may actively compensate for first currents I11 and I12 (e.g., an EMI noise current) that are input as a common-mode current through two or more high-current paths 111 and 112 from a first device 300.

Referring to FIG. 87, the active current compensation device 100 may include a sensing unit 120, an amplification unit 130, and a compensation unit 160.

In the present specification, the first device 300 may be any of various types of power systems using power supplied by a second device 200. For example, the first device 300 may be a load that is driven using the power supplied by the second device 200. In addition, the first device 300 may be a load (e.g., an electric vehicle) that stores energy using the power supplied by the second device 200 and is driven using the stored energy. However, the present disclosure is not limited thereto.

In the present specification, the second device 200 may be any of various types of systems for supplying power to the first device 300 in the form of current and/or voltage. The second device 200 may be a device that supplies stored energy. However, the present disclosure is not limited thereto.

A power converter may be located on the first device 300 side. For example, the first currents I11 and I12 may be input to the current compensation device 100 due to a switching operation of the power converter. That is, the first device 300 side may correspond to a noise source and the second device 200 side may correspond to a noise receiver.

The two or more high-current paths 111 and 112 may be paths for transmitting the power supplied from the second device 200, that is, second currents I21 and I22, to the first device 300, for example, may be power lines. For example, the two or more high-current paths 111 and 112 may be a live line and a neutral line. At least some portions of the high-current paths 111 and 112 may pass through the current compensation device 100. The second currents I21 and I22 may be an alternating current having a frequency of a second frequency band. The second frequency band may be, for example, a band having a range of 50 Hz to 60 Hz.

Further, the two or more high-current paths 111 and 112 may also be paths through which noise generated by the first device 300, that is, the first currents I11 and I12, is transmitted to the second device 200. The first currents I11 and I12 may be input as a common-mode current with respect to each of the two or more high-current paths 111 and 112. The first currents I11 and I12 may be currents that are unintentionally generated in the first device 300 due to various causes. For example, the first currents I11 and I12 may be noise currents generated by virtual capacitance between the first device 300 and the surrounding environment. Alternatively, the first currents I11 and I12 may be noise currents generated due to a switching operation of the power converter of the first device 300. The first currents I11 and I12 may be currents having a frequency of a first frequency band. The first frequency band may be a frequency band higher than the second frequency band described above. The first frequency band may be, for example, a band having a range of 150 KHz to 30 MHz.

Figure 92:
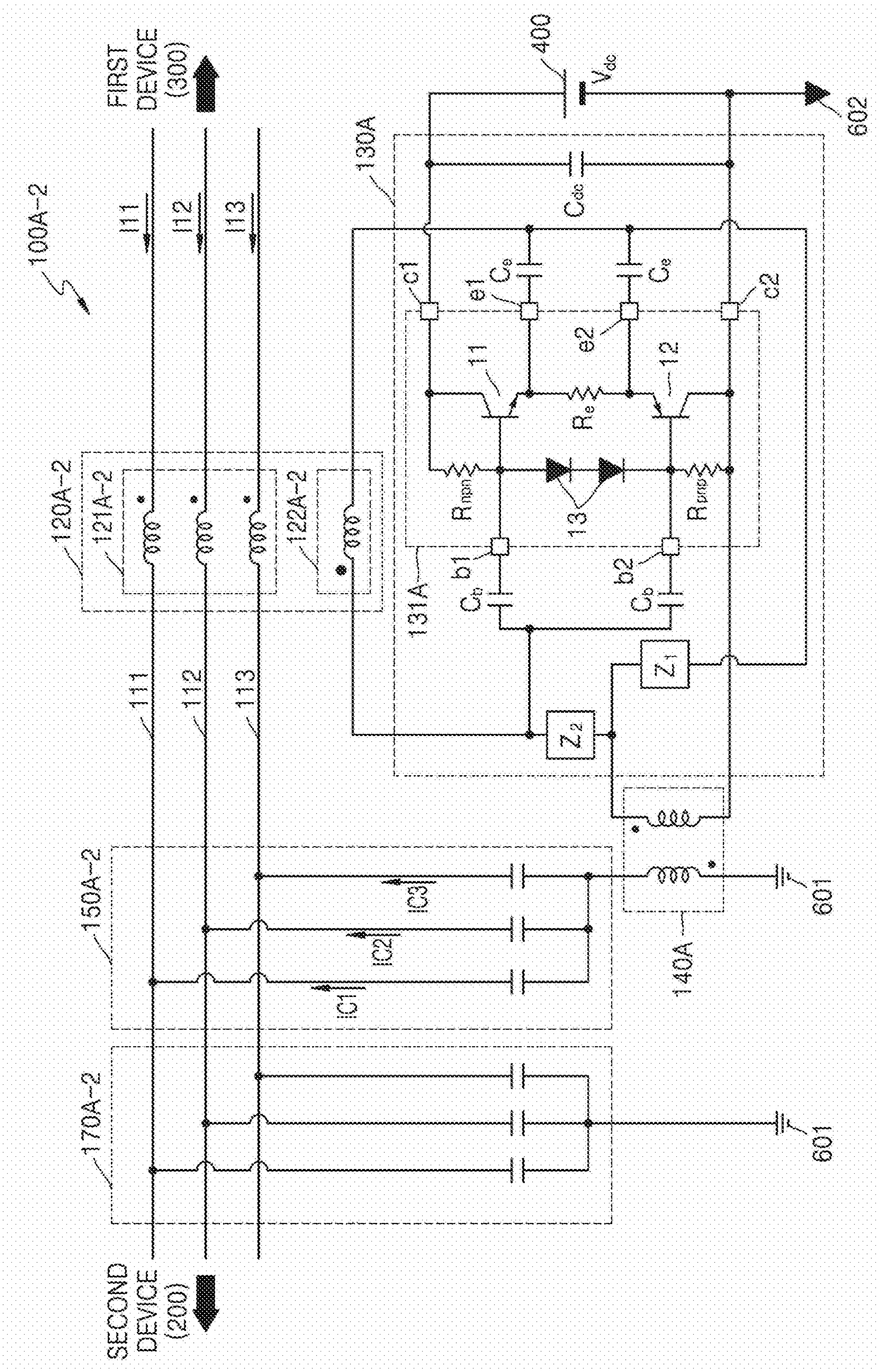
FIG. 92 schematically illustrates a configuration of an active current compensation device according to an embodiment of the present disclosure.

Meanwhile, the two or more high-current paths 111 and 112 may include two paths as shown in FIG. 87, or may include three paths as shown in FIG. 92. In addition, the two or more high-current paths 111 and 112 may include four paths. The number of the high-current paths 111 and 112 may vary depending on the type and/or form of power used by the first device 300 and/or the second device 200.

The sensing unit 120 may sense the first currents I11 and I12 on the two or more high-current paths 111 and 112 and generate an output signal corresponding to the first currents I11 and I12. That is, the sensing unit 120 may refer to a component that senses the first currents I11 and I12 on the high-current paths 111 and 112. In order for the sensing unit 120 to sense the first currents I11 and I12, at least some portion of the high-current paths 111 and 112 may pass through the sensing unit 120, but a portion of the sensing unit 120, which generates an output signal according to the sensing, may be isolated from the high-current paths 111 and 112. For example, the sensing unit 120 may be implemented as a sensing transformer. The sensing transformer may sense the first currents I11 and I12 on the high-current paths 111 and 112 in a state of being isolated from the high-current paths 111 and 112. However, the sensing unit 120 is not limited to the sensing transformer.

According to an embodiment, the sensing unit 120 may be differentially connected to input terminals of the amplification unit 130.

The amplification unit 130 may be electrically connected to the sensing unit 120, and may amplify the output signal output from the sensing unit 120 to generate an amplified output signal. The term "amplification" by the amplification unit 130, as used herein, may indicate the adjustment of the magnitude and/or phase of an object to be amplified. The amplification unit 130 may be implemented by various components, and may include active elements. In an embodiment, the amplification unit 130 may include BJTs. For example, the amplification unit 130 may include a plurality of passive elements, such as resistors and capacitors, in addition to the BJTs. However, the present disclosure is not limited thereto, and the component for the "amplification" described in the present disclosure may be used without being limited to the amplification unit 130 of the present disclosure.

According to an embodiment, a second reference potential 602 of the amplification unit 130 and a first reference potential 601 of the current compensation device 100 may be distinguished from each other. For example, when the amplification unit 130 is isolated from the high-current paths 111 and 112, the second reference potential 602 of the amplification unit 130 and the first reference potential 601 of the current compensation device 100 may be distinguished from each other.

However, the present disclosure is not limited thereto. For example, when the amplification unit 130 is not isolated from the high-current paths 111 and 112, the reference potential of the amplification unit and the reference potential of the current compensation device may not be distinguished from each other.

The amplification unit 130 according to various embodiments of the present disclosure may include a one-chip integrated circuit (IC) 131 and a non-integrated circuit unit 132. The one-chip IC 131 may include essential components of the active current compensation device 100. The essential components may include active elements. That is, the active elements included in the amplification unit 130 may be integrated into the one-chip IC 131. In the amplification unit 130, the non-integrated circuit unit 132 may not include active elements. The IC 131 may further include passive elements as well as the active elements.

The IC 131 according to an embodiment of the present disclosure may physically be one IC chip. The IC 131 according to an embodiment of the present disclosure is applicable to the active current compensation device 100 of various designs. The one-chip IC 131 according to an embodiment of the present disclosure has versatility as an independent module and is applicable to the current compensation device 100 of various designs.

The non-integrated circuit unit 132 according to an embodiment of the present disclosure may be modified according to the design of the active current compensation device 100.

The one-chip IC 131 may include terminals b1, b2, e1, and e2 to be connected to the non-integrated circuit unit 132. The IC 131 and the non-integrated circuit unit 132 may be combined together to function as the amplification unit 130. The combination of the IC 131 and the non-integrated circuit unit 132 may perform a function of generating an amplified signal from the output signal output from the sensing unit 120. The amplified signal may be input to the compensation unit 160.

Examples of the detailed configuration of the amplification unit 130 including the IC 131 and the non-integrated circuit unit 132 will be described below with reference to FIGS. 89, 91, and 92.

The amplification unit 130 may receive power from a power supply 400 that is distinguished from the first device 300 and/or the second device 200. The amplification unit 130 may receive the power from the power supply 400, and amplify the output signal output from the sensing unit 120 to generate an amplified current.

The power supply 400 may be a device that receives power from a power source that is independent of the first device 300 and the second device 200 and generates input power of the amplification unit 130. Alternatively, the power supply 400 may also be a device that receives power from any one of the first device 300 and the second device 200 and generates input power of the amplification unit 130.

The one-chip IC 131 may include a terminal c1 to be connected to the power supply 400, a terminal c2 to be connected to the second reference potential 602, and the terminals b1, b2, e1, and e2 to be connected to the non-integrated circuit unit 132. In other embodiments, the one-chip IC 131 may further include terminals for other functions.

The power supply 400 may supply a DC voltage Vdc, which is based on the second reference potential 602, to drive the amplification unit 130. A capacitor Cdc for providing decoupling for Vdc may be connected in parallel to the power supply 400. The capacitor Cdc may be connected outside the IC 131, and may be connected between the power terminal c1 and the terminal c2 corresponding to the second reference potential.

In the amplification unit 130, the other components other than the IC 131 may be included in the non-integrated circuit unit 132. Thus, the capacitor Cdc may be referred to as being included in the non-integrated circuit unit 132.

The compensation unit 160 may generate compensation currents IC1 and IC2 on the basis of the amplified output signal generated by the amplification unit 130. An output side of the compensation unit 160 may be connected to the high-current paths 111 and 112 to allow the compensation currents IC1 and IC2 to flow to the high-current paths 111 and 112.

According to an embodiment, the output side of the compensation unit 160 may be isolated from the amplification unit 130. For example, the compensation unit 160 may include a compensation transformer for the isolation. For example, the output signal of the amplification unit 130 may flow through a primary side of the compensation transformer, and the compensation current based on the output signal may be generated on a secondary side of the compensation transformer.

However, the present disclosure is not limited thereto. According to an embodiment, the output side of the compensation unit 160 may also be isolated from the amplification unit 130. In this case, the amplification unit 130 may not be isolated from the high-current paths 111 and 112.

In order to cancel the first currents I11 and I12, the compensation unit 160 may inject the compensation currents IC1 and IC2 into the high-current paths 111 and 112 through the two or more high-current paths 111 and 112, respectively. The compensation currents IC1 and IC2 may have the same magnitude and an opposite phase compared to the first currents I11 and I12.

Figure 88:
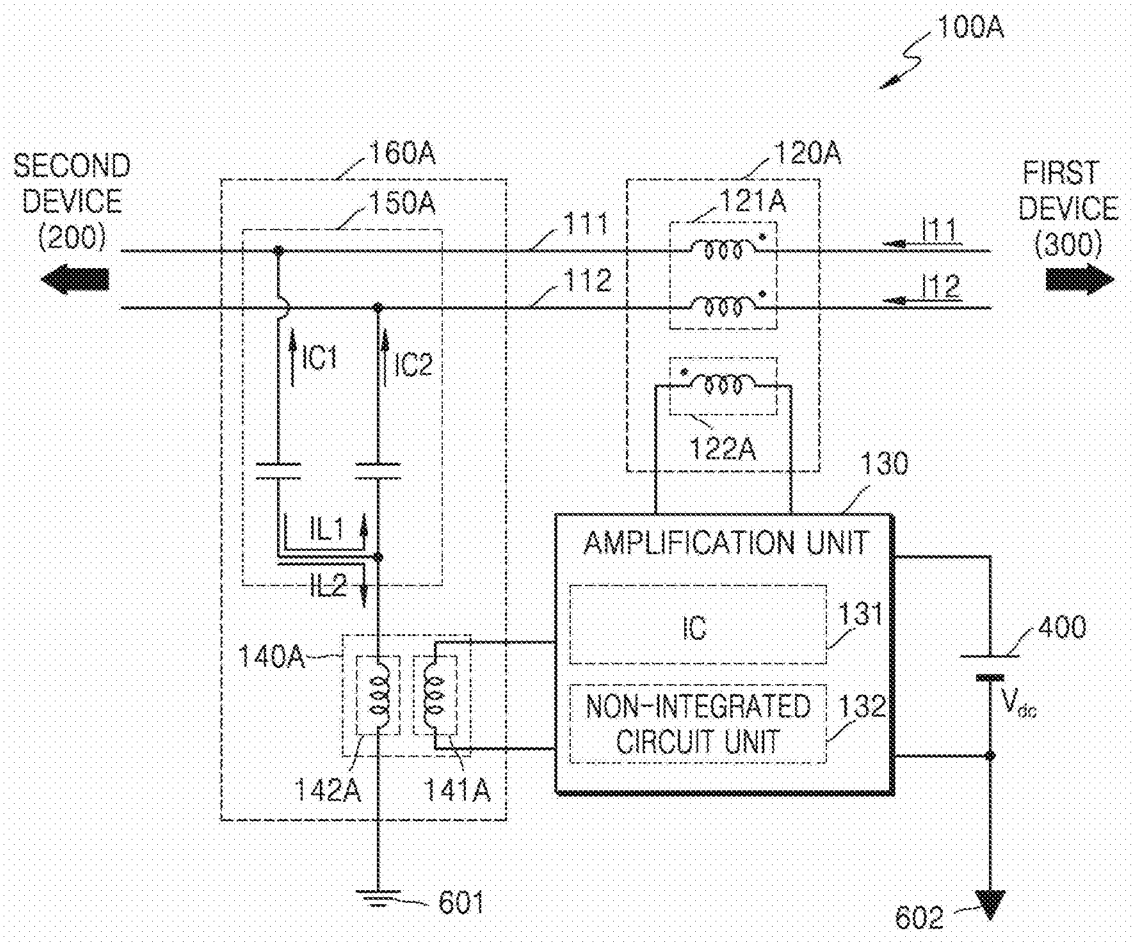
FIG. 88 illustrates a more specific example of the embodiment described with reference to FIG. 87, and schematically illustrates an active current compensation device according to an embodiment of the present disclosure.

FIG. 88 illustrates a more specific example of the embodiment described with reference to FIG. 87, and schematically illustrates an active current compensation device 100A according to an embodiment of the present disclosure. The active current compensation device 100A may actively compensate for first currents I11 and I12 (e.g., a noise current) input as a common-mode current with respect to each of two high-current paths 111 and 112 connected to the first device 300.

Referring to FIG. 88, the active current compensation device 100A may include a sensing transformer 120A, an amplification unit 130, and a compensation unit 160A.

In an embodiment, the sensing unit 120 described above may include the sensing transformer 120A. In this case, the sensing transformer 120A may be a component for sensing the first currents I11 and I12 on the high-current paths 111 and 112 in a state of being isolated from the high-current paths 111 and 112. The sensing transformer 120A may sense the first currents I11 and I12 that are noise currents input through the high-current paths 111 and 112 (e.g., power lines) from the first device 300 side.

The sensing transformer 120A may include a primary side 121A disposed on the high-current paths 111 and 112 and a secondary side 122A differentially connected to input terminals of the amplification unit 130. The sensing transformer 120A may generate an induced current, which is directed to the secondary side 122A (e.g., a secondary winding), on the basis of magnetic flux densities induced due to the first currents I11 and I12 at the primary side 121A (e.g., a primary winding) disposed on the high-current paths 111 and 112. The primary side 121A of the sensing transformer 120A may be, for example, a winding in which each of a first high-current path 111 and a second high-current path 112 is wound around one core. However, the present disclosure is not limited thereto, and the primary side 121A of the sensing transformer 120A may have a form in which the first high-current path 111 and the second high-current path 112 pass through the core.

Specifically, the sensing transformer 120A may be configured such that the magnetic flux density induced due to the first current I11 on the first high-current path 111 (e.g., a live line) and the magnetic flux density induced due to the first current I12 on the second high-current path 112 (e.g., neutral line) are overlapped (or reinforced) with each other. In this case, the second currents I21 and I22 also flow through the high-current paths 111 and 112, and thus the sensing transformer 120A may be configured such that a magnetic flux density induced due to the second current I21 on the first high-current path 111 and a magnetic flux density induced due to the second current I22 on the second high-current path 112 cancel each other. In addition, as an example, the sensing transformer 120A may be configured such that magnitudes of the magnetic flux densities, which are induced due to the first currents I11 and I12 of a first frequency band (e.g., a band having a range of 150 KHz to 30 MHz), are greater than magnitudes of the magnetic flux densities induced due to the second currents I21 and I22 of a second frequency band (for example, a band in a range of 50 Hz to 60 Hz).

As described above, the sensing transformer 120A may be configured such that the magnetic flux densities induced due to the second currents I21 and I22 may cancel each other so that only the first currents I11 and I12 may be sensed. That is, the current induced in the secondary side 122A of the sensing transformer 120A may be a current into which the first currents I11 and I12 are converted at a predetermined ratio.

For example, in the sensing transformer 120A, when a turns ratio of the primary side 121A and the secondary side 122A is 1:Nsen, and a self-inductance of the primary side 121A of the sensing transformer 120A is Lsen, the secondary side 122A may have a self-inductance of Nsen2*Lsen. In this case, the current induced in the secondary side 122A has a magnitude that is 1/Nsen times that of the first currents I11 and I12. In an example, the primary side 121*a* and the secondary side 122*a* of the sensing transformer 120*a* may be coupled with a coupling coefficient of Ksen.

The secondary side 122A of the sensing transformer 120A may be connected to the input terminals of the amplification unit 130. For example, the secondary side 122A of the sensing transformer 120A may be differentially connected to the input terminals of the amplification unit 130 and provide the induced current or an induced voltage to the amplification unit 130.

The amplification unit 130 may amplify the current that is sensed by the sensing transformer 120A and induced in the secondary side 122A. For example, the amplification unit 130 may amplify the magnitude of the induced current at a predetermined ratio and/or adjust a phase of the induced current.

According to various embodiments of the present disclosure, the amplification unit 130 may include a one-chip IC 131 and a non-integrated circuit unit 132 that is a component other than the IC chip.

The IC 131 may include active elements. The IC 131 may be connected to the power supply 400, which is based on the second reference potential 602, to drive the active elements. The second reference potential 602 may be distinguished from the first reference potential 601 of the current compensation device 100A (or the compensation unit 160A).

The one-chip IC 131 may include a terminal c1 to be connected to the power supply 400, a terminal c2 to be connected to the second reference potential 602, and terminals b1, b2, e1, and e2 to be connected to the non-integrated circuit unit 132.

The compensation unit 160A may be an example of the above-described compensation unit 160. In an embodiment, the compensation unit 160A may include a compensation transformer 140A and a compensation capacitor unit 150A. The amplified current amplified by the above-described amplification unit 130 flows through a primary side 141A of the compensation transformer 140A.

The compensation transformer 140A according to an embodiment may be a component for isolating the amplification unit 130 including active elements from the high-current paths 111 and 112. That is, the compensation transformer 140A may be a component for generating compensation current (in a secondary side 142A) to be injected into the high-current paths 111 and 112 on the basis of the amplified current in a state of being isolated from the high-current paths 111 and 112.

The compensation transformer 140A may include the primary side 141A differentially connected to output terminals of the amplification unit 130 and the secondary side 142A connected to the high-current paths 111 and 112. The compensation transformer 140A may induce a compensation current, which is directed toward the secondary side 142A (e.g., a secondary winding), on the basis of a magnetic flux density induced due to the amplified current flowing through the primary side 141A (e.g., a primary winding).

In this case, the secondary side 142A may be disposed on a path connecting the compensation capacitor unit 150A, which will be described below, and the first reference potential 601 of the current compensation device 100A. That is, one end of the secondary side 142A is connected to the high-current paths 111 and 112 through the compensation capacitor unit 150A, and the other end of the secondary side 142A may be connected to the first reference potential 601 of the active current compensation device 100A. Meanwhile, the primary side 141A of the compensation transformer 140A, the amplification unit 130, and the secondary side 122A of the sensing transformer 120A may be connected to the second reference potential 602, which is distinguished from the reference potential of the other components of the active current compensation device 100A. The first reference potential 601 of the current compensation device 100A according to an embodiment and the second reference potential 602 of the amplification unit 130 may be distinguished from each other.

As described above, in the current compensation device 100A according to an embodiment, the component generating the compensation current uses a reference potential (i.e., the second reference potential 602) different from that of the other components and uses the separate power supply 400, and thus, may operate in a state of being isolated from the other components, thereby improving the reliability of the active current compensation device 100A. However, the active current compensation device including the IC 131 and the non-integrated circuit unit 132 according to the present disclosure is not limited to such an isolating structure. The active current compensation device according to an embodiment of the present disclosure may not be isolated from the high-current path.

In the compensation transformer 140A according to an embodiment, when a turns ratio of the primary side 141A and the secondary side 142A is 1:Ninj, and a self-inductance of the primary side 141A of the compensation transformer 140A is Linj, the secondary side 142A may have a self-inductance of Ninj2*Linj. In this case, the current induced in the secondary side 142A has a magnitude that is 1/Ninj times that of the current (i.e., the amplified current) flowing in the primary side 141A. In an example, the primary side 141A and the secondary side 142A of the compensation transformer 140A may be coupled with a coupling coefficient of kinj.

The current converted through the compensation transformer 140A may be injected into the high-current paths 111 and 112 (e.g., power lines) through the compensation capacitor unit 150A as compensation currents IC1 and IC2. Accordingly, the compensation currents IC1 and IC2 may have the same magnitude and an opposite phase compared to the first currents I11 and I12 to cancel the first currents I11 and I12. Accordingly, a magnitude of a current gain of the amplification unit 130 may be designed to be Nsen*Ninj. However, since a magnetic coupling loss may occur in an actual situation, a target current gain of the amplification unit 130 may be designed to be higher than Nsen*Ninj.

As described above, the compensation capacitor unit 150A may provide a path through which the current generated by the compensation transformer 140A flows to each of the two high-current paths 111 and 112.

The compensation capacitor unit 150A may include Y-capacitors (Y-cap) each having one end connected to the secondary side 142A of the compensation transformer 140A and the other end connected to the high-current paths 111 and 112. For example, one ends of the two Y-caps share a node connected to the secondary side 142A of the compensation transformer 140A, and the opposite ends of the two Y-caps may have a node connected to the first high-current path 111 and the second high-current path 112.

The compensation capacitor unit 150A may allow the compensation currents IC1 and IC2 induced by the compensation transformer 140A to flow to the power line. As the compensation currents IC1 and IC2 compensate (cancel) for the first currents I11 and I12, the current compensation device 100A may reduce noise.

Meanwhile, the compensation capacitor unit 150A may be configured such that a current IL1 flowing between the two high-current paths 111 and 112 through the compensation capacitors has a magnitude less than a first threshold magnitude. In addition, the compensation capacitor unit 150A may be configured such that a current IL2 flowing between each of the two high-current paths 111 and 112 and the first reference potential 601 through the compensation capacitors has a magnitude less than a second threshold magnitude.

The active current compensation device 100A according to an embodiment may be implemented as an isolated structure by using the compensation transformer 140A and the sensing transformer 120A.

Figure 89:
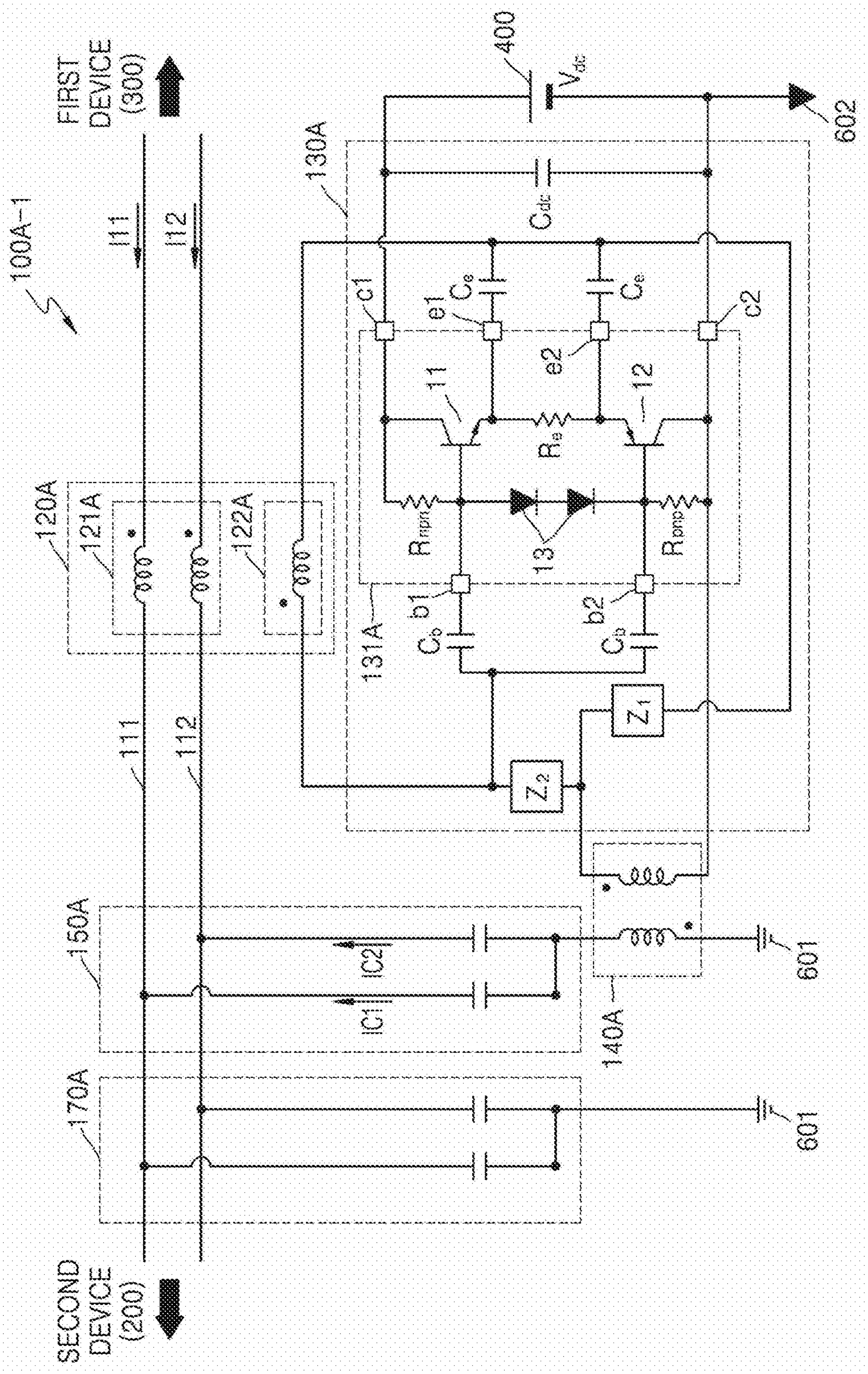
FIG. 89 illustrates a more specific example of the embodiment described with reference to FIG. 88, and schematically illustrates an active current compensation device according to an embodiment of the present disclosure.

FIG. 89 illustrates a more specific example of the embodiment described with reference to FIG. 88, and schematically illustrates an active current compensation device 100A-1 according to an embodiment of the present disclosure. The active current compensation device 100A-1, an amplification unit 130A, and an IC 131A illustrated in FIG. 89 are respectively exemplary of the active current compensation device 100A, the amplification unit 130, and the IC 131 illustrated in FIG. 88.

The active current compensation device 100A-1 according to an embodiment may include a sensing transformer 120A, the amplification unit 130A, a compensation transformer 140A, and a compensation capacitor unit 150A. In an embodiment, the active current compensation device 100A-1 may further include a decoupling capacitor unit 170A on an output side thereof (i.e., the second device 200 side). In other embodiments, the decoupling capacitor unit 170A may be omitted. Descriptions of the sensing transformer 120A, the compensation transformer 140A, and the compensation capacitor unit 150A are redundant and thus omitted.

In an embodiment, an induced current induced in a secondary side 122A by the sensing transformer 120A may be differentially input to the amplification unit 130A.

The amplification unit 130A of the active current compensation device 100A-1 according to an embodiment may include the one-chip IC 131A and a non-integrated circuit unit. In the amplification unit 130A, the other components other than the iC 131A may be included in the non-integrated circuit unit. In embodiments of the present disclosure, the IC 131A is physically implemented in one chip. Components included in the non-integrated circuit unit may be commercial discrete elements. The non-integrated circuit unit may be implemented differently depending on an embodiment. The non-integrated circuit unit may be modified so that the same one-chip IC 131A is applicable to the active current compensation device 100 of various designs.

The one-chip IC 131A may include an npn BJT 11, a pnp BJT 12, a diode 13, and one or more resistors.

In an embodiment, the one or more resistors included in the IC 131A may include Rnpn, Rpnp, and/or Re. In the IC 131A, the resistor Rnpn may connect a collector node and a base node of the npn BJT 11. In the IC 131A, then resistor Rpnp may connect a collector node and a base node of the pnp BJT 12. In the IC 131A, the resistor Re may connect an emitter node of the npn BJT 11 and an emitter node of the pnp BJT 12.

The power supply 400 may supply a DC voltage Vdc between the collector node of the npn BJT 11 and the collector node of the pnp BJT 12 to drive the amplification unit 130A. The collector node of the pnp BJT 12 may correspond to the second reference potential 602, and the collector node of the npn BJT 11 may correspond to the supply voltage Vdc of the power supply 400, which is based on the second reference potential 602.

In an embodiment, in the IC 131A, the biasing diode 13 may connect the base node of the npn BJT 11 and the base node of the pnp BJT 12. That is, one end of the diode 13 may be connected to the base node of the npn BJT 11, and the other end of the diode 13 may be connected to the base node of the pnp BJT 12.

According to embodiments of the present disclosure, the resistors Rnpn, Rpnp, and Re, and/or the biasing diode 13 included in the IC 131A may be used for DC biasing of the BJTs 11 and 12. In an embodiment of the present disclosure, the resistors Rnpn, Rpnp, and Re, and the biasing diode 13 are general-purpose components in various active current compensation devices 100 and 100A, and thus may be integrated in the one-chip IC 131A.

The one-chip IC 131A according to an embodiment of the present disclosure may include a terminal b1 corresponding to a base of the npn BJT 11 and a terminal c1 corresponding to a collector of the npn BJT 11, a terminal e1 corresponding to an emitter of the npn BJT 11, a terminal b2 corresponding to a base of the pnp BJT 12, a terminal c2 corresponding to a collector of the pnp BJT 12, and a terminal e2 corresponding to an emitter of the pnp BJT 12. However, the present disclosure is not limited thereto, and the one-chip IC 131A may further include other terminals in addition to the terminals b1, b2, c1, c2, e1, and e2.

In various embodiments, at least one of the terminals b1, b2, c1, c2, e1, and e2 of the one-chip IC 131A may be connected to the non-integrated circuit unit. The one-chip IC 131A and the non-integrated circuit unit may be combined together to function as the amplification unit 130A according to an embodiment.

In an embodiment, the non-integrated circuit unit may include capacitors Cb, Ce, and Cdc, and impedances Z1 and Z2.

According to an embodiment, the capacitors Cb of the non-integrated circuit unit may be respectively connected to the base terminals b1 and b2 of the one-chip IC 131A. The capacitors Ce of the non-integrated circuit unit may be respectively connected to the emitter terminals e1 and e2 of the IC 131A. In the outside of the IC 131A, the collector terminal c2 of the pnp BJT 12 may be connected to the second reference potential 602. In the outside of the IC 131A, the power supply 400 may be connected between both collector terminals c1 and c2. In the outside of the IC 131A, the capacitor Cdc of the non-integrated circuit unit may be connected between both collector terminals c1 and c2.

The capacitors Cb and Ce included in the non-integrated circuit unit may respectively block DC voltages at the base node and the emitter node of each of the BJTs 11 and 12. Only AC signals may be selectively coupled through the capacitors Cb and Ce.

The capacitor Cdc is a DC decoupling capacitor for the voltage Vdc, and may be connected in parallel with respect to the supply voltage Vdc of the power supply 400. Only AC signals may be coupled between both collectors of the npn BJT 11 and the pnp BJT 12 through the capacitors Cdc.

A current gain of the amplification unit 130A may be controlled by a ratio of the impedances Z1 and Z2. Z1 and Z2 may be flexibly designed depending on a turns ratio of each of the sensing transformer 120A and the compensation transformer 140A and a required target current gain. Accordingly, Z1 and Z2 may be implemented outside the one-chip IC 131A (i.e., in the non-integrated circuit unit).

A combination of the IC 131A and Cb, Ce, Cdc, Z1, and Z2 of the non-integrated circuit unit may function as the amplification unit 130A according to an embodiment. For example, the amplification unit 130A may have a push-pull amplifier structure including an npn BJT and a pnp BJT.

In an embodiment, the secondary side 122A side of the sensing transformer 120A may be connected between a base side and an emitter side of each of the BJTs 11 and 12. In an embodiment, a primary side 141A of the compensation transformer 140A may be connected between a collector side and the base side of each of the BJTs 11 and 12. The connection in the present embodiment includes an indirect connection.

In an embodiment, the amplification unit 130A may have a regression structure in which an output current is injected back into the base of each of the BJTs 11 and 12. Due to the regression structure, the amplification unit 130A may stably obtain a constant current gain for operating the active current compensation device 100A-1.

For example, when an input voltage of the amplification unit 130A has a positive swing of greater than zero due to a noise signal, the npn BJT 11 may operate. In this case, the operating current may flow through a first path passing through the npn BJT 11. When the input voltage of the amplification unit 130A has a negative swing of less than zero due to a noise signal, the pnp BJT 12 may operate. In this case, the operating current may flow through a second path passing through the pnp BJT 12.

In the IC 131A, an operating point of each of the BJTs may be controlled through the resistors Rnpn, Rpnp, and Re. The resistors Rnpn, Rpnp, and Re may be designed according to the operating point of the BJT.

According to an embodiment of the present disclosure, elements having temperature characteristics may be integrated in the one-chip IC 131A. According to an embodiment, the npn BJT 11, the pnp BJT 12, the biasing diode 13, Rnpn, Rpnp, and Re may be integrated into the one-chip IC 131A. When the elements are integrated into a one-chip, a size of the amplification unit 130A may be minimized as compared with a case in which discrete elements are used. In the present document, the elements having temperature characteristics may refer to elements having certain circuit characteristics in a wide temperature range, for example, from extremely low to high temperatures. The elements having temperature characteristics may refer to elements in which element characteristics vary according to a temperature that changes in a wide temperature range. According to an embodiment of the present disclosure, by embedding the active elements having temperature characteristics in the one-chip IC 131A, it is possible to implement the one-chip IC 131A having constant (or stable) circuit characteristics even when a temperature changes. According to an embodiment of the present disclosure, it is possible to implement the amplification unit 130A and the active current compensation device 100A-1, which exhibit constant performance even when a temperature changes, by embedding the active elements having temperature characteristics in the one-chip IC 131A. That is, the one-chip IC 131A may be designed such that the amplification unit 130A exhibits constant performance even when a temperature changes. Here, the expression "the amplification unit 130A exhibits constant performance" is used as a meaning including that the amplification unit 130A maintains stable performance in a predetermined range.

In addition, according to an embodiment of the present disclosure, a temperature may be shared by the elements (e.g., the BJTs 11 and 12, the diode 13, Re, and the like) having temperature characteristics. Accordingly, characteristics according to a temperature may be easily predicted through, for example, simulation or the like. Thus, it is possible to design the amplification unit 130A that is controllable and predictable even when a temperature changes. On the other hand, when discrete elements are used as the BJTs, the diode, and the resistors, since temperature characteristics of the elements may be different, it may be difficult to predict the operation of the amplification unit.

In addition, according to an embodiment of the present disclosure, even when the number of semiconductor devices increases, the size and production cost of the IC 131A or the active current compensation device 100A may increase insignificantly. Accordingly, the one-chip IC 131A and the active current compensation device 100A may be easily mass-produced.

An inductor, the capacitors (e.g., Cb, Ce, and Cdc), Z1, and Z2 of the non-integrated circuit unit are discrete components, and may be implemented around the one-chip IC 131A.

Capacitance of each of the capacitors Cb, Ce, and Cdc required for an AC signal to couple through each of the capacitors Cb, Ce, and Cdc may be several F or more (e.g., 10 μF). Such a capacitance value is difficult to be implemented in the one-chip IC, and thus the capacitors Cb, Ce, and Cdc may be implemented outside the IC 131A, that is, in the non-integrated circuit unit.

Depending on the design of the non-integrated circuit unit, the one-chip IC 131A may be used for the first device 300 (or the second device 200) of various power systems. For example, the one-chip IC 131A may be independent of a power rating of the first device 300, and the non-integrated circuit unit may be designed according to the power rating of the first device 300. For example, values of impedances Z1 and Z2 may be determined on the basis of a turns ratio of each of the sensing transformer 120A and the compensation transformer 140A and a target current gain of the amplification unit 130A. A configuration of the one-chip IC 131A may be independent of the turns ratio and the target current gain.

The impedances Z1 and Z2 may be implemented outside the IC, i.e., in the non-integrated circuit unit, to achieve design flexibility for various power systems or various first devices 300. Z1 and Z2 may be flexibly designed depending on the turns ratio of each of the sensing transformer 120A and the compensation transformer 140A and the required target current gain. It is possible to design various current compensation devices that allow the same IC 131A to be applied to various power systems by adjusting the impedances Z1 and Z2.

In particular, the size and impedance characteristics of the sensing transformer 120A should vary depending on a maximum rated current of the first device 300. Thus, in order to make a ratio of an injected current to a sensed noise current uniform in a wide frequency range, a proper design of Z1 and Z2 is required. Z1 and Z2 may be designed so that the ratio of the injected current to the sensed noise current becomes 1 in a wide frequency range by adjusting the turns ratio of each of the sensing transformer 120A and the compensation transformer 140A and a ratio of Z1 and Z2. To this end, the impedances Z1 and Z2 may be implemented outside the IC 131A for design flexibility. In an embodiment, Z1 may be a series connection of a resistor R1 and a capacitor C1, and Z2 may be a series connection of a resistor R2 and a capacitor C2. Since C1 and C2 are additionally implemented in series next to R1 and R2 respectively, the ratio of the injected current to the sensed noise current in a low-frequency range may exhibit better performance.

The IC 131A according to various embodiments of the present disclosure is designed in consideration of scalability, and thus may be used in various types of active current compensation devices. The same type of IC 131A may be used in various embodiments, and the non-integrated circuit unit may be designed differently depending on an embodiment.

Meanwhile, the active current compensation device 100A-1 may further include the decoupling capacitor unit 170A on an output side thereof (i.e., the second device 200 side). One ends of capacitors included in the decoupling capacitor unit 170A may be connected to a first high-current path 111 and a second high-current path 112, respectively. The opposite end of each of the capacitors may be connected to the first reference potential 601 of the current compensation device 100A-1.

The decoupling capacitor unit 170A may prevent the performance of outputting the compensation current of the active current compensation device 100A-1 from being significantly changed according to a change in an impedance value of the second device 200. An impedance ZY of the decoupling capacitor unit 170A may be designed to have a value less than a value specified in a first frequency band which is subjected to a decrease in noise reduction. As the decoupling capacitor unit 170A is coupled, the current compensation device 100A-1 may be used as an independent module in any system.

According to an embodiment, the decoupling capacitor unit 170A may be omitted from the active current compensation device 100A-1.

Figure 90:
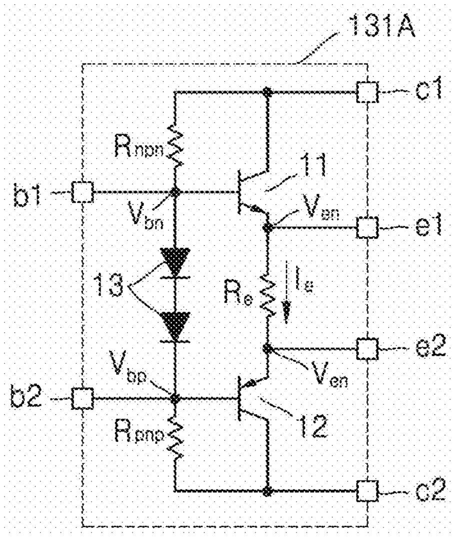
FIG. 90 schematically illustrates a one-chip IC according to an embodiment of the present disclosure.

FIG. 90 schematically illustrates the one-chip IC 131A according to an embodiment of the present disclosure. The one-chip IC 131A is the same as described above and thus will be omitted.

A DC bias circuit for BJT should be designed to have a constant DC operating point as much as possible even when a temperature changes. According to embodiments of the present disclosure, a DC bias circuit for the BJTs 11 and 12 may be designed to have a stable DC operating point in a certain range even when a temperature changes.

Referring to FIG. 90, the biasing diode 13 and the resistors Rnpn, Rpnp, and Re may be used in the DC bias design. In order to bias the BJT, a forward voltage of the biasing diode 13 may have to be equal to or slightly higher than twice a base-emitter voltage of the BJT. In an embodiment of the present disclosure, the biasing diode 13 and the resistor Re may prevent a thermal runaway of the BJTs 11 and 12.

In general, when a current flows through a BJT and heat is generated, a current gain of the BJT increases, which in turn generates more heat. The thermal runaway indicates a phenomenon in which the BJT is damaged by continuously increasing heat generated due to such a positive feedback.

According to an embodiment of the present disclosure, a DC bias current may be adjusted and the thermal runaway may be prevented from occurring by providing the resistor Re between the emitter node of the npn BJT 11 and the emitter node of the pnp BJT 12. Since the resistor Re is increased as the temperature increases, the increase in current Ie may be prevented. Accordingly, the resistor Re may act as a negative feedback element with respect to the current Ie or heat.

According to an embodiment of the present disclosure, by providing the diode 13 between the base node of the npn BJT 11 and the base node of the pnp BJT 12, the thermal runaway may be prevented from occurring. The diode 13 has a characteristic of decreasing the forward voltage compared to a forward current as a temperature increases. Accordingly, in an embodiment of the present disclosure, the diode 13 formed between the base terminals of the BJTs 11 and 12 may serve to lower the voltage between the base terminals thereof as a temperature increases. As a result, the BJTs 11 and 12 may be turned on relatively less easily when the diode 13 is present than when the diode 13 is not present. Accordingly, an increase of the current Ie in response to an increase in temperature may be relatively reduced. Thus, the diode 13 may act as a negative feedback element for the current Ie.

As described above, since the positive feedback according to a temperature and the negative feedback by resistor Re and the diode 13 act together on the BJTs 11 and 12, the BJTs 11 and 12 may maintain a constant current range even when a temperature changes.

When DC bias voltages in the npn BJT 11 and the pnp BJT 12 are well balanced, the DC emitter current Ie may be obtained as in Equation 1 below.

$$I_e \approx \frac{V_{dc} - 2V_{be} - 2R_{bias}I_d}{R_e + \frac{2R_{bias}}{h_{fe}+1}} \quad \text{[Equation 1]}$$

In Equation 1, Vdc is a voltage supplied between the collector of the npn BJT 11 and the collector of the pnp BJT 12, Id is a forward bias current of the diode 13, and Vbe is a base-emitter voltage of the BJT, and hfe is a current gain of the BJT. In addition, in an embodiment, Rbias=Rnpn=Rpnp.

In an embodiment, values of Id and Vbe may be designed according to IV (current-voltage) characteristics of the diode 13 and the BJTs 11 and 12 in the customized IC 131A.

Figure 91:
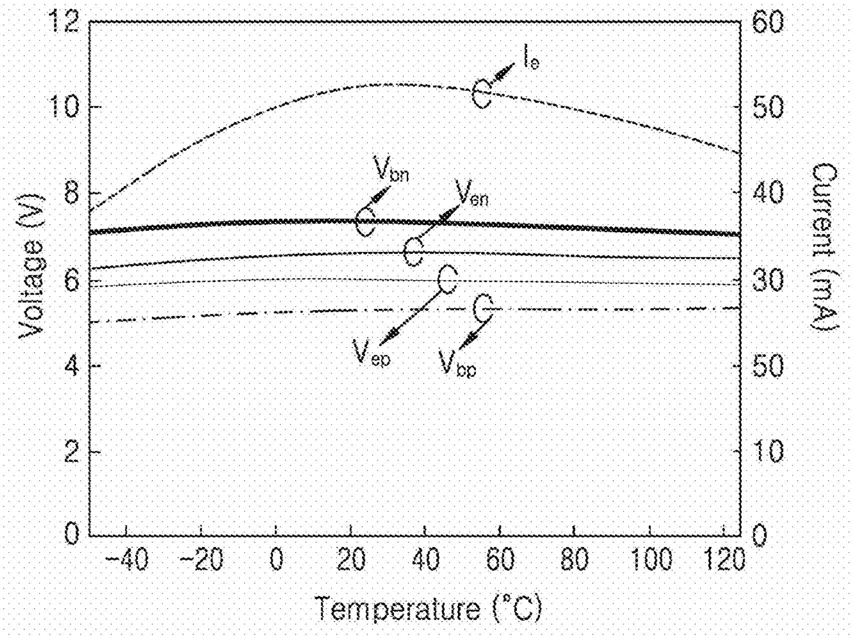
FIG. 91 illustrates simulation results of bias current and voltage of the one-chip IC shown in FIG. 90 according to a temperature.

FIG. 91 illustrates simulation results of bias current and voltage of the one-chip IC 131A shown in FIG. 90 according to a temperature. The graph shown in FIG. 91 shows a DC simulation result of the IC 131A according to a temperature change in a range of −50° C. to 125° C.

Ie is a DC emitter current, Vbn is a voltage of the base node of the npn BJT 11 with respect to the second reference potential 602 (i.e., DC ground reference), Ven is a voltage of the emitter node of the npn BJT 11 with respect to the second reference potential 602, Vbp is a voltage of the base node of the pnp BJT 12 with respect to the second reference potential 602, and Vep is a voltage of the emitter node of the pnp BJT 12 with respect to the second reference potential 602.

Referring to FIG. 91, it can be seen that Vbe (=Vbn−Ven) of the npn BJT 11 and Vbe (=Vep−Vbp) of the pnp BJT 12 are maintained at about 0.75 V in an entire temperature range. In addition, the DC bias voltage is well balanced at around 6 V, which is half of Vdc. That is, a distribution of each node voltage Vbn, Ven, Vbp, or Vep according to a temperature may be constant. As the distribution of each node voltage according to a temperature change is constant, this may advantageously affect the performance of the active current compensation device 100A-1.

According to an embodiment, it can be seen that the current Ie is maintained at a constant level in a range of about 40 to 50 mA even when the temperature is increased up to 125° C. The current Ie does not increase beyond a certain range while the temperature is increased but rather decreases slightly at 40° C. or more. In other words, it can be seen that the thermal runaway does not occur since the current Ie does not continuously increase even when the temperature is increased.

As a result, due to the fact that the bias resistor Re and the diode 13 is embedded into the one-chip IC 131A, the thermal runaway may be prevented from occurring even without using additional discrete components.

On the other hand, when the elements (e.g., the BJTs 11 and 12, the diode 13, resistor Re, and the like) having temperature characteristics are discrete elements, it is difficult for the temperature to be shared by the elements. In this case, the temperature characteristics of the resistors, the diode 13, and the BJTs 11 and 12 may be different from each other. Accordingly, it may be difficult to predict and control the bias voltage and current according to the actual temperature. In addition, in the case of configuring the amplification unit with commercial discrete elements, it is difficult to freely design I-V (current-voltage) characteristics, and thus the optimum design for the active current compensation device may be difficult to achieve. In addition, when discrete elements are used, production costs can be continuously increased according to the number of semiconductor devices.

In embodiments of the present disclosure, as the amplification unit of the active current compensation device includes the one-chip IC 131A, the emitter current Ie and the voltage may be adjusted as desired in consideration of the characteristics of a semiconductor device. In embodiments of the present disclosure, since elements having temperature characteristics are formed in the one-chip IC and a temperature is shared thereby, characteristics of the elements according to a temperature may be easily predicted. In the case of the one-chip IC 131A according to embodiments of the present disclosure, an increase in size due to an increase in the number of semiconductor devices may be insignificant, and an increase in costs due to mass production may also be insignificant.

FIG. 92 schematically illustrates a configuration of an active current compensation device 100A-2 according to an embodiment of the present disclosure. Hereinafter, descriptions of contents overlapping with contents described with reference to FIGS. 88 to 91 will be omitted.

Referring to FIG. 92, the active current compensation device 100A-2 may actively compensate for first currents I11, I12, and I13 input as a common-mode current with respect to each of first through third high-current paths 111, 112, and 113 connected to the first device 300.

To this end, the active current compensation device 100A-2 may include first through third high-current paths 111, 112, and 113, a sensing transformer 120A-2, an amplification unit 130A, a compensation transformer 140A, and a compensation capacitor unit 150A-2.

When it is described in comparison with the active current compensation devices 100A and 100A-1 according to the above-described embodiments, the active current compensation device 100A-2 according to the embodiment described with reference to FIG. 92 includes first through fourth high-current paths 111, 112, and 113, and thus has differences in the sensing transformer 120A-2 and the compensation capacitor unit 150A-2. Thus, the active current compensation device 100A-2 will now be described below focusing on differences described above.

The active current compensation device 100A-2 may include a first high-current path 111, a second high-current path 112, and a third high-current path 113 that are distinguished from each other. According to an embodiment, the first high-current path 111 may be an R-phase power line, the second high-current path 112 may be an S-phase power line, and the third high-current path 113 may be a T-phase power line. The first currents I11, I12, and I13 may be input as a common-mode current with respect to each of the first high-current path 111, the second high-current path 112, and the third high-current path 113.

A primary side 121A-2 of the sensing transformer 120A-2 may be disposed in each of the first to third high-current paths 111 to 113 to generate an induced current in a secondary side 122A-2. Magnetic flux densities generated by the sensing transformer 120A-2 due to the first currents I11, I12, and I13 on the first through third high-current paths 111, 112, and 113 may be reinforced with each other.

The amplification unit 130A of the active current compensation device 100A-2 according to the embodiment described with reference to FIG. 92, may correspond to the amplification unit 130A described above.

The compensation capacitor unit 150A-2 may provide paths through which compensation currents IC1, IC2, and IC3 generated by the compensation transformer 140A flow to the first to third high-current paths 111 to 113, respectively.

The active current compensation device 100A-2 may further include a decoupling capacitor unit 170A-2 on an output side thereof (i.e., the second device 200 side). One ends of capacitors included in the decoupling capacitor unit 170A-2 may be connected to the first high-current path 111, the second high-current path 112, and the third high-current path 113, respectively. The opposite end of each of the capacitors may be connected to the first reference potential 601 of the current compensation device 100A-2.

The decoupling capacitor unit 170A-2 may prevent the performance of outputting the compensation current of the active current compensation device 100A-2 from being significantly changed according to a change in an impedance value of the second device 200. An impedance ZY of the decoupling capacitor unit 170A-2 may be designed to have a value less than a value specified in a first frequency band for which noise reduction is to be performed. As the decoupling capacitor unit 170A-2 is coupled, the current compensation device 100A-2 may be used as an independent module in any system (e.g., a three-phase three-wire system).

According to an embodiment, the decoupling capacitor unit 170A-2 may be omitted from the active current compensation device 100A-2.

The active current compensation device 100A-2 according to the embodiment described above may be used to compensate (or cancel) for the first currents I11, I12, and I13 traveling from a load of a three-phase three-wire power system to a power source.

Of course, according to the technical spirit of the present disclosure, the active current compensation device according to various embodiments may be modified to be also applicable to a three-phase four-wire system.

The amplification unit 130A according to an embodiment of the present disclosure is applicable to the single-phase (two-wire) system shown in FIG. 89, the three-phase three-wire system shown in FIG. 92, and a three-phase four-wire system not shown in the drawing. Since a one-chip IC 131A is applicable to several systems, the IC 131A may have versatility in the active current compensation devices according to various embodiments.

The particular implementations shown and described herein are illustrative examples of the embodiments and are not intended to otherwise limit the scope of the embodiments in any way. For the sake of brevity, conventional electronics, control systems, software development and other functional aspects of the systems may not be described in detail. Further, the connecting lines or connectors shown in the drawings are intended to represent example functional relationships and/or physical or logical couplings between the various elements. It should be noted that many alternative or additional functional relationships, physical connections, or logical connections may be present in a practical device.

An active current compensation device according to various embodiments of the present disclosure configured as described above may reduce the price, area, volume, weight, and heat generation in a high-power system as compared with a passive filter configured with a CM choke.

Further, an active current compensation device according to various embodiments of the present disclosure may detect a failure or malfunction of an active circuit unit.

Further, in various embodiments of the present disclosure, one IC chip in which an active circuit unit and a malfunction detection unit are embedded together may be provided. By embedding the malfunction detection unit in the chip in which the active circuit unit is integrated, the size and price may be reduced as compared with a case of separately configuring the malfunction detection unit using commonly used commercial elements.

Further, by integrating the active circuit unit and the malfunction detection unit into the single IC chip, the IC chip may have versatility as an independent component and may be commercialized.

In addition, a current compensation device including the above-described IC chip may also be manufactured as an independent module and commercialized. The current compensation device may detect a malfunction as an independent module regardless of the characteristics of a peripheral electrical system.

An active current compensation device according to various embodiments of the present disclosure configured as described above is applicable to any of various systems by including an embedded power conversion unit.

In various embodiments of the present disclosure, by embedding an active circuit unit and the power conversion unit in one IC chip, the IC chip may have versatility as an independent component and may be commercialized.

In addition, the current compensation device including the above-described IC chip may also be manufactured as an independent module and commercialized. The active circuit unit included in the current compensation device may stably operate regardless of the characteristics of a peripheral electrical system.

An active current compensation device according to various embodiments of the present disclosure configured as described above may reduce the price, area, volume, weight, and heat generation in a high-power system as compared with a passive filter configured with a CM choke.

Further, an active current compensation device according to various embodiments of the present disclosure is minimized in size as compared with a case in which discrete semiconductor devices are included.

Further, an integrated circuit unit according to various embodiments of the present disclosure may be universally applied to active current compensation devices of various designs.

Further, the active current compensation device including the integrated circuit unit according to various embodiments of the present disclosure may be used in various power electronic products regardless of power rating. Accordingly, the active current compensation device according to various embodiments of the present disclosure is expandable to a high power/high noise system.

Further, the active current compensation device including the integrated circuit unit according to various embodiments of the present disclosure may be easily mass-produced.

Further, the active current compensation device and/or the one-chip integrated circuit unit according to various embodiments of the present disclosure may have versatility as an independent module and may be commercialized.

An active current compensation device according to embodiments of the present disclosure configured as described above may reduce the price, area, volume, weight, and heat generation in a high-power system as compared with a passive filter configured with a CM choke.

Further, an active current compensation device according to embodiments of the present disclosure may prevent a thermal runaway phenomenon. The active current compensation device according to embodiments of the present disclosure may maintain a current in a constant range against a change in temperature by utilizing both positive and negative feedback for a temperature of a BJT.

Further, in an active current compensation device according to embodiments of the present disclosure, elements having temperature characteristics are formed in a one-chip IC and a temperature is shared thereby, and thus characteristics of the elements according to a temperature may be easily predicted.

Accordingly, it is possible to design an active circuit unit (or an amplification unit) that is controllable and predictable even when the temperature changes.

An amplification unit according to embodiments of the present disclosure includes a one-chip IC, and thus may be designed so that current-voltage (I-V) characteristics are controllable as compared with a case of being configured with commercial discrete elements. That is, the one-chip IC according to embodiments of the present disclosure may be custom designed. That is, current and voltage in the one-chip IC may be controllable.

Further, even when the one-chip IC and the active current compensation device including the same according to embodiments of the present disclosure are mass-produced, an increase in production cost may be insignificant. In addition, an increase in size due to an increase in the number of semiconductor devices may be insignificant.

The particular implementations shown and described herein are illustrative examples of the embodiments and are not intended to otherwise limit the scope of the embodiments in any way. For the sake of brevity, conventional electronics, control systems, software development and other functional aspects of the systems may not be described in detail. Further, the connecting lines or connectors shown in the drawings are intended to represent example functional relationships and/or physical or logical couplings between the various elements. It should be noted that many alternative or additional functional relationships, physical connections, or logical connections may be present in a practical device. In addition, no item or element is essential to the practice of the present disclosure unless the element is specifically described as "essential" or "critical".

Therefore, it should be noted that the spirit of the present disclosure is not limited to the embodiments described above, and not only the claims to be described below, but also all ranges equivalent to or equivalently changed from the claims fall within the scope of the spirit of the present disclosure.

What is claimed is:

1. A current compensating device configured to actively compensate for a first current input as a common mode current from a first device, the current compensating device comprising:

at least two or more high current paths through which a second current supplied from a second device is transmitted to the first device;

a first balancing unit configured to adjust balancing of the first current between the at least two or more high current paths;

a sensing unit configured to detect the first current, of which balancing has been adjusted by the first balancing unit, and generate an output signal corresponding to a detection result, on the at least two or more high current paths;

an amplifying unit configured to amplify the output signal to generate an amplified output signal;

a compensating unit configured to generate a compensation current on the basis of the amplified output signal; and a compensating capacitor unit configured to provide a path through which the compensation current flows to each of the at least two or more high current paths, wherein the first current is a current of a first frequency band, and the first balancing unit includes one or more high current path connection units configured to provide paths through which the current of the first frequency band flows between the at least two or more high current paths.

2. The current compensating device of claim 1, wherein, in the first frequency band, a difference between voltages of the at least two or more high current paths is reduced to a predetermined threshold voltage difference or less by the one or more high current path connection units.

3. The current compensating device of claim 1, wherein a difference between impedances when viewed to respective the at least two or more high current paths from the first balancing unit is less than or equal to a predetermined threshold impedance difference.

4. The current compensating device of claim 1, wherein the current compensating device further includes a second balancing unit configured to adjust balancing of synthetic currents, which are generated by adding the compensation current to the first current whose balancing has been adjusted, on the at least two or more high current paths.

5. The current compensating device of claim 1, wherein the current compensating device further includes a phase control unit configured to electrically connect the at least two or more high current paths between the second device and the current compensating device such that the at least two or more electrically connected high current paths are used as one high current path.

6. The current compensating device of claim 1, wherein the compensating capacitor unit configured to provide a path through which the compensation current flows to a reference high current path which is one of the at least two or more high current paths, further comprising a second balancing unit configured to distribute the compensation current, which has been provided to the reference high current path, to the at least two or more high current paths, wherein the second balancing unit adjusts balancing of synthetic currents on the at least two or more high current paths, wherein the synthetic currents are currents obtained by adding the compensation current to the first current of which balancing has been adjusted on each of the at least two or more high current paths.

7. The current compensating device of claim 6, wherein the current compensating device further includes an output impedance control unit configured to control an output impedance from the compensating unit toward the second device.

8. The current compensating device of claim 7, wherein the output impedance control unit includes a first capacitor configured to provide a path through which a current flows between the reference high current path and a reference potential of the compensating unit, and the second balancing unit includes one or more second capacitors configured to provide a path through which a current flows between the reference high current path and each of the remaining high current paths.

9. The current compensating device of claim 8, wherein the output impedance is a synthetic impedance obtained by connecting a first impedance, which is obtained by connecting the first capacitor and the second capacitor to each other in series, to an impedance of the second device in parallel.

* * * * *